United States Patent [19]

Houlberg et al.

[11] Patent Number: 5,726,747
[45] Date of Patent: Mar. 10, 1998

[54] COMPUTER CONTROLLED OPTICAL TRACKING SYSTEM

[75] Inventors: Christian L. Houlberg, Ventura; James Steven Hochstetler, Camarillo, both of Calif.

[73] Assignee: The United States of America as represented by the Secretary of the Navy, Washington, D.C.

[21] Appl. No.: 641,131

[22] Filed: Apr. 22, 1996

[51] Int. Cl.[6] .............................. H04N 7/18; F41G 1/00
[52] U.S. Cl. ........................ 356/139.04; 356/139.05; 356/139.06; 348/169; 348/144; 250/203.1
[58] Field of Search .................... 356/139.04, 139.05, 356/139.06; 348/169, 164, 144, 152, 153; 250/203.1, 203.3

[56] References Cited

U.S. PATENT DOCUMENTS

| | | | |
|---|---|---|---|
| 4,231,534 | 11/1980 | Lintell et al. | 244/3.16 |
| 4,259,009 | 3/1981 | Jerigan | 356/1 |
| 4,773,754 | 9/1988 | Eisele | 356/152 |
| 5,203,220 | 4/1993 | Lerman | 74/5.22 |

*Primary Examiner*—George Dombroske
*Assistant Examiner*—Joseph L. Felber
*Attorney, Agent, or Firm*—Melvin J. Sliwka; David S. Kalmbaugh

[57] ABSTRACT

A tracking system including an acquisition sight for use by a pilot of an aircraft to acquire a target. Once the pilot acquires the target an operator uses a track handle to take control of tracking the target. The operator monitors the target utilizing narrow and wide field of view monitors. When the target is visible within the narrow field of monitor, the operator can switch tracking of the target to an automatic video tracking system which tracks the target by contrasting the target and its surroundings. A computer, which receives azimuth and elevation data from the tracking device, processes the data and provides azimuth and elevation angle signals to a gimballed mirror to steer the mirror to the target. The gimballed mirror receives image forming light from the target and then directs the light to a wide field of view camera and a zoom telescope. The wide field of view camera is connected to the wide field of view monitor to provide a wide field of view image with overlay graphics for display to the operator. The zoom telescope provides a narrow field of view image and then directs the narrow field of view image to a narrow field of view camera. The narrow field of view camera is connected to the narrow field of view monitor which provides a narrow field of view image with overlay graphics of the target for display to the operator.

20 Claims, 16 Drawing Sheets

COMPUTER CONTROLLED OPTICAL TRACKING SYSTEM

BACKGROUND OF THE INVENTION

1. Field of the Invention

The present invention relates generally to tracking systems. More specifically, the present invention relates to an optical tracking system which is computer controlled and which is adapted for use on board an airborne platform such as aircraft, helicopter or the like.

2. Description of the Prior Art

In the past optical tracking systems have been extensively used for acquiring, locating, and tracking objects of interest from an airborne platform. For example, in tracking the movement of illegal drugs via an airborne vehicle, such as helicopter 37 of FIG. 2, or a land based vehicle from the air, an optical tracking system on board a helicopter can be extremely useful in that it continually provides updated information as to the movement, direction and location of the vehicle. By accurately identifying the movement, direction and location of the vehicle to law enforcement personnel on the ground an arrest can be made without undue endangerment to the individuals making the arrest.

An airborne optical tracking system can also be extremely useful in tracking illegal aliens entering the United States across its many boarders which cover several hundred miles of rugged terrain and which are not easily accessible by land. Other uses for airborne optical tracking system include search and rescue missions at sea and on land where the terrain is very rugged.

Generally, an optical tracking system for an airborne platform utilizing video cameras is referred to as an Airborne Video Tracking System (AVTS). These Airborne Video Tracking Systems are often manually controlled by either the pilot of the aircraft or a crew member. However, optical tracking systems which are manually controlled often lack the ability to quickly acquire a target. In addition, the manually controlled airborne optical tracking systems are generally unable to steer the optics to point to a specific latitude and longitude for the target in a rapid response time or to slave the optics of the optical tracking system with another tracking system and thereby follow the other tracking system. Such a tracking system may be an acquisition sight tracking system or an infrared or radar tracking system.

It is therefore an object of the present invention to provide an airborne tracking system which allows for the immediate acquisition of a target of interest by the user of the system.

It is another object of the present invention to provide instantaneous location including longitude and latitude coordinates for the target of interest.

It is still another object of the present invention to provide an airborne optical tracking system which may be slaved with another tracking system so as to follow the other tracking system.

Various other advantages and objectives of the present invention will become apparent to those skilled in the art by the detailed description of the invention and its preferred embodiments.

SUMMARY OF THE INVENTION

The present invention overcomes some of the disadvantages mentioned above in that it comprises a highly accurate and reliable airborne video tracking system for use in tracking a target of interest and then providing instantaneous location information including the longitude, latitude and altitude for the target.

The airborne video tracking system comprises an acquisition sight for use by a pilot of an aircraft to acquire and begin tracking the target. Once the pilot acquires the target, an operator at an operator's console in the aircraft can use a track handle to manually take control of tracking the target from the pilot. The operator monitors the target utilizing a narrow field of view monitor and a wide field of view monitor located at the operator console. When the target is visible within the narrow field of view monitor the operator can switch tracking of the target from the track handle to an automatic video tracking system. The automatic video tracking system tracks the target based upon the contrast between the target and its surroundings.

A computer receives azimuth and elevation positional signals from the tracking device being used to track the target. The tracking device may be the acquisition sight, the track handle, the automatic video tracking system or a tracking radar which is coupled to an infrared display system. The computer then processes the azimuth and elevation data from the tracking device and provides azimuth and elevation angle signals in an analog format to a gimballed mirror to steer the gimballed mirror to the target.

The gimballed mirror receives image forming light from the target and then directs the image forming light via a first turning mirror to a wide field of view camera and a zoom telescope. The wide field of view camera is connected to the wide field of view monitor via an airborne video tracking system computer at the operator console allowing a wide field of view image to be displayed to the operator at the operator's console.

The zoom telescope, which also receives image forming light from the gimballed mirror via a second turning mirror, provides a narrow field of view image ranging from about 0.1 degree to about one degree. The zoom telescope directs the narrow field of view image to a narrow field of view camera. The narrow field of view camera is connected to the narrow field of view monitor via the airborne video tracking system computer at the operator console allowing a narrow field of view image of the target to be displayed to the operator at the operator's console.

The computer includes a video time inserter/video data inserter which overlays time and positional information of the target on the narrow field of view display. The video time inserter/video data inserter also overlays time and positional information of the aircraft as well as positional indicators of the gimballed mirror on the wide field of view display.

DETAILED DESCRIPTION OF THE PREFERRED EMBODIMENT

Figure 1:
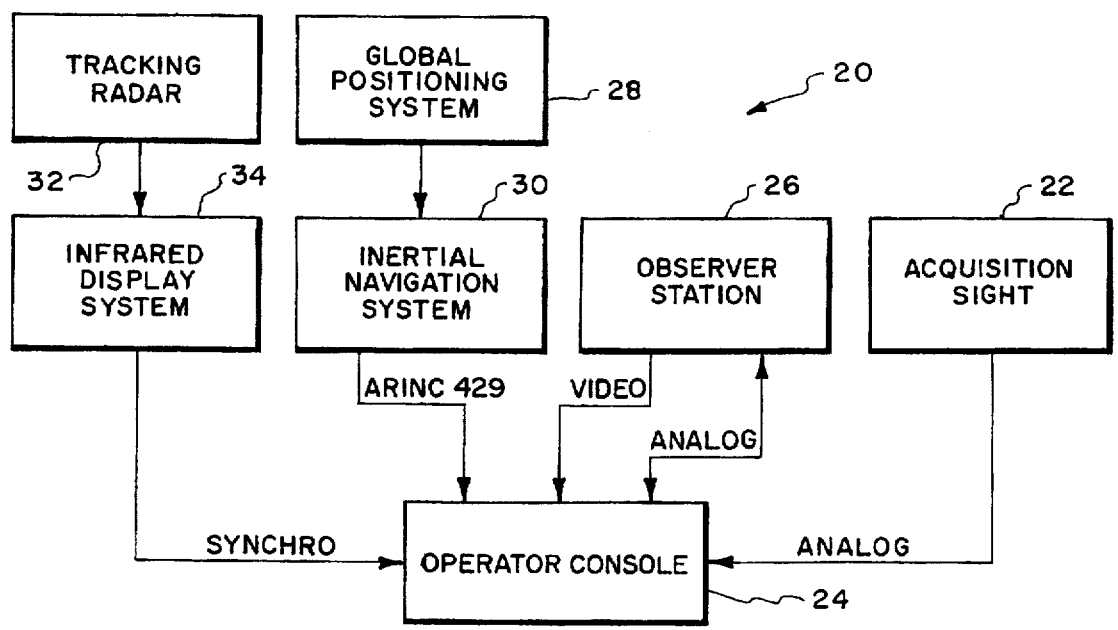
FIG. 1 is a simplified block diagram of the airborne tracking system constituting the present invention.

Referring to FIG. 1 there is shown a simplified block diagram of the airborne video tracking system 20 which is adapted for use on board an aircraft or helicopter or the like. Airborne video tracking system 20 includes an observer station 26 and an operator console 24. The operator console 24 is connected to observer station 26 which has the optical tracking elements of airborne video tracking system 20. The operator console 24 is also connected to an acquisition sight 22 which is generally located in the aircraft's cockpit and which is used by the aircraft's pilot for the initial acquisition of the target when airborne video tracking system 20 is being used to track a target such as the helicopter 37 illustrated in FIG. 2. Although target 37 is depicted as a helicopter in FIG. 2, it should be understood that tracking system 20 is also used to track land based targets such as trucks and automobiles as well as the aforementioned airborne targets.

Figure 2:
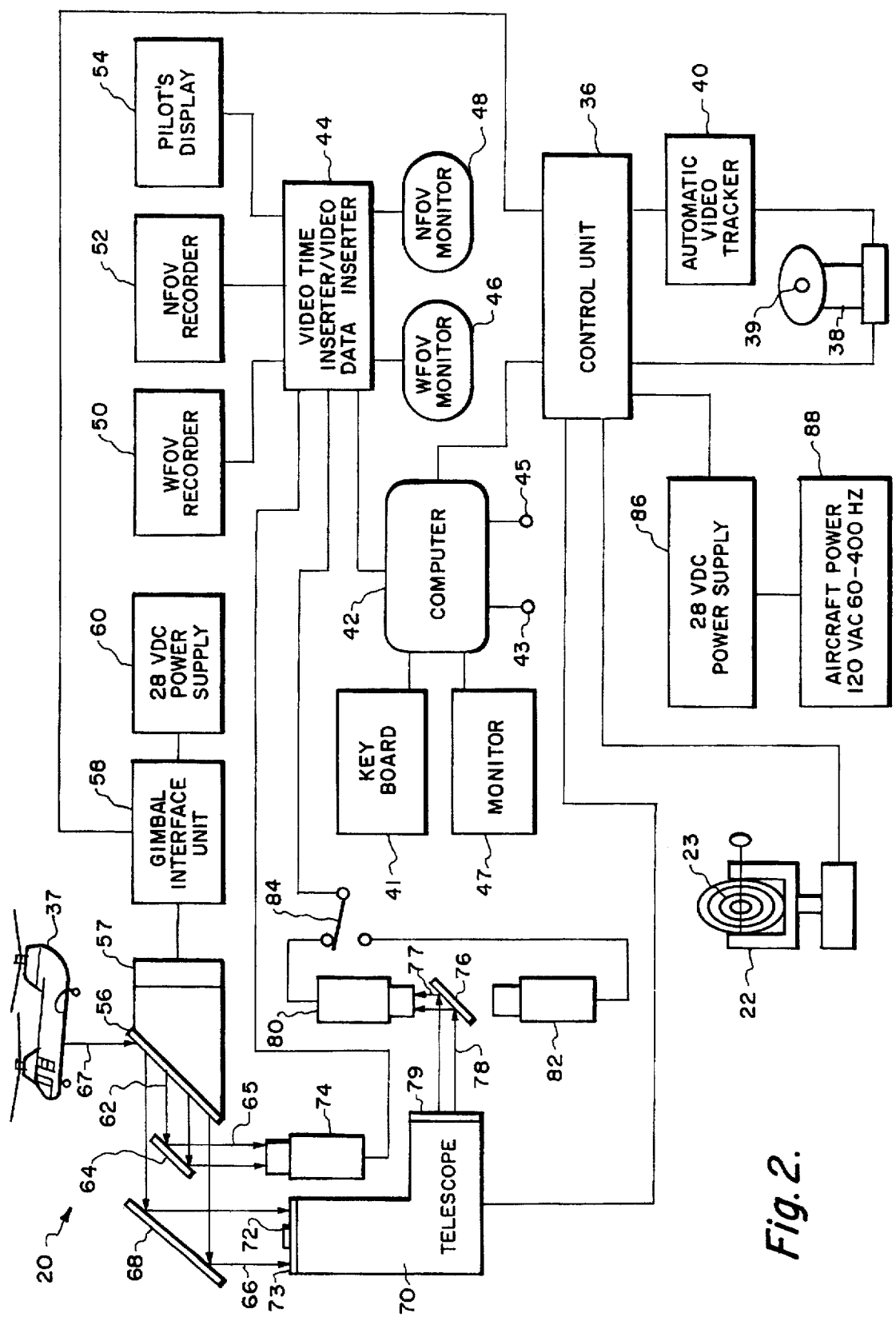
FIG. 2 is a detailed schematic diagram of the airborne tracking system of the present invention.

Referring to FIGS. 1 and 2, the acquisition sight 22 used in the present invention is a newton ring type acquisition sight wherein the aircraft's pilot looks through a glass lens which includes a circle or newton ring 23 projected to infinity. The pilot then aligns circle 23 of acquisition sight 22 with the target 37 such that the target 37 appears within circle 23 of acquisition sight 22 thereby providing for the initial acquisition of the target 37 by airborne video tracking system 20. Acquisition sights 22 then provides an analog signal (indicating azimuth and elevation of the target) to a system computer 42 (FIG. 2) located at the operator console 24. The system computer 42 processes the analog signal and then provides control signals to position the optics at the observer station 26 to the target 37.

Operator console 24 is also coupled to the aircraft's inertial navigation system 30 allowing system computer 42 to monitor the location of the aircraft having airborne video tracking system mounted therein. Positional information provided by the aircraft's inertial navigation system 30 includes the aircraft's latitude and longitude coordinates and the aircraft's elevation as well as the roll, pitch and heading of the aircraft. The inertial navigation system 30 is, in turn, connected to a global positioning system 28 located on board the aircraft. The global positioning system 28 provides position information updates to the aircraft's inertial navigation system 30 to correct for drifting which occurs in the inertial navigation system 30 after takeoff of the aircraft.

The operator console is connected to the aircraft's infrared display system 34 to receive synchro/sinusoidal signals from system 34 which indicate the direction infrared display system 34 is pointing. Infrared display system 34 is coupled to a tracking radar 32 which can be used to guide infrared display system 34. Interfacing with the aircraft's infrared display system 34 allows an operator the ability to monitor the aircraft's tracking radar from operator console 24.

Operator console 24 includes computer 42 which may be, for example, any IBM compatible PC computer. Connected to computer 42 is a keyboard 41 and a monitor 47. There is also a track handle 38 at operators console 24 which is connected to computer 42 through an automatic video tracker 40 and a control unit 36. Track handle 38 allows an operator at console 24 to manually track the target 37 by depressing trigger switch 39 on track handle 38 once the aircraft's pilot acquires the target 37 using acquisition sight 22. The operator monitors the target 37 at the wide field of view monitor 46 which is located at operator's console 24.

By engaging a trigger switch 39 at the operator console 24, the operator takes control of tracking target 37 from the pilot using automatic video tracker 40 or track handle 38. When target 37 is within the narrow field of view as displayed on monitor 48, the operator at operator console 24 can switch to automatic video tracker 40 as the means for tracking target 37. The automatic video tracker 40 tracks the target 37 by contrasting the target 37 with its background. For the helicopter illustrated in FIG. 2, the helicopter is contrasted with the blue sky background. If the helicopter were camouflaged to match the trees of a forest and sufficient contrast were not available then automatic video tracker 40 would not be utilized as the tracking means for airborne video tracking system 20.

It should be noted that acquisition sight 22 and track handle 38 are connected in series allowing an operator at console 24 to acquire control of the tracking of a target 37 from acquisition sight 22 by depressing trigger switch 39 on track handle 38. Automatic video tracker 40 is also connected in series with track handle 38 allowing the operator to use automatic video tracker 40 to track target 37.

Figure 3:
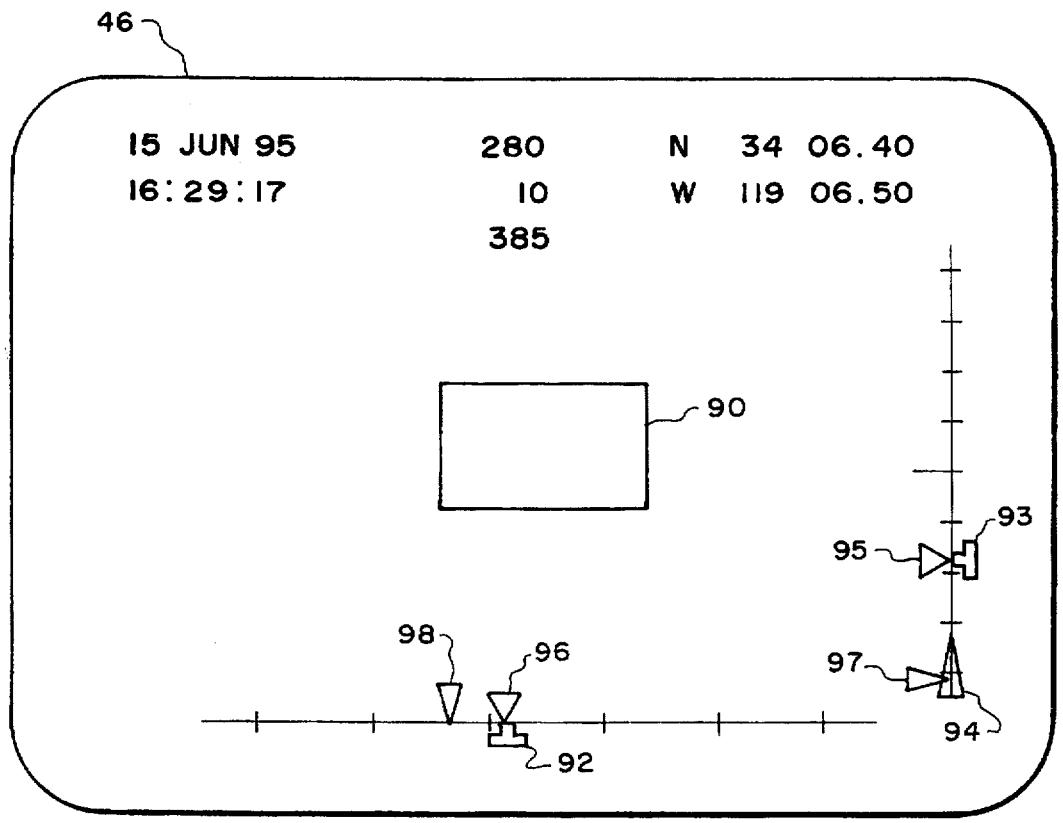
FIG. 3 illustrates an example of the position information provided on the wide field of view monitor of FIG. 2 for a target of interest.

By using track handle 38 the operator at console 24 can position the target 37 within a wide field of view monitor 46 and within a narrow field of view monitor 48 which is located at the operator's console 24. Displayed on the wide field of view monitor 46 and the narrow field of view monitor 48 is the video from the optics at observer's station 26. As shown in FIG. 3 positional information graphics are overlaid on the wide field of view display provided by monitor 46. In a like manner positional information graphics are displayed on the narrow field of view monitor 48.

There is also located at operator's console 24 a pair of video tape recorders 50 and 52 which receive and then record the video from the optics at the observer's station 26. Recorder 52 records the video from the narrow field of view camera 80 generated by the optics at observer station 26, with overlaid graphics generated by computer 42, while recorder 50 records the video from the wide field of view camera 74 generated by the optics at observer station 26, with overlaid graphics generated by computer 42. The operator can either turn on or turn off video tape recorders 50 and 52 by using the F4 function key on keyboard 41.

A gimballed mirror 56 located at observer station 26 receives image forming light from target 37 when mirror 56 is directed along optical path 67 to target 37 (which is also the line of sight to the target 37 as depicted in FIG. 2). Gimballed mirror 56 then reflects or directs the image forming light from target 37 along an optical path 62 to a pair of turning mirrors 64 and 68 which are positioned downstream from gimballed mirror 56 along optical path 62.

A portion of the image forming light from helicopter 37 is reflected by gimballed mirror 56 to turning mirror 64 and then redirected by turning mirror 64 along an optical path 65 to the lens of a wide field of camera 74. The remainder of the image forming light from helicopter 37 is reflected by gimballed mirror 56 to turning mirror 68 and then redirected along an optical path 66 by turning mirror 68 to the lens 73 of a telescope 70. Image forming light from helicopter 37 which passes through and then exits telescope 70 via a lens 79 is directed along optical path 78 to a flip mirror 76. As shown in FIG. 2, flip mirror 76 is positioned to direct the image forming light exiting telescope 70 along an optical path 77 to a narrow field of view camera 80. By rotating flip mirror 76 90 degrees from the position depicted in FIG. 2, flip mirror 76 can direct image forming light exiting telescope 70 to a narrow field of view camera 82. In the preferred embodiment of the present invention, narrow field of view camera 80 may be a black and white camera, while narrow field of view camera 82 may be a color camera or a low light level camera adapted for night missions.

That portion of the image forming light reflected by gimballed mirror 56 to turning mirror 64 which is a one inch turning mirror and then redirected by turning mirror 64 along an optical path 65 to the lens of a wide field of camera 74 comprises a one inch bundle of light. Turning mirror 64 is a one inch turning mirror. The view provided by camera 74 is an overall perspective of the scene including target 37 which the operator at operator console 24 observes on wide field of view monitor 46. The wide field of view appearing on monitor 46 is about four degrees.

Turning mirror 68 is a four inch turning mirror reflecting a four inch bundle of light from gimballed mirror 56 through telescope 70 to narrow field of view camera 80 or narrow field of view camera 82. Narrow field of view cameras 80 and 82 are coupled through a switch 84 to a video time inserter/video data inserter 44 which is comprised of two video overlay circuit boards in computer 42 and which is connected to narrow field of view monitor 48. The view provided by narrow field of view monitor 48 is very narrow and may be in the order of 0.1 degrees. Telescope 70 is a zoom telescope which can zoom from 20 inches to about 120 inches. At 20 inches zoom telescope 70 provides a one degree field of view, while at 120 inches the field of view is about a 0.1 degree field of view. Telescope 70 is connected to control unit 20 which provides control signals to telescope 36 to control the zoom function of telescope 70.

Gimballed mirror 56 is gyro stabilized to eliminate the roll of the aircraft and heading changes by the aircraft when tracking the target 37. The gimballed mirror 56 includes a support stand 57 and a gimbal interface 58 which is electrically connected to control unit 36. Control unit 36 which, for example, is responsive to an operator using track handle 38 provides analog control signals to the gimbal interface 58, which, in turn, orientates or steers gimballed mirror 56 to track target 37. There is also connected in series with track handle 38 an automatic video tracker 40 which when turned on by the operator locks on to video contrast to track target 37.

Gimballed mirror 56 and turning mirror 68 should be flat, for example, in the order of lambda over ten. Turning mirror 64 is also very flat, in the order of lambda over four. Gimballed mirror 56 which is a four inch mirror, is also light weight being fabricated from beryllium.

The light incident upon lens 73 of telescope 70 has a one inch hole or void in its center resulting from that portion of the image forming light which is reflected by turning mirror 64 to wide field of view camera 74. In addition, lens 73 has a one inch centrally located dark spot 72 which is non-transparent and which is optically aligned with mirror 64.

When power is first turned on to airborne video tracking system 20 monitor 47 provides the main screen menu which sets forth the function for each of the function keys on keyboard 41.

|  |  |  |  |  |
|---|---|---|---|---|
|  | F1 | Help | 15 JUN 95 | |
|  | F2 | Setup | 16:29:17 | |
|  | F3 | Toggle Color | N 34 06.40 | |
|  | F4 | Record | W 119 06.50 | |
| \<Ctrl\> | F4 | Stop | Altitiude: | 10000 |
|  | F6 | ACQ Sight | Speed: | 385 |
|  | F7 | IRDS | Heading: | 280 |
|  | F8 | Waypoint | Roll: | 0.0 |
|  | F9 | Triangulate | Pitch: | 0.0 |
|  | F10 | Marked Target |  |  |

ACTIVE ACQ SIGHT

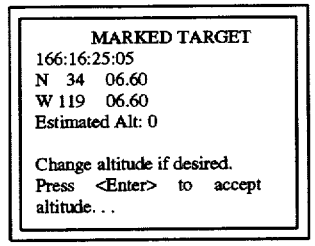

MARKED TARGET
166:16:25:05
N 34 06.60
W 119 06.60
Estimated Alt: 0

Change altitude if desired.
Press \<Enter\> to accept altitude...

When the operator depresses the function F1 on keyboard 41, a Help Screen appears on monitor 47 at the operator console 24. The Help screen provides a detailed explanation for each of the function keys on keyboard 41.

F2 Setup—Perform system calibration/boresight, set waypoints.

F3 Toggle Color—Toggle overlay color between black and white.

F4 Record—Start recording on both VTRs. \<Ctrl\> F4 Stop—Stop both VTRs.

F5 Not used.

F6 ACQ Sight—Select acquisition sight as the active pointing device.

F7 IRDS—Select IRDS as the active pointing device.

F8 Waypoint—Select a waypoint as the active pointing device.

F9 Triangulate Target—Calculate position of the target from the previous and current designated line of sight vectors.

F10 Mark target—Calculate position of the target being viewed. \<Shift\>ESC Exit program from main screen.

Press any key to return to main screen . . .

When the function key F2 is depressed by the operator, the operator can perform a system calibration or boresight and set waypoints. The function key F3 allows the operator to change the overlay color on wide field of view monitor 46 and narrow field of view monitor 48. The function key F4 activates recorders 50 and 52, while \<Ctrl\> F4 de-activates recorders 50 and 52. The function key F6 selects acquisition sight 22 as the means to track target 37. The function key F7 selects infrared display system 34 as the active pointing or tracking device. The function key F8 allows the operator to select one of five waypoints as the active pointing device. Selecting a waypoint results in gimballed mirror 56 pointing to the latitude, longitude and altitude of the selected waypoint. The function key F9 allows the operator to triangulate the location of the target 37 being tracked by airborne video tracking system 20. The function key F10 allows airborne video tracking system 20 to calculate the present latitude and longitude of target 37 using an estimated altitude previously supplied to airborne video tracking system 20 by the operator. The estimated altitude entered by the operator at operator console 24 is displayed in the marked target box in the lower portion of console display 47. The triangulation function can be used to accurately determine the altitude of target 37 after the operator enters an estimated altitude for target 37.

An operator at operator console 24 can first estimate the altitude by knowing the altitude of the aircraft and then making an educated guess as to the difference between the aircraft altitude and the target altitude.

The Setup Screen which appears on monitor 47 at the operator console 24 is set forth below. The operator accesses the Setup Screen by depressing the F2 key on keyboard 41 while the main menu is being displayed on monitor 47.

ACTIVE ACQ SIGHT

Setup Menu

1 Calibrate INS.
2 Calibrate Gimbal Drive.
3 Calibrate Gimbal Input.
4 Calibrate Acquisition Sight.
5 Calibrate IRDS.
6 Adjust Tracking Box.
7. Set Gimbal Limit Points.
8. Edit Waypoints.
Enter password: ********
Press <Esc> to return to main screen.

From the setup screen, the operator can calibrate inertial navigation system 30 by depressing the one key on keyboard 41. The operator can also calibrate gimbal interface 58 from the setup screen by depressing the two key on keyboard 41. By selecting the three key on keyboard 41, the operator can calibrate input signals supplied from gimbal interface 58 through control unit 36 to computer 42. By selecting the three key on keyboard 41, the operator can calibrate acquisition sight 22.

Referring to FIGS. 1, 2 and 3, from the setup screen, the operator can calibrate infrared display system 34 by depressing the five key on keyboard 41. Depressing the six key on keyboard 41 allows the operator to change the size of tracking box 90 (FIG. 3) which is displayed on wide field of view monitor 46. The size (including width, height and position on monitor 46) of the tracking box 90 is changed whenever there is a change in the zoom function on telescope 70. It should be noted that the telescope zoom function is not changed during the flight of the aircraft. Tracking box 90 represents the narrow field of view within wide field of view monitor 46.

Depressing the seven key on keyboard 41 allows the operator to set gimbal limit points for gimballed mirror 56 to prevent damage to gimballed mirror 56. Depressing the eight key on keyboard 41 allows the operator to edit waypoints which are fixed locations at a fixed altitude above sea level.

It should be noted that the Setup Screen as well as other screens display the active pointing device in the upper right hand corner. The active pointing devices are the acquisition sight, the infrared display system and selected waypoints. The setup screen also requires a password which the operator must provide to allow the operate to calibrate any of the devices identified in the setup screen.

The Calibrate Inertial Navigation Screen which appears on monitor 47 at the operator console 24 is set forth below. The operator accesses the Calibrate Inertial Navigation Screen by depressing the 1 key on keyboard 41 while in the Setup Screen.

ACTIVE ACQ SIGHT

Calibrate INS

Turn aircraft to a known heading.
Modify corrected heading (in degrees):
+ or UP Increment heading
− or DOWN Decrement heading
Displayed INS heading (in degree):60.00
Corrected INS heading (in degree): 60.00
Press <Esc> to return to main screen . . .

The +key or the up arrow key on keyboard 41 is used to increment the inertial navigation system heading, while the −key or the down arrow key are used to decrement the inertial navigation system heading. The aircraft is first placed in a known heading or position and then the inertial navigation system heading is adjusted to compensate for any error which may occur in its heading.

The Calibrate Gimbal Drive Screen which appears on monitor 47 at the operator console 24 is set forth below. The operator accesses the Calibrate Gimbal Drive Screen by depressing the 2 key on keyboard 41 while in the Setup Screen.

ACTIVE ACQ SIGHT

Gimbal Drive Calibration

Azimuth scale factor: 1.71
Azimuth offset (volts): 2.72
Elevation Scale factor: 0.87
Elevation offset (volts): 0.13
Press <Tab> or <Up> or <Down>to use new value.
Press <Enter> to save changes.
Press <Esc> to return to main screen . . .

The Azimuth scale factor, Azimuth offset (volts), Elevation Scale factor and Elevation offset (volts) for the gimbal drive calibration values are edited and then accepted using the Tab or Up arrow or Down arrow keys on keyboard 41. These gimbal drive calibration values are adjusted to allow for accurate and concise steering of gimballed mirror 56 by computer 42 via control unit 36.

The Calibrate Gimbal Input Screen which appears on monitor 47 at the operator console 24 is set forth below. The operator accesses the Calibrate Gimbal Input Screen by depressing the 3 key on keyboard 41 while in the Setup Screen.

ACTIVE ACQ SIGHT

Gimbal Input Calibration

Azimuth scale factor: 1.04
Azimuth offset (volts): −0.54
Elevation scale factor: 1.27
Elevation offset (volts): 0.23
Press <Tab> or <Up> or <Down> to use new value.
Press <Enter> to save changes.
Press <Esc> to return to main screen . . .

The Azimuth scale factor, Azimuth offset (volts), Elevation Scale factor and Elevation offset (volts) for the gimbal input calibration values are edited and then accepted using the Tab or Up arrow or Down arrow keys on keyboard 41. These calibration values provide accurate calibration for the gimbal position indicators 95, 96, 97 and 98 on the wide field of view screen 46 shown in FIG. 3. When computer 42 is used to control gimballed mirror 56, the gimbal position indicators 95 and 96 align respectively with the acquisition pointing angle indicators 93 and 92. When computer 42 is providing an active waypoint and an operator is using the track handle 38 to steer the gimballed mirror 56 the gimbal position indicators 97 and 98 may differ significantly from the acquisition pointing angle indicators 93 and 92 as shown in FIG. 3.

The Calibrate Acquisition Sight Screen which appears on monitor 47 at the operator console 24 is set forth below. The operator accesses the Calibrate Acquisition Sight Screen by depressing the 4 key on keyboard 41 while in the Setup Screen.

ACTIVE ACQ SIGHT

Acquisition Sight Calibration

Azimuth scale factor: 1:15
Azimuth offset (volts): 1:36
Elevation scale factor: 1:10
Elevation offset (volts): 0.11
Press <Tab> or <Up> or <Down> to use new value.
Press <Enter> to save changes.
Press <Esc> to return to main screen . . .

The Azimuth scale factor, Azimuth offset (volts), Elevation Scale factor and Elevation offset (volts) for the acquisition sight calibration values are edited and then accepted using the Tab or Up arrow or Down arrow keys on keyboard 41.

The Calibrate Infrared Display System Screen which appears on monitor 47 at the operator console 24 is set forth below. The operator accesses the Infrared Display System Screen by depressing the 5 key on keyboard 41 while in the Setup Screen.

ACTIVE IRDS

IRDS Calibration

Azimuth scale factor: 1.00
Azimuth offset (volts): 2.56
Elevation Scale factor: 1.00
Elevation offset (volts): 0.50
Press <Tab> or <Up> or <Down> to use new value.
Press <Enter> to save changes.
Press <Esc> to return to main screen . . .

The Azimuth scale factor, Azimuth offset (volts), Elevation Scale factor and Elevation offset (volts) for the infrared display system calibration values are edited and then accepted using the Tab or Up arrow or Down arrow keys on keyboard 41.

The Adjust Tracking Box Screen which appears on monitor 47 at the operator console 24 is set forth below. The operator accesses the Adjust Tracking Box by depressing the 6 key on keyboard 41 while in the Setup Screen.

ACTIVE IRDS

Adjust Tracking Box

Use cursor keys to move tracking box.
Use following keys to size tracking box:

T Taller
S Shorter
W Wider
N Narrower
Press <Enter> to save changes . . .
Press <Esc> to return to main screen . . .

The cursor keys on keyboard 41 are utilized to move tracking box 90 left, right, up or down on wide field of view monitor 46. Tracking box 90 is sized using the keys T, S, W and N on keyboard 41. Tracking box 90 illustrates the boundary of the narrow field of view overlaid on wide field of view monitor 46.

The Set Gimbal Limit Points Screen which appears on monitor 47 at the operator console 24 is set forth below. The operator accesses the Set Gimbal Limit Points Screen by depressing the 7 key on keyboard 41 while in the Setup Screen.

ACTIVE IRDS

Gimbal Limits (degrees)

Forward warning point: 35
Aft warning point: −5
Up warning point: 35
Down warning point: −35
Forward stop point: 45
Aft stop point: −15
Up stop point: −45
Down stop point: −45
Press <Tab> or <Up> or <Down> to use new value.
Press <Enter> to save changes.
Press <Esc> to return to main screen . . .

The gimbal limits are set to prevent damage to gimballed mirror 56. Warning indicators, such as warning indicator 94 shown in FIG. 3 are also set via the set gimbal limits point screen. Warning indicators are provided at each end of the azimuth and elevation axis depicted in FIG. 3. When a position indicator such as position indictor 97 passes the warning indictor, the warning indicator 94 is displayed as shown in FIG. 3. This indicator tells the operator at operator console 24 that gimballed mirror 56 is approaching its azimuth and elevation limits for safe operation of gimballed mirror 56. The forward stop point, aft stop point, the up stop point and the down stop point for gimballed mirror 56 are edited from the set gimbal limits point screen and limit the drive signals supplied by control unit 36 to gimbal interface 58 to prevent damage to mirror 56.

The Edit Waypoints Screen which appears on monitor 47 at the operator console 24 is set forth below. The operator accesses the Edit Waypoints Screen by depressing the 8 key on keyboard 41 while in the Setup Screen.

| Edit Waypoints. | | ACTIVE WAYPOINT Laguna Peak |
|---|---|---|
| 1 N 34 06.43 W 119 04.00 | 1413 ft. | Dome |
| 2 N 34 07.37 W 119 04.13 | 550 ft. | Lone Tree |
| 3 N 34 06.67 W 119 05.00 | 259 ft. | Water Tower |
| 4 N 34 06.50 W 119 03.88 | 1476 ft. | Laguna Peak |
| 5 N 34 06.08 W 119 04.00 | 1080 ft. | ET Sign |

|  | Edit Waypoints. | ACTIVE WAYPOINT<br>Laguna Peak |
|---|---|---|

Press <Tab> or <Up> or <Down> to use new value.
Press <Enter> to save changes.
Press <Esc> to return to main screen . . .

By accessing the Edit Waypoints Screen, the operator can edit the waypoint latitude, longitude, altitude and description fields for each waypoint shown on the screen.

The Select Waypoint Screen which appears on monitor 47 at the operator console 24 is set forth below. The operator accesses the Select Waypoints Screen by depressing the F8 key on keyboard 41.

|  | Select Waypoint |  | ACTIVE WAYPOINT<br>Laguna Peak |
|---|---|---|---|
| 1 | N 34 06.43<br>W 119 04.00 | 1413 ft. | Dome |
| 2 | N 34 07.37<br>W 119 04.13 | 550 ft. | Lone Tree |
| 3 | N 34 06.67<br>W 119 05.00 | 259 ft. | Water Tower |
| 4 | N 34 06.50<br>W 119 03.88 | 1476 ft. | Laguna Peak |
| 5 | N 34 06.08<br>W 119 04.00 | 1080 ft. | ET Sign |

Choose the number of the desired waypoint.
Press <Esc> to return to main screen . . .

By accessing the Select Waypoint Screen the operator can select one of five waypoints as the active pointing waypoint for airborne video tracking system 20. For example if the operator at operator console 24 depresses key 4 on keyboard 41, the active pointing waypoint for tracking system 20 will be Laguna Peak.

The narrow field of view monitor 48 provides the following display for an operator to view.

Marked Target
166:16:25:05
N 34 06.60
W 119 06.60
Altitude =0

166:16:29:17

The program listing for the computer software used by computer 42 is set forth in Appendix A and is written in well known computer software language C. Upon power up of system 20, the software enters the main program which is in the AVTSC.C module. This module initializes and updates all airborne video tracking system computer functions. This module also includes an abort function which exits to dos (program steps 104 and 106). If, for example, an operator attempts to uses the software on an authorized computer the software will exit to dos.

Figure 4:
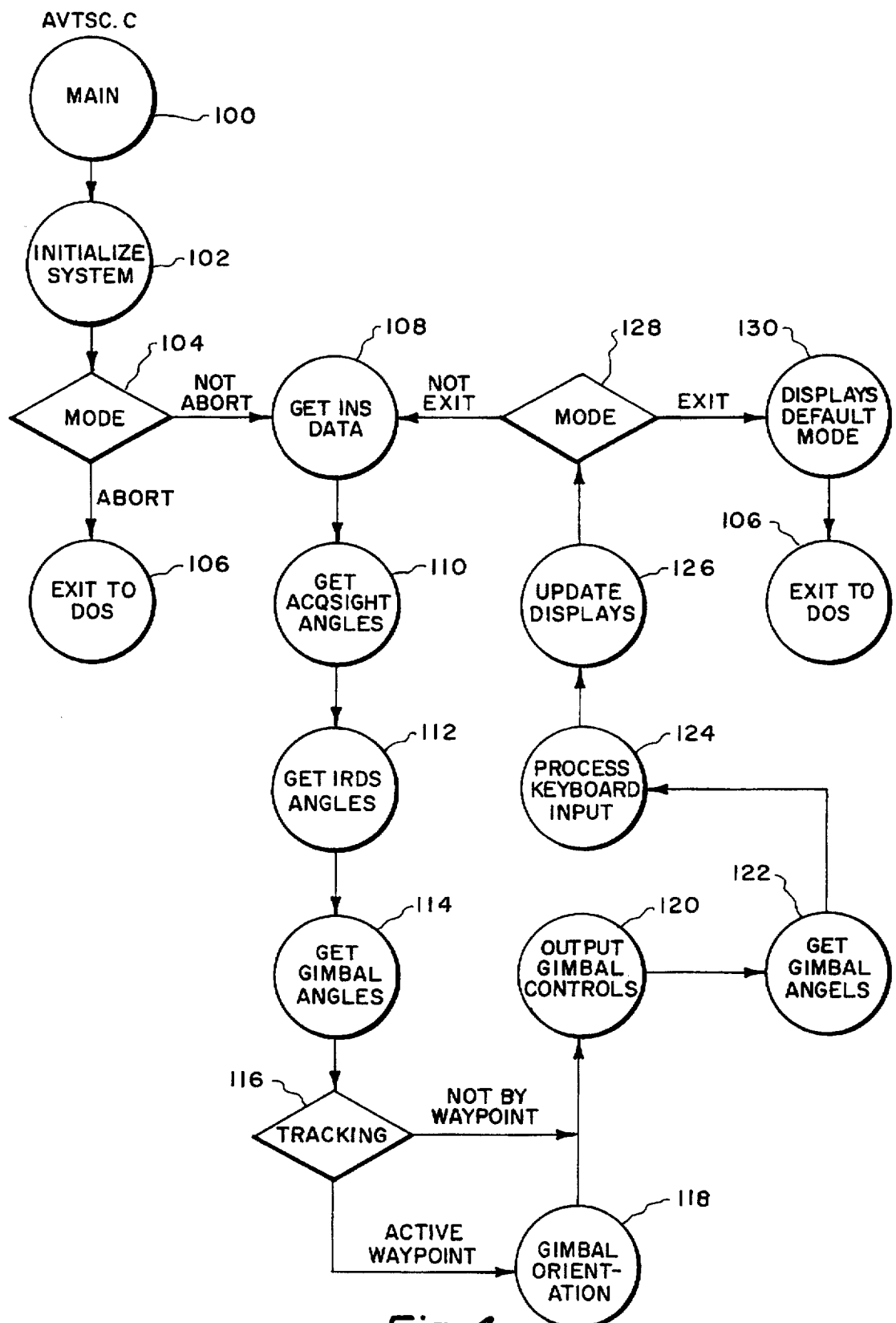
FIG. 4 is a flow chart for the main program module avtsc.c of the computer software program of Appendix A.

Referring to FIGS. 1, 2 and 4, after system initialization (program step 102) and an indication not to abort, the software retrieves and then updates data from inertial navigation system 30 (program step 108). During program step 110 the software retrieves the acqsight angles from acquisition sight 22. During program step 112 the software retrieves the irds angles from infrared display system 34. During program step 114 the software retrieves the gimbal angles for gimballed mirror 56 from gimbal interface 58 through analog output signals from interface 58.

When tracking is by waypoint, the software determines the required gimbal orientation angles for the waypoint and then provides them in the form of analog output signals which are supplied to gimbal interface 58. Gimbal interface 58 then orientates gimballed mirror 56 to the waypoint allowing airborne video tracking system 20 to begin tracking (program steps 118 and 120). When tracking is not by waypoint, the analog output signals for controlling the orientation of gimballed mirror 56 are determined by computer 42 from the acqsight and irds angular inputs and then supplied via control unit 36 to gimbal interface 58 (program step 120). During program step 122 the software again retrieves the gimbal angles for gimballed mirror 56 from gimbal interface 58 through analog output signals from interface 58.

The keyboard functions entered by the operator at operator console 24 are processed during program step 124. The console display appearing on monitor 47, the wide field of view display appearing on monitor 46 and the narrow field of view display appearing on monitor 48 are updated during program step 126.

During program step 128 the mode of operation is checked. If the mode is changed to exit by the operator at operators console 24 the software exits to dos (program step 106) and returns the displays of airborne video tracking system 20 to their default mode.

Figure 5:
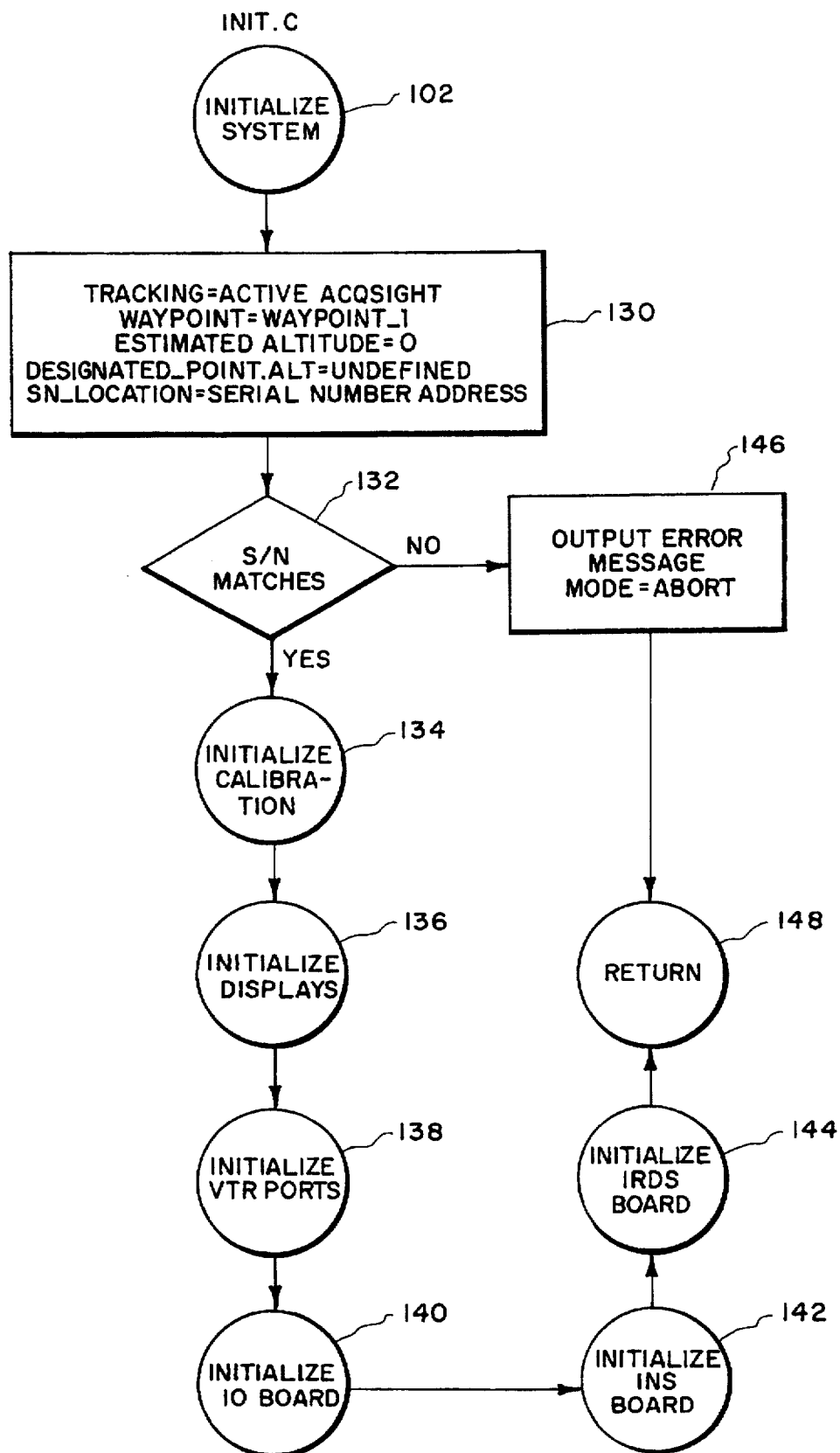
FIG. 5 is a flow chart for the initialization program module init.c of the computer software program of Appendix A.
Figure 6A:
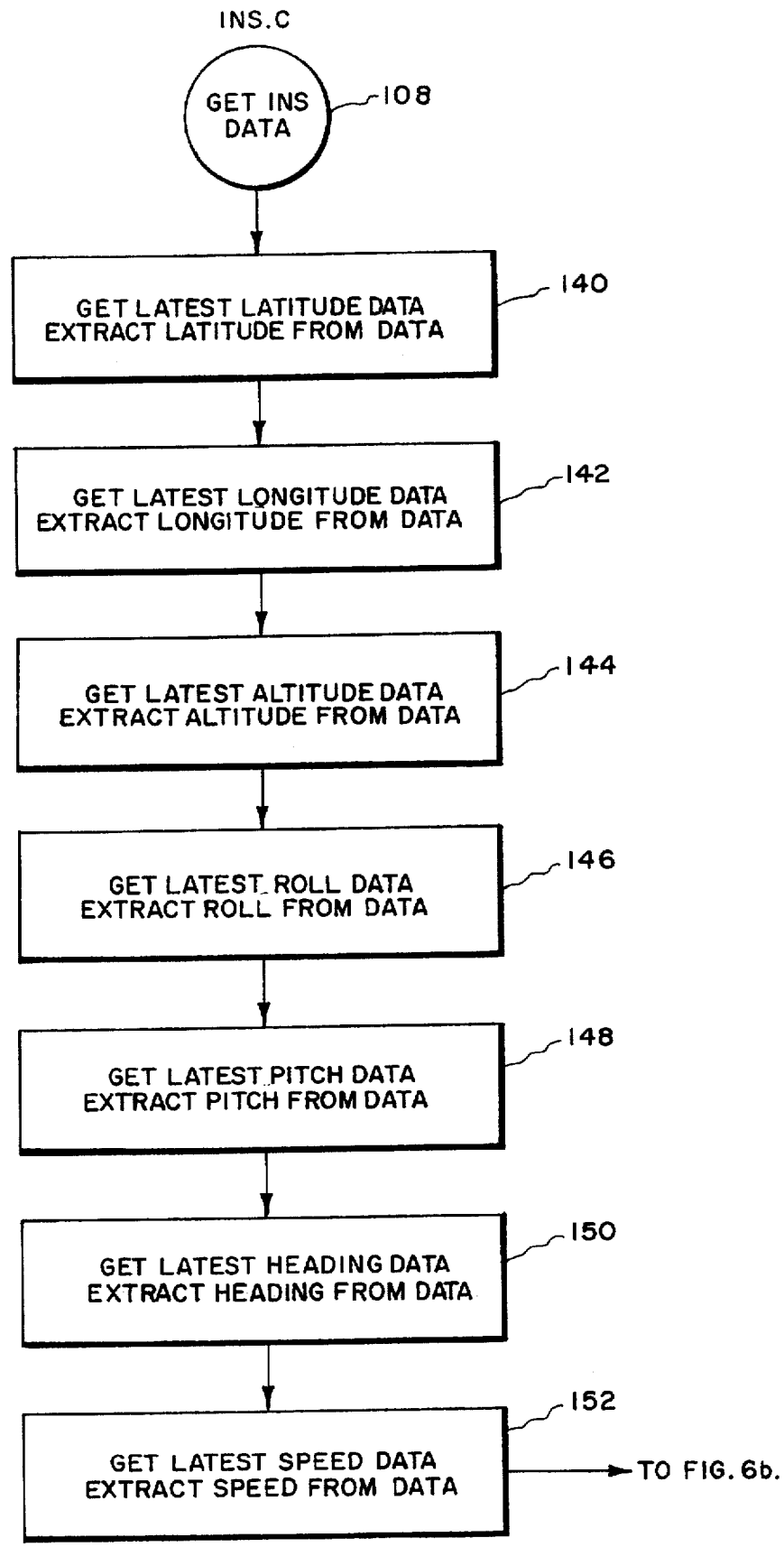
FIGS. 6a and 6b are a flow chart for the inertial navigation system program module ins.c of the computer software program of Appendix A.
Figure 6B:
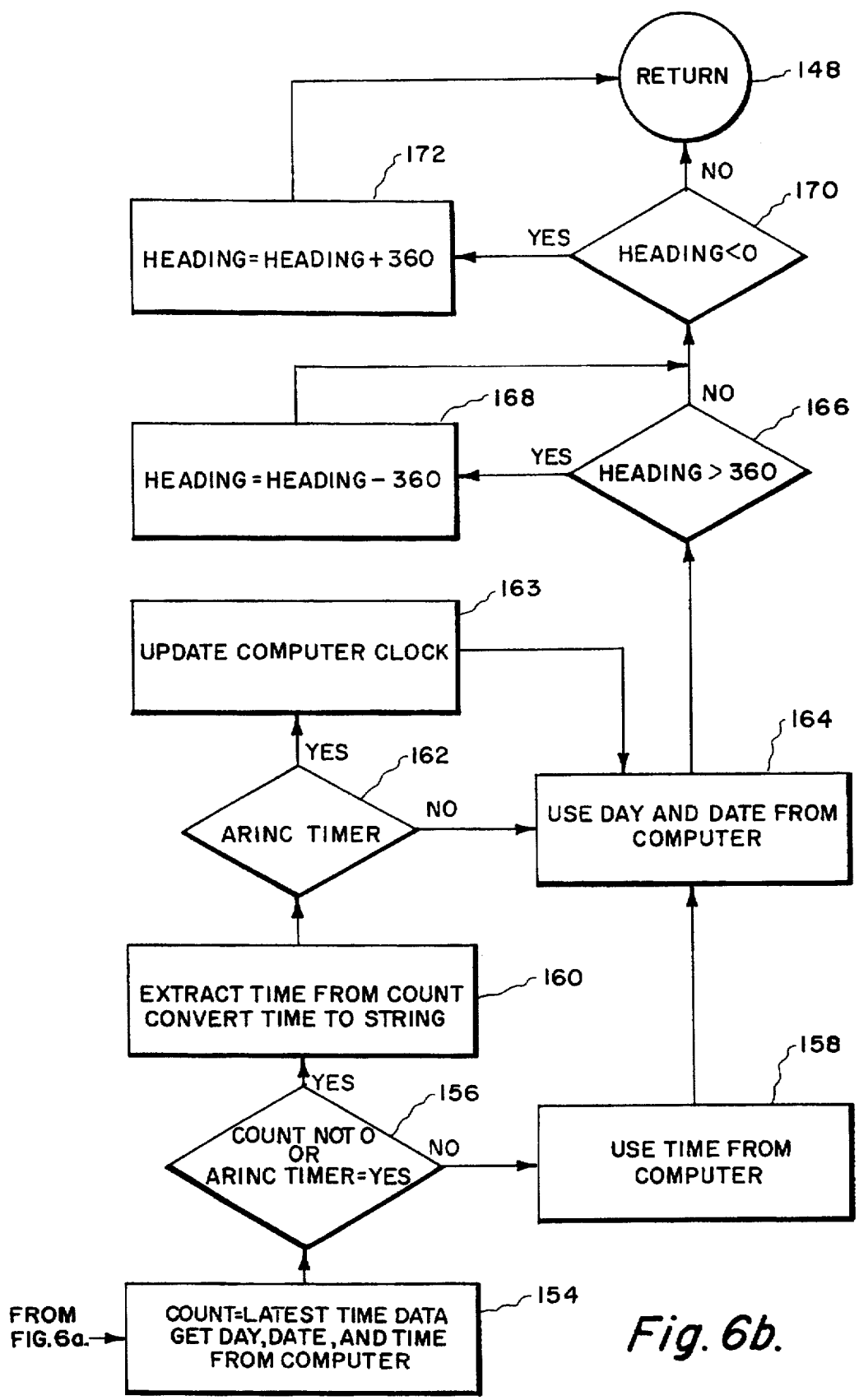

Referring to FIGS. 1, 2 and 5 the module INIT.C is the software module which initializes all Airborne Video Tracking System Computer interfaces, initializes waypoints, initializes Analog to Digital and Digital to Analog boards in system 20.

During program step 130 certain global variables within the INIT.C module are set. Tracking is set to use acquisition sight 22 as the means for acquiring target 37. When waypoint tracking is being used by airborne video tracking system 20 the waypoint is preset to waypoint one which for the waypoint screen illustrated above is the Dome at an altitude of 1413 feet. The estimated altitude is initially set to zero. A "designated_point.alt" is undefined. The "designated_point.alt" is used with the triangulation calculation for determining the location of a target. The serial number is set for the particular computer which is to be used to run the software of Appendix A.

When the serial number of the computer does not match the serial number in the software the program is aborted (program steps 132 and 146). When the serial number of the computer does matches the serial number in the software the program loads data from the file setup.cal which is the calibration file for all devices connected to computer 42. During program step 136 the displays including monitor 47, wide field of view monitor 46 and narrow field of view monitor 48 are initialized. During program step 138 the video tape recorder ports are initialized allowing for communication with wide field of view recorder 50 and narrow field of view recorder 52. During program step 140 an analog input/output board is initialized allowing analog data from track handle 38, automatic video tracker 40 or acquisition sight 22 to be read by computer 42. The analog signal from gimbal interface 58 is also read through this input/output board.

During program step 142 the inertial navigation system board which couples inertial navigation system 30 to computer 42 is initialized. It should be noted that the the inertial navigation system board is an "ARINC 429" interface board within computer 42. The signals from inertial navigation system 30 are signals having a digital format.

During program step 144 the infrared display system board which couples infrared display system 34 to computer 42 is initialized. It should be noted that the the infrared display system board is a "Synchro" interface board within computer 42 which converts synchro data to digital data. As shown in FIG. 2 terminal 43 is the input terminal for synchro data from infrared display system 34, while terminal 45 is the input terminal for ARINC 429 data from inertial navigation system 30.

Referring to FIGS. 1, 2, 6a and 6b, the module INS.C in the software of Appendix A is utilized to input the aircraft location and orientation from inertial navigation system 30 including the aircraft latitude, longitude and altitude and the aircraft roll, pitch and heading. During program step 140 updated latitude data for the aircraft is obtained from inertial navigation system 30 and the latitude is then extracted from the latitude data. During program step 142 updated longitude data for the aircraft is obtained from inertial navigation system 30 and the longitude is then extracted from the longitude data. During program step 144 updated altitude data for the aircraft is obtained from inertial navigation system 30 and the altitude is then extracted from the altitude data. For the wide field of view illustrated in FIG. 3 the aircraft latitude is North 34 degrees 6.40 minutes, the aircraft longitude is West 119 degrees 6.50 minutes and the aircraft altitude is ten feet.

During program steps 146, 148, 150 and 152 aircraft roll, pitch, heading and ground speed data is obtained from the inertial navigation system 30. The monitor 47 at operator console 24 displays the aircraft roll, pitch and heading in degrees. The wide field of view monitor 46 displays the aircraft heading in degrees and the aircraft speed in miles per hour. For the wide field of view illustrated in FIG. 3 the aircraft heading is 280 degrees and the aircraft speed is 385 miles per hour.

During program steps 154 the latest time, data and day is obtained from computer 42. If communication between computer 42 and inertial navigation system 30 is established, then time is obtained from inertial navigation system 30 (program step 160). However, when communication between computer 42 and inertial navigation system 30 is not established, then time is obtained from computer 42. During program step 163 the computer clock is updated to the time provided by inertial navigation system 30.

During program step 166, 168, 170 and 172 the heading is corrected to provide for a positive angle between 0 degrees and 360 degrees. When the heading provided by inertial navigation system 30 is greater than 360 degrees then 360 degrees is subtracted from the heading to provide a corrected heading (program steps 166 and 168). When the heading provided by inertial navigation system 30 is less than 0 degrees, 360 degrees are added to the heading to provide a corrected heading (program steps 170 and 172).

Figure 7:
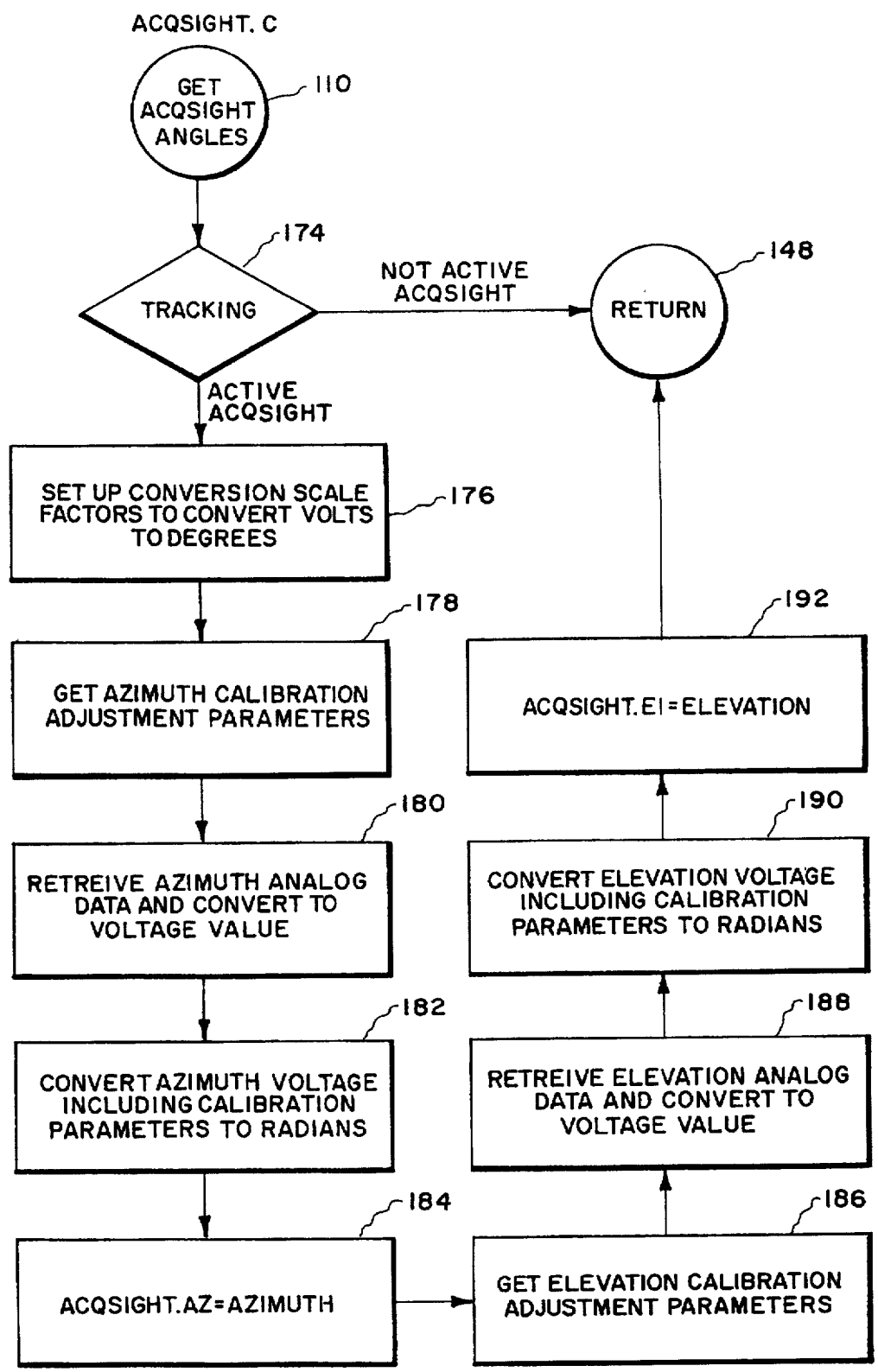
FIG. 7 is a flow chart for the acquisition sight program module acqsight.c of the computer software program of Appendix A.
Figure 8A:
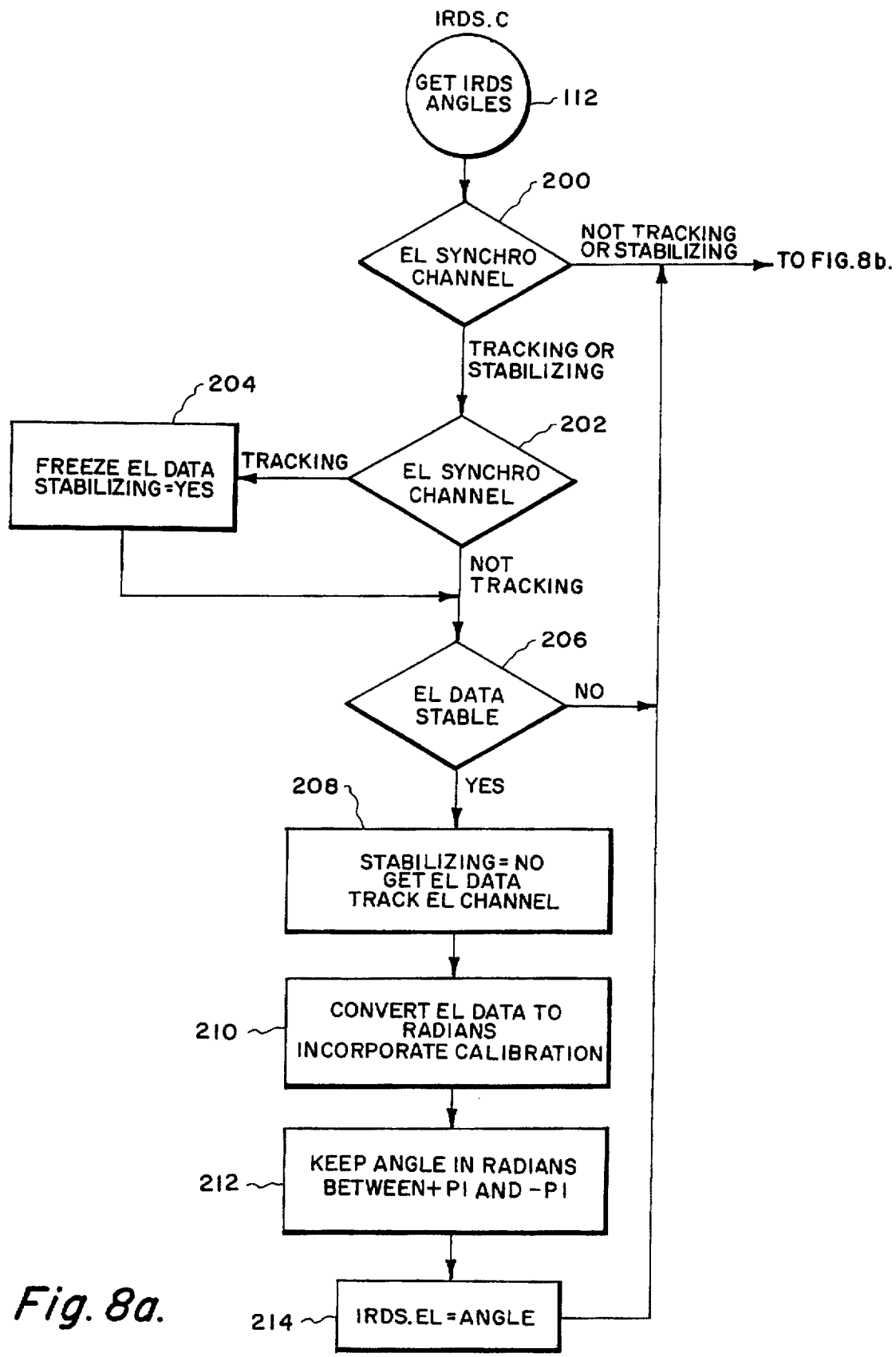
FIGS. 8a and 8b are a flow chart for the infrared display system program module irds.c of the computer software program of Appendix A.
Figure 8B:
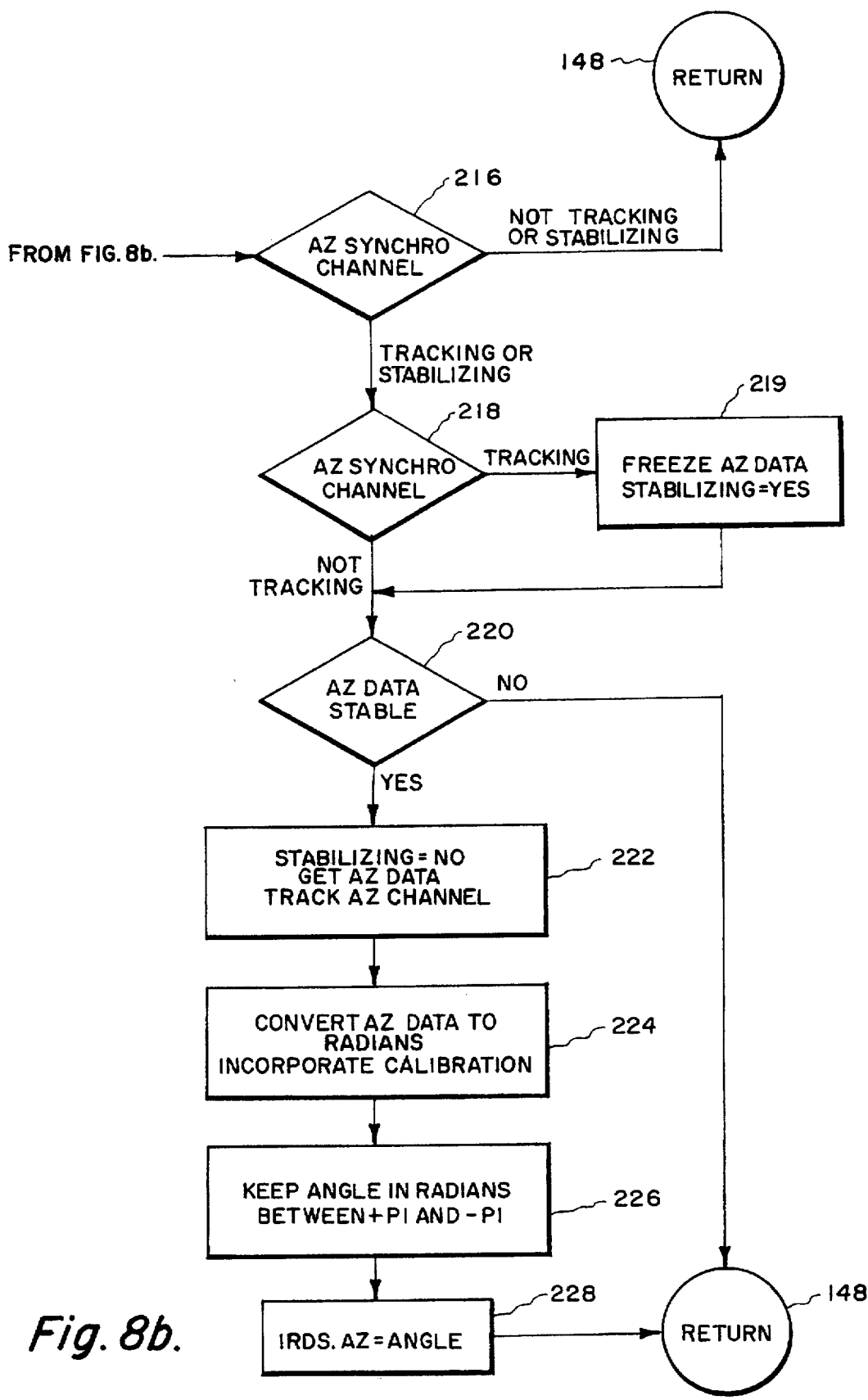

Referring to FIGS. 1, 2 and 7, the module ACQSIGHT.C in the software of Appendix A is utilized to input the acquisition sight angles (azimuth and elevation) for acquisition sight 22 as well as track handle 38 and automatic video tracker 40. The tracking mode is examined during program step 174. If tracking is performed by waypoint or the infrared display system 34 then the software returns to the main program. When, however, acquisition sight 22 is being used to track target 37 position data is obtained from the analog voltages provided by acquisition sight 22 to computer 42.

During program step 176 there is a set up of conversion scale factors to convert volts to degrees for both azimuth and elevation. During program step 178 the conversion scale factors of program step 176 are modified or adjusted to convert azimuth volts to radians. During program step 180 the azimuth analog data is retrieved from an A/D board within computer 42 and then converted to a voltage value. This azimuth analog data is a count representative of the azimuth analog voltage signal from acquisition sight 22. During program step 182, the azimuth analog data with adjustments is converted to an angle in radians. During program step 184, the value acqsight. AZ is established as the azimuth angle in radians for use by gimballed mirror 56 and other functions of airborne video tracking system 20.

It should be noted that computer 42 reads an azimuth analog value from track handle 38, acquisition sight 22 or automatic video tracker 40 and then converts this azimuth analog value to an azimuth angle in radians which is supplied as a voltage to gimballed mirror 56 to point mirror 56 to target 37. It should also be noted that the identical procedure is used to provide the elevation angle in radians to gimballed mirror 56 (program steps 186–192).

Referring to FIGS. 1, 2, 8a and 8b, the module IRDS.C in the software of Appendix A inputs the Infrared Display System angles (azimuth and elevation) from system 34. Infrared display system 34 provides azimuth and elevation data in a synchro or sinusoidal format via a pair of channels through a synchro board in computer 42. Each channel can be in a tracking mode, a stabilizing mode or a non-tracking mode. During program step 202 the elevation channel is sampled to determine if the channel is tracking or stabilizing. If the elevation channel is not tracking or stabilizing then computer 42 can not read the elevation data and the software proceeds to program step 216 to sample the azimuth channel. If the elevation channel is tracking (program step 202) then the software of the IRDS.C module freezes the elevation channel data (program step 204). During program step 206 a test is made to determine if the data is stable. If the elevation channel data is not stable then the software of the IRDS.C module proceeds to program step 216.

When the elevation channel data is stabilized the tracking flag is set to no indicating that the data is stabilized. The elevation channel is retrieved and the elevation channel is next set to a tracking mode to obtain another sample of elevation data. During program step 210, the elevation data is then converted directly to an angle in radians. The elevation angle is kept in radians between +180 degrees and −180 degrees (program step 212). The calculated value for the elevation angle is set to irds. EL during program step 214 and is available to other functions within the software of Appendix A. The azimuth channel data from infrared display system 34 is processed in exactly the same manner as the elevation channel data during program steps 216–228.

Figure 9:
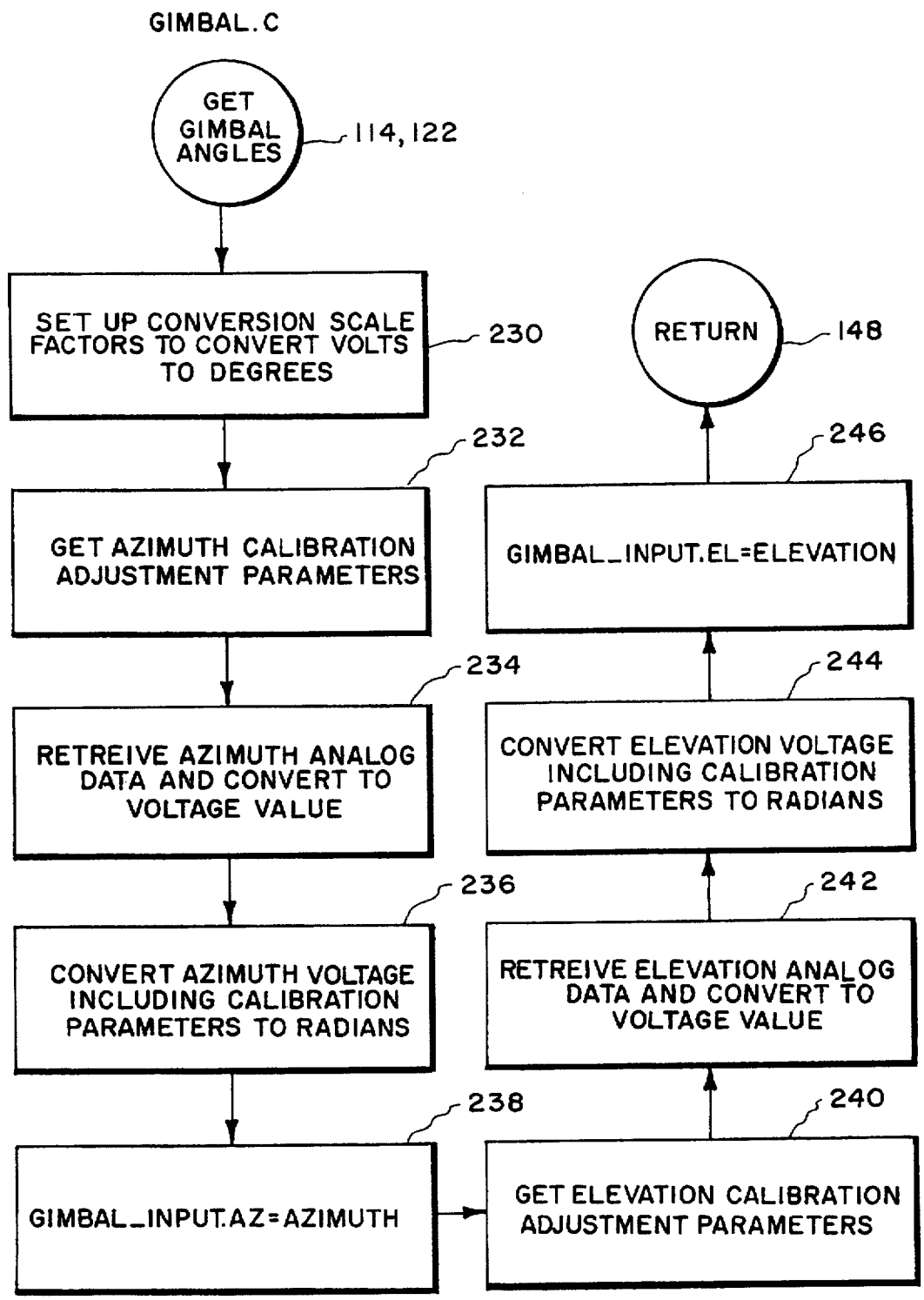
FIG. 9 is a first flow chart for the gimbal program module gimbal.c of the computer software program of Appendix A.

Referring to FIGS. 1, 2 and 9, the module GIMBAL.C in the software of Appendix A is utilized to input the Line of Sight of the gimballed mirror 56 (azimuth and elevation).

During program step 230 there is a set up of conversion scale factors to convert volts to degrees for both azimuth and elevation gimbal angles. During program step 232 the conversion scale factors of program step 230 are modified or adjusted to convert azimuth volts to radians. During program step 234 the azimuth analog data is retrieved from the A/D board within computer 42 and then converted to a voltage value. This azimuth analog data is a count representative of the azimuth analog voltage signal from gimballed mirror 56. During program step 236, the azimuth analog data for gimballed mirror 56 with adjustments is converted to an angle in radians. The azimuth angle is set equal to the gimbal_input.Az variable which is available to other functions within the computer software of Appendix A. The gimballed mirror analog elevation data is processed in exactly the same manner as the gimballed mirror analog azimuth data (program steps 240–246). Once the azimuth and elevation angles for gimballed mirror 56 are converted to radians, the location of gimbal position indicator 95 and 96 are set on wide field of view monitor 46.

Figure 10:
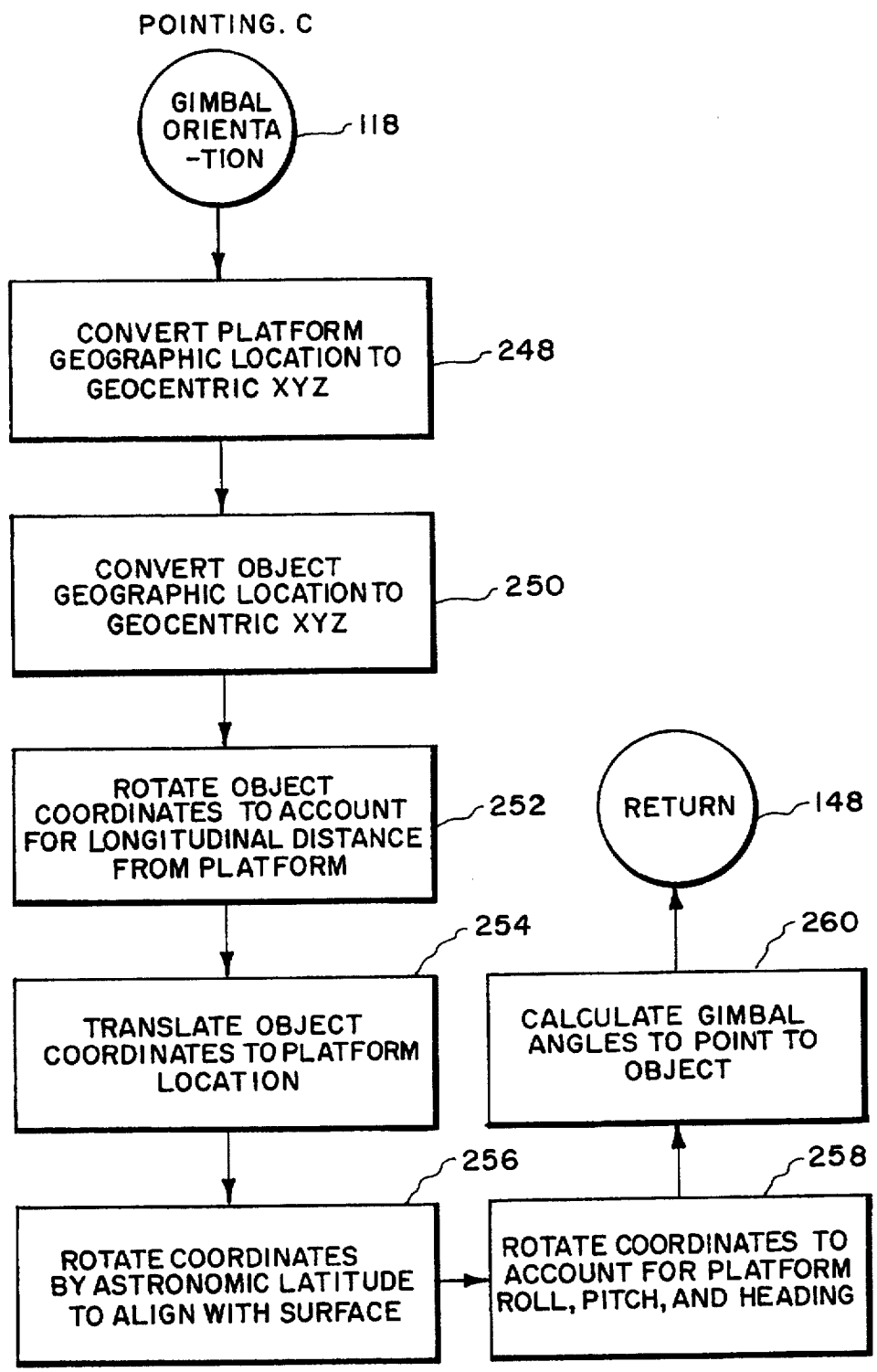
FIG. 10 is a flow chart for the waypoint tracking module pointing.c of the computer software program of Appendix A.

Referring to FIGS. 1, 2 and 10, when tracking is by waypoint or the fixed position of an object on the ground, the azimuth and elevation angles for pointing gimballed mirror 56 at the waypoint are determined in the pointing.c module of the software of Appendix A. During program step 248 the aircraft's geographic location (latitude, longitude and altitude) is converted into a geocentric XYZ coordinate location with the earth's center being the origin for the X, Y and Z axis. During program step 252 the object or waypoint's geographic location is converted into a geocentric XYZ coordinate location. The waypoints coordinates are rotated to account for longitudinal distance from the aircraft to the waypoint. The aircraft is now located at Y equal to zero.

The aircraft coordinates are set to 0,0,0 to establish a new coordinate system to describe the waypoint with respect to the aircraft (program step 254). The coordinate system is then rotated to align the aircraft with the surface of the earth (program step 256). During program step 258 the coordinate system is next rotated to account for the roll, pitch and heading of the aircraft. The azimuth and elevation angles for gimballed mirror 56 are calculated to point the gimballed mirror 56 to the target 37 during program step 260.

Figure 11:
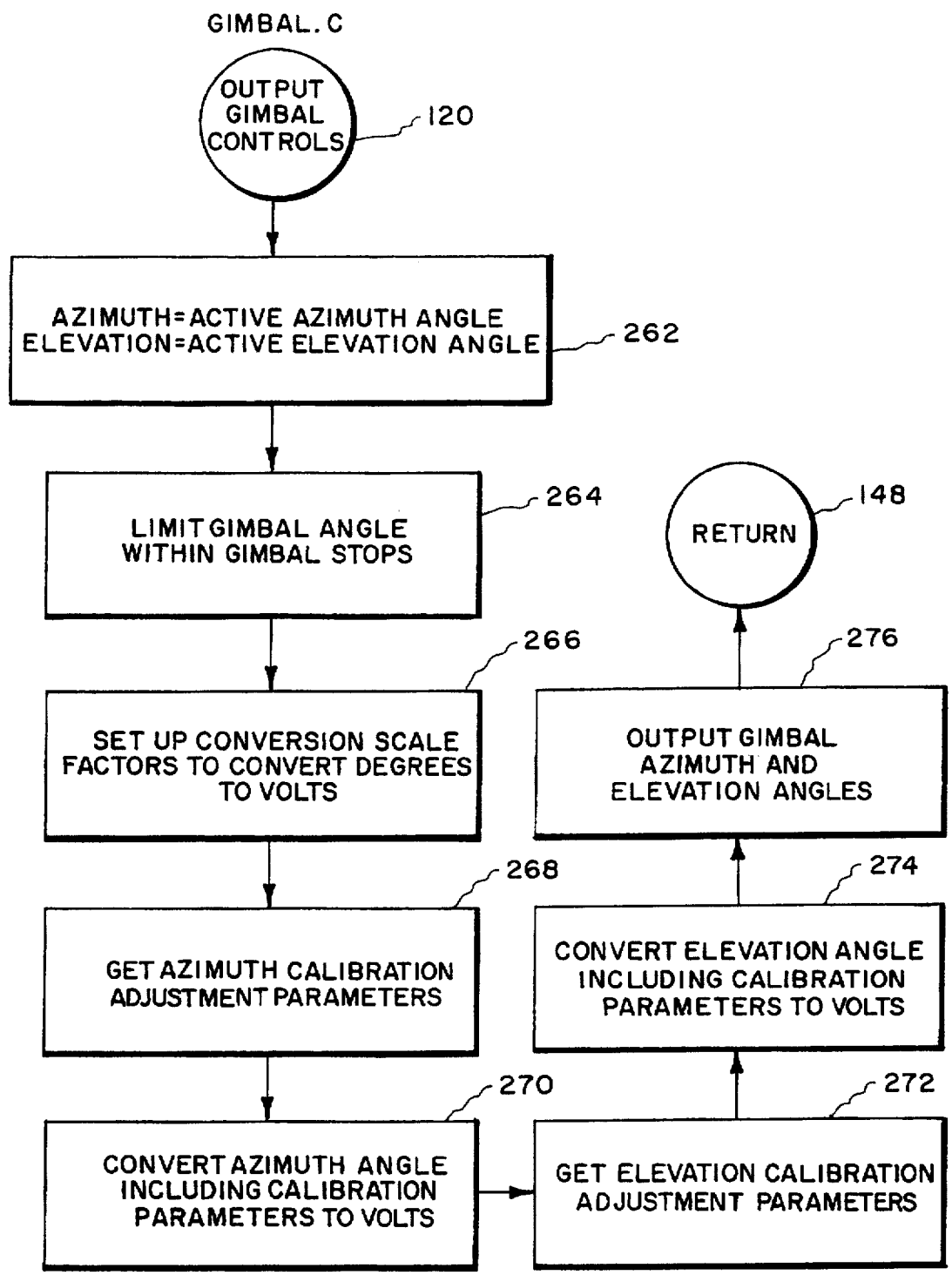
FIG. 11 is a second flow chart for the gimbal program module gimbal.c of the computer software program of Appendix A.
Figure 12A:
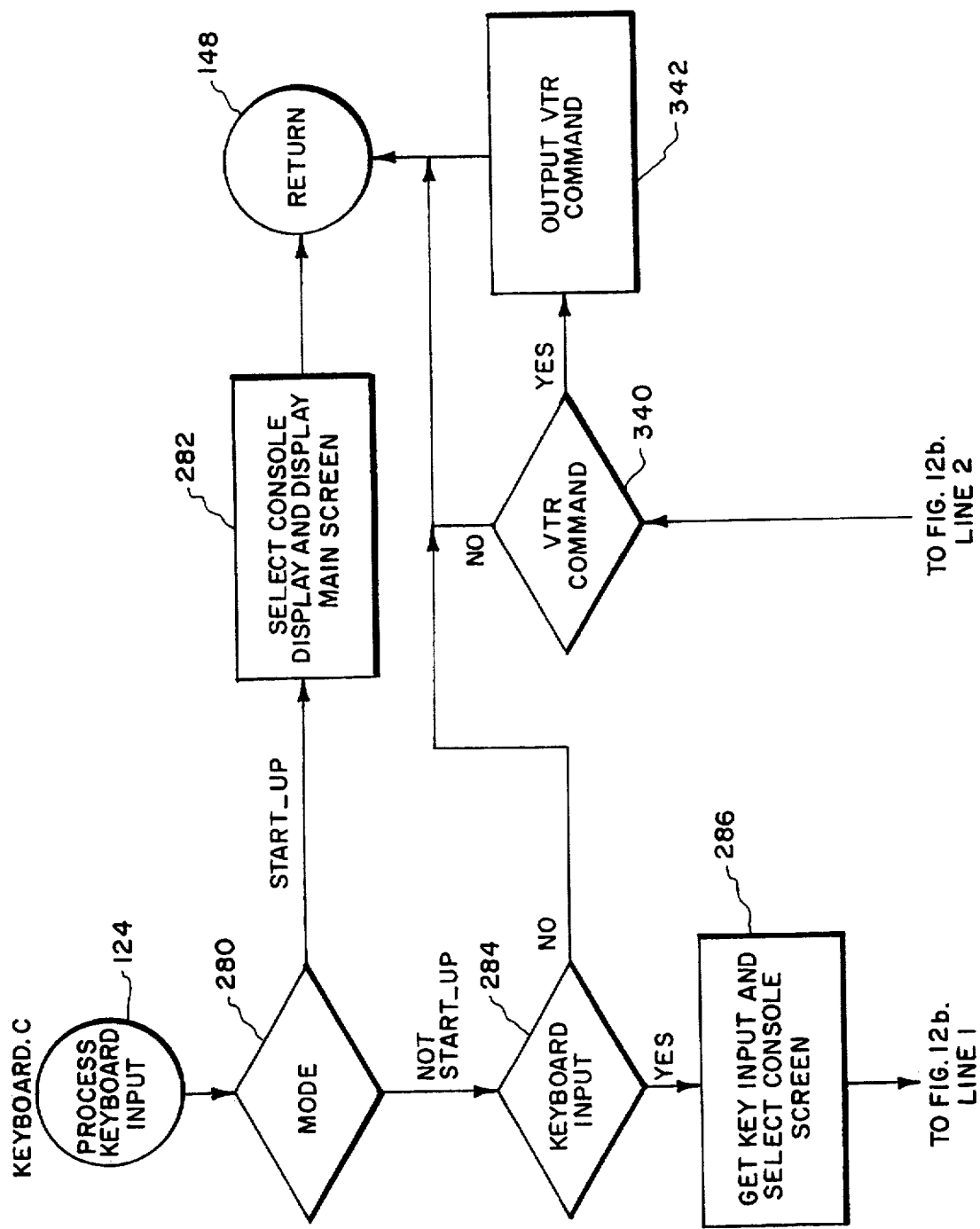
FIGS. 12a and 12b are a flow chart for the computer keyboard program module keyboard.c of the computer software program of Appendix A.
Figure 12B:
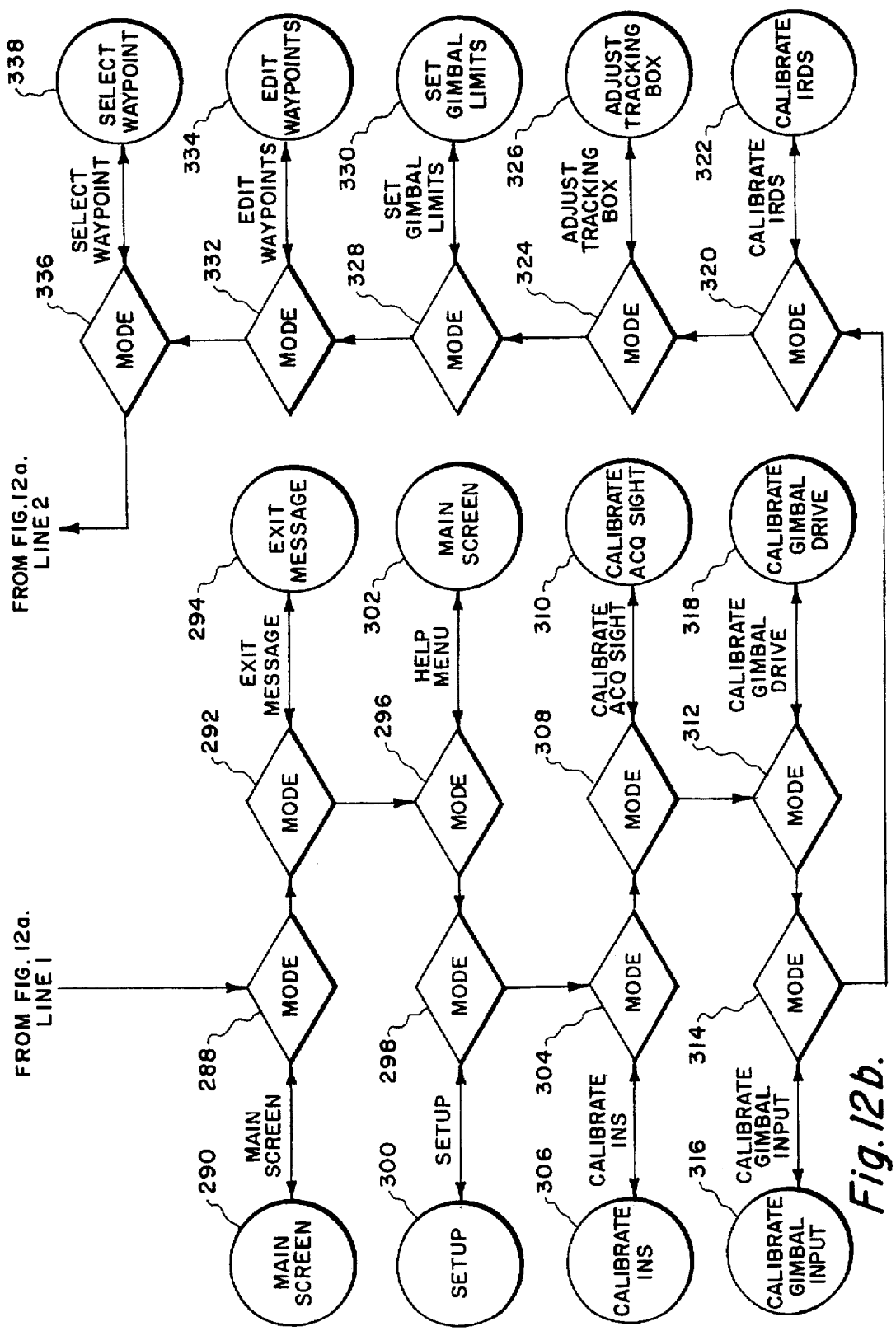

Referring to FIGS. 1, 2 and 11, the gimbal.c module of Appendix A is used to control the orientation of the gimballed mirror 56. A selection is made as to which input angles to output to the gimballed mirror 56 (program step 262). The infrared display system angles are irds.az and irds.el; the acquisition sight angles are acq_sight.az and acq_sight.el and the waypoint angles are pointing.az and pointing.el. During program step 264 there is a limit placed on gimbal travel to within the gimbal stops. During program step 266 conversion scale factors are set up for both azimuth and elevation to convert degrees to volts. During program step 268 adjustment parameters to convert azimuth angular data to volts are retrieved. During program step 270 the azimuth angle in radians with adjustments is converted to volts. During program step 272 adjustment parameters to convert elevation angular data to volts are retrieved. During program step 274 the elevation angle in radians with adjustments is converted to volts. During program step 276 the gimbal azimuth and gimbal elevation angles in an analog signal format are output to gimbal interface 58. Gimballed interface unit 58 then steers gimballed mirror 56 to the target 37.

Referring to FIGS. 1, 2, 12a and 12b, the keyboard.c module of Appendix A is utilized to process keyboard input from the operator at operator console 24. During program step 280 a determination is made as to whether the mode for airborne video tracking system 20 is the startup mode. If the mode is the startup mode then monitor 47 is selected and the main screen menu is displayed during program step 282. However if the mode is not the startup mode then the software proceeds to program step 284 to sample the input from keyboard 41. If the operator has not used a key on the keyboard 41 to select a particular console display, then the program returns to the main program function.

During program step 286 the key input is retrieved and the corresponding console screen is displayed. The various modes are entered by the operator via the function and numeral keys on keyboard 41. For example, if the operator at operator console 24 enters the F2 function key the setup screen will be appear on monitor 47 (program step 300). When the operator at operator console 24 enters the F8 function key the select waypoint screen will be appear on monitor 47 (program step 338). When the operator at operator console 24 enters the "8" key from the setup screen the edit waypoint screen will appear on monitor 47 (program step 334). When the operator at operator console 24 enters the "6" key from the setup screen the adjust tracking box screen will appear on monitor 47 (program step 326).

Figure 13:
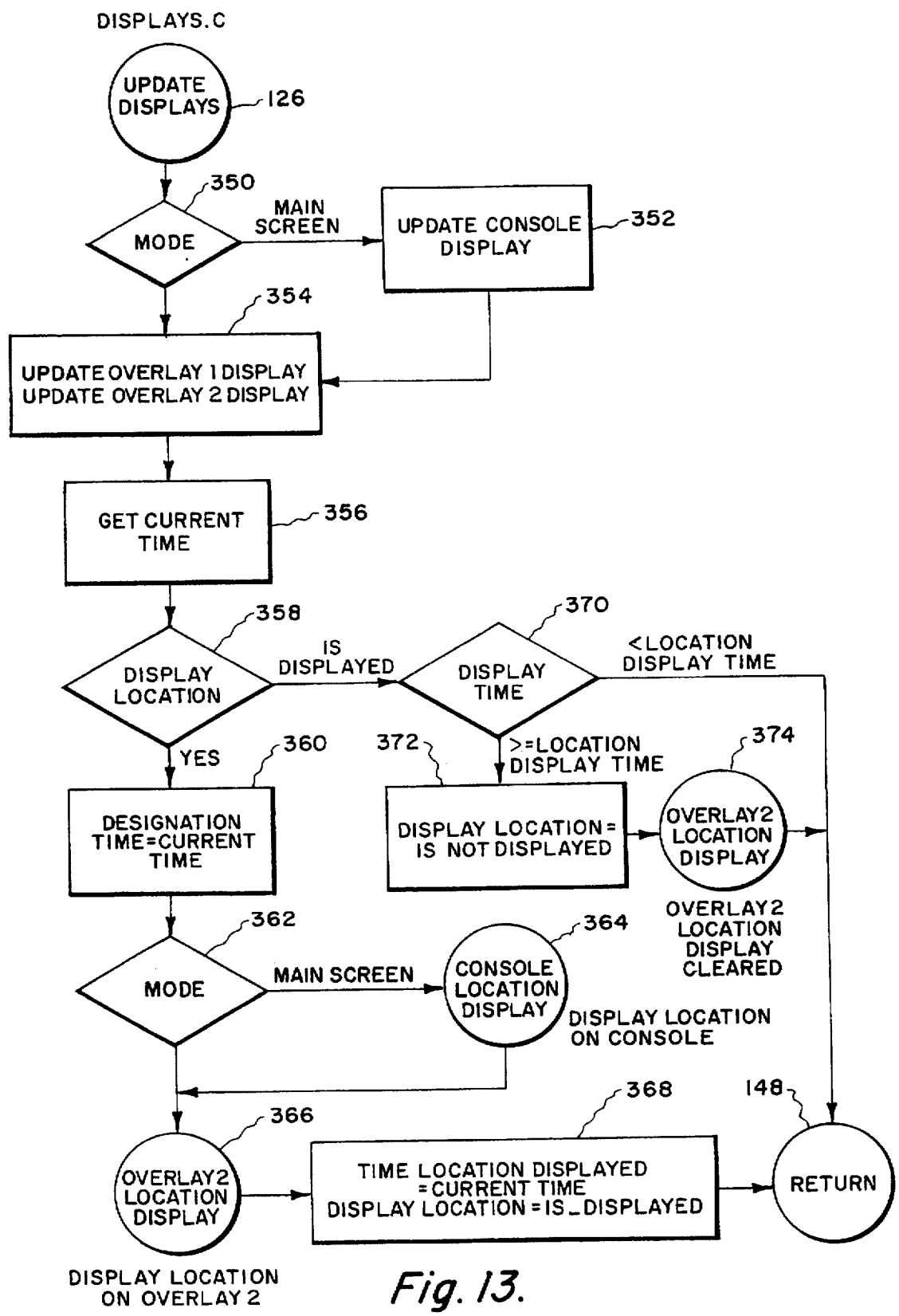
FIG. 13 is a flow chart for the tracking system displays program module displays.c of the computer software program of Appendix A.

Referring to FIGS. 1, 2 and 13, the displays.c module in the software of Appendix A controls the displays in airborne video tracking system 20. If the mode is main screen the console display provided by monitor 47 is updated (program step 352). This update includes the aircraft latitude, longitude, altitude, speed, heading, roll and pitch.

The displays for the wide field of view monitor 46 (FIG. 3) and the narrow field of view monitor 48 are updated during program step 354. The overlay1 display in the software of Appendix A is the wide field of display, while the overlay2 display in the software of Appendix A is the narrow field of display. The current time is read from computer 42 during program step 356. During program step 358 a display location flag is checked. If the flag is "yes", a location is displayed on the monitors of airborne video tracking system 20. For example, in the marked target box appearing on monitor 47 the current latitude and longitude of target 37 is displayed. In addition, the current latitude and longitude of target 37 is displayed on narrow field of view monitor 48. The F10 key on the keyboard sets the location flag to "yes".

The designation time is set equal to the current time. The designated time is the time that target was designated for display. In the marked target box and the narrow field of view display the designated time is 166:16:25:05. The real time shown in the narrow field of view display is 166:16:29:17. If the software is in the main screen mode then monitor 47 displays the target location in the marked target box during program step 364. Target 37 position information including latitude, longitude, altitude and designated target time is displayed on the narrow field of view monitor 52 during program step 366.

During program step 368 the display location flag is set equal to IS_DISPLAYED to indicate that target position information is being displayed. The time location displayed is set equal to the current time.

If the display location flag is set to IS_DISPLAYED, then the display time (designated target time) is tested. If the display time is greater than ten seconds the display location flag is set to IS NOT DISPLAYED (program step 372). The marked target display is then cleared from narrow field of view monitor 48 with only the current time being overlaid on the monitor.

Figure 14:
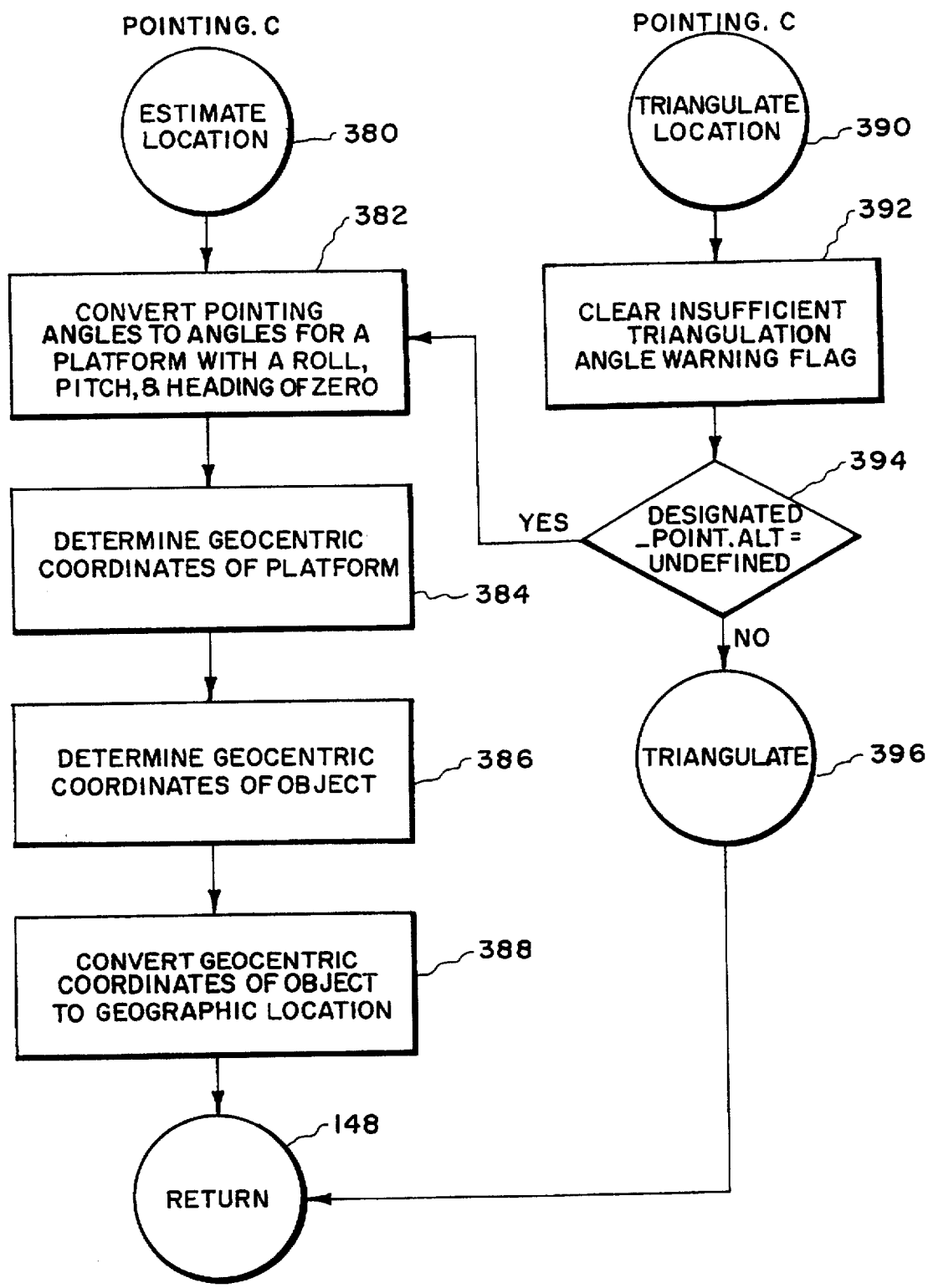
FIG. 14 is a flow chart for the estimate location function and the triangulation function of the program module pointing.c of the computer software program of Appendix A.

Referring to FIGS. 1, 2 and 14, the estimate location function for the target is within the POINTING.C module. When the operator depresses the F10 function key on keyboard 41, computer 42 determines or calculates the latitude and longitude of target 37 from the pointing angles (azimuth and elevation angles) from gimballed mirror 56 and the estimated altitude of target 37 provided by the operator at operator console 24. During program step 382, the pointing angles are converted to angles for a platform with a roll, pitch and heading of zero. During program step 384 the geocentric coordinates of the aircraft are determined, that is the coordinate system for the aircraft is now an XYZ coordinate system.

During program step 386 the geocentric coordinates of the target 37 are determined, that is the coordinate system for the target is now an XYZ coordinate system. This determination is a mathematical determination. Target 37 is assumed to reside on the surface of an ellipsoid. The surface of the ellipsoid resides at the estimated altitude above the surface of the earth. The intersection of the line of sight vector with the surface of the ellipsoid establishes the geocentric coordinates of the target 37 or the object. The geocentric coordinates of the object are next converted to a geographic location in program step 388 (latitude and longitude of target 37).

The pointing.c module also includes a triangulation function which is accessed by depressing the F9 function key on keyboard 41. To utilize the triangulation function the operator must designate one location point for the target meaning that the operator must provide an estimated altitude and then utilize the F10 key on keyboard 41 to allow computer 42 to calculate an estimated latitude and longitude for target 37. This establishes a reference vector for target 37. During program step 394 a determination is made as to whether one location point for the target 37 has been designated. If one location point has been designated the software proceeds to program step 396 to perform the triangulation function.

At this time it should be noted that all function keys except F1 or F8 may be utilized from any screen appearing on monitor 47. Thus, for example, the operator may depress the function key F9 or the function key F10 on keyboard 41 while the setup screen is displayed on monitor 47.

Once the operator at operator console 24 estimates the altitude of target 37 by entering the altitude via keyboard 41, the operator can then use the F9 or F10 key to provide an initial designation for the location of target 37, which is used to establish the reference vector for the target. Computer 42 also uses the aircraft location (latitude, longitude and altitude) and orientation (roll, pitch and heading), and the azimuth and elevation angles of gimballed mirror 56 to calculate the reference vector. The altitude entered by the operator may be positive which is above sea level or negative which is below sea level.

The operator then utilizes the F9 key to obtain a second line of sight vector for target 37 which is calculated from the aircraft's current location (latitude, longitude and altitude) and orientation (roll, pitch and heading), and the azimuth and elevation angles of gimballed mirror 56. The two line of sight vectors are then used to calculate the current latitude, longitude and altitude of target 37. By continuing to use the F9 key and thereby continuing to use the triangulation function of the pointing.c module, the operator can accurately determine the latitude, longitude and altitude of target 37.

For all subsequent triangulation functions computer 42 uses the previous location of target 37 and the current location and orientation of the platform or aircraft and the gimballed angles.

It should be noted that whenever an operator attempts to triangulate without sufficient change in the line of sight to allow for triangulation a warning message is provided to the operator and computer 42 does not process the triangulation function.

From the foregoing, it may readily be seen that the present invention comprises a new, unique and exceedingly useful airborne video tracking system which constitutes a considerable improvement over the known prior art. Obviously, many modifications and variations of the present invention are possible in light of the above teachings. It is therefore to be understood that within the scope of the appended claims the invention may be practiced otherwise than as specifically described.

Navy Case No. 77257

Appendix A

```
/*****************************************************************
Module Name:     acqsight.c
Number/Version:
History:
      Date            Rev       Author              Description
      13-Mar-1995     1.00      J. Hauselmann       Baseline Abstract:  Acquisition sight functions.
      get_acqsight_angles():
            Inputs the acquisition sight angles (azimuth and elevation).
*****************************************************************/
/*    All parameters and functions used by acqsight.c are defined in
      the following header files.
*/
      #include "stdio.h"                /* Standard I/O definitions */
      #include "pclerrs.h"              /* PCLAB error codes */
      #include "pcldefs.h"              /* PCLAB function declarations */
      #include "avtsc.h"                /* Project definitions */
      #include "init.h"                 /* Initilization definitons */
      #include "overlay1.h"             /* Overlay #1 definitions */
      #include "gimbal.h"               /* Gimbal definitions */
      #include "utility.h"              /* Utility definitions */
      #include "acqsight.h"             /* Acquisition sight definitions */

/*    Global declarations.
*/
      struct Acqsight_Angles acqsight;

/*****************************************************************
Function Name:   get_acqsight_angles()
Number/Version:
History:
      Date            Rev       Author              Description
      13-Mar-1995     1.00      J. Hauselmann       Baseline Global Input:
      tracking : Used to determines if ACTIVE_ACQSIGHT is selected.
      setup_parameters : Calabration information.

Global Output:
      aqcsight - Angles in radians determined by the operator via joystick.

Abstract: Convert analog signal from ADC into an angle in radians.
*****************************************************************/
void get_acqsight_angles(void)
{
      #ifdef TARGET_SYSTEM
            /* Variable declarations */
            unsigned short analog_data;
            double analog_voltage;
            double az_acq_gain, el_acq_gain;
            double az_acq_v_offset, el_acq_v_offset;
            struct Adjustment adjustments;
```

Navy Case No. 77257

```
if( tracking == ACTIVE_ACQSIGHT)
{
        /*    Set up conversion scale factors to convert volts to degs. */
        /*    Voltage gain factors */
        az_acq_gain = ((AZ_ACQ_MAX_ANGLE - AZ_ACQ_MIN_ANGLE) /
              (AZ_ACQ_MAX_VOLTS - AZ_ACQ_MIN_VOLTS));
        el_acq_gain = ((EL_ACQ_MAX_ANGLE - EL_ACQ_MIN_ANGLE) /
              (EL_ACQ_MAX_VOLTS - EL_ACQ_MIN_VOLTS));
        /*    Voltage offsets. */
        az_acq_v_offset  = (-(AZ_ACQ_MAX_VOLTS + AZ_ACQ_MIN_VOLTS)/2.0);
        el_acq_v_offset  = (-(EL_ACQ_MAX_VOLTS + EL_ACQ_MIN_VOLTS)/2.0);

/* Adjustment parameters to convert analog data to rads */
        adjustments.gain = az_acq_gain;
        adjustments.v_offset = az_acq_v_offset;
        adjustments.cal_gain =
               setup_parameters.acq_sight_calibration.AZ_Factor;
        adjustments.cal_offset =
               setup_parameters.acq_sight_calibration.AZ_Offset;
        adjustments.max_volts = AZ_ACQ_MAX_VOLTS;
        adjustments.min_volts = AZ_ACQ_MIN_VOLTS;

/* Retreive analog data from ADC */
        adc_value( CHANNEL_2, GAIN_2, &analog_data);
        /* Convert a 12 bit analog value to voltage */
        analog_voltage = (float)analog_data
                 * (((POS_FULL_SCALE - NEG_FULL_SCALE)/GAIN_2)/4096.0)
                 + (NEG_FULL_SCALE/GAIN_2);

/* Convert analog data with adjustments to an angle in radians */
        acqsight.Az = voltage_to_radians( analog_voltage, &adjustments );

/* Adjustment parameters to convert analog data to rads */
        adjustments.gain = el_acq_gain;
        adjustments.v_offset = el_acq_v_offset;
        adjustments.cal_gain
            = setup_parameters.acq_sight_calibration.EL_Factor;
        adjustments.cal_offset
            = setup_parameters.acq_sight_calibration.EL_Offset;
        adjustments.max_volts = EL_ACQ_MAX_VOLTS;
        adjustments.min_volts = EL_ACQ_MIN_VOLTS;

/* Retreive analog data from ADC */
        adc_value( CHANNEL_3, GAIN_2, &analog_data);
        /* Convert a 12 bit analog value to voltage */
        analog_voltage = (float)analog_data
                 * (((POS_FULL_SCALE - NEG_FULL_SCALE)/GAIN_2)/4096.0)
                 + (NEG_FULL_SCALE/GAIN_2);

/* Convert analog data with adjustments to an angle in radians */
        acqsight.El = voltage_to_radians( analog_voltage, &adjustments );
}
else
     /* Set to test values (scanning Az then El) */
     if(acqsight.Az < -H_SCALE_N_RANGE1 * PI/180)
          acqsight.Az = -H_SCALE_N_RANGE1 * PI/180;
     else if(acqsight.Az >= H_SCALE_P_RANGE1 * PI/180)
```

70

Navy Case No. 77257

```
        {
                acqsight.Az = -H_SCALE_N_RANGE1 * PI/180;
                if(acqsight.El < -V_SCALE_N_RANGE1 * PI/180)
                    acqsight.El = -V_SCALE_N_RANGE1 * PI/180;
                else if(acqsight.El >= V_SCALE_P_RANGE1 * PI/180)
                    acqsight.El = -V_SCALE_N_RANGE1 * PI/180;
                else
                    acqsight.El += PI/180;
        }
        else
                acqsight.Az += PI/180;
    #endif
}
/* end */
```

Navy Case No. 77257

```
/*****************************************************************
Module Name:    acqsight.h
Number/Version:
History:
    Date            Rev         Author              Description
    13-Mar-1995     1.00        J. Hauselmann       Baseline Abstract:
    Acquisition sight definitions.
*****************************************************************/

/*      Physical constants.
*/ define CHANNEL_2               2           /* Channel 2 (Azimuth) */
    #define CHANNEL_3               3           /* Channel 3 (Elevation) */

/*  MAX_VOLTS is maximum voltage level.
        MAX_ANGLE isn't nessecarily the largest angle. Its
        the angle that corisponds to the maximum voltage level.
    */
    #define     AZ_ACQ_MAX_VOLTS        2.5
    #define     EL_ACQ_MAX_VOLTS        3.75 define     AZ_ACQ_MAX_ANGLE        30.0
    #define     EL_ACQ_MAX_ANGLE        -45.0

/*  MIN_VOLTS is minimum voltage level.
        MIN_ANGLE isn't nessecarily the smallest angle. Its
        the angle that corisponds to the minimum voltage level.
    */
    #define     AZ_ACQ_MIN_VOLTS        -2.5
    #define     EL_ACQ_MIN_VOLTS        -3.75 define     AZ_ACQ_MIN_ANGLE        -30.0
    #define     EL_ACQ_MIN_ANGLE        45.0

/*      Structure definitions.
*/
    struct Acqsight_Angles
    {
            double          Az;
            double          El;
    };

/*      Global variables.
*/
    extern struct Acqsight_Angles acqsight;

/*      Function definitions.
*/
    void get_acqsight_angles(void);

/* end */
```

72

Navy Case No. 77257

```
/****************************************************************
Module Name:      avtsc.c
Number/Version:
History:
      Date            Rev       Author              Description
      11-Jan-1995     1.00      C. Houlberg         Baseline Abstract:  Main program.
    main(): Initializes and updates all Airborne Video Tracking System
    Computer (AVTSC) functions.
*****************************************************************/
/*    All parameters and functions used by main() are defined in
      the following header files.
*/
      #include "avtsc.h"              /* Project definitions */
      #include "init.h"               /* Initialization definitions */
      #include "acqsight.h"           /* Acquisition sight angle definitions */
      #include "gimbal.h"             /* Gimbal definitions */
      #include "irds.h"               /* IRDS definitions */
      #include "ins.h"                /* INS definitions */
      #include "pointing.h"           /* Pointing definitions */
      #include "keyboard.h"           /* Keyboard definitions */
      #include "displays.h"           /* Display definitions */

/*    Global variables.
*/
      double estimated_altitude;              /* Operator estimated altitude */
      enum Console_Mode mode;                 /* Console mode */
      enum Tracking_Mode tracking;            /* Tracking mode */
      enum Display_Object display_location = NO;   /* Location display status */
      GEOGRAPHIC_TYPE designated_point;       /* Object location */
/****************************************************************
Function Name:    main()
Number/Version:
History:
      Date            Rev       Author              Description
      11-Jan-1995     1.00      C. Houlberg         Baseline
      21-Mar-1996     1.04      C. Houlberg         Get gimbal angles after output.

Abstract:  Main program module to update all AVTSC functions.
      1)    Initialize System (executed upon power up).
      2)    Update INS data (ARINC-429 interface).
      3)    Update ACQ Sight angles (A/D interface).
      4)    Update IRDS angles (synchro to digital interface).
      5)    Determine geographic location of display point.
      6)    Output Gimbal controls (D/A interface).
      7)    Update Gimbal angles (A/D interface).
      8)    Process keyboard input.
      9)    Update Video displays.
*****************************************************************/
void main(void)
{
      /* Perform system initialization */
      initialize_system();

/* Execute processes until terminated */
      if(mode != ABORT)
```

73

Navy Case No. 77257

```
    {
        do
        {
            get_ins_data();
            get_acqsight_angles();
            get_irds_angles();
/* Code moved 21-Mar-1996 to get gimbal position immediately after update.
            get_gimbal_angles();
End of moved code */
            if(tracking == ACTIVE_WAYPOINT);
                gimbal_orientation();   /* Get angles for waypoint */
            output_gimbal_controls();
            get_gimbal_angles();        /* Update for location designation */
            process_keyboard_input();
            update_displays();

} while(mode != EXIT);

/* Return system to default mode */
        displays_default_mode();
    }
}

/* end */
```

Navy Case No. 77257

```
/******************************************************************
Module Name:    avtsc.h
Number/Version:
History:
        Date            Rev     Author              Description
        20-Jan-1995     1.00    C. Houlberg         Baseline
        18-Aug-1995     1.01    C. Houlberg         Fix for Latitude truncation.
                                                    Functions changed:
                                                    init.c, initialize_calibration()
                                                    keyboard.c, edit_waypoints()
        18-Aug-1995     1.01    C. Houlberg         Fix for computer time error.
                                                    Functions changed:
                                                    ins.c, initialize_ins_board()
                                                    ins.c, get_ins_data()
        18-Aug-1995     1.01    C. Houlberg         Fix for angle overflow error.
                                                    Function changed:
                                                    irds.c, get_irds_angles()
        5-Sep-1995      1.02    C. Houlberg         Add gimbal soft stop function.
                                                    Functions changed:
                                                    init.c, initialize_calibration()
                                                    console.c, setup_screen()
                                                    console.c, set_gimbal_limit_screen()
                                                    utility.h, struct File_Location
                                                    keyboard.c, set_gimbal_limits()
                                                    keyboard.c, update_gimbal_item()
                                                    gimbal.c, output_gimbal_controls()
        7-Sep-1995      1.02    C. Houlberg         Fix for computer time error.
                                                    Functions changed:
                                                    ins.c, initialize_ins_board()
                                                    ins.c, get_ins_data()
        12-Dec-1995     1.03    C. Houlberg         Corrected gimbal pointing error.
                                                    Functions changed:
                                                    pointing.c, gimbal_angles()
        13-Dec-1995     1.03    C. Houlberg         Fix for sequence error and
                                                    potential truncation error.
                                                    pointing.c, object_direction()
        17-Jan-1996     1.03    C. Houlberg         Added qualifier for exit message.
                                                    keyboard.c, main_screen()
        18-Jan-1996     1.03    C. Houlberg         Added exit to help message.
                                                    console.c, help_screen()
        25-Jan-1996     1.03    C. Houlberg         Changed <Ctrl> F5 to <Ctrl> F4
                                                    keyboard.c, main_screen()
                                                    console.c, main_screen_template()
                                                    console.c, help_screen()
        25-Jan-1996     1.03    C. Houlberg         Display leading zeros in heading.
                                                    console.c, update_console_display()
                                                    overlay1.c,
                                                    update_overlay1_display()
        5-Feb-1996      1.03    C. Houlberg         Main screen location display only
                                                    displays.c, update_displays()
        6-Feb-1996      1.03    C. Houlberg         Added global function key
                                                    keyboard.c,
                                                    setup(),
                                                    calibrate_ins()
                                                    calibrate_acq_sight()
                                                    calibrate_gimbal_drive()
                                                    calibrate_gimbal_input()
```

Navy Case No. 77257

| | | | |
|---|---|---|---|
| | | | calibrate_irds()<br>adjust_tracking_box()<br>set_gimbal_limits()<br>edit_waypoints()<br>select_waypoint()<br>global_function_key() |
| 6-Feb-1996 | 1.03 | C. Houlberg | Added global tracking mode display.<br>keyboard.c,<br>update_waypoint_item()<br>select_waypoint()<br>console.c,<br>global_tracking_display() |
| 7-Feb-1996 | 1.03 | C. Houlberg | Added display of ground speed.<br>console.c,<br>update_console_display()<br>main_screen_template()<br>overlay1.c,<br>update_overlay1_display()<br>ins.c,<br>initialize_ins_board()<br>get_ins_data() |
| 7-Feb-1996 | 1.03 | C. Houlberg | Password characters masked<br>keyboard.c, string_control() |
| 7-Feb-1996 | 1.03 | C. Houlberg | Password made case insensitive.<br>keyboard.c, setup() |
| 7-Feb-1996 | 1.03 | C. Houlberg | Added global waypoint selection.<br>keyboard.c,<br>main_screen()<br>setup()<br>calibrate_ins()<br>calibrate_acq_sight()<br>calibrate_gimbal_drive()<br>calibrate_gimbal_input()<br>calibrate_irds()<br>adjust_tracking_box()<br>set_gimbal_limits()<br>edit_waypoints()<br>select_waypoint()<br>global_alt_key() |
| 8-Feb-1996 | 1.03 | C. Houlberg | User friendly password entry.<br>keyboard.c,<br>main_screen()<br>setup()<br>console.c, setup_screen() |
| 8-Feb-1996 | 1.03 | C. Houlberg | Added display of file errors.<br>utility.c,<br>get_calibration()<br>put_calibration() |
| 21-Mar-1996 | 1.04 | C. Houlberg | Get gimbal angles after output.<br>avtsc.c, main() |
| 21-Mar-1996 | 1.04 | C. Houlberg | Function compensates for altitude.<br>earth.c, astronomic_latitude() |
| 21-Mar-1996 | 1.04 | C. Houlberg | Allow updates during exit message.<br>process_keyboard_input()<br>main_screen() |
| 21-Mar-1996 | 1.04 | C. Houlberg | Display position changes.<br>overlay1.h |

Navy Case No. 77257

| | | | |
|---|---|---|---|
| 21-Mar-1996 | 1.04 | C. Houlberg | Renamed function.<br>pointing.h |
| 21-Mar-1996 | 1.04 | C. Houlberg | Deleted unused typedef.<br>Moved type for global access.<br>pointing.h<br>avtsc.h |
| 21-Mar-1996 | 1.04 | C. Houlberg | Changed function name.<br>pointing.c,<br>estimate_location() |
| 21-Mar-1996 | 1.04 | C. Houlberg | Changed arguement in function.<br>pointing.c,<br>estimate_location()<br>gimbal_orientation() |
| 21-Mar-1996 | 1.04 | C. Houlberg | Made function more general<br>pointing.c,<br>geocentric_to_geographic() |
| 21-Mar-1996 | 1.04 | C. Houlberg | Simplified program.<br>pointing.c,<br>gimbal_orientation() |
| 21-Mar-1996 | 1.04 | C. Houlberg | Added triangulation feature.<br>concole.h, added definition<br>console.c,<br>main_screen_template()<br>help_screen()<br>displays.c, update_displays()<br>init.c, initialize_system()<br>keyboard.c,<br>main_screen()<br>global_function_key()<br>pointing.h<br>pointing.c,<br>global items<br>triangulate_location()<br>triangulate()<br>save_platform() |
| 25-Mar-1996 | 1.04 | C. Houlberg | Fixed new estimated altitude error.<br>keyboard.c, main_screen()<br>pointing.h<br>pointing.c,<br>re_estimate_location() |
| 25-Mar-1996 | 1.04 | C. Houlberg | Made help screen more readable<br>console.h<br>console.c, help_screen() |
| 26-Mar-1996 | 1.04 | C. Houlberg | Changed order of setup items.<br>keyboard.c, setup()<br>console.h<br>console.c, setup_screen() |

Abstract:  Project definitions.
    All angles used in this project are expressed in radians.
***************************************************************/

```
/*    Conditional compilation.
*/
//    #define TARGET_SYSTEM          /* Compiled to run on target system */

/*    Constant definitions.
*/
```

Navy Case No. 77257

```
#define LOCATION_DISPLAY_TIME 10          /* Display time in seconds */
#define MAX_ALTITUDE          999999      /* Maximum target altitude */
#define PI                    3.14159265359
#define KEY_BUFFER_SIZE       41          /* Size of keyboard string buffer */

/* Console modes */
enum Console_Mode
{
        START_UP,               /* Initial mode (prior to main screen display) */
        MAIN_SCREEN,
        HELP_MENU,
        SETUP,
        CALIBRATE_INS,
        CALIBRATE_GIMBAL_DRIVE,
        CALIBRATE_GIMBAL_INPUT,
        CALIBRATE_ACQ_SIGHT,
        CALIBRATE_IRDS,
        ADJUST_TRACKING_BOX,
        SET_GIMBAL_LIMITS,
        EDIT_WAYPOINTS,
        ALTERNATE_SETUP,
        SELECT_WAYPOINT,
        EXIT_MESSAGE,
        EXIT,
        ABORT
};

/* Tracking modes */
enum Tracking_Mode
{
        ACTIVE_ACQSIGHT,
        ACTIVE_IRDS,
        ACTIVE_WAYPOINT
};

/* Object display condition */
enum Display_Object
{
        YES,
        NO,
        IS_DISPLAYED,
        IS_NOT_DISPLAYED,
        TRIANGULATE
};

/*      Structure definitions.
*/
        typedef struct
        {
                short X_Center;
                short Y_Center;
                short X_Max;
                short Y_Max;
                short H_Scale_X_Origin;
                short H_Scale_Y_Origin;
                short H_Scale_Gradient;
                short V_Scale_X_Origin;
```

78

Navy Case No. 77257

```
        short V_Scale_Y_Origin;
        short V_Scale_Gradient;

} GRAPHICS_TYPE;

typedef struct
    {
        double Lat;
        double Lon;
        double Alt;
        char Time[14];

} GEOGRAPHIC_TYPE;

/* Added code 21-Mar-1996, moved from pointing.h */
    typedef struct
    {
        double X;                                   /* x axis location */
        double Y;                                   /* y axis location */
        double Z;                                   /* z axis location */

} CARTESIAN_TYPE;
/* End of added code */

/*  Global declarations.
*/
    extern double estimated_altitude;
    extern enum Console_Mode mode;
    extern enum Tracking_Mode tracking;
    extern enum Display_Object display_location;
    extern GEOGRAPHIC_TYPE designated_point;

/* end */
```

Navy Case No. 77257

```
/******************************************************************
Module Name:     console.c
Number/Version:
History:
    Date            Rev      Author           Description
    7-Feb-1995      1.00     C. Houlberg      Baseline
    5-Sep-1995      1.02     C. Houlberg      Added gimbal soft stop capability.
                                              setup_screen()
                                              set_gimbal_limit_screen()
    18-Jan-1996     1.03     C. Houlberg      Added exit to help screen.
                                              help_screen()
    25-Jan-1996     1.03     C. Houlberg      Changed <Ctrl> F5 to <Ctrl> F4
                                              main_screen_template()
                                              help_screen()
    25-Jan-1996     1.03     C. Houlberg      Display leading zeros in heading.
                                              update_console_display()
    6-Feb-1996      1.03     C. Houlberg      Added global tracking display.
                                              global_tracking_display()
    6-Feb-1996      1.03     C. Houlberg      added tracking mode display.
                                              setup_screen()
                                              calibrate_ins_screen()
                                              calibrate_acq_sight_screen()
                                              calibrate_gimbal_drive_screen()
                                              calibrate_gimbal_input_screen()
                                              calibrate_irds_screen()
                                              tracking_box_adjust_screen()
                                              set_gimbal_limit_screen()
                                              display_waypoints()
    7-Feb-1996      1.03     C. Houlberg      Added ground speed display.
                                              update_console_display()
                                              main_screen_template()
    8-Feb-1996      1.03     C. Houlberg      User friendly password entry.
                                              setup_screen()
    21-Mar-1996     1.04     C. Houlberg      Added new triangulation function.
                                              main_screen_template()
                                              help_screen()
    25-Mar-1996     1.04     C. Houlberg      Made help screen more readable
                                              help_screen()
    26-Mar-1996     1.04     C. Houlberg      Changed order of setup items.
                                              setup_screen()
Abstract:  Console display functions.
    1)   Initialize console display.
    2)   Display console main screen template.
    3)   Update console display data.
    4)   Console display of object location
******************************************************************/
/*   All parameters and functions used by console.c are defined in
     the following header files.
*/
    #include "stdio.h"          /* Standard I/O definitions */
    #include "graph.h"          /* Graphics I/O definitions */
    #include "malloc.h"         /* Memory allocation definitions */
    #include "mem_map.h"        /* Hardware memory map */
    #include "avtsc.h"          /* Project definitions */
    #include "init.h"           /* Initialization definitions */
    #include "earth.h"          /* Earth definitions */
    #include "ins.h"            /* INS definitions */
```

Navy Case No. 77257

```
        #include "video.h"                       /* Video definitions */
        #include "utility.h"                     /* Utility definitions */
        #include "error.h"                       /* Error display definitions */
        #include "console.h"                     /* Console display definitions */

/*      Global variable declarations.
*/
        short console_start_mode;                /* Initial console screen mode */
        GRAPHICS_TYPE console_graphics;          /* Console graphics makeup */
        char __huge *cursor_ind;                 /* Cursor indicator image */

/*      Functions local to console.c.
*/
        void construct_console_cursor(void);

/***********************************************************************
Function Name:   init_console_display()
Number/Version:
History:
        Date            Rev         Author              Description
        7-Feb-1995      1.00        C. Houlberg         Baseline Abstract:   Initializes console display.
***********************************************************************/
void init_console_display(void)
{
        /* Variable declarations */
        struct _videoconfig video;               /* Configuration of video screen */
        long imsize;                             /* Size of indicator image */

/* Select the console display board and set the operating mode */
        current_port = switch_monitors(CONSOLE, current_port);
        set_operation_mode(GRAPHIC_MODE);

/* Set the video mode and clear the screen */
        _getvideoconfig(&video); console_start_mode = video.mode;
        _setvideomode(_VRES16COLOR);
        _clearscreen(_GCLEARSCREEN);

/* Get video configuration data and set the screen origin */
        _getvideoconfig(&video);
        console_graphics.X_Center = (short) (video.numxpixels)/2;
        console_graphics.Y_Center = (short) (video.numypixels)/2;
        _setvieworg(console_graphics.X_Center, console_graphics.Y_Center);
        console_graphics.X_Max = (short) (video.numxpixels)/2;
        console_graphics.Y_Max = (short) (video.numypixels)/2;

/* Reserve memory for the cursor image */
        imsize = (size_t)_imagesize(0, 0, CURSOR_WD, CURSOR_HT);
        cursor_ind = _halloc(imsize, sizeof(char));

/* Construct and save the cursor image */
    construct_console_cursor();
}

/***********************************************************************
Function Name:   construct_console_cursor()
```

81

Navy Case No. 77257

```
Number/Version:
History:
      Date           Rev          Author               Description
      3-Feb-1995     1.00         C. Houlberg          Baseline Abstract:   Constructs and saves console cursor images.
*************************************************************************/
void construct_console_cursor(void)
{
      /* Variable declarations */
      struct _xycoord polyside[4];            /* Sides of polygon */

/* Select the console display board */
      current_port = switch_monitors(CONSOLE, current_port);

/* Construct cursor */
      polyside[0].xcoord = 0;
      polyside[0].ycoord = 0;
      polyside[1].xcoord = CURSOR_WD - 1;
      polyside[1].ycoord = 0;
      polyside[2].xcoord = CURSOR_WD - 1;
      polyside[2].ycoord = CURSOR_HT - 1;
      polyside[3].xcoord = 0;
      polyside[3].ycoord = CURSOR_HT - 1;
      _polygon(_GFILLINTERIOR, polyside, 4);
      _getimage(0, 0, CURSOR_WD - 1, CURSOR_HT - 1, cursor_ind);
      _putimage(0, 0, cursor_ind, _GXOR);
}

/************************************************************************
Function Name:   update_console_display()
Number/Version:
History:
      Date           Rev          Author               Description
      16-Feb-1995    1.00         C. Houlberg          Baseline
      25-Jan-1996    1.03         C. Houlberg          Display leading zeros in heading.
      7-Feb-1996     1.03         C. Houlberg          Added ground speed display.

Abstract:   Updates console display data.
*************************************************************************/
void update_console_display(void)
{
      /* Variable declarations */
      char buffer[15];                        /* 14 character buffer */

/* Select the console display board */
      current_port = switch_monitors(CONSOLE, current_port);

/* Display date and time */
      _settextposition(MAIN_DATE); _outtext(platform.Date);
      _settextposition(MAIN_TIME); _outtext(platform.Time);

/* Display aircraft data */
      latitude_to_ascii(buffer, platform.Lat);
      _settextposition(MAIN_LAT); _outtext(buffer);
      longitude_to_ascii(buffer, platform.Lon);
      _settextposition(MAIN_LON); _outtext(buffer);
```

Navy Case No. 77257

```
    sprintf(buffer, "%-6.0f", platform.Alt);
    _settextposition(MAIN_ALT + 10); _outtext(buffer);
    sprintf(buffer, "%6.1f", platform.Roll * 180.0/PI);
    _settextposition(MAIN_ROLL + 9); _outtext(buffer);
    sprintf(buffer, "%5.1f", platform.Pitch * 180.0/PI);
    _settextposition(MAIN_PITCH + 10); _outtext(buffer);
/* Changed code 25-Jan-1996 to display leading zeros in heading from:
    sprintf(buffer, "%3.0f", platform.Heading * 180.0/PI);
to: */
    sprintf(buffer, "%03.0f", platform.Heading * 180.0/PI);
/* End of code change */
    _settextposition(MAIN_HEADING + 12); _outtext(buffer);

/* Added code 7-Feb-1996 to add update for display of ground speed */
    sprintf(buffer, "%4.0f", platform.Speed);
    _settextposition(MAIN_SPEED + 11); _outtext(buffer);
/* End of added code */

/* Update error display */
    if(error_item.New_Error_Status == YES)
        update_error_display();
}
/************************************************************************
Function Name:   console_location_display()
Number/Version:
History:
    Date            Rev         Author          Description
    15-Feb-1995     1.00        C. Houlberg     Baseline Abstract:   Displays console latitude, longitude, and altitude.
************************************************************************/
void console_location_display(void)
{
    /* Variable declarations */
    char buffer[20];                    /* 19 character buffer */

/* Select the console display board */
    current_port = switch_monitors(CONSOLE, current_port);

/* Display date and time */
    _settextposition(MAIN_TGT3 + 2); _outtext(designated_point.Time);

/* Display target location */
    if(designated_point.Alt == UNDEFINED)      /* Location is undefined */
    {
        sprintf(buffer, "Undefined  ");
        _settextposition(MAIN_TGT4 + 2); _outtext(buffer);
        sprintf(buffer, "Undefined  ");
        _settextposition(MAIN_TGT5 + 2); _outtext(buffer);
    }
    else                                       /* Location is defined */
    {
        latitude_to_ascii(buffer, designated_point.Lat);
        _settextposition(MAIN_TGT4 + 2); _outtext(buffer);
        longitude_to_ascii(buffer, designated_point.Lon);
        _settextposition(MAIN_TGT5 + 2); _outtext(buffer);
```

Navy Case No. 77257

```
        }
}
/***********************************************************************
Function Name:    console_default_mode()
Number/Version:
History:
        Date            Rev         Author          Description
        31-Jan-1995     1.00        C. Houlberg     Baseline Abstract:   Returns the console to its default video mode.
***********************************************************************/
void console_default_mode(void)
{
        /* Select the console display board */
        current_port = switch_monitors(CONSOLE, current_port);

/* Return console display to its default mode */
        _setvideomode(console_start_mode);
        _clearscreen(_GCLEARSCREEN);
}

/***********************************************************************
Function Name:    main_screen_template()
Number/Version:
History:
        Date            Rev         Author          Description
        13-Feb-1995     1.00        C. Houlberg     Baseline
        25-Jan-1996     1.03        C. Houlberg     Changed <Ctrl> F5 to <Ctrl> F4.
        7-Feb-1996      1.03        C. Houlberg     Added ground speed display.
        21-Mar-1996     1.04        C. Houlberg     Added new triangulation function.

Abstract:   Display main screen template.
***********************************************************************/
void main_screen_template(void)
{
        /* Variable declarations */
        char buffer[39];                    /* 38 character buffer */
        char box_top[41] = {0xc9u,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xbbu,
                            '\0'};
        char box_side[2] = {0xbau,'\0'};
        char box_btm[41] = {0xc8u,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xcdu,
                            0xcdu,0xcdu,0xcdu,0xcdu,0xcdu,0xcdu,0xcdu,0xbcu,
                            '\0'};

/* Clear the screen */
        _clearscreen(_GCLEARSCREEN);

/* Display function key descriptions */
        sprintf(buffer, "F1   Help");
```

Navy Case No. 77257

```
    _settextposition(MAIN_F1); _outtext(buffer);
    sprintf(buffer, "F2   Setup");
    _settextposition(MAIN_F2); _outtext(buffer);
    sprintf(buffer, "F3   Toggle Color");
    _settextposition(MAIN_F3); _outtext(buffer);
    sprintf(buffer, "F4   Record");
    _settextposition(MAIN_F4); _outtext(buffer);
/* Code change 25-Jan-1996 to change function key from <Ctrl> F5
    sprintf(buffer, "<Ctrl> F5    Stop");
    _settextposition(MAIN_CTL_F5); _outtext(buffer);
to <Ctrl> F4 */
    sprintf(buffer, "<Ctrl> F4    Stop");
    _settextposition(MAIN_CTL_F4); _outtext(buffer);
/* End of code change */
    sprintf(buffer, "F6   ACQ Sight");
    _settextposition(MAIN_F6); _outtext(buffer);
    sprintf(buffer, "F7   IRDS");
    _settextposition(MAIN_F7); _outtext(buffer);
    sprintf(buffer, "F8   Waypoint");
    _settextposition(MAIN_F8); _outtext(buffer);
/* Code change 21-Mar-1996 to add new triangulation function from:
    sprintf(buffer, "F9");
to: */
    sprintf(buffer, "F9   Triangulate Target");
/* End of code change */
    _settextposition(MAIN_F9); _outtext(buffer);
    sprintf(buffer, "F10  Mark Target");
    _settextposition(MAIN_F10); _outtext(buffer);

/* Display operational data template */
    sprintf(buffer, "Altitude:");
    _settextposition(MAIN_ALT); _outtext(buffer);
    sprintf(buffer, "Roll:");
    _settextposition(MAIN_ROLL); _outtext(buffer);
    sprintf(buffer, "Pitch:");
    _settextposition(MAIN_PITCH); _outtext(buffer);
    sprintf(buffer, "Heading:");
    _settextposition(MAIN_HEADING); _outtext(buffer);
    sprintf(buffer, "Gnd Speed:");
    _settextposition(MAIN_SPEED); _outtext(buffer);

/* Display target data template */
    _settextposition(MAIN_TGT1); _outtext(box_top);
    sprintf(buffer, "          Marked Target           ");
    _settextposition(MAIN_TGT2);
    _outtext(box_side); _outtext(buffer); _outtext(box_side);
    sprintf(buffer, "                                  ");
    _settextposition(MAIN_TGT3);
    _outtext(box_side); _outtext(buffer); _outtext(box_side);
    _settextposition(MAIN_TGT7);
    _outtext(box_side); _outtext(buffer); _outtext(box_side);
    _settextposition(MAIN_TGT4);
    _outtext(box_side); _outtext(buffer); _outtext(box_side);
    _settextposition(MAIN_TGT5);
    _outtext(box_side); _outtext(buffer); _outtext(box_side);
    sprintf(buffer, " Estimated Alt:                   ");
    _settextposition(MAIN_TGT6);
```

Navy Case No. 77257

```
        _outtext(box_side); _outtext(buffer); _outtext(box_side);
        sprintf(buffer, " Change altitude if desired.           ");
        _settextposition(MAIN_TGT8);
        _outtext(box_side); _outtext(buffer); _outtext(box_side);
        sprintf(buffer, " Press <Enter> to accept altitude ... ");
        _settextposition(MAIN_TGT9);
        _outtext(box_side); _outtext(buffer); _outtext(box_side);
        _settextposition(MAIN_TGT10); _outtext(box_btm);

/* Tracking display */
        switch(tracking)
        {
                case(ACTIVE_ACQSIGHT):
                        /* Display acquisition sight notice */
                        sprintf(buffer, "ACTIVE ACQ SIGHT");
                        _settextposition(MAIN_TRACKING); _outtext(buffer);
                        break;
                case(ACTIVE_IRDS):
                        /* Display IRDS notice */
                        sprintf(buffer, "ACTIVE IRDS");
                        _settextposition(MAIN_TRACKING); _outtext(buffer);
                        break;
                case(ACTIVE_WAYPOINT):
                        /* Display waypoint notice */
                        sprintf(buffer, "ACTIVE WAYPOINT");
                        _settextposition(MAIN_TRACKING); _outtext(buffer);
                        /* Display waypoint description */
                        _settextposition(MAIN_WAYPOINT);
                        _outtext(waypoint->Description);
                        break;
        }
}

/******************************************************************************
Function Name:  help_screen()
Number/Version:
History:
        Date            Rev     Author          Description
        13-Feb-1995     1.00    C. Houlberg     Baseline
        18-Jan-1996     1.03    C. Houlberg     Added exit to help screen.
        25-Jan-1996     1.03    C. Houlberg     Change <Ctrl> F5 to <Ctrl> F4.
        21-Mar-1996     1.04    C. Houlberg     Added new triangulation function.
        25-Mar-1996     1.04    C. Houlberg     Made help text more readable.

Abstract:  Display help screen.
******************************************************************************/
void help_screen(void)
{
        /* Variable declarations */
        char buffer[56];                        /* 55 character buffer */

/* Clear the screen */
        _clearscreen(_GCLEARSCREEN);

/* Code changed 25-Mar-1996 to make help screen more readable */
        /* Display the help screen */
        sprintf(buffer, "F2    Setup - Perform system calibration/boresight, ");
```

86

Navy Case No. 77257

```
        _settextposition(HELP_F2); _outtext(buffer);
        sprintf(buffer, "set waypoints."); _outtext(buffer);
        sprintf(buffer, "F3   Toggle Color - Toggle overlay color between ");
        _settextposition(HELP_F3); _outtext(buffer);
        sprintf(buffer, "black and white."); _outtext(buffer);
        sprintf(buffer, "F4   Record - Start recording on both VTR's.");
        _settextposition(HELP_F4); _outtext(buffer);
/* Code change 25-Jan-1996 to change function key from <Ctrl> F5
        sprintf(buffer, "<Ctrl> F5    Stop - Stop both VTR's");
        _settextposition(HELP_CTRL_F5); _outtext(buffer);
to <Ctrl> F4 */
        sprintf(buffer, "<Ctrl> F4    Stop - Stop both VTR's");
        _settextposition(HELP_CTRL_F4); _outtext(buffer);
/* End of code change */
        sprintf(buffer, "F5   Not used");
        _settextposition(HELP_F5); _outtext(buffer);
        sprintf(buffer, "F6   ACQ Sight - Select acquisition sight as the active");
        _settextposition(HELP_F6_1); _outtext(buffer);
        sprintf(buffer, "pointing device.");
        _settextposition(HELP_F6_2); _outtext(buffer);
        sprintf(buffer, "F7   IRDS - Select IRDS as the active pointing ");
        _settextposition(HELP_F7); _outtext(buffer);
        sprintf(buffer, "device."); _outtext(buffer);
        sprintf(buffer, "F8   Waypoint - Select a waypoint as the active ");
        _settextposition(HELP_F8); _outtext(buffer);
        sprintf(buffer, "pointing device."); _outtext(buffer);
/* Added code 21-Mar-1996 for new triangulation function */
        sprintf(buffer, "F9   Triangulate Target - Calculate position of the ");
        _settextposition(HELP_F9_1); _outtext(buffer);
        sprintf(buffer, "target from the "); _outtext(buffer);
        sprintf(buffer, "previous and current designated line of sight vectors.");
        _settextposition(HELP_F9_2); _outtext(buffer);
/* End of added code */
        sprintf(buffer, "F10  Mark Target - Calculate position of the target ");
        _settextposition(HELP_F10); _outtext(buffer);
        sprintf(buffer, "being viewed."); _outtext(buffer);
/* End of code change */
        sprintf(buffer, "<Shift> ESC  Exit program from main screen");
        _settextposition(HELP_SHIFT_ESC); _outtext(buffer);
        sprintf(buffer, "Press any key to return to main screen ...");
        _settextposition(HELP_EXIT); _outtext(buffer);
}

/**************************************************************************
Function Name:   setup_screen()
Number/Version:
History:
        Date            Rev     Author          Description
        13-Feb-1995     1.00    C. Houlberg     Baseline
        5-Sep-1995      1.02    C. Houlberg     Added gimbal soft stop capability.
        6-Feb-1996      1.03    C. Houlberg     Added tracking mode display.
        26-Mar-1996     1.04    C. Houlberg     Changed order of setup items.

Abstract:  Display setup screen.
**************************************************************************/
void setup_screen(void)
{
```

Navy Case No. 77257

```
    /* Variable declarations */
    char buffer[41];                    /* 40 character buffer */

/* Clear the screen */
    _clearscreen(_GCLEARSCREEN);
/* Added code 6-Feb-1996 to display tracking mode globally */
    global_tracking_display();
/* End of added code */

/* Display setup menu */
    sprintf(buffer, "Setup Menu");
    _settextposition(SETUP_TITLE); _outtext(buffer);
    sprintf(buffer, "1  Calibrate INS.");
    _settextposition(SETUP_INS); _outtext(buffer);
    sprintf(buffer, "2  Calibrate Gimbal Drive.");     /* Was item 3 now 2 */
    _settextposition(SETUP_GIMBAL_DRIVE); _outtext(buffer);
    sprintf(buffer, "3  Calibrate Gimbal Input.");     /* Was item 4 now 3 */
    _settextposition(SETUP_GIMBAL_INPUT); _outtext(buffer);
    sprintf(buffer, "4  Calibrate Acquisition Sight."); /* Was item 2 now 4 */
    _settextposition(SETUP_ACQ_SIGHT); _outtext(buffer);
    sprintf(buffer, "5  Calibrate IRDS.");
    _settextposition(SETUP_IRDS); _outtext(buffer);
    sprintf(buffer, "6  Adjust Tracking Box");
    _settextposition(SETUP_TRACK_BOX); _outtext(buffer);
/* Code change 5-Sep-1995 for gimbal soft stop capability from:
    sprintf(buffer, "7  Set Gimbal Limit Warning Points.");
to: */
    sprintf(buffer, "7  Set Gimbal Limit Points.");
/* End of code change */
    _settextposition(SETUP_GIMBAL); _outtext(buffer);
    sprintf(buffer, "8  Edit Waypoints.");
    _settextposition(SETUP_WAYPOINTS); _outtext(buffer);
/* Code deleted 8-Feb-1996 for user friendly password entry:
    sprintf(buffer, "Enter password for items 1 - 7:");
    _settextposition(SETUP_PASSWORD); _outtext(buffer);
End of deleted code */
    sprintf(buffer, "Press <Esc> to return to main screen ...");
    _settextposition(SETUP_EXIT); _outtext(buffer);
}

/************************************************************************
Function Name:   calibrate_ins_screen()
Number/Version:
History:
    Date            Rev         Author          Description
    9-Mar-1995      1.00        C. Houlberg     Baseline
    6-Feb-1996      1.03        C. Houlberg     Added tracking mode display.

Abstract:  Display INS calibration screen.
************************************************************************/
void calibrate_ins_screen(void)
{
    /* Variable declarations */
    char buffer[41];                    /* 40 character buffer */

/* Clear the screen */
```

Navy Case No. 77257

```
        _clearscreen(_GCLEARSCREEN);

/* Added code 6-Feb-1996 to display tracking mode globally */
        global_tracking_display();
/* End of added code */

/* Display setup menu */
        sprintf(buffer, "Calibrate INS");
        _settextposition(INS_TITLE); _outtext(buffer);

sprintf(buffer, "Turn aircraft to a known heading.");
        _settextposition(INS_LINE1); _outtext(buffer);
        sprintf(buffer, "Modify corrected heading (in degrees):");
        _settextposition(INS_LINE2); _outtext(buffer);
        sprintf(buffer, "+ or UP    Increment heading");
        _settextposition(INS_LINE3); _outtext(buffer);
        sprintf(buffer, "- or DOWN  Decrement heading");
        _settextposition(INS_LINE4); _outtext(buffer);

sprintf(buffer, "Displayed INS heading (in degrees):");
        _settextposition(INS_LINE5); _outtext(buffer);

sprintf(buffer, "Corrected INS heading (in degrees):");
        _settextposition(INS_LINE6); _outtext(buffer);

sprintf(buffer, "Press <Enter> to save change.");
        _settextposition(INS_SAVE); _outtext(buffer);

sprintf(buffer, "Press <Esc> to return to main screen ...");
        _settextposition(INS_EXIT); _outtext(buffer);
}

/****************************************************************
Function Name:   calibrate_acq_sight_screen()
Number/Version:
History:
        Date          Rev      Author           Description
        9-Mar-1995    1.00     C. Houlberg      Baseline
        6-Feb-1996    1.03     C. Houlberg      Added tracking mode display.

Abstract:   Display ACQ Sight calibration screen.
****************************************************************/
void calibrate_acq_sight_screen(void)
{
        /* Variable declarations */
        char buffer[48];                        /* 47 character buffer */

/* Clear the screen */
        _clearscreen(_GCLEARSCREEN);

/* Added code 6-Feb-1996 to display tracking mode globally */
        global_tracking_display();
/* End of added code */

/* Display setup menu */
        sprintf(buffer, "Acquisition Sight Calibration");
        _settextposition(ACQSIGHT_TITLE); _outtext(buffer);
```

Navy Case No. 77257

```
        sprintf(buffer, "Azimuth scale factor:");
        _settextposition(ACQSIGHT_AZ_FACTOR); _outtext(buffer);
        sprintf(buffer, "%4.2f",
              setup_parameters.acq_sight_calibration.AZ_Factor);
        _settextposition(ACQSIGHT_AZ_FACTOR + 22); _outtext(buffer);

sprintf(buffer, "Azimuth offset (volts):");
        _settextposition(ACQSIGHT_AZ_OFFSET); _outtext(buffer);
        sprintf(buffer, "%-5.2f",
              setup_parameters.acq_sight_calibration.AZ_Offset);
        _settextposition(ACQSIGHT_AZ_OFFSET + 24); _outtext(buffer);

sprintf(buffer, "Elevation scale factor:");
        _settextposition(ACQSIGHT_EL_FACTOR); _outtext(buffer);
        sprintf(buffer, "%4.2f",
              setup_parameters.acq_sight_calibration.EL_Factor);
        _settextposition(ACQSIGHT_EL_FACTOR + 24); _outtext(buffer);

sprintf(buffer, "Elevation offset (volts):");
        _settextposition(ACQSIGHT_EL_OFFSET); _outtext(buffer);
        sprintf(buffer, "%-5.2f",
              setup_parameters.acq_sight_calibration.EL_Offset);
        _settextposition(ACQSIGHT_EL_OFFSET + 26); _outtext(buffer);

sprintf(buffer, "Press <Tab> or <Up> or <Down> to use new value.");
        _settextposition(ACQSIGHT_USE); _outtext(buffer);
        sprintf(buffer, "Press <Enter> to save changes.");
        _settextposition(ACQSIGHT_SAVE); _outtext(buffer);

sprintf(buffer, "Press <Esc> to return to main screen ...");
        _settextposition(ACQSIGHT_EXIT); _outtext(buffer);
}
/******************************************************************************
Function Name:   calibrate_gimbal_drive_screen()
Number/Version:
History:
      Date            Rev         Author              Description
      3-Aug-1995      1.00        C. Houlberg         Baseline
      6-Feb-1996      1.03        C. Houlberg         Added tracking mode display.

Abstract:  Display Gimbal Drive calibration screen.
******************************************************************************/
void calibrate_gimbal_drive_screen(void)
{
        /* Variable declarations */
        char buffer[48];                          /* 47 character buffer */

/* Clear the screen */
        _clearscreen(_GCLEARSCREEN);

/* Added code 6-Feb-1996 to display tracking mode globally */
        global_tracking_display();
/* End of added code */

/* Display setup menu */
        sprintf(buffer, "Gimbal Drive Calibration");
```

Navy Case No. 77257

```
        _settextposition(GIMDRIVE_TITLE); _outtext(buffer);

sprintf(buffer, "Azimuth scale factor:");
        _settextposition(GIMDRIVE_AZ_FACTOR); _outtext(buffer);
        sprintf(buffer, "%4.2f",
              setup_parameters.gimbal_drive_calibration.AZ_Factor);
        _settextposition(GIMDRIVE_AZ_FACTOR + 22); _outtext(buffer);

sprintf(buffer, "Azimuth offset (volts):");
        _settextposition(GIMDRIVE_AZ_OFFSET); _outtext(buffer);
        sprintf(buffer, "%-5.2f",
              setup_parameters.gimbal_drive_calibration.AZ_Offset);
        _settextposition(GIMDRIVE_AZ_OFFSET + 24); _outtext(buffer);

sprintf(buffer, "Elevation scale factor:");
        _settextposition(GIMDRIVE_EL_FACTOR); _outtext(buffer);
        sprintf(buffer, "%4.2f",
              setup_parameters.gimbal_drive_calibration.EL_Factor);
        _settextposition(GIMDRIVE_EL_FACTOR + 24); _outtext(buffer);

sprintf(buffer, "Elevation offset (volts):");
        _settextposition(GIMDRIVE_EL_OFFSET); _outtext(buffer);
        sprintf(buffer, "%-5.2f",
              setup_parameters.gimbal_drive_calibration.EL_Offset);
        _settextposition(GIMDRIVE_EL_OFFSET + 26); _outtext(buffer);

sprintf(buffer, "Press <Tab> or <Up> or <Down> to use new value.");
        _settextposition(GIMDRIVE_USE); _outtext(buffer);
        sprintf(buffer, "Press <Enter> to save changes.");
        _settextposition(GIMDRIVE_SAVE); _outtext(buffer);

sprintf(buffer, "Press <Esc> to return to main screen ...");
        _settextposition(GIMDRIVE_EXIT); _outtext(buffer);
}
/************************************************************************
Function Name:    calibrate_gimbal_input_screen()
Number/Version:
History:
        Date            Rev        Author           Description
        3-Aug-1995      1.00       C. Houlberg      Baseline
        6-Feb-1996      1.03       C. Houlberg      Added tracking mode display.

Abstract:  Display Gimbal Input calibration screen.
*************************************************************************/
void calibrate_gimbal_input_screen(void)
{
        /* Variable declarations */
        char buffer[48];                        /* 47 character buffer */

/* Clear the screen */
        _clearscreen(_GCLEARSCREEN);

/* Added code 6-Feb-1996 to display tracking mode globally */
        global_tracking_display();
/* End of added code */
```

91

Navy Case No. 77257

```c
        /* Display setup menu */
        sprintf(buffer, "Gimbal Input Calibration");
        _settextposition(GIMINPUT_TITLE); _outtext(buffer);

sprintf(buffer, "Azimuth scale factor:");
        _settextposition(GIMINPUT_AZ_FACTOR); _outtext(buffer);
        sprintf(buffer, "%4.2f",
              setup_parameters.gimbal_input_calibration.AZ_Factor);
        _settextposition(GIMINPUT_AZ_FACTOR + 22); _outtext(buffer);

sprintf(buffer, "Azimuth offset (volts):");
        _settextposition(GIMINPUT_AZ_OFFSET); _outtext(buffer);
        sprintf(buffer, "%-5.2f",
              setup_parameters.gimbal_input_calibration.AZ_Offset);
        _settextposition(GIMINPUT_AZ_OFFSET + 24); _outtext(buffer);

sprintf(buffer, "Elevation scale factor:");
        _settextposition(GIMINPUT_EL_FACTOR); _outtext(buffer);
        sprintf(buffer, "%4.2f",
              setup_parameters.gimbal_input_calibration.EL_Factor);
        _settextposition(GIMINPUT_EL_FACTOR + 24); _outtext(buffer);

sprintf(buffer, "Elevation offset (volts):");
        _settextposition(GIMINPUT_EL_OFFSET); _outtext(buffer);
        sprintf(buffer, "%-5.2f",
              setup_parameters.gimbal_input_calibration.EL_Offset);
        _settextposition(GIMINPUT_EL_OFFSET + 26); _outtext(buffer);

sprintf(buffer, "Press <Tab> or <Up> or <Down> to use new value.");
        _settextposition(GIMINPUT_USE); _outtext(buffer);
        sprintf(buffer, "Press <Enter> to save changes.");
        _settextposition(GIMINPUT_SAVE); _outtext(buffer);

sprintf(buffer, "Press <Esc> to return to main screen ...");
        _settextposition(GIMINPUT_EXIT); _outtext(buffer);
}

/***********************************************************************
Function Name:   calibrate_irds_screen()
Number/Version:
History:
       Date           Rev       Author          Description
       9-Mar-1995     1.00      C. Houlberg     Baseline
       6-Feb-1996     1.03      C. Houlberg     Added tracking mode display.

Abstract:   Display IRDS calibration screen.
***********************************************************************/
void calibrate_irds_screen(void)
{
        /* Variable declarations */
        char buffer[48];                           /* 47 character buffer */

/* Clear the screen */
        _clearscreen(_GCLEARSCREEN);

/* Added code 6-Feb-1996 to display tracking mode globally */
        global_tracking_display();
```

Navy Case No. 77257

```c
/* End of added code */

/* Display setup menu */
    sprintf(buffer, "IRDS Calibration");
    _settextposition(IRDS_TITLE); _outtext(buffer);

sprintf(buffer, "Azimuth scale factor:");
    _settextposition(IRDS_AZ_FACTOR); _outtext(buffer);
    sprintf(buffer, "%4.2f",
        setup_parameters.irds_calibration.AZ_Factor);
    _settextposition(IRDS_AZ_FACTOR + 22); _outtext(buffer);

sprintf(buffer, "Azimuth offset (degrees):");
    _settextposition(IRDS_AZ_OFFSET); _outtext(buffer);
    sprintf(buffer, "%-5.2f",
        setup_parameters.irds_calibration.AZ_Offset);
    _settextposition(IRDS_AZ_OFFSET + 26); _outtext(buffer);

sprintf(buffer, "Elevation scale factor:");
    _settextposition(IRDS_EL_FACTOR); _outtext(buffer);
    sprintf(buffer, "%4.2f",
        setup_parameters.irds_calibration.EL_Factor);
    _settextposition(IRDS_EL_FACTOR + 24); _outtext(buffer);

sprintf(buffer, "Elevation offset (degrees):");
    _settextposition(IRDS_EL_OFFSET); _outtext(buffer);
    sprintf(buffer, "%-5.2f",
        setup_parameters.irds_calibration.EL_Offset);
    _settextposition(IRDS_EL_OFFSET + 28); _outtext(buffer);

sprintf(buffer, "Press <Tab> or <Up> or <Down> to use new value.");
    _settextposition(IRDS_USE); _outtext(buffer);
    sprintf(buffer, "Press <Enter> to save changes.");
    _settextposition(IRDS_SAVE); _outtext(buffer);

sprintf(buffer, "Press <Esc> to return to main screen ...");
    _settextposition(IRDS_EXIT); _outtext(buffer);
}
/**********************************************************************
Function Name:   tracking_box_adjust_screen()
Number/Version:
History:
    Date           Rev      Author           Description
    6-Mar-1995     1.00     C. Houlberg      Baseline
    6-Feb-1996     1.03     C. Houlberg      Added tracking mode display.

Abstract:   Display tracking box adjust screen.
**********************************************************************/
void tracking_box_adjust_screen(void)
{
    /* Variable declarations */
    char buffer[41];                    /* 40 character buffer */

/* Clear the screen */
    _clearscreen(_GCLEARSCREEN);
```

Navy Case No. 77257

```
/* Added code 6-Feb-1996 to display tracking mode globally */
    global_tracking_display();
/* End of added code */

/* Display adjust instructions */
    sprintf(buffer, "Adjust Tracking Box");
    _settextposition(ADJUST_BOX_TITLE); _outtext(buffer);
    sprintf(buffer, "Use cursor keys to move tracking box.");
    _settextposition(ADJUST_BOX_LINE1); _outtext(buffer);
    sprintf(buffer, "Use following keys to size tracking box:");
    _settextposition(ADJUST_BOX_LINE2); _outtext(buffer);
    sprintf(buffer, "T  Taller.");
    _settextposition(ADJUST_BOX_LINE3); _outtext(buffer);
    sprintf(buffer, "S  Shorter.");
    _settextposition(ADJUST_BOX_LINE4); _outtext(buffer);
    sprintf(buffer, "W  Wider.");
    _settextposition(ADJUST_BOX_LINE5); _outtext(buffer);
    sprintf(buffer, "N  Narrower.");
    _settextposition(ADJUST_BOX_LINE6); _outtext(buffer);
    sprintf(buffer, "Press <Enter> to save changes ...");
    _settextposition(ADJUST_BOX_SAVE); _outtext(buffer);
    sprintf(buffer, "Press <Esc> to return to main screen ...");
    _settextposition(ADJUST_BOX_EXIT); _outtext(buffer);
}

/****************************************************************
Function Name:    set_gimbal_limit_screen()
Number/Version:
History:
    Date            Rev         Author          Description
    9-Mar-1995      1.00        C. Houlberg     Baseline
    5-Sep-1995      1.02        C. Houlberg     Added gimbal soft stop capability.
    6-Feb-1996      1.03        C. Houlberg     Added tracking mode display.

Abstract:    Display set gimbal limit screen.
****************************************************************/
void set_gimbal_limit_screen(void)
{
    /* Variable declarations */
    char buffer[48];                        /* 47 character buffer */

/* Clear the screen */
    _clearscreen(_GCLEARSCREEN);

/* Added code 6-Feb-1996 to display tracking mode globally */
    global_tracking_display();
/* End of added code */

/* Display setup menu */
    sprintf(buffer, "Gimbal Limits (degrees)");
    _settextposition(GIMBAL_TITLE); _outtext(buffer);

sprintf(buffer, "Forward warning point:");
    _settextposition(GIMBAL_FORWARD); _outtext(buffer);
    sprintf(buffer, "%-2.0f",
            setup_parameters.Gimbal_Forward_Limit);
    _settextposition(GIMBAL_FORWARD + 23); _outtext(buffer);
```

94

Navy Case No. 77257

```
      sprintf(buffer, "Aft warning point:");
      _settextposition(GIMBAL_AFT); _outtext(buffer);
      sprintf(buffer, "%-3.0f",
            setup_parameters.Gimbal_Aft_Limit);
      _settextposition(GIMBAL_AFT + 19); _outtext(buffer);

sprintf(buffer, "Up warning point:");
      _settextposition(GIMBAL_UP); _outtext(buffer);
      sprintf(buffer, "%-2.0f",
            setup_parameters.Gimbal_Up_Limit);
      _settextposition(GIMBAL_UP + 18); _outtext(buffer);

sprintf(buffer, "Down warning point:");
      _settextposition(GIMBAL_DOWN); _outtext(buffer);
      sprintf(buffer, "%-3.0f",
            setup_parameters.Gimbal_Down_Limit);
      _settextposition(GIMBAL_DOWN + 20); _outtext(buffer);

/* Code added 5-Sep-1995 for gimbal soft stop capability */
      sprintf(buffer, "Forward stop point:");
      _settextposition(GIMBAL_FORWARD_STOP); _outtext(buffer);
      sprintf(buffer, "%-2.0f",
            setup_parameters.Gimbal_Forward_Stop);
      _settextposition(GIMBAL_FORWARD_STOP + 20); _outtext(buffer);

sprintf(buffer, "Aft stop point:");
      _settextposition(GIMBAL_AFT_STOP); _outtext(buffer);
      sprintf(buffer, "%-3.0f",
            setup_parameters.Gimbal_Aft_Stop);
      _settextposition(GIMBAL_AFT_STOP + 16); _outtext(buffer);

sprintf(buffer, "Up stop point:");
      _settextposition(GIMBAL_UP_STOP); _outtext(buffer);
      sprintf(buffer, "%-2.0f",
            setup_parameters.Gimbal_Up_Stop);
      _settextposition(GIMBAL_UP_STOP + 15); _outtext(buffer);

sprintf(buffer, "Down stop point:");
      _settextposition(GIMBAL_DOWN_STOP); _outtext(buffer);
      sprintf(buffer, "%-3.0f",
            setup_parameters.Gimbal_Down_Stop);
      _settextposition(GIMBAL_DOWN_STOP + 17); _outtext(buffer);
/* End of code addition */ sprintf(buffer, "Press <Tab> or <Up> or <Down> to use new value.");
      _settextposition(GIMBAL_USE); _outtext(buffer);
      sprintf(buffer, "Press <Enter> to save changes.");
      _settextposition(GIMBAL_SAVE); _outtext(buffer);

sprintf(buffer, "Press <Esc> to return to main screen ...");
      _settextposition(GIMBAL_EXIT); _outtext(buffer);
}

/****************************************************************
Function Name:    edit_waypoints_screen()
Number/Version:
History:
```

95

Navy Case No. 77257

```
        Date            Rev         Author              Description
        9-Mar-1995      1.00        C. Houlberg         Baseline Abstract:    Display the edit waypoints screen.
****************************************************************************/
void edit_waypoints_screen(void)
{
        /* Variable declarations */
        char buffer[48];                    /* 47 character buffer */

/* Clear the screen */
        _clearscreen(_GCLEARSCREEN);

/* Display setup menu */
        sprintf(buffer, "Edit Waypoints");
        _settextposition(WAYPOINT_EDIT1); _outtext(buffer);
        sprintf(buffer, "Press <Tab> or <Up> or <Down> to use new value.");
        _settextposition(WAYPOINT_EDIT2); _outtext(buffer);
        sprintf(buffer, "Press <Enter> to save all Waypoints.");
        _settextposition(WAYPOINT_EDIT3); _outtext(buffer);

/* Display the waypoints */
        display_waypoints();
}

/****************************************************************************
Function Name:    select_waypoint_screen()
Number/Version:
History:
        Date            Rev         Author              Description
        9-Mar-1995      1.00        C. Houlberg         Baseline Abstract:    Display the select waypoint screen.
****************************************************************************/
void select_waypoint_screen(void)
{
        /* Variable declarations */
        char buffer[43];                    /* 42 character buffer */

/* Clear the screen */
        _clearscreen(_GCLEARSCREEN);

/* Display setup menu */
        sprintf(buffer, "Select Waypoint");
        _settextposition(WAYPOINT_CHOICE1); _outtext(buffer);
        sprintf(buffer, "Choose the number of the desired waypoint.");
        _settextposition(WAYPOINT_CHOICE2); _outtext(buffer);

/* Display the waypoints */
        display_waypoints();
}

/****************************************************************************
Function Name:    display_waypoints()
Number/Version:
History:
        Date            Rev         Author              Description
```

Navy Case No. 77257

```
    9-Mar-1995    1.00    C. Houlberg    Baseline
    6-Feb-1996    1.03    C. Houlberg    Added tracking mode display.

Abstract:   Display the waypoints screen.
*************************************************************************/
void display_waypoints(void)
{
    /* Variable declarations */
    char buffer[41];                    /* 40 character buffer */

/* Added code 6-Feb-1996 to display tracking mode globally */
    global_tracking_display();
/* End of added code */

/* Display waypoint list */
    latitude_to_ascii(buffer, setup_parameters.waypoint_1.Latitude);
    _settextposition(WAYPOINT1_LAT - 3); _outtext("1  "); _outtext(buffer);
    sprintf(buffer, "% 7.0f %s", setup_parameters.waypoint_1.Altitude, " ft.");
    _settextposition(WAYPOINT1_ALT); _outtext(buffer);
    _settextposition(WAYPOINT1_DES);
    _outtext(setup_parameters.waypoint_1.Description);
    longitude_to_ascii(buffer, setup_parameters.waypoint_1.Longitude);
    _settextposition(WAYPOINT1_LON); _outtext(buffer);

latitude_to_ascii(buffer, setup_parameters.waypoint_2.Latitude);
    _settextposition(WAYPOINT2_LAT - 3); _outtext("2  "); _outtext(buffer);
    sprintf(buffer, "% 7.0f %s", setup_parameters.waypoint_2.Altitude, " ft.");
    _settextposition(WAYPOINT2_ALT); _outtext(buffer);
    _settextposition(WAYPOINT2_DES);
    _outtext(setup_parameters.waypoint_2.Description);
    longitude_to_ascii(buffer, setup_parameters.waypoint_2.Longitude);
    _settextposition(WAYPOINT2_LON); _outtext(buffer);

latitude_to_ascii(buffer, setup_parameters.waypoint_3.Latitude);
    _settextposition(WAYPOINT3_LAT - 3); _outtext("3  "); _outtext(buffer);
    sprintf(buffer, "% 7.0f %s", setup_parameters.waypoint_3.Altitude, " ft.");
    _settextposition(WAYPOINT3_ALT); _outtext(buffer);
    _settextposition(WAYPOINT3_DES);
    _outtext(setup_parameters.waypoint_3.Description);
    longitude_to_ascii(buffer, setup_parameters.waypoint_3.Longitude);
    _settextposition(WAYPOINT3_LON); _outtext(buffer);

latitude_to_ascii(buffer, setup_parameters.waypoint_4.Latitude);
    _settextposition(WAYPOINT4_LAT - 3); _outtext("4  "); _outtext(buffer);
    sprintf(buffer, "% 7.0f %s", setup_parameters.waypoint_4.Altitude, " ft.");
    _settextposition(WAYPOINT4_ALT); _outtext(buffer);
    _settextposition(WAYPOINT4_DES);
    _outtext(setup_parameters.waypoint_4.Description);
    longitude_to_ascii(buffer, setup_parameters.waypoint_4.Longitude);
    _settextposition(WAYPOINT4_LON); _outtext(buffer);

latitude_to_ascii(buffer, setup_parameters.waypoint_5.Latitude);
    _settextposition(WAYPOINT5_LAT - 3); _outtext("5  "); _outtext(buffer);
    sprintf(buffer, "% 7.0f %s", setup_parameters.waypoint_5.Altitude, " ft.");
    _settextposition(WAYPOINT5_ALT); _outtext(buffer);
    _settextposition(WAYPOINT5_DES);
    _outtext(setup_parameters.waypoint_5.Description);
```

97

Navy Case No. 77257

```
        longitude_to_ascii(buffer, setup_parameters.waypoint_5.Longitude);
        _settextposition(WAYPOINT5_LON); _outtext(buffer);

sprintf(buffer, "Press <Esc> to return to main screen ...");
        _settextposition(WAYPOINT_EXIT); _outtext(buffer);
}
/****************************************************************************
Function Name:    global_tracking_display()
Number/Version:
History:
        Date              Rev          Author            Description
        6-Feb-1996        1.00         C. Houlberg       Baseline Abstract:    Global display of tracking mode.
****************************************************************************/
void global_tracking_display(void)
{
        /* Variable declarations */
        char buffer[31];                       /* 30 character buffer */
        char blank_waypoint[] = {"                              "};

/* Waypoint display */
        switch(tracking)
        {
                case(ACTIVE_ACQSIGHT):
                        /* Display acquisition sight notice */
                        sprintf(buffer, "ACTIVE ACQ SIGHT");
                        if(mode == MAIN_SCREEN)
                        {
                                _settextposition(MAIN_TRACKING); _outtext(buffer);
                                _settextposition(MAIN_WAYPOINT);
                        }
                        else
                        {
                                _settextposition(GLOBAL_TRACKING); _outtext(buffer);
                                _settextposition(GLOBAL_WAYPOINT);
                        }
                        _outtext(blank_waypoint);
                        break;
                case(ACTIVE_IRDS):
                        /* Display IRDS notice */
                        sprintf(buffer, "ACTIVE IRDS");
                        if(mode == MAIN_SCREEN)
                        {
                                _settextposition(MAIN_TRACKING); _outtext(buffer);
                                _settextposition(MAIN_WAYPOINT);
                        }
                        else
                        {
                                _settextposition(GLOBAL_TRACKING); _outtext(buffer);
                                _settextposition(GLOBAL_WAYPOINT);
                        }
                        _outtext(blank_waypoint);
                        break;
                case(ACTIVE_WAYPOINT):
                        /* Display waypoint notice */
```

Navy Case No. 77257

```
        sprintf(buffer, "ACTIVE WAYPOINT ");
        if(mode == MAIN_SCREEN)
        {
             _settextposition(MAIN_TRACKING); _outtext(buffer);
             /* Display waypoint description */
             _settextposition(MAIN_WAYPOINT);
             _outtext(waypoint->Description);
        }
        else
        {
             _settextposition(GLOBAL_TRACKING); _outtext(buffer);
             /* Display waypoint description */
             sprintf(buffer, "%.30s", waypoint->Description);/* Truncate */
             _settextposition(GLOBAL_WAYPOINT); _outtext(buffer);

}
        break;
    }
}
/* end */
```

Navy Case No. 77257

```
/****************************************************************
Module Name:    console.h
Number/Version:
History:
        Date            Rev     Author          Description
        12-Jan-1995     1.00    C. Houlberg     Baseline
        5-Sep-1995      1.02    C. Houlberg     Added gimbal soft stop capability.
        5-Feb-1996      1.03    C. Houlberg     Added global use of function keys.
        6-Feb-1996      1.03    C. Houlberg     Added display of ground speed.
        21-Mar-1996     1.04    C. Houlberg     Added definition for triangulation.
        25-Mar-1996     1.04    C. Houlberg     Made help screen more readable.
        26-Mar-1996     1.04    C. Houlberg     Changed order of setup items.

Abstract:
    Overlay #1 display definitions.
****************************************************************/

/*      Constant definitions.
*/
        /* Graphics cursor definitions */
        #define CURSOR_WD               8               /* Cursor indicator width */
        #define CURSOR_HT               16              /* Cursor indicator height */

/* Main screen display line locations */
        #define MAIN_COL1               10
        #define MAIN_COL2               55
        #define MAIN_LINE1              5
        #define MAIN_F1                 MAIN_LINE1, MAIN_COL1
        #define MAIN_F2                 MAIN_LINE1 + 1, MAIN_COL1
        #define MAIN_F3                 MAIN_LINE1 + 2, MAIN_COL1
        #define MAIN_F4                 MAIN_LINE1 + 3, MAIN_COL1
/* Code changed 25-Jan-96 to change function key from Ctrl F5:
        #define MAIN_CTL_F5             MAIN_LINE1 + 4, MAIN_COL1 - 7
to Ctrl F4 */
        #define MAIN_CTL_F4             MAIN_LINE1 + 4, MAIN_COL1 - 7
/* End of code change */
        #define MAIN_F6                 MAIN_LINE1 + 5, MAIN_COL1
        #define MAIN_F7                 MAIN_LINE1 + 6, MAIN_COL1
        #define MAIN_F8                 MAIN_LINE1 + 7, MAIN_COL1
        #define MAIN_F9                 MAIN_LINE1 + 8, MAIN_COL1
        #define MAIN_F10                MAIN_LINE1 + 9, MAIN_COL1
        #define MAIN_DATE               MAIN_LINE1, MAIN_COL2
        #define MAIN_TIME               MAIN_LINE1 + 1, MAIN_COL2
        #define MAIN_LAT                MAIN_LINE1 + 2, MAIN_COL2
        #define MAIN_LON                MAIN_LINE1 + 3, MAIN_COL2
        #define MAIN_ALT                MAIN_LINE1 + 4, MAIN_COL2
/* Added code 6-Feb-1996 to display ground speed */
        #define MAIN_SPEED              MAIN_LINE1 + 5, MAIN_COL2
/* End of added code */
/* Changed code 6-Feb-1996 for display of ground speed from:
        #define MAIN_ROLL               MAIN_LINE1 + 5, MAIN_COL2
        #define MAIN_PITCH              MAIN_LINE1 + 6, MAIN_COL2
        #define MAIN_HEADING            MAIN_LINE1 + 7, MAIN_COL2
to: */
        #define MAIN_HEADING            MAIN_LINE1 + 6, MAIN_COL2
        #define MAIN_ROLL               MAIN_LINE1 + 7, MAIN_COL2
        #define MAIN_PITCH              MAIN_LINE1 + 8, MAIN_COL2
```

100

Navy Case No. 77257

```
/* End of code change */
    #define MAIN_TGT_X              3
    #define MAIN_TGT_Y              MAIN_LINE1 + 14
    #define MAIN_TGT1               MAIN_TGT_Y, MAIN_TGT_X
    #define MAIN_TGT2               MAIN_TGT_Y + 1, MAIN_TGT_X
    #define MAIN_TGT3               MAIN_TGT_Y + 2, MAIN_TGT_X
    #define MAIN_TGT4               MAIN_TGT_Y + 3, MAIN_TGT_X
    #define MAIN_TGT5               MAIN_TGT_Y + 4, MAIN_TGT_X
    #define MAIN_TGT6               MAIN_TGT_Y + 5, MAIN_TGT_X
    #define MAIN_TGT7               MAIN_TGT_Y + 6, MAIN_TGT_X
    #define MAIN_TGT8               MAIN_TGT_Y + 7, MAIN_TGT_X
    #define MAIN_TGT9               MAIN_TGT_Y + 8, MAIN_TGT_X
    #define MAIN_TGT10              MAIN_TGT_Y + 9, MAIN_TGT_X
    #define MAIN_TRACKING           MAIN_LINE1 + 11, MAIN_COL1
    #define MAIN_WAYPOINT           MAIN_LINE1 + 12, MAIN_COL1
    #define MAIN_ERROR_Y            MAIN_TGT_Y
    #define MAIN_ERROR_X            50

/* Exit message display line location */
    #define EXIT_MESSAGE_LOC        MAIN_LINE1 + 11, MAIN_COL2 - 20

/* Code added 21-Mar-96 for new feature (triangulation) */
    /* Insufficient triangulation angle warning message location */
    #define ANGLE_WARNING_LOC       MAIN_LINE1 + 13, MAIN_COL2 - 20
/* End of added code */

/* Help screen display line locations */
    #define HELP_COL                10
    #define HELP_LINE               2
    #define HELP_F2                 HELP_LINE, HELP_COL
/* Code changed 21-Mar-1996 to move help text to more readable locations */
    #define HELP_F3                 HELP_LINE + 2, HELP_COL
    #define HELP_F4                 HELP_LINE + 4, HELP_COL
/* Code changed 25-Jan-96 to change function key from Ctrl F5:
    #define HELP_CTRL_F4            HELP_LINE + 8, HELP_COL - 7
to Ctrl F4 */
    #define HELP_CTRL_F4            HELP_LINE + 6, HELP_COL - 7
/* End of code change */
    #define HELP_F5                 HELP_LINE + 8, HELP_COL
    #define HELP_F6_1               HELP_LINE + 10, HELP_COL
    #define HELP_F6_2               HELP_LINE + 11, HELP_COL + 10
    #define HELP_F7                 HELP_LINE + 13, HELP_COL
    #define HELP_F8                 HELP_LINE + 15, HELP_COL
    #define HELP_F9_1               HELP_LINE + 17, HELP_COL
    #define HELP_F9_2               HELP_LINE + 18, HELP_COL + 10
    #define HELP_F10                HELP_LINE + 20, HELP_COL
    #define HELP_SHIFT_ESC          HELP_LINE + 22, HELP_COL - 8
/* End of code change */
    #define HELP_EXIT               HELP_LINE + 26, HELP_COL define SETUP_COL               10
    #define SETUP_LINE              3
    #define SETUP_TITLE             SETUP_LINE, SETUP_COL
    #define SETUP_INS               SETUP_LINE + 2, SETUP_COL
    #define SETUP_GIMBAL_DRIVE      SETUP_LINE + 3, SETUP_COL     /* Line 4 now 3 */
    #define SETUP_GIMBAL_INPUT      SETUP_LINE + 4, SETUP_COL     /* Line 5 now 4 */
    #define SETUP_ACQ_SIGHT         SETUP_LINE + 5, SETUP_COL     /* Line 3 now 5 */
```

101

Navy Case No. 77257

```
#define SETUP_IRDS              SETUP_LINE + 6, SETUP_COL
#define SETUP_TRACK_BOX         SETUP_LINE + 7, SETUP_COL
#define SETUP_GIMBAL            SETUP_LINE + 8, SETUP_COL
#define SETUP_WAYPOINTS         SETUP_LINE + 9, SETUP_COL
#define SETUP_PASSWORD          SETUP_LINE + 17, SETUP_COL
define SETUP_EXIT              SETUP_LINE + 23, SETUP_COL define INS_COL                 10
define INS_LINE                3
#define INS_TITLE               INS_LINE, INS_COL
#define INS_LINE1               INS_LINE + 2, INS_COL
#define INS_LINE2               INS_LINE + 3, INS_COL
#define INS_LINE3               INS_LINE + 4, INS_COL + 4
#define INS_LINE4               INS_LINE + 5, INS_COL + 4
#define INS_LINE5               INS_LINE + 7, INS_COL
#define INS_LINE6               INS_LINE + 8, INS_COL
#define INS_SAVE                INS_LINE + 21, INS_COL
define INS_EXIT                INS_LINE + 23, INS_COL define ACQSIGHT_COL            10
define ACQSIGHT_LINE           3
#define ACQSIGHT_TITLE          ACQSIGHT_LINE, ACQSIGHT_COL
#define ACQSIGHT_AZ_FACTOR      ACQSIGHT_LINE + 2, ACQSIGHT_COL
#define ACQSIGHT_AZ_OFFSET      ACQSIGHT_LINE + 3, ACQSIGHT_COL
#define ACQSIGHT_EL_FACTOR      ACQSIGHT_LINE + 4, ACQSIGHT_COL
#define ACQSIGHT_EL_OFFSET      ACQSIGHT_LINE + 5, ACQSIGHT_COL
#define ACQSIGHT_USE            ACQSIGHT_LINE + 20, ACQSIGHT_COL
#define ACQSIGHT_SAVE           ACQSIGHT_LINE + 21, ACQSIGHT_COL
define ACQSIGHT_EXIT           ACQSIGHT_LINE + 23, ACQSIGHT_COL define GIMDRIVE_COL            10
define GIMDRIVE_LINE           3
#define GIMDRIVE_TITLE          GIMDRIVE_LINE, GIMDRIVE_COL
#define GIMDRIVE_AZ_FACTOR      GIMDRIVE_LINE + 2, GIMDRIVE_COL
#define GIMDRIVE_AZ_OFFSET      GIMDRIVE_LINE + 3, GIMDRIVE_COL
#define GIMDRIVE_EL_FACTOR      GIMDRIVE_LINE + 4, GIMDRIVE_COL
#define GIMDRIVE_EL_OFFSET      GIMDRIVE_LINE + 5, GIMDRIVE_COL
#define GIMDRIVE_USE            GIMDRIVE_LINE + 20, GIMDRIVE_COL
#define GIMDRIVE_SAVE           GIMDRIVE_LINE + 21, GIMDRIVE_COL
define GIMDRIVE_EXIT           GIMDRIVE_LINE + 23, GIMDRIVE_COL define GIMINPUT_COL            10
define GIMINPUT_LINE           3
#define GIMINPUT_TITLE          GIMINPUT_LINE, GIMINPUT_COL
#define GIMINPUT_AZ_FACTOR      GIMINPUT_LINE + 2, GIMINPUT_COL
#define GIMINPUT_AZ_OFFSET      GIMINPUT_LINE + 3, GIMINPUT_COL
#define GIMINPUT_EL_FACTOR      GIMINPUT_LINE + 4, GIMINPUT_COL
#define GIMINPUT_EL_OFFSET      GIMINPUT_LINE + 5, GIMINPUT_COL
#define GIMINPUT_USE            GIMINPUT_LINE + 20, GIMINPUT_COL
#define GIMINPUT_SAVE           GIMINPUT_LINE + 21, GIMINPUT_COL
define GIMINPUT_EXIT           GIMINPUT_LINE + 23, GIMINPUT_COL define IRDS_COL                10
define IRDS_LINE               3
#define IRDS_TITLE              IRDS_LINE, IRDS_COL
#define IRDS_AZ_FACTOR          IRDS_LINE + 2, IRDS_COL
#define IRDS_AZ_OFFSET          IRDS_LINE + 3, IRDS_COL
```

Navy Case No. 77257

```
    #define IRDS_EL_FACTOR          IRDS_LINE + 4, IRDS_COL
    #define IRDS_EL_OFFSET          IRDS_LINE + 5, IRDS_COL
    #define IRDS_USE                IRDS_LINE + 20, IRDS_COL
    #define IRDS_SAVE               IRDS_LINE + 21, IRDS_COL
    #define IRDS_EXIT               IRDS_LINE + 23, IRDS_COL define ADJUST_BOX_COL          10
    #define ADJUST_BOX_LINE         3
    #define ADJUST_BOX_TITLE        ADJUST_BOX_LINE, ADJUST_BOX_COL
    #define ADJUST_BOX_LINE1        ADJUST_BOX_LINE + 2, ADJUST_BOX_COL
    #define ADJUST_BOX_LINE2        ADJUST_BOX_LINE + 4, ADJUST_BOX_COL
    #define ADJUST_BOX_LINE3        ADJUST_BOX_LINE + 5, ADJUST_BOX_COL + 4
    #define ADJUST_BOX_LINE4        ADJUST_BOX_LINE + 6, ADJUST_BOX_COL + 4
    #define ADJUST_BOX_LINE5        ADJUST_BOX_LINE + 7, ADJUST_BOX_COL + 4
    #define ADJUST_BOX_LINE6        ADJUST_BOX_LINE + 8, ADJUST_BOX_COL + 4
    #define ADJUST_BOX_SAVE         ADJUST_BOX_LINE + 21, ADJUST_BOX_COL
    #define ADJUST_BOX_EXIT         ADJUST_BOX_LINE + 23, ADJUST_BOX_COL define GIMBAL_COL              10
    #define GIMBAL_LINE             3
    #define GIMBAL_TITLE            GIMBAL_LINE, GIMBAL_COL
    #define GIMBAL_FORWARD          GIMBAL_LINE + 2, GIMBAL_COL
    #define GIMBAL_AFT              GIMBAL_LINE + 3, GIMBAL_COL
    #define GIMBAL_UP               GIMBAL_LINE + 4, GIMBAL_COL
    #define GIMBAL_DOWN             GIMBAL_LINE + 5, GIMBAL_COL
/* Code added 5-Sep-1995 for gimbal soft stop capability */
    #define GIMBAL_FORWARD_STOP     GIMBAL_LINE + 7, GIMBAL_COL
    #define GIMBAL_AFT_STOP         GIMBAL_LINE + 8, GIMBAL_COL
    #define GIMBAL_UP_STOP          GIMBAL_LINE + 9, GIMBAL_COL
    #define GIMBAL_DOWN_STOP        GIMBAL_LINE + 10, GIMBAL_COL
/* End of code addition */
    #define GIMBAL_USE              GIMBAL_LINE + 20, GIMBAL_COL
    #define GIMBAL_SAVE             GIMBAL_LINE + 21, GIMBAL_COL
    #define GIMBAL_EXIT             GIMBAL_LINE + 23, GIMBAL_COL define WAYPOINT_COL            5
    #define WAYPOINT_LINE           3
    #define WAYPOINT_EDIT1          WAYPOINT_LINE, WAYPOINT_COL + 15
    #define WAYPOINT_EDIT2          WAYPOINT_LINE + 20, WAYPOINT_COL
    #define WAYPOINT_EDIT3          WAYPOINT_LINE + 21, WAYPOINT_COL
    #define WAYPOINT_CHOICE1        WAYPOINT_LINE, WAYPOINT_COL + 10
    #define WAYPOINT_CHOICE2        WAYPOINT_LINE + 21, WAYPOINT_COL
    #define WAYPOINT1_LAT           WAYPOINT_LINE + 2, WAYPOINT_COL + 3
    #define WAYPOINT1_ALT           WAYPOINT1_LAT + 14
    #define WAYPOINT1_DES           WAYPOINT1_ALT + 14
    #define WAYPOINT1_LON           WAYPOINT_LINE + 3, WAYPOINT_COL + 3
    #define WAYPOINT2_LAT           WAYPOINT_LINE + 5, WAYPOINT_COL + 3
    #define WAYPOINT2_ALT           WAYPOINT2_LAT + 14
    #define WAYPOINT2_DES           WAYPOINT2_ALT + 14
    #define WAYPOINT2_LON           WAYPOINT_LINE + 6, WAYPOINT_COL + 3
    #define WAYPOINT3_LAT           WAYPOINT_LINE + 8, WAYPOINT_COL + 3
    #define WAYPOINT3_ALT           WAYPOINT3_LAT + 14
    #define WAYPOINT3_DES           WAYPOINT3_ALT + 14
    #define WAYPOINT3_LON           WAYPOINT_LINE + 9, WAYPOINT_COL + 3
    #define WAYPOINT4_LAT           WAYPOINT_LINE + 11, WAYPOINT_COL + 3
    #define WAYPOINT4_ALT           WAYPOINT4_LAT + 14
    #define WAYPOINT4_DES           WAYPOINT4_ALT + 14
```

Navy Case No. 77257

```
        #define WAYPOINT4_LON          WAYPOINT_LINE + 12, WAYPOINT_COL + 3
        #define WAYPOINT5_LAT          WAYPOINT_LINE + 14, WAYPOINT_COL + 3
        #define WAYPOINT5_ALT          WAYPOINT5_LAT + 14
        #define WAYPOINT5_DES          WAYPOINT5_ALT + 14
        #define WAYPOINT5_LON          WAYPOINT_LINE + 15, WAYPOINT_COL + 3
        #define WAYPOINT_EXIT          WAYPOINT_LINE + 23, WAYPOINT_COL /* Code added 5-Feb-1996 for global use of function keys */
        #define GLOBAL_COL             50
        #define GLOBAL_LINE            3
        #define GLOBAL_TRACKING        GLOBAL_LINE, GLOBAL_COL
        #define GLOBAL_WAYPOINT        GLOBAL_LINE + 1, GLOBAL_COL
/* End of added code */

/*      External variable definitions.
*/
        extern short console_start_mode;        /* Initial console screen mode */
        extern GRAPHICS_TYPE console_graphics;  /* Console graphics makeup */
        extern char __huge *cursor_ind;         /* Cursor indicator image */

/*      Function definitions.
*/
        void init_console_display(void);
        void update_console_display(void);
        void console_location_display(void);
        void console_default_mode(void);
        void main_screen_template(void);
        void help_screen(void);
        void setup_screen(void);
        void calibrate_ins_screen(void);
        void calibrate_acq_sight_screen(void);
        void calibrate_gimbal_drive_screen(void);
        void calibrate_gimbal_input_screen(void);
        void calibrate_irds_screen(void);
        void tracking_box_adjust_screen(void);
        void set_gimbal_limit_screen(void);
        void select_waypoint_screen(void);
        void edit_waypoints_screen(void);
        void display_waypoints(void);
        void global_tracking_display(void);

/* end */
```

Navy Case No. 77257

```
/************************************************************************
Module Name:    display.c
Number/Version:
History:
    Date            Rev         Author          Description
    23-Jan-1995     1.00        C. Houlberg     Baseline
    5-Feb-1996      1.03        C. Houlberg     Main screen location display only
                                                update_displays()
    21-Mar-1996     1.04        C. Houlberg     Moved code for triangulation.
                                                update_displays()
Abstract:   Display functions.
    1)  Initialize the displays.
    2)  Construct video 1 indicator images.
    3)  Update all displays.
    4)  Toggle overlay color.
    5)  Return to video default modes.
************************************************************************/
/*  All parameters and functions used by video.c are defined in
    the following header files.
*/
    #include "time.h"           /* Computer timer definitions */
    #include "stdio.h"          /* Standard I/O definitions */
    #include "avtsc.h"          /* Project definitions */
    #include "ins.h"            /* INS definitions */
    #include "pointing.h"       /* Pointing definitions */
    #include "console.h"        /* Console display definitions */
    #include "overlay1.h"       /* Overlay #1 display definitions */
    #include "overlay2.h"       /* Overlay #2 display definitions */
    #include "video.h"          /* Video definitions */
    #include "displays.h"       /* Display function definitions */

/*  Display definitions.
*/
    time_t time_location_displayed;     /* Display time */

/************************************************************************
Function Name:  initialize_displays()
Number/Version:
History:
    Date            Rev         Author          Description
    7-Feb-1995      1.00        C. Houlberg     Baseline Abstract:   Initializes console display.
************************************************************************/
void initialize_displays(void)
{
    /* Set the colors */
    console_color = YELLOW;
    overlay1_color = LIGHT;
    overlay2_color = LIGHT;

/* Initialize displays */
    init_console_display();
    init_overlay1_display();
    init_overlay2_display();

/* Initial screen displays */
```

Navy Case No. 77257

```
        mode = START_UP;                        /* Start up mode */
        display_overlay1_template();            /* Display overlay #1 template */
}
/**************************************************************************
Function Name:   update_displays()
Number/Version:
History:
        Date            Rev     Author          Description
        16-Feb-1995     1.00    C. Houlberg     Baseline
        5-Feb-1996      1.03    C. Houlberg     Main screen location display only
        21-Mar-1996     1.04    C. Houlberg     Moved code for triangulation.

Abstract:   Updates console, overlay #1, and overlay #2 displays.
**************************************************************************/
void update_displays(void)
{
        /* Variable declarations */
        time_t current_time;

/* Update console, overlay #1, and overlay #2 displays */
        if((mode == MAIN_SCREEN) || (mode == EXIT_MESSAGE))
                update_console_display();
        update_overlay1_display();
        update_overlay2_display();

/* Get current time */
        time(&current_time);

/* Latitude, longitude, and time display */
        if(display_location == YES)
        {
                /* Register the designation time */
                sprintf(designated_point.Time, "%s:%s", platform.Day, platform.Time);

/* Code moved 21 Mar 1996 to keyboard.c function for triangulation.
                geographic_location();
End of moved code */

/* Code added 5 Feb 1996 for global function key implementation */
                if(mode == MAIN_SCREEN)                 /* Display on main screen only */
/* End of added code */
                        console_location_display();     /* Location will be updated */
                        overlay2_location_display();    /* Location will be displayed */
                        time_location_displayed = current_time;
                        display_location = IS_DISPLAYED;
        }
        else if((display_location == IS_DISPLAYED)
                && ((current_time - time_location_displayed)
                >= LOCATION_DISPLAY_TIME))
        {
                display_location = IS_NOT_DISPLAYED;
                overlay2_location_display();            /* Location will cleared */
        }
}
/**************************************************************************
```

106

Navy Case No. 77257

```
Function Name:    toggle_overlay_color()
Number/Version:
History:
     Date              Rev          Author          Description
     3-Feb-1995        1.00         C. Houlberg     Baseline Abstract:   Toggles overlay color.
************************************************************************/
void toggle_overlay_color(void)
{
      /* Set the color */
      if(overlay1_color == DARK)
            overlay1_color = LIGHT;
      else
            overlay1_color = DARK;
      overlay2_color = overlay1_color;

/* Construct indicators */
      construct_overlay1_indicators();

/* Display templates */
      display_overlay1_template();
}

/************************************************************************
Function Name:    displays_default_mode()
Number/Version:
History:
     Date              Rev          Author          Description
     31-Jan-1995       1.00         C. Houlberg     Baseline Abstract:   Returns the displays to their default video mode.
************************************************************************/
void displays_default_mode(void)
{
      overlay1_default_mode();
      overlay2_default_mode();
      console_default_mode();
}

/* end */
```

Navy Case No. 77257

```
/*******************************************************************
Module Name:    displays.h
Number/Version:
History:
    Date            Rev         Author          Description
    12-Jan-1995     1.00        C. Houlberg     Baseline Abstract:
    Video display definitions.
********************************************************************/

/*      Constant definitions.
*/
        /* Color definitions */
        #define BLACK               0x00
        #define BLUE                0x01
        #define GREEN               0x02
        #define CYAN                0x03
        #define RED                 0x04
        #define MAGENTA             0x05
        #define BROWN               0x06
        #define WHITE               0x07
        #define GRAY                0x08
        #define LIGHTBLUE           0x09
        #define LIGHTGREEN          0x0a
        #define LIGHTCYAN           0x0b
        #define LIGHTRED            0x0c
        #define LIGHTMAGENTA        0x0d
        #define YELLOW              0x0e
        #define BRIGHTWHITE         0x0f
        /* Screen colors */
        #define LIGHT               BRIGHTWHITE
        #define DARK                RED
        #define BACKGROUND          BLACK /*      Function definitions.
*/
        void initialize_displays(void);
        void update_displays(void);
        void toggle_overlay_color(void);
        void displays_default_mode(void);

/* end */
```

Navy Case No. 77257

```
/******************************************************************
Module Name:    earth.c
Number/Version:
History:
    Date           Rev      Author            Description
    17-Jan-1995    1.00     C. Houlberg       Baseline
    21-Mar-1996    1.04     C. Houlberg       Function compensates for altitude.
                                              astronomic_latitude()
Abstract:   Earth functions.
    astronomic_latitude():
        Computes the astronomical latitude given the geographical latitude
        and altitude above sea level.
    local_radius():
        Computes the local radius of the Earth given the latitude.
******************************************************************/
/*  All parameters and functions used by gimbal.c are defined in
    the following header files.
*/
    #include "math.h"                      /* Math definitions */
    #include "avtsc.h"                     /* Project definitions */
    #include "earth.h"                     /* Earth function definitions */

/******************************************************************
Function Name:  astronomic_latitude()
Number/Version:
History:
    Date           Rev      Author            Description
    20-Jan-1995    1.00     C. Houlberg       Baseline
    21-Mar-1996    1.04     C. Houlberg       Function compensates for altitude.
                                              Input variable changed to
                                              GEOGRAPHIC_TYPE position pointer.

Inputs:
    Pointer to geographic position.

Outputs:
    Astronomic latitude.

Abstract:   Computes the astronomic latitude given the geographic latitude
    as given by the following relationship:
        a = atan((((Re+A) * (Re+A))/((Rp+A) * (Rp+A))) * tan(g))
```

```
                                Where:
                                    a = astronomic latitude
                                    g = geographic latitude
                                    Re = equatorial radius
                                    Rp = polar radius
                                    A = altitude above sea level With the assumption that the Earth
                                is an ellipsiod.
******************************************************************/
double astronomic_latitude(GEOGRAPHIC_TYPE *position_ptr)
{
    /* Variable declarations */
    double a, b, c;
```

109

```
        if(position_ptr->Lat >= PI/2)                  /* Over north pole */
              a = PI/2;
        else if(position_ptr->Lat <= -PI/2)            /* Over south pole */
              a = -PI/2;
        else
              b = EQUATORIAL_RADIUS + position_ptr->Alt;
              c = POLAR_RADIUS + position_ptr->Alt;
              a = atan((b * b)/(c * c) * tan(position_ptr->Lat));

return a;
}

/************************************************************************
Function Name:    local_radius()
Number/Version:
History:
      Date              Rev       Author           Description
      20-Jan-1995       1.00      C. Houlberg      Baseline Inputs:
      Geographic latitude (acft.lat).

Outputs:
      Local radius of the Earth.

Abstract:  Computes the local radius of the Earth using the relationship:
           r = Re * sqrt((1 + (tan(g) * tan(g)))
                  /(1 + ((Re * Re)/(Rp * Rp)) * tan(g) * tan(g)))
```

```
                                  Where:
                                        r = local radius
                                        g = geographic latitude
                                        Re = equatorial radius
                                        Rp = polar radius With the assumption that the Earth
                                        is an ellipsiod.

************************************************************************/
double local_radius(double geographic_latitude)
{
      /* Variable declarations */
      double r, tg, tgtg;

if(geographic_latitude >= PI/2)
              r = POLAR_RADIUS;
      else if(geographic_latitude <= -PI/2)
              r = POLAR_RADIUS;
      else
      {
              tg = tan(geographic_latitude);
              tgtg = tg * tg;
              r = EQUATORIAL_RADIUS
                    * sqrt((1 + tgtg)
                    /(1 + ((EQUATORIAL_RADIUS * EQUATORIAL_RADIUS)
                    /(POLAR_RADIUS * POLAR_RADIUS)) * tgtg));
```

Navy Case No. 77257

```
     }
     return r;
}
/* end */
```

Navy Case No. 77257

```
/*******************************************************************
Module Name:    earth.h
Number/Version:
History:
        Date            Rev     Author          Description
        19-Jan-1995     1.00    C. Houlberg     Baseline Abstract:
    Earth parameter definitions.
*******************************************************************/

/*      Physical constants.
*/
        #define EQUATORIAL_RADIUS       2.092564e7  /* Equatorial radius of Earth */
        #define POLAR_RADIUS            2.085550e7  /* Polar radius of Earth */
        #define UNDEFINED               -EQUATORIAL_RADIUS /*      Function definitions.
*/
        double astronomic_latitude(GEOGRAPHIC_TYPE *position_ptr);
        double local_radius(double geographic_latitude);

/* end */
```

Navy Case No. 77257

```
/*******************************************************************
Module Name:      error.c
Number/Version:
History:
      Date              Rev       Author          Description
      23-May-1995       1.00      C. Houlberg     Baseline Abstract:   Console error display functions.
      1)    Add error to error display list.
      2)    Remove error from error display list.
      3)    Update error display.
*******************************************************************/
/*    All parameters and functions used by error.c are defined in
      the following header files.
*/
      #include "graph.h"                          /* Graphics definitions */
      #include "avtsc.h"                          /* Project definitions */
      #include "console.h"                        /* Console definitions */
      #include "error.h"                          /* Error definitions */

/*    Global variable definitions.
*/
      struct Error_Status error_item =
      {
            NO,
            0,
            0,
            {0,0,0,0,0,0,0,0,0},
            "                    ",
            "System Error",
            {
                  "Can't Open SETUP.CAL",
                  "Can't Close SETUP.CAL",
                  "Can't Open WAYPOINT.DAT",
                  "Can't Close WAYPOINT.DAT",
/* Added code 8-feb-1996 to display file errors */
                  "File Seek Failed",
                  "File Scan Failed",
/* End of added code */
                  "A/D Initialization Failed",
                  "ARINC Init. Failed",
                  "VTR #1 Not Ready",
                  "VTR #2 Not Ready",
                  "VTR #1 Receive Error",
                  "VTR #2 Receive Error"
            }
      };

/*******************************************************************
Function Name:    add_error()
Number/Version:
History:
      Date              Rev       Author          Description
      23-May-1995       1.00      C. Houlberg     Baseline Abstract:   Adds error to error display list.
```

113

Navy Case No. 77257

```
*************************************************************************/
void add_error(enum Possible_Errors error)
{
      /* Variable declarations */
      short i;
      short error_displayed = NO;

/* Add the error to the list */
      if(error_item.Number_Found < MAX_ERRORS)
      {
            /* Check if error already displayed */
            for(i = 0; i < error_item.Number_Found; i++)
            {
                  if(error_item.Error_List[i] == error)
                        error_displayed = YES;
            }

/* Display error if error not displayed or none displayed */
            if((error_displayed == NO) || !(error_item.Number_Found))
            {
                  error_item.Error_List[error_item.Number_Found] = error;
                  error_item.Number_Found = error_item.Number_Found + 1;

/* Indicate new error status */
                  error_item.New_Error_Status = YES;
            }
      }
}

/************************************************************************
Function Name:    remove_error()
Number/Version:
History:
      Date              Rev         Author            Description
      23-May-1995       1.00        C. Houlberg       Baseline Abstract:   Removes error from error display list.
*************************************************************************/
void remove_error(enum Possible_Errors error)
{
      /* Variable declarations */
      short i;

/* Remove the error from the list */
      for(i = 0; i < error_item.Number_Found; i++)
      {
            if(error_item.Error_List[i] == error)
            {
                  /* Move the rest of the errors up the list */
                  for(;i < error_item.Number_Found - 1; i++)
                  {
                        error_item.Error_List[i] = error_item.Error_List[i + 1];
                  }

/* Decrement number of errors */
                  error_item.Number_Found = error_item.Number_Found - 1;
```

114

Navy Case No. 77257

```c
            /* Indicate new error status */
            error_item.New_Error_Status = YES;
        }
    }
}
/**************************************************************************
Function Name:   update_error_display()
Number/Version:
History:
        Date            Rev         Author          Description
        23-May-1995     1.00        C. Houlberg     Baseline Abstract:   Updates console display data.
**************************************************************************/
void update_error_display(void)
{
    /* Variable declarations */
    short i;                                                    /* Index counter */

/* Update error status */
    if(error_item.Number_Found)
    {
        /* Display active errors */
        if(!error_item.Number_Displayed)
        {
            _settextposition(MAIN_ERROR_Y, MAIN_ERROR_X + 4);
            _outtext(error_item.Error_Title);
        }
        for(i = 0; i < error_item.Number_Found; i++)
        {
            _settextposition(MAIN_ERROR_Y + 1 + i, MAIN_ERROR_X);
            _outtext(error_item.Error[error_item.Error_List[i]]);
        }
        /* Remove recovered errors */
        for(i = error_item.Number_Found; i < error_item.Number_Displayed; i++)
        {
            _settextposition(MAIN_ERROR_Y + 1 + i, MAIN_ERROR_X);
            _outtext(error_item.Blank_Line);
        }
        /* Number displayed now the same as the number found */
        error_item.Number_Displayed = error_item.Number_Found;
    }
    else
    {
        for(i = 0; i <= error_item.Number_Displayed; i++)
        {
            _settextposition(MAIN_ERROR_Y + i, MAIN_ERROR_X);
            _outtext(error_item.Blank_Line);
        }
        error_item.Number_Displayed = 0;                        /* No more displayed */
    }

/* Indicate error display status not new */
    error_item.New_Error_Status = NO;
}
```

115

Navy Case No. 77257

/* end */

Navy Case No. 77257

```
/*****************************************************************
Module Name:     error.h
Number/Version:
History:
     Date          Rev       Author        Description
     23-May-1995   1.00      C. Houlberg   Baseline
     8-Feb-1996    1.03      C. Houlberg   Added display of file errors.

Abstract:
     Error display definitions.
*****************************************************************/

/*   Constant definitions.
*/
     #define MAX_ERRORS                9          /* Maximum errors displayable
*/ enum Possible_Errors
     {
            CANNOT_OPEN_SETUP_FILE,                /* Error number 0 */
            CANNOT_CLOSE_SETUP_FILE,
            CANNOT_OPEN_WAYPOINT_FILE,
            CANNOT_CLOSE_WAYPOINT_FILE,
/* Added code 8-Feb-1996 to display file errors */
            FILE_SEEK_FAILED,
            FILE_SCAN_FAILED,
/* End of added code */
            ATOD_INIT_FAILED,
            ARINC_INIT_FAILED,
            VTR1_NOT_READY,
            VTR2_NOT_READY,
            VTR1_ERROR,
            VTR2_ERROR,
            NUMBER_OF_ERRORS                       /* Number of possible errors */
     };

/*   Structure definitions.
*/
     struct Error_Status
     {
            short New_Error_Status;
            short Number_Found;
            short Number_Displayed;
            short Error_List[MAX_ERRORS];
            char Blank_Line[26];
            char Error_Title[13];
            char Error[NUMBER_OF_ERRORS][26];
     };

/*   External variable definitions.
*/
     extern struct Error_Status error_item;

/*   Function definitions.
*/
     void add_error(enum Possible_Errors error);
     void remove_error(enum Possible_Errors error);
```

Navy Case No. 77257

```
    void update_error_display(void);
/* end */
```

Navy Case No. 77257

```
/****************************************************************
Module Name:      gimbal.c
Number/Version:
History:
     Date              Rev        Author            Description
     13-Mar-1995       1.00       J. Hauselmann     Baseline
     5-Sep-1995        1.02       C. Houlberg       Added gimbal soft stop capability.
                                                    output_gimbal_controls()
Abstract:   Gimbal functions.
     get_gimbal_angles():
          Inputs the Line Of Sight (LOS) of the gimbal (azimuth and elevation).
     output_gimbal_controls():
          Controls the orientation of the gimbal.
****************************************************************/
/*   All parameters and functions used by gimbal.c are defined in
     the following header files.
*/
     #include "stdio.h"              /* Standard I/O definitions */
     #include "pclerrs.h"            /* PCLAB error codes */
     #include "pcldefs.h"            /* PCLAB function declarations */
     #include "avtsc.h"              /* Project definitions */
     #include "init.h"               /* Initialization definitions */
     #include "pointing.h"           /* Pointing function definitions */
     #include "irds.h"               /* IRDS definitions */
     #include "acqsight.h"           /* Acquisition sight definitions */
     #include "overlay1.h"           /* Overlay #1 definitions */
     #include "utility.h"            /* Utility definitions */
     #include "gimbal.h"             /* Gimbal definitions */

/*   Global declarations.
*/
    struct Gimbal_Angles gimbal_input;

/****************************************************************
Function Name:    get_gimbal_angles()
Number/Version:
History:
     Date              Rev        Author            Description
     13-Mar-1995       1.00       J. Hauselmann     Baseline Global outputs:
     Gimbal angles (gimbal_input.az and gimbal_input.el).

Abstract:   Converts gimbal input voltages to angles in radians.
****************************************************************/
void get_gimbal_angles(void)
{
     #ifdef TARGET_SYSTEM
          short analog_data;
          double analog_voltage;
          double az_gimbal_input_gain, el_gimbal_input_gain;
          double az_gimbal_input_v_offset, el_gimbal_input_v_offset;
          struct Adjustment adjustments;

/*   Setting up conversion scale factors to convert volts to degs. */
          /*   Voltage gain factors */
          az_gimbal_input_gain = ((AZ_GIMBAL_INPUT_MAX_ANGLE -
```

Navy Case No. 77257

```
            AZ_GIMBAL_INPUT_MIN_ANGLE) /
        (AZ_GIMBAL_INPUT_MAX_VOLTS - AZ_GIMBAL_INPUT_MIN_VOLTS));
    el_gimbal_input_gain = ((EL_GIMBAL_INPUT_MAX_ANGLE -
            EL_GIMBAL_INPUT_MIN_ANGLE) /
        (EL_GIMBAL_INPUT_MAX_VOLTS - EL_GIMBAL_INPUT_MIN_VOLTS));
    /* Voltage offsets. */
    az_gimbal_input_v_offset = (-(AZ_GIMBAL_INPUT_MAX_VOLTS +
        AZ_GIMBAL_INPUT_MIN_VOLTS)/2.0);
    el_gimbal_input_v_offset = (-(EL_GIMBAL_INPUT_MAX_VOLTS +
        EL_GIMBAL_INPUT_MIN_VOLTS)/2.0);

/* Adjustment parameters to convert analog data to rads */
    adjustments.gain = az_gimbal_input_gain;
    adjustments.v_offset = az_gimbal_input_v_offset;
    adjustments.cal_gain =
        setup_parameters.gimbal_input_calibration.AZ_Factor;
    adjustments.cal_offset =
        setup_parameters.gimbal_input_calibration.AZ_Offset;
    adjustments.max_volts = AZ_GIMBAL_INPUT_MAX_VOLTS;
    adjustments.min_volts = AZ_GIMBAL_INPUT_MIN_VOLTS;

/* Retreive analog data from ADC */
    adc_value( CHANNEL_0, GAIN_4, &analog_data);
    /* Convert a 12 bit analog value to voltage */
    analog_voltage = (float)analog_data
            * (((POS_FULL_SCALE - NEG_FULL_SCALE)/GAIN_4)/4096.0)
            + (NEG_FULL_SCALE/GAIN_4);

/* Convert analog data with adjustments to an angle in radians */
    gimbal_input.Az = voltage_to_radians( analog_voltage, &adjustments );

/* Adjustment parameters to convert analog data to rads */
    adjustments.gain = el_gimbal_input_gain;
    adjustments.v_offset = el_gimbal_input_v_offset;
    adjustments.cal_gain =
        setup_parameters.gimbal_input_calibration.EL_Factor;
    adjustments.cal_offset =
        setup_parameters.gimbal_input_calibration.EL_Offset;
    adjustments.max_volts = EL_GIMBAL_INPUT_MAX_VOLTS;
    adjustments.min_volts = EL_GIMBAL_INPUT_MIN_VOLTS;

/* Retreive analog data from ADC */
    adc_value( CHANNEL_1, GAIN_2, &analog_data);
    /* Convert a 12 bit analog value to voltage */
    analog_voltage = (float)analog_data
            * (((POS_FULL_SCALE - NEG_FULL_SCALE)/GAIN_2)/4096.0)
            + (NEG_FULL_SCALE/GAIN_2);

/* Convert analog data with adjustments to an angle in radians */
    gimbal_input.El = voltage_to_radians( analog_voltage, &adjustments );
#else
    /* Set to test values */
    switch( tracking )
    {
        case(ACTIVE_ACQSIGHT):
            gimbal_input.Az = acqsight.Az;
            gimbal_input.El = acqsight.El;
```

Navy Case No. 77257

```
                break;
        case(ACTIVE_IRDS):
            gimbal_input.Az = irds.Az;
            gimbal_input.El = irds.El;
            break;
        case(ACTIVE_WAYPOINT):
            gimbal_input.Az = pointing_output.Az;
            gimbal_input.El = pointing_output.El;
            break;
        default:
            break;
    }

/* Gimbal travel limited to within gimbal stops */
    if(gimbal_input.Az < (setup_parameters.Gimbal_Aft_Stop * PI/180))
        gimbal_input.Az = setup_parameters.Gimbal_Aft_Stop * PI/180;
    else if(gimbal_input.Az
            > (setup_parameters.Gimbal_Forward_Stop * PI/180))
        gimbal_input.Az = setup_parameters.Gimbal_Forward_Stop * PI/180;
    if(gimbal_input.El < (setup_parameters.Gimbal_Down_Stop * PI/180))
        gimbal_input.El = setup_parameters.Gimbal_Down_Stop * PI/180;
    else if(gimbal_input.El > (setup_parameters.Gimbal_Up_Stop * PI/180))
        gimbal_input.El = setup_parameters.Gimbal_Up_Stop * PI/180;
    #endif
}

/****************************************************************************
Function Name:   output_gimbal_controls()
Number/Version:
History:
    Date            Rev     Author              Description
    13-Mar-1995     1.00    J. Hauselmann       Baseline
    5-Sep-1995      1.02    C. Houlberg         Added gimbal soft stop capability.

Global inputs:
    Setup_parameters - Calabration table information.
    Tracking - Select which input angles to output to the gimbal.
    IRDS angles (gimbal.az and gimbal.el).
    Acq sight angles (acq_sight.az and acq_sight.el)
    Way Point angles (pointing.az and pointing.el).

Abstract:   Converts angles in radians to gimbal control voltages.
****************************************************************************/
void output_gimbal_controls(void)
{
    unsigned short analog_data[2];
    double az_angle, el_angle;
    double az_gimbal_drive_gain, el_gimbal_drive_gain;
    double az_gimbal_drive_v_offset, el_gimbal_drive_v_offset;
    struct Adjustment adjustments;

switch( tracking )
    {
        case(ACTIVE_ACQSIGHT):
            az_angle = acqsight.Az;
            el_angle = acqsight.El;
            break;
```

121

Navy Case No. 77257

```
        case(ACTIVE_IRDS):
            az_angle = irds.Az;
            el_angle = irds.El;
            break;
        case(ACTIVE_WAYPOINT):
            az_angle = pointing_output.Az;
            el_angle = pointing_output.El;
            break;
        default:
            break;
    }
/* Code added 5-Sep-1995 for gimbal soft stop capability */
    /* Limit gimbal travel to within gimbal stops */
        if(az_angle < (setup_parameters.Gimbal_Aft_Stop * PI/180))
            az_angle = setup_parameters.Gimbal_Aft_Stop * PI/180;
        else if(az_angle > (setup_parameters.Gimbal_Forward_Stop * PI/180))
            az_angle = setup_parameters.Gimbal_Forward_Stop * PI/180;
        if(el_angle < (setup_parameters.Gimbal_Down_Stop * PI/180))
            el_angle = setup_parameters.Gimbal_Down_Stop * PI/180;
        else if(el_angle > (setup_parameters.Gimbal_Up_Stop * PI/180))
            el_angle = setup_parameters.Gimbal_Up_Stop * PI/180;
/* End of code addition */

/*    Setting up conversion scale factors to convert degrees to volts. */
    /*    Voltage gain factors */
    az_gimbal_drive_gain = ((AZ_GIMBAL_DRIVE_MAX_ANGLE -
        AZ_GIMBAL_DRIVE_MIN_ANGLE) /
        (AZ_GIMBAL_DRIVE_MAX_VOLTS - AZ_GIMBAL_DRIVE_MIN_VOLTS));
    el_gimbal_drive_gain = ((EL_GIMBAL_DRIVE_MAX_ANGLE -
        EL_GIMBAL_DRIVE_MIN_ANGLE) /
        (EL_GIMBAL_DRIVE_MAX_VOLTS - EL_GIMBAL_DRIVE_MIN_VOLTS));
    /* Voltage offset. */
    az_gimbal_drive_v_offset = (-(AZ_GIMBAL_DRIVE_MAX_VOLTS +
        AZ_GIMBAL_DRIVE_MIN_VOLTS)/2.0);
    el_gimbal_drive_v_offset = (-(EL_GIMBAL_DRIVE_MAX_VOLTS +
        EL_GIMBAL_DRIVE_MIN_VOLTS)/2.0);

/* Adjustment parameters to convert angular data to volts */
    adjustments.gain = az_gimbal_drive_gain;
    adjustments.v_offset = az_gimbal_drive_v_offset;
    adjustments.cal_gain =
        setup_parameters.gimbal_drive_calibration.AZ_Factor;
    adjustments.cal_offset =
        setup_parameters.gimbal_drive_calibration.AZ_Offset;
    adjustments.max_volts = AZ_GIMBAL_DRIVE_MAX_VOLTS;
    adjustments.min_volts = AZ_GIMBAL_DRIVE_MIN_VOLTS;

/* Convert az angle in radians with adjustments to analog data */
    analog_data[0] = radians_to_dac( az_angle, &adjustments );

/* Adjustment parameters to convert angular data to volts */
    adjustments.gain = el_gimbal_drive_gain;
    adjustments.v_offset = el_gimbal_drive_v_offset;
    adjustments.cal_gain =
        setup_parameters.gimbal_drive_calibration.EL_Factor;
    adjustments.cal_offset =
```

122

Navy Case No. 77257

```
        setup_parameters.gimbal_drive_calibration.EL_Offset;
    adjustments.max_volts = EL_GIMBAL_DRIVE_MAX_VOLTS;
    adjustments.min_volts = EL_GIMBAL_DRIVE_MIN_VOLTS;

/* Convert el angle in radians with adjustments to analog data */
    analog_data[1] = radians_to_dac( el_angle, &adjustments );

#ifdef TARGET_SYSTEM
        /* Output analog data to DAC0 & DAC1 */
        dac_value( BOTH, analog_data);
    #endif
}
/* end */
```

Navy Case No. 77257

```
/*****************************************************************
Module Name:    gimbal.h
Number/Version:
History:
     Date              Rev        Author           Description
     13-Mar-1995       1.00       J. Hauselmann    Baseline Abstract:
     Gimbal definitions.
*****************************************************************/

/*   Physical constants.
*/
     #define DT2801              0x0        /* Board ID codes */
     #define TIMING_SOURCE       0          /* Software trigger, internal clock */
     #define BOTH                -1         /* DAC channel 0 & 1 */
     #define BOARD_1             1          /* Board 1 */
     #define MAX_VOLTS           10         /* Maximum volts */
     #define MIN_VOLTS           -10        /* Minimum volts */ define CHANNEL_0           0          /* Channel 0 (Azimuth) */
     #define CHANNEL_1           1          /* Channel 1 (Elevation) */

/*   MAX_VOLTS is maximum voltage level.
          MAX_ANGLE isn't nessecarily the largest angle. Its just
          the angle that corresponds to the maximum voltage level.
     */
     #define     AZ_GIMBAL_DRIVE_MAX_VOLTS     2.5
     #define     AZ_GIMBAL_INPUT_MAX_VOLTS     0.861
     #define     EL_GIMBAL_DRIVE_MAX_VOLTS     3.75
     #define     EL_GIMBAL_INPUT_MAX_VOLTS     2.88 define  AZ_GIMBAL_DRIVE_MAX_ANGLE    30.0
     #define  AZ_GIMBAL_INPUT_MAX_ANGLE    -30.0
     #define  EL_GIMBAL_DRIVE_MAX_ANGLE    -45.0
     #define  EL_GIMBAL_INPUT_MAX_ANGLE    -45.0

/*   MIN_VOLTS is minimum voltage level.
          MIN_ANGLE isn't nessecarily the smallest angle. Its just
          the angle that corresponds to the minimum voltage level.
     */
     #define     AZ_GIMBAL_DRIVE_MIN_VOLTS     -2.5
     #define     AZ_GIMBAL_INPUT_MIN_VOLTS     -0.861
     #define     EL_GIMBAL_DRIVE_MIN_VOLTS     -3.75
     #define     EL_GIMBAL_INPUT_MIN_VOLTS     0.023 define  AZ_GIMBAL_DRIVE_MIN_ANGLE    -30.0
     #define  AZ_GIMBAL_INPUT_MIN_ANGLE    30.0
     #define  EL_GIMBAL_DRIVE_MIN_ANGLE    45.0
     #define  EL_GIMBAL_INPUT_MIN_ANGLE    45.0

/*   Structure definitions.
*/
     struct Gimbal_Angles
     {
             double            Az;
```

Navy Case No. 77257

```
        double        El;
    };

/*  Global declarations.
*/
    extern struct Gimbal_Angles gimbal_input;

/*  Function definitions.
*/
    void get_gimbal_angles(void);
    void output_gimbal_controls(void);

/* end */
```

Navy Case No. 77257

```
/************************************************************************
Module Name:    init.c
Number/Version:
History:
    Date            Rev     Author          Description
    12-Jan-1995     1.00    C. Houlberg     Baseline
    18-Aug-1995     1.01    C. Houlberg     Fix for Latitude truncation.
                                            initialize_calibration()
    5-Sep-1995      1.02    C. Houlberg     Added gimbal soft stop capability.
                                            initialize_calibration()
    21-Mar-1996     1.04    C. Houlberg     Added code for triangulation.
                                            initialize_system()

Abstract:   Initialization functions.
    1)      initialize_system():            Initializes all AVTSC interfaces.
    2)      initialize_calibration():       Initializes setup and waypoints.
    3)      initialize_io_board():          Initializes A/D D/A board.
*************************************************************************/
/*  All parameters and functions used by init.c are defined in
    the following header files.
*/
    #include "stdio.h"              /* Standard I/O definitions */
    #include "graph.h"              /* Graphics I/O definitions */
    #include "math.h"               /* Math definitions */
    #include "string.h"             /* String definitions */
    #include "pclerrs.h"            /* PCLAB error codes */
    #include "pcldefs.h"            /* PCLAB function declarations */
    #include "avtsc.h"              /* Project definitions */
    #include "gimbal.h"             /* Gimbal definitions */
    #include "vtr.h"                /* Video tape recorder definitions */
    #include "displays.h"           /* Display definitions */
    #include "earth.h"              /* Earth definitions */
    #include "ins.h"                /* INS function definitions */
    #include "irds.h"               /* IRDS (syncro interface) definitions */
    #include "overlay1.h"           /* Overlay #1 definitions */
    #include "utility.h"            /* Utility definitions */
    #include "error.h"              /* Error display definitions */
    #include "init.h"               /* Initialization definitions */

/*  Global declarations.
*/
    struct Calibration setup_parameters;
    struct Waypoint *waypoint;
    short init_error_flags = 0;     /* Error flags */

/*  Declarations local to init.c.
*/
    /* Initialization errors */
    #define CANNOT_OPEN_SETUP       0x01    /* Can't open file */
    #define CANNOT_CLOSE_SETUP      0x02    /* Can't close file */
    #define CANNOT_OPEN_WAYPOINT    0x04    /* Can't open file */
    #define CANNOT_CLOSE_WAYPOINT   0x08    /* Can't close file */
    #define ATOD_FAILED_INIT        0x10    /* Initialization failed */

/*  Functions local to init.c.
*/
    void initialize_calibration(void);
    void initialize_io_board(void);
```

Navy Case No. 77257

```
/****************************************************************
Function Name:    initialize_system()
Number/Version:
History:
        Date            Rev         Author           Description
        12-Jan-1995     1.00        C. Houlberg      Baseline
        21-Mar-1996     1.04        C. Houlberg      Added code for triangulation.

Abstract:    Initializes all AVTSC interfaces.
****************************************************************/
void initialize_system(void)
{
      /* Variable declarations */
      unsigned char sn[] = {"40-0103-006421-00101111-062594-SATURN2"};
      unsigned char far *sn_location;
      char message[] = {"\n\nERROR\nSoftware NOT portable!!\n\n"};

/* Initialize tracking mode */
      tracking = ACTIVE_ACQSIGHT;

/* Set waypoint pointer to waypoint_1 */
      waypoint = &setup_parameters.waypoint_1;

/* Initial estimated altitude and designated point altitude */
      estimated_altitude = 0;
      designated_point.Alt = UNDEFINED;
/* End of added code */

/* Test for target system */
      sn_location = (unsigned char far *) 0xf0008078;
      if(_fstrcmp(sn, sn_location))
      {
            outtext(message);
      #ifdef TARGET_SYSTEM
            mode = ABORT;
      #endif
      } if(mode != ABORT)
      {
            /* Read parameters from setup.cal */
            initialize_calibration();

/* Initialize console, overlay1, and overlay2 */
            initialize_displays();

/* Initialize VTR interface */
            initialize_vtr_ports();

#ifdef TARGET_SYSTEM
            /* Initialize A/D & D/A board */
            initialize_io_board();

/* Initialize other interface boards */
            initialize_ins_board();
            initialize_irds_board();
      #endif
```

Navy Case No. 77257

```
        }
}
/***********************************************************************
Function Name:   initialize_calibration()
Number/Version:
History:
        Date            Rev         Author          Description
        22-Feb-1995     1.00        C. Houlberg     Baseline
        18-Aug-1995     1.01        C. Houlberg     Fix for Latitude truncation.
                                                    Size changed to 11 characters.
        5-Sep-1995      1.02        C. Houlberg     Added gimbal soft stop capability.

Abstract:   Initializes all calibration parameters.
***********************************************************************/
void initialize_calibration(void)
{
        /* Variable declarations */
        char buffer [41];                           /* 40 character buffer */
        FILE *file_pointer;                         /* Pointer into file */
        struct File_Location data_location;         /* File location of data */

/* Open setup/calibration file for reading only */
        if((file_pointer = fopen("setup.cal", "r")) == '\0')
        {
                /* Flag error */
                init_error_flags = init_error_flags | CANNOT_OPEN_SETUP;
                add_error(CANNOT_OPEN_SETUP_FILE);

/* Initialize parameters to default values */
                setup_parameters.INS_Correction = 0;
                setup_parameters.gimbal_drive_calibration.AZ_Factor = 2.0;
                setup_parameters.gimbal_drive_calibration.AZ_Offset = 0.0;
                setup_parameters.gimbal_drive_calibration.EL_Factor = 1.0;
                setup_parameters.gimbal_drive_calibration.EL_Offset = 0.0;
                setup_parameters.gimbal_input_calibration.AZ_Factor = 1.0;
                setup_parameters.gimbal_input_calibration.AZ_Offset = 0.0;
                setup_parameters.gimbal_input_calibration.EL_Factor = 1.0;
                setup_parameters.gimbal_input_calibration.EL_Offset = 0.0;
                setup_parameters.acq_sight_calibration.AZ_Factor = 1.0;
                setup_parameters.acq_sight_calibration.AZ_Offset = 0.0;
                setup_parameters.acq_sight_calibration.EL_Factor = 1.0;
                setup_parameters.acq_sight_calibration.EL_Offset = 0.0;
                setup_parameters.irds_calibration.AZ_Factor = 1.0;
                setup_parameters.irds_calibration.AZ_Offset = 0.0;
                setup_parameters.irds_calibration.EL_Factor = 1.0;
                setup_parameters.irds_calibration.EL_Offset = 0.0;
                setup_parameters.Box_X_Location = (short) 20;
                setup_parameters.Box_Y_Location = (short) 0;
                setup_parameters.Box_Height = (short) 100;
                setup_parameters.Box_Width = (short) 150;
                setup_parameters.Gimbal_Forward_Limit = 35;
                setup_parameters.Gimbal_Aft_Limit = -5;
                setup_parameters.Gimbal_Up_Limit = 35;
                setup_parameters.Gimbal_Down_Limit = -35;
/* Code added 5-Sep-1995 for gimbal soft stop capability */
                setup_parameters.Gimbal_Forward_Stop = 45;
```

128

Navy Case No. 77257

```
            setup_parameters.Gimbal_Aft_Stop = -15;
            setup_parameters.Gimbal_Up_Stop = 45;
            setup_parameters.Gimbal_Down_Stop = -45;
/* End of code addition */
     } if(!(init_error_flags & CANNOT_OPEN_SETUP))
     {
            /* Read all data into setup_parameters */
            sprintf(data_location.Group, "INS HEADING");
            sprintf(data_location.Item, "CORRECTION");
            data_location.Size = 7;                  /* 7 character string */
            get_calibration(file_pointer, &data_location, buffer);
            setup_parameters.INS_Correction = ascii_to_angle(buffer);

sprintf(data_location.Group, "GIMBAL DRIVE");
            sprintf(data_location.Item, "AZ FACTOR");
            data_location.Size = 4;                  /* 4 character string */
            get_calibration(file_pointer, &data_location, buffer);
            setup_parameters.gimbal_drive_calibration.AZ_Factor = atof(buffer);
            sprintf(data_location.Item, "AZ OFFSET");
            data_location.Size = 5;                  /* 5 character string with sign */
            get_calibration(file_pointer, &data_location, buffer);
            setup_parameters.gimbal_drive_calibration.AZ_Offset = atof(buffer);
            sprintf(data_location.Item, "EL FACTOR");
            data_location.Size = 4;                  /* 4 character string */
            get_calibration(file_pointer, &data_location, buffer);
            setup_parameters.gimbal_drive_calibration.EL_Factor = atof(buffer);
            sprintf(data_location.Item, "EL OFFSET");
            data_location.Size = 5;                  /* 5 character string with sign */
            get_calibration(file_pointer, &data_location, buffer);
            setup_parameters.gimbal_drive_calibration.EL_Offset = atof(buffer);

sprintf(data_location.Group, "GIMBAL INPUT");
            sprintf(data_location.Item, "AZ FACTOR");
            data_location.Size = 4;                  /* 4 character string */
            get_calibration(file_pointer, &data_location, buffer);
            setup_parameters.gimbal_input_calibration.AZ_Factor = atof(buffer);
            sprintf(data_location.Item, "AZ OFFSET");
            data_location.Size = 5;                  /* 5 character string with sign */
            get_calibration(file_pointer, &data_location, buffer);
            setup_parameters.gimbal_input_calibration.AZ_Offset = atof(buffer);
            sprintf(data_location.Item, "EL FACTOR");
            data_location.Size = 4;                  /* 4 character string */
            get_calibration(file_pointer, &data_location, buffer);
            setup_parameters.gimbal_input_calibration.EL_Factor = atof(buffer);
            sprintf(data_location.Item, "EL OFFSET");
            data_location.Size = 5;                  /* 5 character string with sign */
            get_calibration(file_pointer, &data_location, buffer);
            setup_parameters.gimbal_input_calibration.EL_Offset = atof(buffer);

sprintf(data_location.Group, "ACQ SIGHT");
            sprintf(data_location.Item, "AZ FACTOR");
            data_location.Size = 4;                  /* 4 character string */
            get_calibration(file_pointer, &data_location, buffer);
            setup_parameters.acq_sight_calibration.AZ_Factor = atof(buffer);
            sprintf(data_location.Item, "AZ OFFSET");
```

Navy Case No. 77257

```
            data_location.Size = 5;                     /* 5 character string with sign */
            get_calibration(file_pointer, &data_location, buffer);
            setup_parameters.acq_sight_calibration.AZ_Offset = atof(buffer);
            sprintf(data_location.Item, "EL FACTOR");
            data_location.Size = 4;                     /* 4 character string */
            get_calibration(file_pointer, &data_location, buffer);
            setup_parameters.acq_sight_calibration.EL_Factor = atof(buffer);
            sprintf(data_location.Item, "EL OFFSET");
            data_location.Size = 5;                     /* 5 character string with sign */
            get_calibration(file_pointer, &data_location, buffer);
            setup_parameters.acq_sight_calibration.EL_Offset = atof(buffer);

sprintf(data_location.Group, "IRDS");
            sprintf(data_location.Item, "AZ FACTOR");
            data_location.Size = 4;                     /* 4 character string */
            get_calibration(file_pointer, &data_location, buffer);
            setup_parameters.irds_calibration.AZ_Factor = atof(buffer);
            sprintf(data_location.Item, "AZ OFFSET");
            data_location.Size = 5;                     /* 5 character string with sign */
            get_calibration(file_pointer, &data_location, buffer);
            setup_parameters.irds_calibration.AZ_Offset = atof(buffer);
            sprintf(data_location.Item, "EL FACTOR");
            data_location.Size = 4;                     /* 4 character string */
            get_calibration(file_pointer, &data_location, buffer);
            setup_parameters.irds_calibration.EL_Factor = atof(buffer);
            sprintf(data_location.Item, "EL OFFSET");
            data_location.Size = 5;                     /* 5 character string with sign */
            get_calibration(file_pointer, &data_location, buffer);
            setup_parameters.irds_calibration.EL_Offset = atof(buffer);

sprintf(data_location.Group, "TRACKING BOX");
            sprintf(data_location.Item, "X LOCATION");
            data_location.Size = 4;                     /* 4 character string with sign */
            get_calibration(file_pointer, &data_location, buffer);
            setup_parameters.Box_X_Location = (short) atof(buffer);
            sprintf(data_location.Item, "Y LOCATION");
            get_calibration(file_pointer, &data_location, buffer);
            setup_parameters.Box_Y_Location = (short) atof(buffer);
            sprintf(data_location.Item, "HEIGHT");
            data_location.Size = 4;                     /* 3 character string */
            get_calibration(file_pointer, &data_location, buffer);
            setup_parameters.Box_Height = (short) atof(buffer);
            sprintf(data_location.Item, "WIDTH");
            get_calibration(file_pointer, &data_location, buffer);
            setup_parameters.Box_Width = (short) atof(buffer);

/* Code change 5-Sep-1995 from:
            sprintf(data_location.Group, "GIMBAL LIMITS");
to: */
            sprintf(data_location.Group, "GIMBAL WARNING");
/* End of code change */
            sprintf(data_location.Item, "FORWARD");
            data_location.Size = 2;                     /* 2 character string */
            get_calibration(file_pointer, &data_location, buffer);
            setup_parameters.Gimbal_Forward_Limit = atof(buffer);
            sprintf(data_location.Item, "AFT");
            data_location.Size = 3;                     /* 3 character string */
```

130

Navy Case No. 77257

```
            get_calibration(file_pointer, &data_location, buffer);
            setup_parameters.Gimbal_Aft_Limit = atof(buffer);
            sprintf(data_location.Item, "UP");
            data_location.Size = 2;                    /* 2 character string */
            get_calibration(file_pointer, &data_location, buffer);
            setup_parameters.Gimbal_Up_Limit = atof(buffer);
            sprintf(data_location.Item, "DOWN");
            data_location.Size = 3;                    /* 3 character string */
            get_calibration(file_pointer, &data_location, buffer);
            setup_parameters.Gimbal_Down_Limit = atof(buffer);

/* Code added 5-Sep-1995 for gimbal soft stop capability */
            sprintf(data_location.Group, "GIMBAL STOPS");
            sprintf(data_location.Item, "FORWARD");
            data_location.Size = 2;                    /* 2 character string */
            get_calibration(file_pointer, &data_location, buffer);
            setup_parameters.Gimbal_Forward_Stop = atof(buffer);
            sprintf(data_location.Item, "AFT");
            data_location.Size = 3;                    /* 3 character string */
            get_calibration(file_pointer, &data_location, buffer);
            setup_parameters.Gimbal_Aft_Stop = atof(buffer);
            sprintf(data_location.Item, "UP");
            data_location.Size = 2;                    /* 2 character string */
            get_calibration(file_pointer, &data_location, buffer);
            setup_parameters.Gimbal_Up_Stop = atof(buffer);
            sprintf(data_location.Item, "DOWN");
            data_location.Size = 3;                    /* 3 character string */
            get_calibration(file_pointer, &data_location, buffer);
            setup_parameters.Gimbal_Down_Stop = atof(buffer);
/* End of code addition */

/* Close file setup.cal */
            if(fclose(file_pointer))
            {
                    init_error_flags = init_error_flags | CANNOT_CLOSE_SETUP;
                    add_error(CANNOT_CLOSE_SETUP_FILE);
            };
    }

/* Open waypoint data file for reading only */
    if((file_pointer = fopen("waypoint.dat", "r")) == '\0')
    {
            init_error_flags = init_error_flags | CANNOT_OPEN_WAYPOINT;
            add_error(CANNOT_OPEN_WAYPOINT_FILE);

/* Initialize waypoints to default values */
            setup_parameters.waypoint_1.Latitude = 0.0;
            setup_parameters.waypoint_1.Longitude = 0.0;
            setup_parameters.waypoint_1.Altitude = 0.0;
            sprintf(setup_parameters.waypoint_1.Description,
                    "                              ");
            setup_parameters.waypoint_2.Latitude = 0.0;
            setup_parameters.waypoint_2.Longitude = 0.0;
            setup_parameters.waypoint_2.Altitude = 0.0;
            strcpy(setup_parameters.waypoint_2.Description,
                    setup_parameters.waypoint_1.Description);
            setup_parameters.waypoint_3.Latitude = 0.0;
```

131

Navy Case No. 77257

```
            setup_parameters.waypoint_3.Longitude = 0.0;
            setup_parameters.waypoint_3.Altitude = 0.0;
            strcpy(setup_parameters.waypoint_3.Description,
                    setup_parameters.waypoint_1.Description);
            setup_parameters.waypoint_4.Latitude = 0.0;
            setup_parameters.waypoint_4.Longitude = 0.0;
            setup_parameters.waypoint_4.Altitude = 0.0;
            strcpy(setup_parameters.waypoint_4.Description,
                    setup_parameters.waypoint_1.Description);
            setup_parameters.waypoint_5.Latitude = 0.0;
            setup_parameters.waypoint_5.Longitude = 0.0;
            setup_parameters.waypoint_5.Altitude = 0.0;
            strcpy(setup_parameters.waypoint_5.Description,
                    setup_parameters.waypoint_1.Description);
    } if(!(init_error_flags & CANNOT_OPEN_WAYPOINT))
    {
            /* Read all waypoints into setup_parameters */
            sprintf(data_location.Group, "WAYPOINT 1");
            sprintf(data_location.Item, "LAT");
/* Code change 18-Aug-1995 from:
                            data_location.Size = 10;
to: */
            data_location.Size = 11;            /* 11 character string */
/* End of code change */
            get_calibration(file_pointer, &data_location, buffer);
            setup_parameters.waypoint_1.Latitude = ascii_to_latitude(buffer);
            sprintf(data_location.Item, "LON");
            data_location.Size = 11;            /* 11 character string */
            get_calibration(file_pointer, &data_location, buffer);
            setup_parameters.waypoint_1.Longitude = ascii_to_longitude(buffer);
            sprintf(data_location.Item, "ALT");
            data_location.Size = 7;             /* 7 character signed string */
            get_calibration(file_pointer, &data_location, buffer);
            setup_parameters.waypoint_1.Altitude = atof(buffer);
            sprintf(data_location.Item, "DESCRIPTION");
            data_location.Size = DESCRIPTION_SIZE;   /* # of caracters in string */
            get_calibration(file_pointer, &data_location, buffer);
            strcpy(setup_parameters.waypoint_1.Description, buffer);

sprintf(data_location.Group, "WAYPOINT 2");
            sprintf(data_location.Item, "LAT");
/* Code change 18-Aug-1995 from:
                            data_location.Size = 10;
to: */
            data_location.Size = 11;            /* 11 character string */
/* End of code change */
            get_calibration(file_pointer, &data_location, buffer);
            setup_parameters.waypoint_2.Latitude = ascii_to_latitude(buffer);
            sprintf(data_location.Item, "LON");
            data_location.Size = 11;            /* 11 character string */
            get_calibration(file_pointer, &data_location, buffer);
            setup_parameters.waypoint_2.Longitude = ascii_to_longitude(buffer);
            sprintf(data_location.Item, "ALT");
            data_location.Size = 7;             /* 7 character signed string */
            get_calibration(file_pointer, &data_location, buffer);
```

Navy Case No. 77257

```
            setup_parameters.waypoint_2.Altitude = atof(buffer);
            sprintf(data_location.Item, "DESCRIPTION");
            data_location.Size = DESCRIPTION_SIZE;      /* # of characters in string */
            get_calibration(file_pointer, &data_location, buffer);
            strcpy(setup_parameters.waypoint_2.Description, buffer);

sprintf(data_location.Group, "WAYPOINT 3");
            sprintf(data_location.Item, "LAT");
/* Code change 18-Aug-1995 from:
                            data_location.Size = 10;
to: */
            data_location.Size = 11;                    /* 11 character string */
/* End of code change */
            get_calibration(file_pointer, &data_location, buffer);
            setup_parameters.waypoint_3.Latitude = ascii_to_latitude(buffer);
            sprintf(data_location.Item, "LON");
            data_location.Size = 11;                    /* 11 character string */
            get_calibration(file_pointer, &data_location, buffer);
            setup_parameters.waypoint_3.Longitude = ascii_to_longitude(buffer);
            sprintf(data_location.Item, "ALT");
            data_location.Size = 7;                     /* 7 character signed string */
            get_calibration(file_pointer, &data_location, buffer);
            setup_parameters.waypoint_3.Altitude = atof(buffer);
            sprintf(data_location.Item, "DESCRIPTION");
            data_location.Size = DESCRIPTION_SIZE;      /* # of characters in string */
            get_calibration(file_pointer, &data_location, buffer);
            strcpy(setup_parameters.waypoint_3.Description, buffer);

sprintf(data_location.Group, "WAYPOINT 4");
            sprintf(data_location.Item, "LAT");
/* Code change 18-Aug-1995 from:
                            data_location.Size = 10;
to: */
            data_location.Size = 11;                    /* 11 character string */
/* End of code change */
            get_calibration(file_pointer, &data_location, buffer);
            setup_parameters.waypoint_4.Latitude = ascii_to_latitude(buffer);
            sprintf(data_location.Item, "LON");
            data_location.Size = 11;                    /* 11 character string */
            get_calibration(file_pointer, &data_location, buffer);
            setup_parameters.waypoint_4.Longitude = ascii_to_longitude(buffer);
            sprintf(data_location.Item, "ALT");
            data_location.Size = 7;                     /* 7 character signed string */
            get_calibration(file_pointer, &data_location, buffer);
            setup_parameters.waypoint_4.Altitude = atof(buffer);
            sprintf(data_location.Item, "DESCRIPTION");
            data_location.Size = DESCRIPTION_SIZE;      /* # of characters in string */
            get_calibration(file_pointer, &data_location, buffer);
            strcpy(setup_parameters.waypoint_4.Description, buffer);

sprintf(data_location.Group, "WAYPOINT 5");
            sprintf(data_location.Item, "LAT");
/* Code change 18-Aug-1995 from:
                            data_location.Size = 10;
to: */
            data_location.Size = 11;                    /* 11 character string */
/* End of code change */
```

133

Navy Case No. 77257

```
            get_calibration(file_pointer, &data_location, buffer);
            setup_parameters.waypoint_5.Latitude = ascii_to_latitude(buffer);
            sprintf(data_location.Item, "LON");
            data_location.Size = 11;                  /* 11 character string */
            get_calibration(file_pointer, &data_location, buffer);
            setup_parameters.waypoint_5.Longitude = ascii_to_longitude(buffer);
            sprintf(data_location.Item, "ALT");
            data_location.Size = 7;                   /* 7 character signed string */
            get_calibration(file_pointer, &data_location, buffer);
            setup_parameters.waypoint_5.Altitude = atof(buffer);
            sprintf(data_location.Item, "DESCRIPTION");
            data_location.Size = DESCRIPTION_SIZE;    /* # of characters in string */
            get_calibration(file_pointer, &data_location, buffer);
            strcpy(setup_parameters.waypoint_5.Description, buffer);

/* Close file setup.cal */
            if(fclose(file_pointer))
            {
                    init_error_flags = init_error_flags | CANNOT_CLOSE_WAYPOINT;
                    add_error(CANNOT_CLOSE_WAYPOINT_FILE);
            }
       }
}

/***********************************************************************
Function Name:   initialize_io_board()
Number/Version:
History:
     Date              Rev         Author            Description
     21-Feb-1995       1.00        J. Hauselmann     Baseline Global Output:
     analog_data - Data to recieved from digital io board.

Abstract:   Initializes DAC/ADC interface boards.
***********************************************************************/
void initialize_io_board(void)
{
     /* Declare types */
     short unit_id, status;
     short board_type;
     float clock_frequency;

/* Initialize variables to default */
     status = initialize( );                     /* Initialize the PCLAB subroutines */ if( status == E_NORMAL )
            status = select_board( BOARD_1 );    /* Address board 1. */ if( status == E_NORMAL )
            status = reset_dt ( &unit_id );      /* perform a reset on the device */ if( status == E_NORMAL )
     {
            board_type = (unit_id / 16);         /* mask out Board ID. code */ if( board_type == DT2801 )
```

134

Navy Case No. 77257

```
            {
                clock_frequency = 10000.0F;        /* 10 Khz */
                status = set_clock_frequency( &clock_frequency );
            }
            else
                status = E_BOARD;
        }
        if( status != E_NORMAL )
        {
            init_error_flags = init_error_flags | ATOD_FAILED_INIT;
            add_error(ATOD_INIT_FAILED);
        }
    }
    /* end */
```

Navy Case No. 77257

```
/************************************************************************
Module Name:     init.h
Number/Version:
History:
        Date            Rev         Author          Description
        12-Jan-1995     1.00        C. Houlberg     Baseline
        5-Sep-1995      1.02        C. Houlberg     Added gimbal soft stop capability.

Abstract:
    Initialization definitions.
************************************************************************/

/*      Constant definitions.
*/
        #define DESCRIPTION_SIZE            KEY_BUFFER_SIZE - 1

/*      Structure definitions.
*/
        struct Pointing_Calibration
        {
                double AZ_Factor;
                double AZ_Offset;
                double EL_Factor;
                double EL_Offset;
        };

struct Waypoint
        {
                double Latitude;
                double Longitude;
                double Altitude;
                char Description[DESCRIPTION_SIZE + 1];
        };

struct Calibration
        {
                double INS_Correction;
                struct Pointing_Calibration gimbal_drive_calibration;
                struct Pointing_Calibration gimbal_input_calibration;
                struct Pointing_Calibration acq_sight_calibration;
                struct Pointing_Calibration irds_calibration;
                short Box_X_Location;
                short Box_Y_Location;
                short Box_Height;
                short Box_Width;
                double Gimbal_Forward_Limit;
                double Gimbal_Aft_Limit;
                double Gimbal_Up_Limit;
                double Gimbal_Down_Limit;
/* Code added 5-Sept-1995 for gimbal soft stop capability */
                double Gimbal_Forward_Stop;
                double Gimbal_Aft_Stop;
                double Gimbal_Up_Stop;
                double Gimbal_Down_Stop;
/* End of code addition */
                struct Waypoint waypoint_1;
                struct Waypoint waypoint_2;
```

136

Navy Case No. 77257

```
        struct Waypoint waypoint_3;
        struct Waypoint waypoint_4;
        struct Waypoint waypoint_5;
    };
/*  External definitions.
*/
    extern struct File_Location data_location;
    extern struct Calibration setup_parameters;
    extern struct Waypoint *waypoint;

/*  Function definitions.
*/
    void initialize_system(void);

/* end */
```

Navy Case No. 77257

```
/******************************************************************
Module Name:      ins.c
Number/Version:
History:
        Date            Rev     Author         Description
        23-Jan-1995     1.00    C. Houlberg    Baseline
        18-Aug-1995     1.01    C. Houlberg    Fix for computer time error.
                                               initialize_ins_board()
                                               get_ins_data()
        7-Sep-1995      1.02    C. Houlberg    Fix for computer time error.
                                               initialize_ins_board()
                                               get_ins_data()
        7-Feb-1996      1.03    C. Houlberg    Added display of ground speed.
                                               initialize_ins_board()
                                               get_ins_data()
Abstract:   Inertial Navagation System (INS) functions.
        get_ins_data():
            Inputs aircraft location and orientation from the INS (acft.lat,
        acft.lon, acft.alt, acft.roll, acft.pitch, and acft.heading).
******************************************************************/
/*      All parameters and functions used by ins.c are defined in
        the following header files.
*/
        #include "stdio.h"              /* Standard I/O */
        #include "stdlib.h"             /* Standard library definitions */
        #include "string.h"             /* String definitions */
        #include "math.h"               /* Math utility definitions */
        #include "time.h"               /* Time utility definitions */
        #include "dos.h"                /* DOS utility definitions */
        #include "utildefs.h"           /* ARINC utility definitions */
        #include "mem_map.h"            /* Hardware memory map */
        #include "avtsc.h"              /* Project definitions */
        #include "init.h"               /* Initialization definitions */
        #include "pointing.h"           /* Pointing definitions */
        #include "error.h"              /* Error display definitions */
        #include "ins.h"                /* INS function definitions */

/*      Global declarations.
*/
        time_t temp_time;               /* Time used for testing only */
        short arinc_timer;              /* Flag indicating arinc time source */
        struct Inertial platform;
/* Code changed 7-Feb-1996 to acquire and display ground speed from:
        struct Label label[7] =
to: */
        struct Label label[NUMBER_OF_LABELS] =
/* End of code change */
        {
            { TIME_LABEL,    "Sys Time"        , "HHMM.M",   2400.0F,   5, 1, BCD },
            { LAT_LABEL,     "Pres-Pos LAT"    , "DEG"    ,   180.0F,  20, 6, BNR },
            { LONG_LABEL,    "Pres-Pos LONG"   , "DEG"    ,   180.0F,  20, 6, BNR },
            { HEADING_LABEL, "True Heading"    , "DEG"    ,   180.0F,  15, 6, BNR },
            { PITCH_LABEL,   "Pitch Angle"     , "DEG"    ,   180.0F,  15, 6, BNR },
            { ROLL_LABEL,    "Roll Angle"      , "DEG"    ,   180.0F,  15, 6, BNR },
            { ALT_LABEL,   "Inertial Altitude" , "Feet"   , 131072.0F, 20, 6, BNR },
/* Added code 7-Feb-1996 to acquire and display ground speed */
```

Navy Case No. 77257

```
        { SPEED_LABEL,   "Ground Speed", "Knots" ,  4096.0F, 15, 3, BNR}
/* End of code addition */
    } ;
    short ins_error_flags = 0;                        /* Error flags */

/* Initialization errors */
    #define ARINC_FAILED_INIT          0x01      /* Can't open file */

/************************************************************************
Function Name:   initialize_ins_board()
Number/Version:
History:
    Date            Rev     Author           Description
    21-Feb-1995     1.00    J. Hauselmann    Baseline
    18-Aug-1995     1.01    C. Houlberg      Fix for computer time error.
                                             Time moved from:
                                             initialize_ins_board()
                                             to: get_ins_data()
    7-Sep-1995      1.02    C. Houlberg      Fix for computer time error.
                                             Use ARINC time word count as flag
    7-Feb-1996      1.03    C. Houlberg      Added display of ground speed.
Abstract:   Initializes INS interface boards.
*************************************************************************/
void initialize_ins_board(void)
{
    short status;                /* Utility status return value */
/* Code deleted 18-Aug-1995 to fix computer time error, see get_ins_data():
    double arinc_data ;
    unsigned char count;
    unsigned long arinc_word;
    struct _dostime_t newtime;
    double hrs, mins, secs, hsecs;
End of code deletion */ ar_reset(ARINC_BOARD_1);

/* Load board 1. Initial ARINC defaults are:
       Transmit & Receive bit rate are 100 Kbs  (AR_HIGH).
       Parity ODD  (AR_ODD).
       SDI filters disabled (AR_OFF).
       Timer rate 5 milliseconds.
    */
    status = ar_loadslv( ARINC_BOARD_1, ARINC_SEG, ARINC_IO, ARINC_MEM );

/*     Set the on-board timer to run at a rate of 1 MS.
    */
    if( status == ARS_NORMAL)
        ar_set_timerrate( ARINC_BOARD_1, 0x70 );

/* Setup data to be stored in fixed location referenced by there label
    */
    if( status == ARS_NORMAL)
        status = ar_set_storage_mode( ARINC_BOARD_1, ARU_DEDICATED );

/* Filter out all labels except 85, 200, 201, 204, 212, 213, 241 (dec).
    */
    if( status == ARS_NORMAL)
```

139

Navy Case No. 77257

```
    status = ar_label_filter( ARINC_BOARD_1, ARINC_CHANNEL_1,
        ARU_ALL_LABELS, ARU_FILTER_ON);
    if( status == ARS_NORMAL)
      status = ar_label_filter(ARINC_BOARD_1, ARINC_CHANNEL_1, TIME_LABEL,
      ARU_FILTER_OFF);
    if( status == ARS_NORMAL)
      status = ar_label_filter(ARINC_BOARD_1, ARINC_CHANNEL_1, LAT_LABEL,
          ARU_FILTER_OFF);
    if( status == ARS_NORMAL)
      status = ar_label_filter(ARINC_BOARD_1, ARINC_CHANNEL_1, LONG_LABEL,
          ARU_FILTER_OFF);
    if( status == ARS_NORMAL)
      status = ar_label_filter(ARINC_BOARD_1, ARINC_CHANNEL_1, HEADING_LABEL,
          ARU_FILTER_OFF);
    if( status == ARS_NORMAL)
      status = ar_label_filter(ARINC_BOARD_1, ARINC_CHANNEL_1, PITCH_LABEL,
          ARU_FILTER_OFF);
    if( status == ARS_NORMAL)
      status = ar_label_filter(ARINC_BOARD_1, ARINC_CHANNEL_1, ROLL_LABEL,
          ARU_FILTER_OFF);
    if( status == ARS_NORMAL)
      status = ar_label_filter(ARINC_BOARD_1, ARINC_CHANNEL_1, ALT_LABEL,
          ARU_FILTER_OFF);
/* Code added 7-Feb-1996 to acquire and display ground speed */
    if( status == ARS_NORMAL)
      status = ar_label_filter(ARINC_BOARD_1, ARINC_CHANNEL_1, SPEED_LABEL,
          ARU_FILTER_OFF);
/* End of added code */

/* Start board 1 running and initialize time.
    */
/* Code added 7-Sep-1995 to fix computer time error */
      arinc_timer = NO;
/* End of code addition */ if( status == ARS_NORMAL )
    {
/* Code deleted 7-Sep-1995 to fix computer time error:
        arinc_timer = YES;
End of code deletion */

/* Start */
      ar_go (ARINC_BOARD_1);

/* Code deleted 18-Aug-1995 to fix computer time error, see get_ins_data():
        ar_get_latest( ARINC_BOARD_1, ARINC_CHANNEL_1, TIME_LABEL,
            &arinc_word, &count );
        arinc_data = extract_arinc_data( (struct Arinc *) &arinc_word );
        mins = 100 * modf(arinc_data/100, &hrs);
        mins += .005;
        secs = 60 * modf(mins, &mins);
        hsecs = 100 * modf(secs, &secs);
        newtime.hour = (char)hrs;
        newtime.minute = (char)mins;
        newtime.second = (char)secs;
        newtime.hsecond = (char)hsecs;
        _dos_settime(&newtime);
```

140

Navy Case No. 77257

```
End of code deletion */
    }
    else
    {
            /* Indicate initialization failed */
            ins_error_flags = ins_error_flags | ARINC_FAILED_INIT;
            add_error(ARINC_INIT_FAILED);

/* Code deleted 7-Sep-1995 to fix computer time error:
    arinc_timer = NO;
End of code deletion */
    }
}

/******************************************************************************
Function Name:    get_ins_data()
Number/Version:
History:
        Date            Rev         Author          Description
        21-Feb-1995     1.00        J. Hauselmann   Baseline
        18-Aug-1995     1.01        C. Houlberg     Fix for computer time error.
                                                    Time moved from:
                                                    initialize_ins_board()
                                                    to: get_ins_data()
        7-Sep-1995      1.02        C. Houlberg     Fix for computer time error.
                                                    Use ARINC time word count as flag
        7-Feb-1996      1.03        C. Houlberg     Added display of ground speed.
Global outputs:
        Aircraft location and orientation (platform.lat, platform.lon,
        platform.alt, platform.roll, platform.pitch, platform.heading,
        and platform.time).

Abstract:   Inputs data from the INS.
******************************************************************************/
void get_ins_data(void)
{
        #ifdef TARGET_SYSTEM
                /* Variable declarations */
                double arinc_data ;
                double hrs, mins, secs;
/* Code added 18-Aug-1995 to fix computer time error: */
                double hsecs;
                struct _dostime_t newtime;
/* End of code addition */
                unsigned char count;
                unsigned long arinc_word;
                struct tm *gm_time;
                time_t current_time;
                char month[12][4] = {"JAN", "FEB", "MAR", "APR", "MAY", "JUN",
                                     "JUL", "AUG", "SEP", "OCT", "NOV", "DEC"};

/* Get latitude */
        ar_get_latest( ARINC_BOARD_1, ARINC_CHANNEL_1, LAT_LABEL,
                &arinc_word, &count );
        platform.Lat = ( extract_arinc_data( (struct Arinc *) &arinc_word )
                * (PI/180) );
```

Navy Case No. 77257

```
        /* Get longitude */
          ar_get_latest( ARINC_BOARD_1, ARINC_CHANNEL_1, LONG_LABEL,
                &arinc_word, &count );
          platform.Lon = ( extract_arinc_data( (struct Arinc *) &arinc_word )
                * (PI/180) );

/* Get altitude */
          ar_get_latest( ARINC_BOARD_1, ARINC_CHANNEL_1, ALT_LABEL,
                &arinc_word, &count );
          platform.Alt = extract_arinc_data( (struct Arinc *) &arinc_word );

/* Get roll */
          ar_get_latest( ARINC_BOARD_1, ARINC_CHANNEL_1, ROLL_LABEL,
                &arinc_word, &count );
          platform.Roll = ( extract_arinc_data( (struct Arinc *) &arinc_word )
                * (PI/180) );

/* Get pitch  */
          ar_get_latest( ARINC_BOARD_1, ARINC_CHANNEL_1, PITCH_LABEL,
                &arinc_word, &count );
          platform.Pitch = ( extract_arinc_data( (struct Arinc *) &arinc_word )
                * (PI/180) );

/* Get heading  */
          ar_get_latest( ARINC_BOARD_1, ARINC_CHANNEL_1, HEADING_LABEL,
                &arinc_word, &count );
          platform.Heading = ((extract_arinc_data((struct Arinc *) &arinc_word)
                * (PI/180) ) + setup_parameters.INS_Correction );
/* Code added 7-Feb-1996 to acquire and display ground speed */
        /* Get heading  */
          ar_get_latest( ARINC_BOARD_1, ARINC_CHANNEL_1, SPEED_LABEL,
                &arinc_word, &count );
          platform.Speed = extract_arinc_data( (struct Arinc *) &arinc_word );
/* End of added code */

/* Process time */
          time(&current_time);
/* Code changed 7-Sep-1995 to fix computer time error from:
          gm_time = gmtime(&current_time);
to: */
        /* Get system date from DOS */
          gm_time = localtime(&current_time);

/* Get system time from ARINC */
          ar_get_latest( ARINC_BOARD_1, ARINC_CHANNEL_1, TIME_LABEL,
                &arinc_word, &count );
/* End of code change */

/* Code changed 7-Sep-1995 to fix computer time error from:
          if(arinc_timer == YES)
to: */
          if(count || (arinc_timer == YES))    /* Indicate if time was received */
/* End of code change */
          {
/* Code moved 7-Sep-1995 to above to fix computer time error:
             ar_get_latest( ARINC_BOARD_1, ARINC_CHANNEL_1, TIME_LABEL,
```

Navy Case No. 77257

```
                        &arinc_word, &count );
End of moved code */
                arinc_data = extract_arinc_data( (struct Arinc *) &arinc_word );
                /* Convert hours and minutes to hours, minutes and seconds */
                mins = 100 * modf(arinc_data/100, &hrs);  /* Extract hours */
                /* Rounding correction factor */
                mins += .005;
                secs = 60 * modf(mins, &mins);      /* Extract minutes and seconds */
                /* Put hours, minutes, and seconds in string form */
                sprintf(platform.Time, "%02.0f:%02.0f:%02.0f%c",
                        hrs, mins, secs, ' ');

/* Code added 7-Sep-1995 to fix computer time error: */
                if(arinc_timer == NO)
                {
                        arinc_timer = YES;
/* End of code addition */
/* Code added 18-Aug-1995 to fix computer time error: */
                        /* Update the computer's time */
                        hsecs = 100 * modf(secs, &secs);
                        newtime.hour = (unsigned char)hrs;
                        newtime.minute = (unsigned char)mins;
                        newtime.second = (unsigned char)secs;
                        newtime.hsecond = (unsigned char)hsecs;
                        _dos_settime(&newtime);
/* End of code addition */
/* Code added 7-Sep-1995 to fix computer time error: */
                }
/* End of code addition */
        }
        else
        {
                /* Use system time from computer (DOS) */
                sprintf(platform.Time, "%02.0f:%02.0f:%02.0f%c",
                        (float)gm_time->tm_hour,
                        (float)gm_time->tm_min,
                        (float)gm_time->tm_sec,
                        '*');
        }

/* Use system date and day from computer (DOS) */
        sprintf(platform.Date, "%02.0f %3s %02.0f",
                (float)gm_time->tm_mday,
                month[gm_time->tm_mon],
                (float)gm_time->tm_year);
        sprintf(platform.Day, "%03.0f", (float)gm_time->tm_yday + 1);
#else
        /* Variable declarations */
        struct tm *gm_time;
        time_t current_time;
        char month[12][4] = {"JAN", "FEB", "MAR", "APR", "MAY", "JUN",
                             "JUL", "AUG", "SEP", "OCT", "NOV", "DEC"};

/* Update time and date */
        time(&current_time);
        gm_time = localtime(&current_time);
        sprintf(platform.Time, "%02.0f:%02.0f:%02.0f%c",
```

143

Navy Case No. 77257

```
                (float)gm_time->tm_hour,
                (float)gm_time->tm_min,
                (float)gm_time->tm_sec,
                '*');
        sprintf(platform.Date, "%02.0f %3s %02.0f",
                (float)gm_time->tm_mday,
                month[gm_time->tm_mon],
                (float)gm_time->tm_year);
        sprintf(platform.Day, "%03.0f", (float)gm_time->tm_yday + 1);

/* Update attitude */
        platform.Roll = 0;
        platform.Pitch = 0;
        platform.Heading = 60 * PI/180 + setup_parameters.INS_Correction;

/* Update altitude and speed */
        platform.Alt = 10000;
        platform.Speed = 100;

/* Update latitude and longitude */
        platform.Lat = 34 * PI/180;
//      platform.Lon = -119 * PI/180;

/**** Test ****/
      if(platform.Lon < (-119.1 * PI/180))
            platform.Lon = -118.9 * PI/180;
      else if(platform.Lon > (-118.9 * PI/180))
            platform.Lon = -119.1 * PI/180;
      else
      {
            platform.Lon += atan(platform.Speed/60/60
                  * (current_time - temp_time)/3958);
      }
      time(&temp_time);
/**** End Test ****/
      #endif /* Insure that heading is greater than 0 degrees */
    if(platform.Heading < 0)
      platform.Heading += 2*PI;

/* Insure that heading is no greater than 360 degrees */
    if(platform.Heading >= 2*PI)
      platform.Heading -= 2*PI;
}

/*******************************************************************
Function Name:     extract_arinc_data()
Number/Version:
History:
      Date              Rev      Author            Description
      22-Feb-1995       1.00     J. Hauselmann     Baseline Abstract:   Extract data from arinc_word
********************************************************************/
double extract_arinc_data( struct Arinc  *arinc_word )
```

144

Navy Case No. 77257

```c
{
    double usable_number;                       // final extracted number
    float value_per_bit;                        // decimal value for each bit
    long usable_data;                           // arincs data shifted right
    long largest_number;                        // largest number from number of digits
    short i, label_index;
    enum Sign sign;

for( i = 0 ; i < NUMBER_OF_LABELS ; i++ )
        if( (unsigned long)label[i].number ==  arinc_word->label )
        {
            label_index = i;
            break;
        } switch(    label[label_index].encoding )
    {
        case(BNR):
            sign = POSITIVE ;

/* The usable data is located in the left most part of the
                data word. The size of the usable data field is defined
                by the number of digits in the user defined label plus
                a sign bit. Usable data is shifted right until usable
                data is LSB justified.
            */
            usable_data = (long) ( arinc_word->data >>
                   ( MAX_BNR_DIGITS - label[label_index].digits - 1 ) ) ;

/*  Check if negitive number, if so convert to positive number
                using 2's complement. Bit 21 of arinc data is the sign bit
            */
            if( ( arinc_word->data & 0x100000 ) > 0 )       // check if negitive
            {
                usable_data &=                              // Mask out sign bit
                      ( (long) pow( 2, label[label_index].digits )
                        ^ 0xFFFFFFFF);
                usable_data ^=                              // 1's Complement
                      (long) pow( 2, label[label_index].digits ) - 1 ;
                usable_data += 1 ;                          // 2's Complement
                sign = NEGITIVE ;
            }

/* Determine largest number for the number of binary digits */
            largest_number = (long) powl( 2, label[label_index].digits );

/* Determine what the value of one bit represents */
            value_per_bit = label[label_index].scale / largest_number ;

/* The final extracted value */
        usable_number = (double) usable_data * value_per_bit  ;

if( sign == NEGITIVE )
              usable_number = - usable_number ;
        break;
    case(BCD):
```

145

Navy Case No. 77257

```
            /* Right Justify BCD data */
            usable_data = (arinc_word->data >>
                 ( ( MAX_BCD_DIGITS - label[label_index].digits ) * 4 ) + 2 ) ;

/* convert BCD to Binary */
            usable_number = 0 ;
            for( i = 0 ; i < MAX_BCD_DIGITS ; i++ )
            {
                    usable_number *= 10 ;
                    usable_number += (double)( (0x000F0000 & usable_data) >> 16);
                    usable_data <<= 4 ;
            }

/* insert decimal point */
            if( label[label_index].dp != 0 )
                    usable_number /= (double) pow(10,label[label_index].dp) ;

/* check for negitive number */
            if( arinc_word->ssm != 0 )
                    usable_number = - usable_number ;
            break;
        default:
            break;
    }
    return( usable_number ) ;
}
/* end */
```

146

Navy Case No. 77257

```
/*****************************************************************
Module Name:    ins.h
Number/Version:
History:
    Date            Rev         Author          Description
    12-Jan-1995     1.00        C. Houlberg     Baseline
    7-Feb-1996      1.03        C. Houlberg     Added ground speed display.

Abstract:
    Inertial Navigation System (INS) definitions.
*****************************************************************/

/*      Physical constants.
*/
        #define ARINC_BOARD_1       0x0     /* Board number 1 */
        #define ARINC_CHANNEL_1     0x0     /* Channel number 0 */
        #define MAX_BCD_DIGITS      5       /* Maximum number of BCD digits */
        #define MAX_BNR_DIGITS      21      /* Maximum number of digit + sign bit */
/* Code changed 7-Feb-1996 to acquire ground speed for display from:
        #define NUMBER_OF_LABELS    7
to: */
        #define NUMBER_OF_LABELS    8       /* Number of labels */
/* End of code change */

/*      Arinc Labels (decimal value used).
*/
        #define TIME_LABEL          85              /* System time (125) */
        #define LAT_LABEL           200             /* Latitude (310) */
        #define LONG_LABEL          201             /* Longitude (311) */
        #define HEADING_LABEL       204             /* Heading (304) */
        #define PITCH_LABEL         212             /* Pitch angle (324) */
        #define ROLL_LABEL          213             /* Roll angle (325) */
        #define ALT_LABEL           241             /* Inertial Altitude (361) */
/* Added code 7-Feb-1996 to acquire ground speed for display */
        #define SPEED_LABEL         202             /* Ground Speed (312) */
/* End of added code */

/*      Enumerated definitions.
*/
        enum Encoding
        {
                BCD,
                BNR
        };

enum Sign
        {
                POSITIVE,
                NEGITIVE
        };

/*      Structure definitions.
*/
        struct Inertial
        {
                double Roll;
                double Pitch;
```

147

Navy Case No. 77257

```c
        double Heading;
/* Added code 7-Feb-1996 to acquire ground speed for display */
        double Speed;
/* End of added code */
        double Lat;
        double Lon;
        double Alt;
        char Time[10];
        char Date[10];
        char Day[4];
    };

struct Arinc                       /* Declare ARINC 32 bit field */
    {
        unsigned long label    : 8;/* 0000 0000 0000 0000 0000 0000 ???? ???? */
        unsigned long data     :21;/* 000? ???? ???? ???? ???? ???? 0000 0000 */
        unsigned long ssm      : 2;/* 0??0 0000 0000 0000 0000 0000 0000 0000 */
        unsigned long p        : 1;/* ?000 0000 0000 0000 0000 0000 0000 0000 */
    };

struct Label
    {
        int number ;
        char name[20] ;
        char units[20] ;
        float scale ;
        int digits ;
        int dp ;
        enum Encoding encoding ;
    };

/*  Global declarations.
*/
    extern struct Inertial platform;
/* Code change 7-Feb-1996 to acquire and display ground speed from:
    extern struct Label label[7];
to: */
    extern struct Label label[NUMBER_OF_LABELS];
/* End of code change */
/*  Function definitions.
*/
    void initialize_ins_board(void);
    void get_ins_data(void);
    double extract_arinc_data( struct Arinc * );

/* end */
```

Navy Case No. 77257

```
/****************************************************************
Module Name:     irds.c
Number/Version:
History::
        Date            Rev     Author          Description
        17-Jan-1995     1.00    C. Houlberg     Baseline
        18-Aug-1995     1.01    C. Houlberg     Fix for angle overflow error.
                                                get_irds_angles()
Abstract:  Infrared System (IRDS) functions.
        initialize_irds_board():    Initializes interface board.
        get_irds_angles():                Inputs the IRDS angles (azimuth and elevation).
****************************************************************/
/*      All parameters and functions used by irds.c are defined in
        the following header files.
*/
        #include "conio.h"              /* Console I/O definitions */
        #include "avtsc.h"              /* Project definitions */
        #include "init.h"               /* Initialization definitions */
        #include "mem_map.h"            /* System memory map */
        #include "overlay1.h"           /* Overlay #1 definitions */
        #include "irds.h"               /* IRDS definitions */

/*      Global declarations.
*/
        struct Irds_Angles irds;
           short ch1_stablizing, ch2_stablizing;
           double irds_az_test_angle, irds_el_test_angle;

/*      Constant definitions.
*/
        #define CH1_TRACK       0x01
        #define CH2_TRACK       0x02
        #define CH1_BIT         0x10
        #define CH2_BIT         0x20
        #define BYTE_MASK       0xff
        #define BAN_TO_RAD      PI/32768
        #define DEGREES_TO_BAN  32768/180

/****************************************************************
Function Name:   initialize_irds_board()
Number/Version:
History:
        Date            Rev     Author          Description
        22-May-1995     1.00    C. Houlberg     Baseline Abstract:  Initializes the IRDS board.
****************************************************************/
void initialize_irds_board(void)
{
        #ifdef TARGET_SYSTEM
                /* Track channel 1 and channel 2 inputs */
                _outp(SYNCHRO, CH1_TRACK | CH2_TRACK);

/* Indicate channel #1 and #2 data not stablizing */
                ch1_stablizing = NO;
                ch2_stablizing = NO;
        #else
```

149

Navy Case No. 77257

```c
            /* Test angle in degrees */
            irds_az_test_angle = -90;
            irds_el_test_angle = 0;
    #endif
}
/****************************************************************
Function Name:    get_irds_angles()
Number/Version:
History:
        Date            Rev         Author          Description
        23-Jan-1995     1.00        C. Houlberg     Baseline
        18-Aug-1995     1.01        C. Houlberg     Fix for angle overflow error.

Global outputs:
    IRDS angles (irds.az and irds.el).

Abstract:   Inputs and converts IRDS input to angles in radians.
****************************************************************/
void get_irds_angles(void)
{
        /* Variable declarations */
        double radians, gain, offset;
        unsigned short ban;
    #ifdef TARGET_SYSTEM
        unsigned short msb, lsb;

/* Test for stable synchro data (angle 1) */
            if((_inp(SYNCHRO) & CH1_BIT)                    /* Tracking signal */
                    || (ch1_stablizing == YES))             /* Not stable yet */
            {
                    /* Retreive synchro data */
                    if(ch1_stablizing == NO)                /* Still tracking */
                    {
                            _outp(SYNCHRO, _inp(SYNCHRO) & !CH1_TRACK);    /* Freeze data */
                            ch1_stablizing = YES;                          /* Data stablizing */
                    }
                    if(!(_inp(SYNCHRO) & CH1_TRACK))        /* Test for stable data */
                    {
                            ch1_stablizing = NO;                           /* Data is stable */
                            lsb = BYTE_MASK & _inp(SYNCHRO_CH1_LSB);       /* LSByte */
                            msb = BYTE_MASK & _inp(SYNCHRO_CH1_MSB);       /* MSByte */
                            _outp(SYNCHRO, _inp(SYNCHRO) | CH1_TRACK);     /* Track data */ ban = (msb << 8) + lsb;                        /* BAN */
                            radians = BAN_TO_RAD * (double) ban;           /* Radians */

/* Allow for scaling (gain and offset) */
                            gain = setup_parameters.irds_calibration.EL_Factor;
                            offset = setup_parameters.irds_calibration.EL_Offset;
/* Code changed 18-Aug-1995 to fix angle overflow problem from:
                            radians = radians * gain + offset * PI/180.0;
to: */
                            if(radians < PI)
                                    radians = radians * gain + offset * PI/180.0;
                            else
                                    radians = (radians - 2 * PI) * gain + offset * PI/180.0;
```

150

Navy Case No. 77257

```
/* End of code change */
                /* Keep magnitude between +/- PI */
                if(radians > PI)
                        radians -= 2 * PI;
                else if(radians < -PI)
                        radians += 2 * PI;

/* Save angle as elevation */
                irds.El = radians;
            }
        }

/* Test for stable synchro data (angle 2) */
        if((_inp(SYNCHRO) & CH2_BIT)                        /* Tracking signal */
            || (ch2_stablizing == YES))                     /* Not stable yet */
        {
            /* Retreive synchro data */
            if(ch2_stablizing == NO)                        /* Still tracking */
            {
                _outp(SYNCHRO, _inp(SYNCHRO) & !CH2_TRACK);     /* Freeze data */
                ch2_stablizing = YES;                           /* Data stablizing */
            }
            if(!(_inp(SYNCHRO) & CH2_TRACK))                /* Test for stable data */
            {
                ch2_stablizing = NO;                        /* Data is stable */
                lsb = BYTE_MASK & _inp(SYNCHRO_CH2_LSB);    /* LSByte */
                msb = BYTE_MASK & _inp(SYNCHRO_CH2_MSB);    /* MSByte */
                _outp(SYNCHRO, _inp(SYNCHRO) | CH2_TRACK);      /* Track data */ ban = (msb << 8) + lsb;                     /* BAN */
                radians = BAN_TO_RAD * (double) ban;        /* Radians */
                /* Account for 90 degree offset (PI/2) */
                radians = radians + PI/2;

/* Allow for scaling (gain and offset) */
                gain = setup_parameters.irds_calibration.AZ_Factor;
                offset = setup_parameters.irds_calibration.AZ_Offset;
/* Code changed 18-Aug-1995 to fix angle overflow problem from:
                radians = radians * gain + offset * PI/180.0;
to: */
                if(radians < PI)
                        radians = radians * gain + offset * PI/180.0;
                else
                        radians = (radians - 2 * PI) * gain + offset * PI/180.0;
/* End of code change */

/* Keep magnitude between +/- PI */
                if(radians > PI)
                        radians -= 2 * PI;
                else if(radians < -PI)
                        radians += 2 * PI;

/* Save angle as azimuth */
                irds.Az = radians;
            }
        }
```

151

Navy Case No. 77257

```
    #else
            /* Set irds.El to test value */
            if(irds_el_test_angle < 0)         /* ban is always positive */
                    ban = (unsigned short) (DEGREES_TO_BAN
                            * (irds_el_test_angle + 360));
            else
                    ban = (unsigned short) (DEGREES_TO_BAN * irds_el_test_angle);
            ++irds_el_test_angle;
            if(irds_el_test_angle > V_SCALE_P_RANGE1)
                    irds_el_test_angle = -V_SCALE_N_RANGE1;
            radians = (double) ban * BAN_TO_RAD;

/* Allow for scaling (gain and offset) */
            gain = setup_parameters.irds_calibration.EL_Factor;
            offset = setup_parameters.irds_calibration.EL_Offset;
/* Code changed 18-Aug-1995 to fix angle overflow problem from:
                    radians = radians * gain + offset * PI/180.0;
to: */
            if(radians < PI)
                    radians = radians * gain + offset * PI/180.0;
            else
                    radians = (radians - 2 * PI) * gain + offset * PI/180.0;
/* End of code change */

/* Keep magnitude between +/- PI */
            if(radians > PI)
                    radians -= 2 * PI;
            else if(radians < -PI)
                    radians += 2 * PI;

/* Save angle as elevation */
            irds.El = radians;

/* Set irds.Az to test value */
            if(irds_az_test_angle < 0)         /* ban is always positive */
                    ban = (unsigned short) (DEGREES_TO_BAN
                            * (irds_az_test_angle + 360));
            else
                    ban = (unsigned short) (DEGREES_TO_BAN * irds_az_test_angle);
            ++irds_az_test_angle;
            if(irds_az_test_angle > (H_SCALE_P_RANGE1 - 90))
                    irds_az_test_angle = -H_SCALE_N_RANGE1 - 90;
            radians = BAN_TO_RAD * (double) ban;
            radians = radians + PI/2;

/* Allow for scaling of azimuth (gain and offset) */
            gain = setup_parameters.irds_calibration.AZ_Factor;
            offset = setup_parameters.irds_calibration.AZ_Offset;
/* Code changed 18-Aug-1995 to fix angle overflow problem from:
                    radians = radians * gain + offset * PI/180.0;
to: */
            if(radians < PI)
                    radians = radians * gain + offset * PI/180.0;
            else
                    radians = (radians - 2 * PI) * gain + offset * PI/180.0;
/* End of code change */
```

152

Navy Case No. 77257

```
        /* Keep magnitude between +/- PI */
        if(radians > PI)
            radians -= 2 * PI;
        else if(radians < -PI)
            radians += 2 * PI;

/* Save angle as azimuth */
        irds.Az = radians;
    #endif
}
/* end */
```

Navy Case No. 77257

```
/*******************************************************************
Module Name:    irds.h
Number/Version:
History:
        Date            Rev     Author          Description
        12-Jan-1993     1.00    C. Houlberg     Baseline Abstract:
    Infrared System (IRDS) definitions.
*******************************************************************/

/*      Structure definitions.
*/
        struct Irds_Angles
        {
                double          Az;
                double          El;
        };

/*      Global declarations.
*/
    extern struct Irds_Angles irds;

/*      Function definitions.
*/
        void initialize_irds_board(void);
        void get_irds_angles(void);

/* end */
```

Navy Case No. 77257

```
/*********************************************************************
Module Name:     keyboard.c
Number/Version:
History:
        Date            Rev         Author          Description
        23-Jan-1995     1.00        C. Houlberg     Baseline
        18-Aug-1995     1.01        C. Houlberg     Fix for Latitude truncation.
                                                    edit_waypoints()
        5-Sep-1995      1.02        C. Houlberg     Added gimbal soft stop capability.
                                                    set_gimbal_limits()
                                                    update_gimbal_item()
        17-Jan-1996     1.03        C. Houlberg     Added qualifier for exit message.
                                                    main_screen()
        25-Jan-1996     1.03        C. Houlberg     Changed <Ctrl> F5 to <Ctrl> F4
                                                    main_screen()
        6-Feb-1996      1.03        C. Houlberg     Added global function key
                                                    setup()
                                                    calibrate_ins()
                                                    calibrate_acq_sight()
                                                    calibrate_gimbal_drive()
                                                    calibrate_gimbal_input()
                                                    calibrate_irds()
                                                    adjust_tracking_box()
                                                    set_gimbal_limits()
                                                    edit_waypoints()
                                                    select_waypoint()
                                                    global_function_key()
        6-Feb-1996      1.03        C. Houlberg     Added tracking mode display
                                                    update_waypoint_item()
                                                    select_waypoint()
        7-Feb-1996      1.03        C. Houlberg     Password characters masked
                                                    string_control()
        7-Feb-1996      1.03        C. Houlberg     Password made case insensitive.
                                                    setup()
        7-Feb-1996      1.03        C. Houlberg     Added global waypoint selection.
                                                    main_screen()
                                                    setup()
                                                    calibrate_ins()
                                                    calibrate_acq_sight()
                                                    calibrate_gimbal_drive()
                                                    calibrate_gimbal_input()
                                                    calibrate_irds()
                                                    adjust_tracking_box()
                                                    set_gimbal_limits()
                                                    edit_waypoints()
                                                    select_waypoint()
                                                    global_alt_key()
        8-Feb-1996      1.03        C. Houlberg     User friendly password entry.
                                                    main_screen()
                                                    setup()
        21-Mar-1996     1.04        C. Houlberg     Allow updates during exit message.
                                                    process_keyboard_input()
                                                    main_screen()
        21-Mar-1996     1.04        C. Houlberg     Added triangulation feature.
                                                    main_screen()
                                                    global_function_key()
        25-Mar-1996     1.04        C. Houlberg     Fixed new estimated altitude error.
```

Navy Case No. 77257

```
                                              main_screen()
    26-Mar-1996     1.04      C. Houlberg     Changed order of setup items.
                                              setup()
Abstract:  Keyboard functions.
    1)    process_keyboard_input():   Directs input to proper mode routine.
    2)    main_screen():
    3)    help_menu():
    4)    setup():
    5)    calibrate_ins():
    6)    calibrate_acq_sight():
    7)    calibrate_irds():
    8)    adjust_tracking_box():
    9)    set_gimbal_limits():
    10)   set_gimbal_stops():
    11)   edit_waypoints():
    12)   numeral_string_input():
*************************************************************************/
/*   All parameters and functions used by keyboard.c are defined in
     the following header files.
*/
    #include "bios.h"           /* Bios I/O definitions */
    #include "stdio.h"          /* Standard I/O definitions */
    #include "stdlib.h"         /* Standard library definitions */
    #include "graph.h"          /* Screen graphics definitions */
    #include "string.h"         /* String definitions */
    #include "mem_map.h"        /* Hardware memory map */
    #include "avtsc.h"          /* Project definitions */
    #include "init.h"           /* Initialization parameters */
    #include "vtr.h"            /* VTR definitions */
    #include "gimbal.h"         /* Gimbal definitions */
    #include "ins.h"            /* INS definitions */
    #include "pointing.h"       /* Pointing calculation definitions */
    #include "displays.h"       /* Display definitions */
    #include "console.h"        /* Console display definitions */
    #include "overlay1.h"       /* Overlay #1 display definitions */
    #include "overlay2.h"       /* Overlay #2 display definitions */
    #include "video.h"          /* Video display definitions */
    #include "utility.h"        /* Utility definitions */
    #include "error.h"          /* Error display definitions */
    #include "keyboard.h"       /* Keyboard definitions */

/*  Keyboard variable declarations.
*/
    char char_string[KEY_BUFFER_SIZE];    /* Keyboard character string */
    short char_pointer = 0;               /* String character pointer */
    short line_item = 0;                  /* Line item selected */
    struct _rccoord text;                 /* Text position */
/* Code deleted 8-Feb-1996 user friendly password entry:
    short password_valid;
End of deleted code */
    short keyboard_error_flags = 0;       /* Keyboard routine errors */

/*  Variables local to keyboard.c.
*/
    /* File errors */
    #define CANNOT_OPEN_SETUP      0x01      /* Can't open file */
    #define CANNOT_CLOSE_SETUP     0x02      /* Can't close file */
```

Navy Case No. 77257

```
    #define CANNOT_OPEN_WAYPOINT        0x04     /* Can't open file */
    #define CANNOT_CLOSE_WAYPOINT       0x08     /* Can't close file */

/*  Functions local to keyboard.c.
*/
    void main_screen(unsigned short keyboard_input);
    void exit_message(unsigned short keyboard_input);
    void help_menu(void);
    void setup(unsigned short keyboard_input);
    void calibrate_ins(unsigned short keyboard_input);
    void calibrate_acq_sight(unsigned short keyboard_input);
    void update_acqsight_item(short item);
    void calibrate_gimbal_drive(unsigned short keyboard_input);
    void update_gimbal_drive_item(short item);
    void calibrate_gimbal_input(unsigned short keyboard_input);
    void update_gimbal_input_item(short item);
    void calibrate_irds(unsigned short keyboard_input);
    void update_irds_item(short item);
    void adjust_tracking_box(unsigned short keyboard_input);
    void set_gimbal_limits(unsigned short keyboard_input);
    void update_gimbal_item(short item);
    void set_gimbal_stops(unsigned short keyboard_input);
    void update_gimbal_stop(short item);
    void edit_waypoints(unsigned short keyboard_input);
    void update_waypoint_item(short item);
    void select_waypoint(unsigned short keyboard_input);
    void ascii_string_input(unsigned short keyboard_input);
    void numeral_string_input(unsigned short keyboard_input);
    void string_control(unsigned short keyboard_input);
    void global_function_key(unsigned short keyboard_input);
    void global_alt_key(unsigned short keyboard_input);
/****************************************************************************
Function Name:    process_keyboard_input()
Number/Version:
History:
    Date          Rev       Author           Description
    23-Jan-1995   1.00      C. Houlberg      Baseline
    12-Mar_1996   1.04      C. Houlberg      Allow console updates during
                                             exit message display.

Abstract:  Processes keyboard inputs.
****************************************************************************/
void process_keyboard_input(void)
{
    /* Variable declarations */
    unsigned short keyboard_input;

/* Test for start up mode (display main screen) */
    if(mode == START_UP)
    {
        /* Select the console display board and display main screen */
        current_port = switch_monitors(CONSOLE, current_port);
        main_screen(ENTER);
    }

/* Test for keyboard input */
    while(_bios_keybrd(_NKEYBRD_READY))
```

Navy Case No. 77257

```
    {
            /* Get keyboard scan code */
            keyboard_input = _bios_keybrd(_NKEYBRD_READ);

/* Select the console display board */
            current_port = switch_monitors(CONSOLE, current_port);

/* Take input to appropriate console screen function */
            switch(mode)
            {
                case(MAIN_SCREEN):
/* Code changed 21-Mar-1996 to allow console screen updates
   during exit message display from:
                main_screen(keyboard_input);
                break;
            case(EXIT_MESSAGE):
                exit_message(keyboard_input);
to: */
                case(EXIT_MESSAGE):
                    main_screen(keyboard_input);
/* End of code change */
                    break;
                case(HELP_MENU):
                    main_screen(keyboard_input);
                    break;
                case(SETUP):
                    setup(keyboard_input);
                    break;
                case(CALIBRATE_INS):
                    calibrate_ins(keyboard_input);
                    break;
                case(CALIBRATE_GIMBAL_DRIVE):
                    calibrate_gimbal_drive(keyboard_input);
                    break;
                case(CALIBRATE_GIMBAL_INPUT):
                    calibrate_gimbal_input(keyboard_input);
                    break;
                case(CALIBRATE_ACQ_SIGHT):
                    calibrate_acq_sight(keyboard_input);
                    break;
                case(CALIBRATE_IRDS):
                    calibrate_irds(keyboard_input);
                    break;
                case(ADJUST_TRACKING_BOX):
                    adjust_tracking_box(keyboard_input);
                    break;
                case(SET_GIMBAL_LIMITS):
                    set_gimbal_limits(keyboard_input);
                    break;
                case(EDIT_WAYPOINTS):
                    edit_waypoints(keyboard_input);
                    break;
                case(SELECT_WAYPOINT):
                    select_waypoint(keyboard_input);
                    break;
            }
    }
```

Navy Case No. 77257

```c
        /* Process VTR command */
        if(vtr_command)
                output_vtr_command(vtr_command);
}
/***********************************************************************
Function Name:    main_screen()
Number/Version:
History:
        Date            Rev         Author            Description
        13-Feb-1995     1.00        C. Houlberg       Baseline
        17-Jan-1996     1.03        C. Houlberg       Added qualifier for exit message.
        25-Jan-1996     1.03        C. Houlberg       Changed <Ctrl> F5 to <Ctrl> F4.
        7-Feb-1996      1.03        C. Houlberg       Added global waypoint selection.
        21-Mar-1996     1.04        C. Houlberg       Allow updates during exit message.
        21-Mar-1996     1.04        C. Houlberg       Added triangulation feature.
        25-Mar-1996     1.04        C. Houlberg       Fixed new estimated altitude error.

Abstract:   Process main screen entry.
***********************************************************************/
void main_screen(unsigned short keyboard_input)
{
        /* Variable declarations */
        short i;                                        /* Index pointer */
        short shift_status;
        char buffer[17];                                /* 16 character buffer */
        char blank_waypoint[] = {"                "};

if((mode != MAIN_SCREEN) && (mode != EXIT_MESSAGE))
        {
                /* Set the mode */
                mode = MAIN_SCREEN;

/* Display main screen template */
                main_screen_template();

/* Display existing errors */
                error_item.Number_Displayed = 0;        /* None currently displayed */
                update_error_display();

/* To display or not to display latitude and longitude */
                if(display_location != NO)
                        console_location_display();

/* Reset cursor position */
                char_pointer = 0;                       /* Beginning of line item */

/* Initialize char_string */
                sprintf(char_string, "%-6.0f", estimated_altitude);
                _settextposition(MAIN_TGT6 + 17);

/* Establish base row and column */
                text = _gettextposition();

/* Display target's estimated altitude */
                _outtext(char_string);
```

Navy Case No. 77257

```
            /* Establish end of displayed string */
            for(i = 0;(char_string[i] != ' ') && (char_string[i] != '\0'); i++);
            if(char_string[i] == ' ')
                    char_string[i] = '\0';        /* Terminate string */

/* Display cursor (simulated) */
            _putimage((text.col + char_pointer - 1) * CURSOR_WD
                    - console_graphics.X_Center,
                    (text.row -1) * CURSOR_HT - console_graphics.Y_Center,
                    cursor_ind, _GXOR);
      }
      else
      {
            /* Clear cursor (simulated) */
            _putimage((text.col + char_pointer - 1) * CURSOR_WD
                    - console_graphics.X_Center,
                    (text.row - 1) * CURSOR_HT - console_graphics.Y_Center,
                    cursor_ind, _GXOR);

/* Code added 7-Feb-1996 for global waypoint selection */
            global_alt_key(keyboard_input);
/* End of added code */

/* Code added 21-Mar-1996 to allow console screen update during
    exit message display */
            /* Look for exit message response */
            if(mode == EXIT_MESSAGE)
                    exit_message(keyboard_input);
/* End of added code */ switch(keyboard_input >> 8)        /* Test scan code */
            {
                    case(ESC):                            /* Exit program (return to DOS) */
/* Code added 17 Janurary 1996 to prevent exit message display */
                    shift_status = (LEFT_SHIFT_KEY | RIGHT_SHIFT_KEY)
                            & _bios_keybrd(_NKEYBRD_SHIFTSTATUS);
                    if((shift_status == LEFT_SHIFT_KEY)
                            || (shift_status == RIGHT_SHIFT_KEY))
/* End of added code */
                            exit_message(keyboard_input);
                    break;
            case(F1):
                    /* Display help menu */
                    help_menu();

/* Toggle cursor on (toggled off below) */
                    _putimage((text.col + char_pointer - 1) * CURSOR_WD
                            - console_graphics.X_Center,
                            (text.row - 1) * CURSOR_HT - console_graphics.Y_Center,
                            cursor_ind, _GXOR);
                    break;
            case(F2):
                    /* Setup (system calibration) */
                    setup(keyboard_input);

/* Toggle cursor on (toggled off below) */
/* Code added 8-Feb-1996 for user friendly password entry */
```

160

Navy Case No. 77257

```
                    _putimage(((text.col + char_pointer - 1) * CURSOR_WD
                            - console_graphics.X_Center,
                            (text.row - 1) * CURSOR_HT - console_graphics.Y_Center,
                            cursor_ind, _GXOR);
/* End of added code */
                    break;
                case(F3):                               /* Toggle color */
                    toggle_overlay_color();

/* Select the console display board */
                    current_port = switch_monitors(CONSOLE, current_port);
                    break;
                case(F4):                               /* Record (start both VTRs) */
                    vtr_command = START;
                    vtr1_string_pointer = 0;
                    vtr2_string_pointer = 0;
                    break;
/* Code change 25-Jan-1996 to change function key from <Ctrl> F5:
                case(CTRL_F5):
to <Ctrl> F4 */
                case(CTRL_F4):                          /* Stop both VTRs? */
/* End of code change */
                    vtr_command = STOP;
                    vtr1_string_pointer = 0;
                    vtr2_string_pointer = 0;
                    break;
                case(F6):                               /* ACQ sight active pointing device
*/
                    tracking = ACTIVE_ACQSIGHT;         /* Set tracking mode */
                    sprintf(buffer, "ACTIVE ACQ SIGHT");  /* Display mode */
                    _settextposition(MAIN_TRACKING); _outtext(buffer);
                    _settextposition(MAIN_WAYPOINT); _outtext(blank_waypoint);
                    break;
                case(F7):                               /* IRDS active pointing device */
                    tracking = ACTIVE_IRDS;             /* Set tracking mode */
                    sprintf(buffer, "ACTIVE IRDS       ");  /* Display mode */
                    _settextposition(MAIN_TRACKING); _outtext(buffer);
                    _settextposition(MAIN_WAYPOINT); _outtext(blank_waypoint);
                    break;
                case(F8):
                    /* Select desired waypoint to track */
                    select_waypoint(keyboard_input);

/* Toggle cursor on (toggled off below) */
                    _putimage(((text.col + char_pointer - 1) * CURSOR_WD
                            - console_graphics.X_Center,
                            (text.row - 1) * CURSOR_HT - console_graphics.Y_Center,
                            cursor_ind, _GXOR);
                    break;
                case(F9):                               /* Not used at this time */
/* Code added 21-Mar-1996 to added triangulation feature */
                    pointing_input.Az = gimbal_input.Az;
                    pointing_input.El = gimbal_input.El;
                    triangulate_location();             /* Triangulate location */
                    display_location = YES;

/* Ensure angle warning message is updated */
```

161

Navy Case No. 77257

```
                    _settextposition(ANGLE_WARNING_LOC);
                    if(Insufficient_Angle_Warning == YES)
                        _outtext("WARNING Insufficient Triangulation Angle");
                    else
                        _outtext("                                          ");
/* End of added code */
                    break;
                case(F10):                              /* Display current object location */
                    pointing_input.Az = gimbal_input.Az;
                    pointing_input.El = gimbal_input.El;
                    display_location = YES;
/* Code added 21-Mar-1996 to add triangulation feature */
                    estimate_location();                /* Estimate location */

/* Ensure angle warning message is cleared */
                    _settextposition(ANGLE_WARNING_LOC);
                    _outtext("                                          ");
/* End of added code */
                    break;
                case(X_ENTER):
                case(ENTER):                            /* Process new estimated altitude */
                    if(char_string[0] != '\0')
                    {
                        /* Convert input to estimated altitude */
                        estimated_altitude = atof(&char_string[0]);

/* Update console location display */
                        if(display_location != NO)
                        {
/* Code change 25-Mar-1996 to fix new estimated altitude error from:
                            estimate_location();
to: */
                            re_estimate_location();     /* Calculate location */
/* End of code change */
                            console_location_display(); /* Update displays */
                            overlay2_location_display();

/* Back to the console display board */
                            current_port = switch_monitors(CONSOLE, current_port);
                        }

/* Reset pointer */
                        char_pointer = 0;
                        _settextposition(text.row, text.col);
                    }
                    break;
                default:                                /* Build new estimated altitude */
                    numeral_string_input(keyboard_input);
                    if(char_pointer > 6)                /* Can't exceed 6 characters */
                    {
                        char_pointer = 6;
                        char_string[char_pointer] = '\0';  /* Null character */
                        sprintf(buffer, " ");           /* Blank displayed character */
                        _settextposition(text.row, text.col + 6);
                        _outtext(buffer);
                        _settextposition(text.row, text.col + 6);
```

162

Navy Case No. 77257

```
                        }
                        break;
            }

/* Toggle cursor (simulated) */
            _putimage(((text.col + char_pointer - 1) * CURSOR_WD
                    - console_graphics.X_Center,
                    (text.row - 1) * CURSOR_HT - console_graphics.Y_Center,
                    cursor_ind, _GXOR);
    }
}

/****************************************************************************
Function Name:    exit_message()
Number/Version:
History:
        Date            Rev         Author          Description
        7-Aug-1995      1.00        C. Houlberg     Baseline Abstract:   Display the exit message and wait for conformation.
****************************************************************************/
void exit_message(unsigned short keyboard_input)
{
    if(mode != EXIT_MESSAGE)
    {
            /* Establish new mode */
            mode = EXIT_MESSAGE;

/* Clear cursor (simulated) */
            _putimage(((text.col + char_pointer - 1) * CURSOR_WD
                    - console_graphics.X_Center,
                    (text.row -1) * CURSOR_HT - console_graphics.Y_Center,
                    cursor_ind, _GXOR);

/* Display the exit message */
            _settextposition(EXIT_MESSAGE_LOC);
            _outtext("Exit Program? (Y/N): _");
    }
    else
    {
            switch(keyboard_input >> 8)
            {
                    case(YES_KEY):
                            mode = EXIT;
                            break;
                    default:
                            /* Re-establish the mode as MAIN_SCREEN */
                            mode = MAIN_SCREEN;

/* Clear exit message */
                            _settextposition(EXIT_MESSAGE_LOC);
                            _outtext("                         ");

/* Display cursor (simulated) */
                            _putimage(((text.col + char_pointer - 1) * CURSOR_WD
                                    - console_graphics.X_Center,
                                    (text.row -1) * CURSOR_HT - console_graphics.Y_Center,
```

Navy Case No. 77257

```
                        cursor_ind, _GXOR);
                break;
        }
    }
}
/**************************************************************************
Function Name:   help_menu()
Number/Version:
History:
        Date            Rev         Author          Description
        13-Feb-1995     1.00        C. Houlberg     Baseline Abstract:    Display help menu.
**************************************************************************/
void help_menu(void)
{
    /* Establish new mode */
    mode = HELP_MENU;

/* Display the help screen */
    help_screen();
}

/**************************************************************************
Function Name:   setup()
Number/Version:
History:
        Date            Rev         Author          Description
        13-Feb-1995     1.00        C. Houlberg     Baseline
        6-Feb-1996      1.03        C. Houlberg     Added global function key.
        7-Feb-1996      1.03        C. Houlberg     Password made case insensitive.
        26-Mar-1996     1.04        C. Houlberg     Changed order of setup items.

Abstract:    System setup and calibration.
**************************************************************************/
void setup(unsigned short keyboard_input)
{
    /* Variable declarations */
    char buffer[KEY_BUFFER_SIZE];                   /* Character buffer */
    char magic_word[] = "peekaboo";

/* Set end of buffer string */
    buffer[1] = '\0';

/* Process setup key input */
    if(mode != SETUP)
    {
        /* Establish new mode */
        mode = SETUP;

/* Display the main setup screen */
        setup_screen();

/* Set up for password */
        line_item = '8';                            /* Waypoint line item */
        char_pointer = 0;                           /* Beginning of password */
```

Navy Case No. 77257

```
            sprintf(char_string, "");                      /* Clear string */
/* Code change 8-Feb-1996 for user friendly password entry from:
            password_valid = NO;
            _settextposition(SETUP_PASSWORD + 32);
to: */
            _settextposition(SETUP_PASSWORD + 16);
/* End of code change */
            text = _gettextposition();
      }
      else
      {
/* Code deleted 8-Feb-1996 for user friendly password entry:
            _putimage((text.col + char_pointer - 1) * CURSOR_WD
                    - console_graphics.X_Center,
                    (text.row -1) * CURSOR_HT - console_graphics.Y_Center,
                    cursor_ind, _GXOR);
End of code deletion */

/* Added code 5 Feb 1996 to include global function key execution */
            /* Check for global function key input */
            global_function_key(keyboard_input);      /* Test for function key */
/* End of added code */

/* Code added 7-Feb-1996 for global waypoint selection */
            global_alt_key(keyboard_input);
/* End of added code */

/* Process selection */
/* Code changed 8-Feb-1996 for user friendly password entry from:
            if((line_item == 8) && ((0xff & keyboard_input) == '8'))
            {
                    edit_waypoints(keyboard_input);
to: */
            if(line_item == '8')              /* Passworded item not selected */
            {
                    /* Waypoint editing requires no password */
                    if((0xff & keyboard_input) == '8')
                    {
                            edit_waypoints(keyboard_input);

/* Toggle cursor on */
                            _putimage((text.col + char_pointer - 1) * CURSOR_WD
                                    - console_graphics.X_Center,
                                    (text.row - 1) * CURSOR_HT - console_graphics.Y_Center,
                                    cursor_ind, _GXOR);
                    }
                    else if(('1' <= (0xff & keyboard_input))
                            && ((0xff & keyboard_input) <= '7'))
                    {
                            line_item = 0xff & keyboard_input;
                            sprintf(buffer, "Enter password:");
                            _settextposition(SETUP_PASSWORD); _outtext(buffer);

/* Toggle cursor on */
                            _putimage((text.col + char_pointer - 1) * CURSOR_WD
                                    - console_graphics.X_Center,
                                    (text.row - 1) * CURSOR_HT - console_graphics.Y_Center,
```

165

Navy Case No. 77257

```
                            cursor_ind, _GXOR);
                }
/* End of code change */
        }
            else                                    /* Process password */
            {
/* Code deleted 8-Feb-1996 for user friendly password entry:
                if(password_valid == NO)
                {
                        line_item = 1;
End of deleted code */

/* Code added 8-Feb-1996 for user friendly password entry */
                /* Clear cursor (simulated) */
                _putimage((text.col + char_pointer - 1) * CURSOR_WD
                        - console_graphics.X_Center,
                        (text.row - 1) * CURSOR_HT - console_graphics.Y_Center,
                        cursor_ind, _GXOR);
/* End of added code */

/* Build password */
                ascii_string_input(keyboard_input);
                if(char_pointer)
                {
                        buffer[0] = '*';
                        _settextposition(text.row, text.col + char_pointer - 1);
                        _outtext(buffer);
                }

/* Test password */
                if(((keyboard_input >> 8) == ENTER)
                        || ((keyboard_input >> 8) == X_ENTER))
/* Code changed 7-Feb-1996 to make password case insensitive from:
                        if(!strcmp(char_string, magic_word))
to: */
                        if(!_stricmp(char_string, magic_word))
/* End of code change */
                        {
/* Code deleted 8-Feb-1996 for user friendly password entry:
                                password_valid = YES;
                                sprintf(buffer,
                                        "ACCEPTED                          ");
                                _settextposition(SETUP_PASSWORD + 32);
                                _outtext(buffer);
                        }
                        else
                        {
End of deleted code */
/* Code change 8-Feb-1996 for user friendly password entry from:
                        switch (0xff & keyboard_input)
to: */
                        switch(line_item)           /* Function line item */
/* End of code change */
                        {
                                case('1'):
```

166

Navy Case No. 77257

```c
                                    calibrate_ins(keyboard_input);
                                    /* Toggle cursor on (toggled off below) */
                                    _putimage((text.col + char_pointer - 1)
                                            * CURSOR_WD - console_graphics.X_Center,
                                            (text.row -1) * CURSOR_HT
                                            - console_graphics.Y_Center,
                                            cursor_ind, _GXOR);
                                    break;
                            case('2'):          /* Changed from item 3 to item 2 */
                                    calibrate_gimbal_drive(keyboard_input);
                                    break;
                            case('3'):          /* Changed from item 4 to item 3 */
                                    calibrate_gimbal_input(keyboard_input);
                                    break;
                            case('4'):          /* Changed from item 2 to item 4 */
                                    calibrate_acq_sight(keyboard_input);
                                    break;
                            case('5'):
                                    calibrate_irds(keyboard_input);
                                    break;
                            case('6'):
                                    adjust_tracking_box(keyboard_input);
                                    /* Toggle cursor on (toggled off below) */
                                    _putimage((text.col + char_pointer - 1)
                                            * CURSOR_WD - console_graphics.X_Center,
                                            (text.row -1) * CURSOR_HT
                                            - console_graphics.Y_Center,
                                            cursor_ind, _GXOR);
                                    break;
                            case('7'):
                                    set_gimbal_limits(keyboard_input);
                                    break;
                            }
                    }

/* Display cursor (simulated) */
                    _putimage((text.col + char_pointer - 1) * CURSOR_WD
                            - console_graphics.X_Center,
                            (text.row -1) * CURSOR_HT - console_graphics.Y_Center,
                            cursor_ind, _GXOR);
            }

/* Test for return to main screen */
            if((keyboard_input >> 8) == ESC)            /* Test scan code */
            {
/* Code added 8-Feb-1996 for user friendly password input */
                    if(line_item != '8')                /* Allow selection again */
                    {
                            /* Toggle cursor off */
                            _putimage((text.col + char_pointer - 1) * CURSOR_WD
                                    - console_graphics.X_Center,
                                    (text.row -1) * CURSOR_HT - console_graphics.Y_Center,
                                    cursor_ind, _GXOR);

line_item = '8';
                            sprintf(buffer, "                    ");
                            _settextposition(SETUP_PASSWORD); _outtext(buffer);
```

Navy Case No. 77257

```
                        sprintf(buffer, "                                          ");
                        _settextposition(SETUP_PASSWORD + 16); _outtext(buffer);
                        char_pointer = 0;                      /* Beginning of password */
                        sprintf(char_string, "");              /* Clear string */
                        _settextposition(SETUP_PASSWORD + 16);
                }
                else
/* End of added code */
                        main_screen(keyboard_input);
        }
/* Code deleted 8-Feb-1996 for user friendly password entry:
        else
        {
                _putimage((text.col + char_pointer - 1) * CURSOR_WD
                        - console_graphics.X_Center,
                        (text.row -1) * CURSOR_HT - console_graphics.Y_Center,
                        cursor_ind, _GXOR);
        }
End of deleted code */
    }
}

/****************************************************************************
Function Name:  calibrate_ins()
Number/Version:
History:
        Date            Rev     Author          Description
        6-Mar-1995      1.00    C. Houlberg     Baseline
        6-Feb-1996      1.03    C. Houlberg     Added global function key.

Abstract:  INS calibration.
****************************************************************************/
void calibrate_ins(unsigned short keyboard_input)
{
        /* Variable declarations */
        FILE *file_pointer;                            /* Pointer into file */
        char buffer[7];                                /* 6 character buffer */
        struct File_Location data_location;            /* File location of data */

/* Process INS calibration key input */
        if(mode != CALIBRATE_INS)
        {
                /* Establish new mode */
                mode = CALIBRATE_INS;

/* Display the INS calibration screen */
                calibrate_ins_screen();

/* Display uncorrected heading and heading */
                sprintf(buffer, "%6.2f", (platform.Heading
                        - setup_parameters.INS_Correction) * 180.0/PI);
                _settextposition(INS_LINE5 + 36); _outtext(buffer);
                sprintf(buffer, "%6.2f", platform.Heading * 180.0/PI);
                _settextposition(INS_LINE6 + 36); _outtext(buffer);
        }
        else
        {
```

168

Navy Case No. 77257

```
/* Added code 5 Feb 1996 to include global function key execution */
          /* Check for global function key input */
          global_function_key(keyboard_input);        /* Test scan code */
/* End of added code */

/* Code added 7-Feb-1996 for global waypoint selection */
          global_alt_key(keyboard_input);
/* End of added code */

/* Test for correction to known good heading */
          if(((keyboard_input >> 8) == UP)
             || ((0xff & keyboard_input) == '+'))
          {
                platform.Heading += 0.01 * PI/180.0;
                if(platform.Heading > 2*PI)
                      platform.Heading -= 2*PI;
                setup_parameters.INS_Correction += 0.01 * PI/180.0;
                if(setup_parameters.INS_Correction >= PI)
                      setup_parameters.INS_Correction -= 2*PI;
                sprintf(buffer, "%6.2f", platform.Heading * 180.0/PI);
                _settextposition(INS_LINE6 + 36); _outtext(buffer);
          }
          else if(((keyboard_input >> 8) == DOWN)
             || ((0xff & keyboard_input) == '-'))
          {
                platform.Heading -= 0.01 * PI/180.0;
                if(platform.Heading < 0)
                      platform.Heading += 2*PI;
                setup_parameters.INS_Correction -= 0.01 * PI/180.0;
                if(setup_parameters.INS_Correction < -PI)
                      setup_parameters.INS_Correction += 2*PI;
                sprintf(buffer, "%6.2f", platform.Heading * 180.0/PI);
                _settextposition(INS_LINE6 + 36); _outtext(buffer);
          }

/* Test to save results */
          if(((keyboard_input >> 8) == ENTER)
             || ((keyboard_input >> 8) == X_ENTER))     /* Test scan code */
          {
                /* Open setup/calibration file for reading and writing */
                if((file_pointer = fopen("setup.cal", "r+")) == '\0')
                {
                      keyboard_error_flags = keyboard_error_flags
                            | CANNOT_OPEN_SETUP;
                      add_error(CANNOT_OPEN_SETUP_FILE);
                }
                else if(keyboard_error_flags & CANNOT_OPEN_SETUP)
                {
                  /* Clear error flag */
                  keyboard_error_flags = keyboard_error_flags
                        & !(CANNOT_OPEN_SETUP);
                  remove_error(CANNOT_OPEN_SETUP_FILE);
                } if(!(keyboard_error_flags & CANNOT_OPEN_SETUP))
                {
                      /* Save the data */
```

169

Navy Case No. 77257

```
            sprintf(data_location.Group, "INS HEADING");
            sprintf(data_location.Item, "CORRECTION");
            data_location.Size = 7;      /* 7 character string */
            sprintf(buffer, "%-7.2f",
                    (setup_parameters.INS_Correction) * 180.0/PI);
            put_calibration(file_pointer, &data_location, buffer);

/* Close the file */
            if(fclose(file_pointer))
            {
                    keyboard_error_flags = keyboard_error_flags
                            | CANNOT_CLOSE_SETUP;
                    add_error(CANNOT_CLOSE_SETUP_FILE);
            }
            else if(keyboard_error_flags & CANNOT_CLOSE_SETUP)
            {
                    /* Clear error flag */
                    keyboard_error_flags = keyboard_error_flags
                            & !(CANNOT_CLOSE_SETUP);
                    remove_error(CANNOT_CLOSE_SETUP_FILE);
            }
        }
    }

/* Test for return to main screen */
    if((keyboard_input >> 8) == ESC)        /* Test scan code */
            main_screen(keyboard_input);
    }
}

/******************************************************************
Function Name:   calibrate_acq_sight()
Number/Version:
History:
    Date            Rev     Author          Description
    6-Mar-1995      1.00    C. Houlberg     Baseline
    6-Feb-1996      1.03    C. Houlberg     Added global function key.

Abstract:  Acquisition sight calibration.
*******************************************************************/
void calibrate_acq_sight(unsigned short keyboard_input)
{
    /* Variable declarations */
    short i;                                            /* Index pointer */
    short shift_status;
    short old_item;
    char buffer[2];                                     /* 1 character buffer */
    FILE *file_pointer;                                 /* Pointer into file */
    struct File_Location data_location;                 /* File location of data */

/* Put terminator in buffer */
    buffer[1] = '\0';

/* Process acquisition sight calibration key input */
    if(mode != CALIBRATE_ACQ_SIGHT)
    {
            /* Establish new mode */
```

Navy Case No. 77257

```
            mode = CALIBRATE_ACQ_SIGHT;

/* Display the acquisition sight calibration screen */
            calibrate_acq_sight_screen();

/* Reset line item indicator and text position */
            line_item = 0;                              /* 1st line item */
            char_pointer = 0;                           /* Beginning of line item */

/* Initially set the cursor position to azimuth scale factor */
            sprintf(char_string, "%4.2f",
                    setup_parameters.acq_sight_calibration.AZ_Factor);
            _settextposition(ACQSIGHT_AZ_FACTOR + 22);

/* Establish the text base row and column */
            text = _gettextposition();
        }
        else
        {
            /* Clear cursor (simulated) */
            _putimage((text.col + char_pointer - 1) * CURSOR_WD
                    - console_graphics.X_Center,
                    (text.row -1) * CURSOR_HT - console_graphics.Y_Center,
                    cursor_ind, _GXOR);

/* Added code 5 Feb 1996 to include global function key execution */
            /* Check for global function key input */
            global_function_key(keyboard_input);         /* Test scan code */
/* End of added code */

/* Code added 7-Feb-1996 for global waypoint selection */
            global_alt_key(keyboard_input);
/* End of added code */

/* Process input */
            numeral_string_input(keyboard_input);

/* Must retain format */
            if((char_string[0] == '-') && ((line_item == 1) || (line_item == 3)))
            {
                /* Negative offset format */
                if(char_string[4] == '\0')          /* Zero deleted character */
                {
                    for(i = 5; i > char_pointer; i--)
                    {
                        char_string[i] = char_string[i - 1];
                        if(char_string[i] == '\0')
                            buffer[0] = ' ';
                        else
                            buffer[0] = char_string[i];
                        _settextposition(text.row, text.col + i);
                        _outtext(buffer);
                    }
                    if(char_pointer == 2)
                        char_string[char_pointer] = '.';
                    else
                        char_string[char_pointer] = '0';
```

171

Navy Case No. 77257

```
                buffer[0] = char_string[char_pointer];
                _settextposition(text.row, text.col + char_pointer);
                _outtext(buffer);
        }
        else
        {
                switch(char_pointer)
                {
                        case(2):
                                if((0xff & keyboard_input) == '.')
                                        ++char_pointer;
                                break;
                        case(3):
                                char_string[char_pointer - 1] = '.';
                                buffer[0] = '.';
                                _settextposition(text.row,
                                        text.col + char_pointer - 1);
                                _outtext(buffer);
                                break;
                        case(6):
                                --char_pointer;
                                char_string[char_pointer] = '\0';
                                buffer[0] = ' ';
                                _settextposition(text.row, text.col + char_pointer);
                                _outtext(buffer);
                                break;
                }
        }
}
else                                            /* Positive number format */
{
        if(char_string[3] == '\0')              /* Zero deleted character */
        {
                for(i = 4; i > char_pointer; i--)
                {
                        char_string[i] = char_string[i - 1];
                        if(char_string[i] == '\0')
                                buffer[0] = ' ';
                        else
                                buffer[0] = char_string[i];
                        _settextposition(text.row, text.col + i);
                        _outtext(buffer);
                }
                if(char_pointer == 1)
                        char_string[char_pointer] = '.';
                else
                        char_string[char_pointer] = '0';
                buffer[0] = char_string[char_pointer];
                _settextposition(text.row, text.col + char_pointer);
                _outtext(buffer);
        }
        else
        {
                switch(char_pointer)
                {
                        case(1):
                                if(char_string[0] == '-')
```

172

Navy Case No. 77257

```
                {
                        for(i = 0; char_string[i] != '\0'; i++)
                        {
                                char_string[i] = char_string[i + 1];
                                if(char_string[i] == '\0')
                                        buffer[0] = ' ';
                                else
                                        buffer[0] = char_string[i];
                                _settextposition(text.row, text.col + i);
                                _outtext(buffer);
                        }
                        --char_pointer;
                }
                else if((0xff & keyboard_input) == '.')
                        ++char_pointer;
                break;
        case(2):
                char_string[char_pointer - 1] = '.';
                buffer[0] = '.';
                _settextposition(text.row,
                        text.col + char_pointer - 1);
                _outtext(buffer);
                break;
        case(5):
                --char_pointer;
                char_string[char_pointer] = '\0';
                buffer[0] = ' ';
                _settextposition(text.row, text.col + char_pointer);
                _outtext(buffer);
                break;
        }
    }
}

/* Set cursor location */
_settextposition(text.row, text.col + char_pointer);

/* Test for new line item */
old_item = line_item;
switch(keyboard_input >> 8)        /* Test scan code */
{
    case(ESC):                              /* Test for return to main screen */
        main_screen(keyboard_input);
        /* Toggle cursor off (toggled on below) */
        _putimage((text.col + char_pointer - 1) * CURSOR_WD
                - console_graphics.X_Center,
                (text.row -1) * CURSOR_HT - console_graphics.Y_Center,
                cursor_ind, _GXOR);
        break;
    case(TAB):                              /* Select item */
        /* Update last item edited */
        update_acqsight_item(line_item);
        shift_status = (LEFT_SHIFT_KEY | RIGHT_SHIFT_KEY)
                & _bios_keybrd(_NKEYBRD_SHIFTSTATUS);
        if((shift_status == LEFT_SHIFT_KEY)
                || (shift_status == RIGHT_SHIFT_KEY))
        {
```

Navy Case No. 77257

```c
                if(line_item)
                        --line_item;
                else
                        line_item = 3;    /* Roll over to last line item */
        }
        else
        {
                if(line_item == 3)
                        line_item = 0;    /* Roll over to 1st line item */
                else
                        ++line_item;
        }
        break;
case(UP):                                 /* Select previous line */
        /* Update last item edited */
        update_acqsight_item(line_item);
        if(line_item)
                --line_item;
        else
                line_item = 3;            /* Roll over to last line item */
        break;
case(DOWN):                               /* Select next line */
        /* Update last item edited */
        update_acqsight_item(line_item);
        if(line_item == 3)
                line_item = 0;            /* Roll over to 1st line item */
        else
                ++line_item;
        break;
case(X_ENTER):
case(ENTER):                              /* Save all waypoints */
        /* Update last item edited */
        update_acqsight_item(line_item);

/* Point to next line */
        if(line_item == 3)
                line_item = 0;            /* Roll over to 1st line item */
        else
                ++line_item;

/* Open setup/calibration file for reading and writing */
        if((file_pointer = fopen("setup.cal", "r+")) == '\0')
        {
                keyboard_error_flags = keyboard_error_flags
                        | CANNOT_OPEN_SETUP;
                add_error(CANNOT_OPEN_SETUP_FILE);
        }
        else if(keyboard_error_flags & CANNOT_OPEN_SETUP)
        {
                /* Clear error flag */
                keyboard_error_flags = keyboard_error_flags
                        & !(CANNOT_OPEN_SETUP);
                remove_error(CANNOT_OPEN_SETUP_FILE);
        } if(!(keyboard_error_flags & CANNOT_OPEN_SETUP))
        {
```

174

Navy Case No. 77257

```
                /* Save the data */
                sprintf(data_location.Group, "ACQ SIGHT");
                sprintf(data_location.Item, "AZ FACTOR");
                data_location.Size = 4;              /* 4 character string */
                sprintf(char_string, "%4.2f",
                        setup_parameters.acq_sight_calibration.AZ_Factor);
                put_calibration(file_pointer, &data_location, char_string);
                sprintf(data_location.Item, "AZ OFFSET");
                data_location.Size = 5;              /* 5 character string */
                sprintf(char_string, "%-5.2f",
                        setup_parameters.acq_sight_calibration.AZ_Offset);
                put_calibration(file_pointer, &data_location, char_string);
                sprintf(data_location.Item, "EL FACTOR");
                data_location.Size = 4;              /* 4 character string */
                sprintf(char_string, "%4.2f",
                        setup_parameters.acq_sight_calibration.EL_Factor);
                put_calibration(file_pointer, &data_location, char_string);
                sprintf(data_location.Item, "EL OFFSET");
                data_location.Size = 5;              /* 5 character string */
                sprintf(char_string, "%-5.2f",
                        setup_parameters.acq_sight_calibration.EL_Offset);
                put_calibration(file_pointer, &data_location, char_string);

/* Close the file */
                if(fclose(file_pointer))
                {
                        keyboard_error_flags = keyboard_error_flags
                                | CANNOT_CLOSE_SETUP;
                        add_error(CANNOT_CLOSE_SETUP_FILE);
                }
                else if(keyboard_error_flags & CANNOT_CLOSE_SETUP)
                {
                    /* Clear error flag */
                    keyboard_error_flags = keyboard_error_flags
                        & ~(CANNOT_CLOSE_SETUP);
                    remove_error(CANNOT_CLOSE_SETUP_FILE);
                }
            }
            break;
    }
    /* Reposition cursor if line item changed */
    if(line_item != old_item)
    {
        char_pointer = 0;                  /* Beginning of item */
        switch(line_item)
        {
            case(0):
                _settextposition(ACQSIGHT_AZ_FACTOR + 22);
                sprintf(char_string, "%4.2f",
                        setup_parameters.acq_sight_calibration.AZ_Factor);
                break;
            case(1):
                _settextposition(ACQSIGHT_AZ_OFFSET + 24);
                sprintf(char_string, "%-5.2f",
                        setup_parameters.acq_sight_calibration.AZ_Offset);
                break;
```

Navy Case No. 77257

```
                case(2):
                    _settextposition(ACQSIGHT_EL_FACTOR + 24);
                    sprintf(char_string, "%4.2f",
                            setup_parameters.acq_sight_calibration.EL_Factor);
                    break;
                case(3):
                    _settextposition(ACQSIGHT_EL_OFFSET + 26);
                    sprintf(char_string, "%-5.2f",
                            setup_parameters.acq_sight_calibration.EL_Offset);
                    break;
            }

/* Establish base row and column */
            text = _gettextposition();
        }

/* Display cursor (simulated) */
        _putimage((text.col + char_pointer - 1) * CURSOR_WD
                - console_graphics.X_Center,
                (text.row - 1) * CURSOR_HT - console_graphics.Y_Center,
                cursor_ind, _GXOR);
    }
}

/************************************************************************
Function Name:  update_acqsight_item()
Number/Version:
History:
    Date            Rev         Author          Description
    5-Apr-1995      1.00        C. Houlberg     Baseline Abstract:   Update line item to activate entry.
************************************************************************/
void update_acqsight_item(short item)
{
    switch(item)
    {
        case(0):
            /* Update item */
            setup_parameters.acq_sight_calibration.AZ_Factor
                    = atof(char_string);
            /* Recall item */
            sprintf(char_string, "%4.2f",
                    setup_parameters.acq_sight_calibration.AZ_Factor);
            /* Display location */
            _settextposition(ACQSIGHT_AZ_FACTOR + 22);
            break;
        case(1):
            /* Update item */
            setup_parameters.acq_sight_calibration.AZ_Offset
                    = atof(char_string);
            /* Recall item */
            sprintf(char_string, "%-5.2f",
                    setup_parameters.acq_sight_calibration.AZ_Offset);
            /* Display location */
            _settextposition(ACQSIGHT_AZ_OFFSET + 24);
            break;
```

176

Navy Case No. 77257

```
            case(2):
                /* Update item */
                setup_parameters.acq_sight_calibration.EL_Factor
                        = atof(char_string);
                /* Recall item */
                sprintf(char_string, "%4.2f",
                        setup_parameters.acq_sight_calibration.EL_Factor);
                /* Display location */
                _settextposition(ACQSIGHT_EL_FACTOR + 24);
                break;
            case(3):
                /* Update item */
                setup_parameters.acq_sight_calibration.EL_Offset
                        = atof(char_string);
                /* Recall item */
                sprintf(char_string, "%-5.2f",
                        setup_parameters.acq_sight_calibration.EL_Offset);
                /* Display location */
                _settextposition(ACQSIGHT_EL_OFFSET + 26);
                break;
        }
        /* Display processed item */
        _outtext(char_string);
}
/****************************************************************************
Function Name:   calibrate_gimbal_drive()
Number/Version:
History:
        Date            Rev     Author          Description
        3-Aug-1995      1.00    C. Houlberg     Baseline
        6-Feb-1996      1.03    C. Houlberg     Added global function key.

Abstract:   Gimbal drive calibration.
****************************************************************************/
void calibrate_gimbal_drive(unsigned short keyboard_input)
{
        /* Variable declarations */
        short i;                                                /* Index pointer */
        short shift_status;
        short old_item;
        char buffer[2];                                         /* 1 character buffer */
        FILE *file_pointer;                                     /* Pointer into file */
        struct File_Location data_location;     /* File location of data */

/* Put terminator in buffer */
        buffer[1] = '\0';

/* Process acquisition sight calibration key input */
        if(mode != CALIBRATE_GIMBAL_DRIVE)
        {
                /* Establish new mode */
                mode = CALIBRATE_GIMBAL_DRIVE;

/* Display the acquisition sight calibration screen */
                calibrate_gimbal_drive_screen();
```

Navy Case No. 77257

```c
        /* Reset line item indicator and text position */
        line_item = 0;                              /* 1st line item */
        char_pointer = 0;                           /* Beginning of line item */

/* Initially set the cursor position to azimuth scale factor */
        sprintf(char_string, "%4.2f",
                setup_parameters.gimbal_drive_calibration.AZ_Factor);
        _settextposition(GIMDRIVE_AZ_FACTOR + 22);

/* Establish the text base row and column */
        text = _gettextposition();
    }
    else
    {
        /* Clear cursor (simulated) */
        _putimage((text.col + char_pointer - 1) * CURSOR_WD
                - console_graphics.X_Center,
            (text.row -1) * CURSOR_HT - console_graphics.Y_Center,
            cursor_ind, _GXOR);

/* Added code 5 Feb 1996 to include global function key execution */
        /* Check for global function key input */
        global_function_key(keyboard_input);         /* Test scan code */
/* End of added code */

/* Code added 7-Feb-1996 for global waypoint selection */
        global_alt_key(keyboard_input);
/* End of added code */

/* Process input */
        numeral_string_input(keyboard_input);

/* Must retain format */
        if((char_string[0] == '-') && ((line_item == 1) || (line_item == 3)))
        {
            /* Negative offset format */
            if(char_string[4] == '\0')               /* Zero deleted character */
            {
                for(i = 5; i > char_pointer; i--)
                {
                    char_string[i] = char_string[i - 1];
                    if(char_string[i] == '\0')
                        buffer[0] = ' ';
                    else
                        buffer[0] = char_string[i];
                    _settextposition(text.row, text.col + i);
                    _outtext(buffer);
                }
                if(char_pointer == 2)
                    char_string[char_pointer] = '.';
                else
                    char_string[char_pointer] = '0';
                buffer[0] = char_string[char_pointer];
                _settextposition(text.row, text.col + char_pointer);
                _outtext(buffer);
            }
            else
```

178

Navy Case No. 77257

```
                {
                        switch(char_pointer)
                        {
                                case(2):
                                        if((0xff & keyboard_input) == '.')
                                                ++char_pointer;
                                        break;
                                case(3):
                                        char_string[char_pointer - 1] = '.';
                                        buffer[0] = '.';
                                        _settextposition(text.row,
                                                text.col + char_pointer - 1);
                                        _outtext(buffer);
                                        break;
                                case(6):
                                        --char_pointer;
                                        char_string[char_pointer] = '\0';
                                        buffer[0] = ' ';
                                        _settextposition(text.row, text.col + char_pointer);
                                        _outtext(buffer);
                                        break;
                        }
                }
        }
        else                                            /* Positive number format */
        {
                if(char_string[3] == '\0')              /* Zero deleted character */
                {
                        for(i = 4; i > char_pointer; i--)
                        {
                                char_string[i] = char_string[i - 1];
                                if(char_string[i] == '\0')
                                        buffer[0] = ' ';
                                else
                                        buffer[0] = char_string[i];
                                _settextposition(text.row, text.col + i);
                                _outtext(buffer);
                        }
                        if(char_pointer == 1)
                                char_string[char_pointer] = '.';
                        else
                                char_string[char_pointer] = '0';
                        buffer[0] = char_string[char_pointer];
                        _settextposition(text.row, text.col + char_pointer);
                        _outtext(buffer);
                }
                else
                {
                        switch(char_pointer)
                        {
                                case(1):
                                        if(char_string[0] == '-')
                                        {
                                                for(i = 0; char_string[i] != '\0'; i++)
                                                {
                                                        char_string[i] = char_string[i + 1];
                                                        if(char_string[i] == '\0')
```

179

Navy Case No. 77257

```c
                                buffer[0] = ' ';
                        else
                                buffer[0] = char_string[i];
                        _settextposition(text.row, text.col + i);
                        _outtext(buffer);
                }
                --char_pointer;
            }
            else if((0xff & keyboard_input) == '.')
                ++char_pointer;
            break;
        case(2):
            char_string[char_pointer - 1] = '.';
            buffer[0] = '.';
            _settextposition(text.row,
                    text.col + char_pointer - 1);
            _outtext(buffer);
            break;
        case(5):
            --char_pointer;
            char_string[char_pointer] = '\0';
            buffer[0] = ' ';
            _settextposition(text.row, text.col + char_pointer);
            _outtext(buffer);
            break;
        }
    }
}

/* Set cursor location */
_settextposition(text.row, text.col + char_pointer);

/* Test for new line item */
old_item = line_item;
switch(keyboard_input >> 8)       /* Test scan code */
{
    case(ESC):                              /* Test for return to main screen */
        main_screen(keyboard_input);
        /* Toggle cursor off (toggled on below) */
        _putimage((text.col + char_pointer - 1) * CURSOR_WD
                - console_graphics.X_Center,
                (text.row -1) * CURSOR_HT - console_graphics.Y_Center,
                cursor_ind, _GXOR);
        break;
    case(TAB):                              /* Select item */
        /* Update last item edited */
        update_gimbal_drive_item(line_item);
        shift_status = (LEFT_SHIFT_KEY | RIGHT_SHIFT_KEY)
                & _bios_keybrd(_NKEYBRD_SHIFTSTATUS);
        if((shift_status == LEFT_SHIFT_KEY)
                || (shift_status == RIGHT_SHIFT_KEY))
        {
            if(line_item)
                --line_item;
            else
                line_item = 3;    /* Roll over to last line item */
        }
```

180

Navy Case No. 77257

```
        else
        {
                if(line_item == 3)
                        line_item = 0;      /* Roll over to 1st line item */
                else
                        ++line_item;
        }
        break;
case(UP):                               /* Select previous line */
        /* Update last item edited */
        update_gimbal_drive_item(line_item);
        if(line_item)
                --line_item;
        else
                line_item = 3;          /* Roll over to last line item */
        break;
case(DOWN):                             /* Select next line */
        /* Update last item edited */
        update_gimbal_drive_item(line_item);
        if(line_item == 3)
                line_item = 0;          /* Roll over to 1st line item */
        else
                ++line_item;
        break;
case(X_ENTER):
case(ENTER):                            /* Save all waypoints */
        /* Update last item edited */
        update_gimbal_drive_item(line_item);

/* Point to next line */
        if(line_item == 3)
                line_item = 0;          /* Roll over to 1st line item */
        else
                ++line_item;

/* Open setup/calibration file for reading and writing */
        if((file_pointer = fopen("setup.cal", "r+")) == '\0')
        {
                keyboard_error_flags = keyboard_error_flags
                        | CANNOT_OPEN_SETUP;
                add_error(CANNOT_OPEN_SETUP_FILE);
        }
        else if(keyboard_error_flags & CANNOT_OPEN_SETUP)
        {
           /* Clear error flag */
           keyboard_error_flags = keyboard_error_flags
                   & !(CANNOT_OPEN_SETUP);
           remove_error(CANNOT_OPEN_SETUP_FILE);
        } if(!(keyboard_error_flags & CANNOT_OPEN_SETUP))
        {
                /* Save the data */
                sprintf(data_location.Group, "GIMBAL DRIVE");
                sprintf(data_location.Item, "AZ FACTOR");
                data_location.Size = 4;          /* 4 character string */
                sprintf(char_string, "%4.2f",
```

181

Navy Case No. 77257

```
                        setup_parameters.gimbal_drive_calibration.AZ_Factor);
                put_calibration(file_pointer, &data_location, char_string);
                sprintf(data_location.Item, "AZ OFFSET");
                data_location.Size = 5;             /* 5 character string */
                sprintf(char_string, "%-5.2f",
                        setup_parameters.gimbal_drive_calibration.AZ_Offset);
                put_calibration(file_pointer, &data_location, char_string);
                sprintf(data_location.Item, "EL FACTOR");
                data_location.Size = 4;             /* 4 character string */
                sprintf(char_string, "%4.2f",
                        setup_parameters.gimbal_drive_calibration.EL_Factor);
                put_calibration(file_pointer, &data_location, char_string);
                sprintf(data_location.Item, "EL OFFSET");
                data_location.Size = 5;             /* 5 character string */
                sprintf(char_string, "%-5.2f",
                        setup_parameters.gimbal_drive_calibration.EL_Offset);
                put_calibration(file_pointer, &data_location, char_string);

/* Close the file */
                if(fclose(file_pointer))
                {
                        keyboard_error_flags = keyboard_error_flags
                                | CANNOT_CLOSE_SETUP;
                        add_error(CANNOT_CLOSE_SETUP_FILE);
                }
                else if(keyboard_error_flags & CANNOT_CLOSE_SETUP)
                {
                        /* Clear error flag */
                        keyboard_error_flags = keyboard_error_flags
                                & ~(CANNOT_CLOSE_SETUP);
                        remove_error(CANNOT_CLOSE_SETUP_FILE);
                },
        }
        break;
}
/* Reposition cursor if line item changed */
if(line_item != old_item)
{
        char_pointer = 0;                   /* Beginning of item */
        switch(line_item)
        {
                case(0):
                        _settextposition(GIMDRIVE_AZ_FACTOR + 22);
                        sprintf(char_string, "%4.2f",
                                setup_parameters.gimbal_drive_calibration.AZ_Factor);
                        break;
                case(1):
                        _settextposition(GIMDRIVE_AZ_OFFSET + 24);
                        sprintf(char_string, "%-5.2f",
                                setup_parameters.gimbal_drive_calibration.AZ_Offset);
                        break;
                case(2):
                        _settextposition(GIMDRIVE_EL_FACTOR + 24);
                        sprintf(char_string, "%4.2f",
                                setup_parameters.gimbal_drive_calibration.EL_Factor);
                        break;
```

Navy Case No. 77257

```
                    case(3):
                        _settextposition(GIMDRIVE_EL_OFFSET + 26);
                        sprintf(char_string, "%-5.2f",
                            setup_parameters.gimbal_drive_calibration.EL_Offset);
                        break;
                }

/* Establish base row and column */
                text = _gettextposition();
            }

/* Display cursor (simulated) */
            _putimage((text.col + char_pointer - 1) * CURSOR_WD
                - console_graphics.X_Center,
                (text.row -1) * CURSOR_HT - console_graphics.Y_Center,
                cursor_ind, _GXOR);
        }
}
/************************************************************************
Function Name:   update_gimbal_drive_item()
Number/Version:
History:
    Date          Rev       Author            Description
    3-Aug-1995    1.00      C. Houlberg       Baseline Abstract:   Update line item to activate entry.
*************************************************************************/
void update_gimbal_drive_item(short item)
{
    switch(item)
    {
        case(0):
            /* Update item */
            setup_parameters.gimbal_drive_calibration.AZ_Factor
                = atof(char_string);
            /* Recall item */
            sprintf(char_string, "%4.2f",
                setup_parameters.gimbal_drive_calibration.AZ_Factor);
            /* Display location */
            _settextposition(GIMDRIVE_AZ_FACTOR + 22);
            break;
        case(1):
            /* Update item */
            setup_parameters.gimbal_drive_calibration.AZ_Offset
                = atof(char_string);
            /* Recall item */
            sprintf(char_string, "%-5.2f",
                setup_parameters.gimbal_drive_calibration.AZ_Offset);
            /* Display location */
            _settextposition(GIMDRIVE_AZ_OFFSET + 24);
            break;
        case(2):
            /* Update item */
            setup_parameters.gimbal_drive_calibration.EL_Factor
                = atof(char_string);
            /* Recall item */
```

Navy Case No. 77257

```
                sprintf(char_string, "%4.2f",
                        setup_parameters.gimbal_drive_calibration.EL_Factor);
                /* Display location */
                _settextposition(GIMDRIVE_EL_FACTOR + 24);
                break;
            case(3):
                /* Update item */
                setup_parameters.gimbal_drive_calibration.EL_Offset
                        = atof(char_string);
                /* Recall item */
                sprintf(char_string, "%-5.2f",
                        setup_parameters.gimbal_drive_calibration.EL_Offset);
                /* Display location */
                _settextposition(GIMDRIVE_EL_OFFSET + 26);
                break;
        }
        /* Display processed item */
        _outtext(char_string);
}
/********************************************************************
Function Name:      calibrate_gimbal_input()
Number/Version:
History:
        Date            Rev         Author          Description
        3-Aug-1995      1.00        C. Houlberg     Baseline
        6-Feb-1996      1.03        C. Houlberg     Added global function key.

Abstract:   Gimbal input calibration.
*********************************************************************/
void calibrate_gimbal_input(unsigned short keyboard_input)
{
        /* Variable declarations */
        short i;                                        /* Index pointer */
        short shift_status;
        short old_item;
        char buffer[2];                                 /* 1 character buffer */
        FILE *file_pointer;                             /* Pointer into file */
        struct File_Location data_location;     /* File location of data */

/* Put terminator in buffer */
        buffer[1] = '\0';

/* Process acquisition sight calibration key input */
        if(mode != CALIBRATE_GIMBAL_INPUT)
        {
                /* Establish new mode */
                mode = CALIBRATE_GIMBAL_INPUT;

/* Display the acquisition sight calibration screen */
                calibrate_gimbal_input_screen();

/* Reset line item indicator and text position */
                line_item = 0;                          /* 1st line item */
                char_pointer = 0;                       /* Beginning of line item */

/* Initially set the cursor position to azimuth scale factor */
```

184

Navy Case No. 77257

```
            sprintf(char_string, "%4.2f",
                setup_parameters.gimbal_input_calibration.AZ_Factor);
            _settextposition(GIMINPUT_AZ_FACTOR + 22);

/* Establish the text base row and column */
            text = _gettextposition();
        }
        else
        {
            /* Clear cursor (simulated) */
            _putimage((text.col + char_pointer - 1) * CURSOR_WD
                    - console_graphics.X_Center,
                    (text.row -1) * CURSOR_HT - console_graphics.Y_Center,
                    cursor_ind, _GXOR);

/* Added code 5 Feb 1996 to include global function key execution */
            /* Check for global function key input */
            global_function_key(keyboard_input);         /* Test scan code */
/* End of added code */

/* Code added 7-Feb-1996 for global waypoint selection */
            global_alt_key(keyboard_input);
/* End of added code */

/* Process input */
            numeral_string_input(keyboard_input);

/* Must retain format */
            if((char_string[0] == '-') && ((line_item == 1) || (line_item == 3)))
            {
                /* Negative offset format */
                if(char_string[4] == '\0')        /* Zero deleted character */
                {
                    for(i = 5; i > char_pointer; i--)
                    {
                        char_string[i] = char_string[i - 1];
                        if(char_string[i] == '\0')
                            buffer[0] = ' ';
                        else
                            buffer[0] = char_string[i];
                        _settextposition(text.row, text.col + i);
                        _outtext(buffer);
                    }
                    if(char_pointer == 2)
                        char_string[char_pointer] = '.';
                    else
                        char_string[char_pointer] = '0';
                    buffer[0] = char_string[char_pointer];
                    _settextposition(text.row, text.col + char_pointer);
                    _outtext(buffer);
                }
                else
                {
                    switch(char_pointer)
                    {
                        case(2):
                            if((0xff & keyboard_input) == '.')
```

Navy Case No. 77257

```
                                ++char_pointer;
                        break;
                case(3):
                        char_string[char_pointer - 1] = '.';
                        buffer[0] = '.';
                        _settextposition(text.row,
                                text.col + char_pointer - 1);
                        _outtext(buffer);
                        break;
                case(6):
                        --char_pointer;
                        char_string[char_pointer] = '\0';
                        buffer[0] = ' ';
                        _settextposition(text.row, text.col + char_pointer);
                        _outtext(buffer);
                        break;
                }
        }
    }
    else                                        /* Positive number
format */
    {
        if(char_string[3] == '\0')              /* Zero deleted character */
        {
                for(i = 4; i > char_pointer; i--)
                {
                        char_string[i] = char_string[i - 1];
                        if(char_string[i] == '\0')
                                buffer[0] = ' ';
                        else
                                buffer[0] = char_string[i];
                        _settextposition(text.row, text.col + i);
                        _outtext(buffer);
                }
                if(char_pointer == 1)
                        char_string[char_pointer] = '.';
                else
                        char_string[char_pointer] = '0';
                buffer[0] = char_string[char_pointer];
                _settextposition(text.row, text.col + char_pointer);
                _outtext(buffer);
        }
        else
        {
                switch(char_pointer)
                {
                        case(1):
                                if(char_string[0] == '-')
                                {
                                        for(i = 0; char_string[i] != '\0'; i++)
                                        {
                                                char_string[i] = char_string[i + 1];
                                                if(char_string[i] == '\0')
                                                        buffer[0] = ' ';
                                                else
                                                        buffer[0] = char_string[i];
                                                _settextposition(text.row, text.col + i);
```

186

Navy Case No. 77257

```
                                _outtext(buffer);
                        }
                        --char_pointer;
                    }
                    else if((0xff & keyboard_input) == '.')
                        ++char_pointer;
                    break;
                case(2):
                    char_string[char_pointer - 1] = '.';
                    buffer[0] = '.';
                    _settextposition(text.row,
                        text.col + char_pointer - 1);
                    _outtext(buffer);
                    break;
                case(5):
                    --char_pointer;
                    char_string[char_pointer] = '\0';
                    buffer[0] = ' ';
                    _settextposition(text.row, text.col + char_pointer);
                    _outtext(buffer);
                    break;
            }
        }
    }

/* Set cursor location */
    _settextposition(text.row, text.col + char_pointer);

/* Test for new line item */
    old_item = line_item;
    switch(keyboard_input >> 8)           /* Test scan code */
    {
        case(ESC):                            /* Test for return to main screen */
            main_screen(keyboard_input);
            /* Toggle cursor off (toggled on below) */
            _putimage((text.col + char_pointer - 1) * CURSOR_WD
                - console_graphics.X_Center,
                (text.row -1) * CURSOR_HT - console_graphics.Y_Center,
                cursor_ind, _GXOR);
            break;
        case(TAB):                            /* Select item */
            /* Update last item edited */
            update_gimbal_input_item(line_item);
            shift_status = (LEFT_SHIFT_KEY | RIGHT_SHIFT_KEY)
                & _bios_keybrd(_NKEYBRD_SHIFTSTATUS);
            if((shift_status == LEFT_SHIFT_KEY)
                || (shift_status == RIGHT_SHIFT_KEY))
            {
                if(line_item)
                    --line_item;
                else
                    line_item = 3;    /* Roll over to last line item */
            }
            else
            {
                if(line_item == 3)
                    line_item = 0;    /* Roll over to 1st line item */
```

187

Navy Case No. 77257

```c
                else
                        ++line_item;
        }
        break;
case(UP):                               /* Select previous line */
        /* Update last item edited */
        update_gimbal_input_item(line_item);
        if(line_item)
                --line_item;
        else
                line_item = 3;          /* Roll over to last line item */
        break;
case(DOWN):                             /* Select next line */
        /* Update last item edited */
        update_gimbal_input_item(line_item);
        if(line_item == 3)
                line_item = 0;          /* Roll over to 1st line item */
        else
                ++line_item;
        break;
case(X_ENTER):
case(ENTER):                            /* Save all waypoints */
        /* Update last item edited */
        update_gimbal_input_item(line_item);

/* Point to next line */
        if(line_item == 3)
                line_item = 0;          /* Roll over to 1st line item */
        else
                ++line_item;

/* Open setup/calibration file for reading and writing */
        if((file_pointer = fopen("setup.cal", "r+")) == '\0')
        {
                keyboard_error_flags = keyboard_error_flags
                        | CANNOT_OPEN_SETUP;
                add_error(CANNOT_OPEN_SETUP_FILE);
        }
        else if(keyboard_error_flags & CANNOT_OPEN_SETUP)
        {
          /* Clear error flag */
          keyboard_error_flags = keyboard_error_flags
                & !(CANNOT_OPEN_SETUP);
          remove_error(CANNOT_OPEN_SETUP_FILE);
        } if(!(keyboard_error_flags & CANNOT_OPEN_SETUP))
        {
                /* Save the data */
                sprintf(data_location.Group, "GIMBAL INPUT");
                sprintf(data_location.Item, "AZ FACTOR");
                data_location.Size = 4;         /* 4 character string */
                sprintf(char_string, "%4.2f",
                        setup_parameters.gimbal_input_calibration.AZ_Factor);
                put_calibration(file_pointer, &data_location, char_string);
                sprintf(data_location.Item, "AZ OFFSET");
                data_location.Size = 5;         /* 5 character string */
```

188

Navy Case No. 77257

```
            sprintf(char_string, "%-5.2f",
                setup_parameters.gimbal_input_calibration.AZ_Offset);
            put_calibration(file_pointer, &data_location, char_string);
            sprintf(data_location.Item, "EL FACTOR");
            data_location.Size = 4;          /* 4 character string */
            sprintf(char_string, "%4.2f",
                setup_parameters.gimbal_input_calibration.EL_Factor);
            put_calibration(file_pointer, &data_location, char_string);
            sprintf(data_location.Item, "EL OFFSET");
            data_location.Size = 5;          /* 5 character string */
            sprintf(char_string, "%-5.2f",
                setup_parameters.gimbal_input_calibration.EL_Offset);
            put_calibration(file_pointer, &data_location, char_string);

/* Close the file */
            if(fclose(file_pointer))
            {
                keyboard_error_flags = keyboard_error_flags
                    | CANNOT_CLOSE_SETUP;
                add_error(CANNOT_CLOSE_SETUP_FILE);
            }
            else if(keyboard_error_flags & CANNOT_CLOSE_SETUP)
            {
                /* Clear error flag */
                keyboard_error_flags = keyboard_error_flags
                    & !(CANNOT_CLOSE_SETUP);
                remove_error(CANNOT_CLOSE_SETUP_FILE);
            }
        }
        break;
}

/* Reposition cursor if line item changed */
if(line_item != old_item)
{
    char_pointer = 0;               /* Beginning of item */
    switch(line_item)
    {
        case(0):
            _settextposition(GIMINPUT_AZ_FACTOR + 22);
            sprintf(char_string, "%4.2f",
                setup_parameters.gimbal_input_calibration.AZ_Factor);
            break;
        case(1):
            _settextposition(GIMINPUT_AZ_OFFSET + 24);
            sprintf(char_string, "%-5.2f",
                setup_parameters.gimbal_input_calibration.AZ_Offset);
            break;
        case(2):
            _settextposition(GIMINPUT_EL_FACTOR + 24);
            sprintf(char_string, "%4.2f",
                setup_parameters.gimbal_input_calibration.EL_Factor);
            break;
        case(3):
            _settextposition(GIMINPUT_EL_OFFSET + 26);
            sprintf(char_string, "%-5.2f",
                setup_parameters.gimbal_input_calibration.EL_Offset);
```

Navy Case No. 77257

```
                        break;
                }

/* Establish base row and column */
                text = _gettextposition();
        }

/* Display cursor (simulated) */
        _putimage((text.col + char_pointer - 1) * CURSOR_WD
                - console_graphics.X_Center,
                (text.row -1) * CURSOR_HT - console_graphics.Y_Center,
                cursor_ind, _GXOR);
        }
}

/**************************************************************************
Function Name:   update_gimbal_input_item()
Number/Version:
History:
        Date            Rev     Author          Description
        3-Aug-1995      1.00    C. Houlberg     Baseline Abstract:   Update line item to activate entry.
***************************************************************************/
void update_gimbal_input_item(short item)
{
        switch(item)
        {
                case(0):
                        /* Update item */
                        setup_parameters.gimbal_input_calibration.AZ_Factor
                                = atof(char_string);
                        /* Recall item */
                        sprintf(char_string, "%4.2f",
                                setup_parameters.gimbal_input_calibration.AZ_Factor);
                        /* Display location */
                        _settextposition(GIMINPUT_AZ_FACTOR + 22);
                        break;
                case(1):
                        /* Update item */
                        setup_parameters.gimbal_input_calibration.AZ_Offset
                                = atof(char_string);
                        /* Recall item */
                        sprintf(char_string, "%-5.2f",
                                setup_parameters.gimbal_input_calibration.AZ_Offset);
                        /* Display location */
                        _settextposition(GIMINPUT_AZ_OFFSET + 24);
                        break;
                case(2):
                        /* Update item */
                        setup_parameters.gimbal_input_calibration.EL_Factor
                                = atof(char_string);
                        /* Recall item */
                        sprintf(char_string, "%4.2f",
                                setup_parameters.gimbal_input_calibration.EL_Factor);
                        /* Display location */
                        _settextposition(GIMINPUT_EL_FACTOR + 24);
```

Navy Case No. 77257

```
                break;
        case(3):
                /* Update item */
                setup_parameters.gimbal_input_calibration.EL_Offset
                        = atof(char_string);
                /* Recall item */
                sprintf(char_string, "%-5.2f",
                        setup_parameters.gimbal_input_calibration.EL_Offset);
                /* Display location */
                _settextposition(GIMINPUT_EL_OFFSET + 26);
                break;
        }
        /* Display processed item */
        _outtext(char_string);
}

/****************************************************************************
Function Name:    calibrate_irds()
Number/Version:
History:
        Date            Rev         Author          Description
        6-Mar-1995      1.00        C. Houlberg     Baseline
        6-Feb-1996      1.03        C. Houlberg     Added global function key.

Abstract:    IRDS calibration.
****************************************************************************/
void calibrate_irds(unsigned short keyboard_input)
{
        /* Variable declarations */
        short i;                                        /* Index pointer */
        short shift_status;
        short old_item;
        char buffer[2];                                 /* 1 character buffer */
        FILE *file_pointer;                             /* Pointer into file */
        struct File_Location data_location;             /* File location of data */

/* Put terminator in buffer */
        buffer[1] = '\0';

/* Process IRDS calibration key input */
        if(mode != CALIBRATE_IRDS)
        {
                /* Establish new mode */
                mode = CALIBRATE_IRDS;

/* Display the irds calibration screen */
                calibrate_irds_screen();

/* Reset line item indicator and text position */
                line_item = 0;                          /* 1st line item */
                char_pointer = 0;                       /* Beginning of line item */

/* Initially set the cursor position to azimuth scale factor */
                sprintf(char_string, "%4.2f",
                        setup_parameters.irds_calibration.AZ_Factor);
                _settextposition(IRDS_AZ_FACTOR + 22);
```

191

Navy Case No. 77257

```
                /* Establish the text base row and column */
                text = _gettextposition();
        }
        else
        {
                /* Clear cursor (simulated) */
                _putimage((text.col + char_pointer - 1) * CURSOR_WD
                        - console_graphics.X_Center,
                        (text.row -1) * CURSOR_HT - console_graphics.Y_Center,
                        cursor_ind, _GXOR);

/* Added code 5 Feb 1996 to include global function key execution */
                /* Check for global function key input */
                global_function_key(keyboard_input);         /* Test scan code */
/* End of added code */

/* Code added 7-Feb-1996 for global waypoint selection */
                global_alt_key(keyboard_input);
/* End of added code */

/* Process input */
                numeral_string_input(keyboard_input);

/* Must retain irds data formats */
                if((char_string[0] == '-') && ((line_item == 1) || (line_item == 3)))
                {
                        /* Negative offset format */
                        if(char_string[4] == '\0')          /* Zero deleted character */
                        {
                                for(i = 5; i > char_pointer; i--)
                                {
                                        char_string[i] = char_string[i - 1];
                                        if(char_string[i] == '\0')
                                                buffer[0] = ' ';
                                        else
                                                buffer[0] = char_string[i];
                                        _settextposition(text.row, text.col + i);
                                        _outtext(buffer);
                                }
                                if(char_pointer == 2)
                                        char_string[char_pointer] = '.';
                                else
                                        char_string[char_pointer] = '0';
                                buffer[0] = char_string[char_pointer];
                                _settextposition(text.row, text.col + char_pointer);
                                _outtext(buffer);
                        }
                        else
                        {
                                switch(char_pointer)
                                {
                                        case(2):
                                                if((0xff & keyboard_input) == '.')
                                                        ++char_pointer;
                                                break;
                                        case(3):
                                                char_string[char_pointer - 1] = '.';
```

192

Navy Case No. 77257

```
                        buffer[0] = '.';
                        _settextposition(text.row,
                                text.col + char_pointer - 1);
                        _outtext(buffer);
                        break;
                    case(6):
                        --char_pointer;
                        char_string[char_pointer] = '\0';
                        buffer[0] = ' ';
                        _settextposition(text.row, text.col + char_pointer);
                        _outtext(buffer);
                        break;
                }
            }
        }
        else                                            /* Positive number format */
        {
            if(char_string[3] == '\0')                  /* Zero deleted character */
            {
                for(i = 4; i > char_pointer; i--)
                {
                    char_string[i] = char_string[i - 1];
                    if(char_string[i] == '\0')
                        buffer[0] = ' ';
                    else
                        buffer[0] = char_string[i];
                    _settextposition(text.row, text.col + i);
                    _outtext(buffer);
                }
                if(char_pointer == 1)
                    char_string[char_pointer] = '.';
                else
                    char_string[char_pointer] = '0';
                buffer[0] = char_string[char_pointer];
                _settextposition(text.row, text.col + char_pointer);
                _outtext(buffer);
            }
            else
            {
                switch(char_pointer)
                {
                    case(1):
                        if(char_string[0] == '-')
                        {
                            for(i = 0; char_string[i] != '\0'; i++)
                            {
                                char_string[i] = char_string[i + 1];
                                if(char_string[i] == '\0')
                                    buffer[0] = ' ';
                                else
                                    buffer[0] = char_string[i];
                                _settextposition(text.row, text.col + i);
                                _outtext(buffer);
                            }
                            --char_pointer;
                        }
                        else if((0xff & keyboard_input) == '.')
```

193

Navy Case No. 77257

```c
                                ++char_pointer;
                        break;
                case(2):
                        char_string[char_pointer - 1] = '.';
                        buffer[0] = '.';
                        _settextposition(text.row,
                                text.col + char_pointer - 1);
                        _outtext(buffer);
                        break;
                case(5):
                        --char_pointer;
                        char_string[char_pointer] = '\0';
                        buffer[0] = ' ';
                        _settextposition(text.row, text.col + char_pointer);
                        _outtext(buffer);
                        break;
                }
        }
}

/* Set cursor location */
_settextposition(text.row, text.col + char_pointer);

/* Test for new line item */
old_item = line_item;
switch(keyboard_input >> 8)         /* Test scan code */
{
        case(ESC):                              /* Test for return to main screen */
                main_screen(keyboard_input);
                /* Toggle cursor off (toggled on below) */
                _putimage((text.col + char_pointer - 1) * CURSOR_WD
                        - console_graphics.X_Center,
                        (text.row -1) * CURSOR_HT - console_graphics.Y_Center,
                        cursor_ind, _GXOR);
                break;
        case(TAB):                              /* Select item */
                /* Update last item edited */
                update_irds_item(line_item);
                shift_status = (LEFT_SHIFT_KEY | RIGHT_SHIFT_KEY)
                        & _bios_keybrd(_NKEYBRD_SHIFTSTATUS);
                if((shift_status == LEFT_SHIFT_KEY)
                        || (shift_status == RIGHT_SHIFT_KEY))
                {
                        if(line_item)
                                --line_item;
                        else
                                line_item = 3;    /* Roll over to last line item */
                }
                else
                {
                        if(line_item == 3)
                                line_item = 0;    /* Roll over to 1st line item */
                        else
                                ++line_item;
                }
                break;
        case(UP):                               /* Select previous line */
```

194

Navy Case No. 77257

```
        /* Update last item edited */
        update_irds_item(line_item);
        if(line_item)
              --line_item;
        else
              line_item = 3;        /* Roll over to last line item */
        break;
case(DOWN):                         /* Select next line */
        /* Update last item edited */
        update_irds_item(line_item);
        if(line_item == 3)
              line_item = 0;        /* Roll over to 1st line item */
        else
              ++line_item;
        break;
case(X_ENTER):
case(ENTER):                        /* Save all waypoints */
        /* Update last item edited */
        update_irds_item(line_item);

/* Point to next line */
        if(line_item == 3)
              line_item = 0;        /* Roll over to 1st line item */
        else
              ++line_item;

/* Open setup/calibration file for reading and writing */
        if((file_pointer = fopen("setup.cal", "r+")) == '\0')
        {
              keyboard_error_flags = keyboard_error_flags
                      | CANNOT_OPEN_SETUP;
              add_error(CANNOT_OPEN_SETUP_FILE);
        }
        else if(keyboard_error_flags & CANNOT_OPEN_SETUP)
        {
          /* Clear error flag */
          keyboard_error_flags = keyboard_error_flags
                  & !(CANNOT_OPEN_SETUP);
          remove_error(CANNOT_OPEN_SETUP_FILE);
        }

/* Save the data */
        sprintf(data_location.Group, "IRDS");
        sprintf(data_location.Item, "AZ FACTOR");
        data_location.Size = 4;             /* 4 character string */
        sprintf(char_string, "%4.2f",
              setup_parameters.irds_calibration.AZ_Factor);
        put_calibration(file_pointer, &data_location, char_string);
        sprintf(data_location.Item, "AZ OFFSET");
        data_location.Size = 5;             /* 5 character string */
        sprintf(char_string, "%-5.2f",
              setup_parameters.irds_calibration.AZ_Offset);
        put_calibration(file_pointer, &data_location, char_string);
        sprintf(data_location.Item, "EL FACTOR");
        data_location.Size = 4;             /* 4 character string */
        sprintf(char_string, "%4.2f",
              setup_parameters.irds_calibration.EL_Factor);
```

Navy Case No. 77257

```
            put_calibration(file_pointer, &data_location, char_string);
            sprintf(data_location.Item, "EL OFFSET");
            data_location.Size = 5;            /* 5 character string */
            sprintf(char_string, "%-5.2f",
                    setup_parameters.irds_calibration.EL_Offset);
            put_calibration(file_pointer, &data_location, char_string);

/* Close the file */
            if(fclose(file_pointer))
            {
                    keyboard_error_flags = keyboard_error_flags
                            | CANNOT_CLOSE_SETUP;
                    add_error(CANNOT_CLOSE_SETUP_FILE);
            }
            else if(keyboard_error_flags & CANNOT_CLOSE_SETUP)
            {
                    /* Clear error flag */
                    keyboard_error_flags = keyboard_error_flags
                            & ~(CANNOT_CLOSE_SETUP);
                    remove_error(CANNOT_CLOSE_SETUP_FILE);
            }
            break;
    }

/* Reposition cursor if line item changed */
    if(line_item != old_item)
    {
            char_pointer = 0;                  /* Beginning of item */
            switch(line_item)
            {
                    case(0):
                            _settextposition(IRDS_AZ_FACTOR + 22);
                            sprintf(char_string, "%4.2f",
                                    setup_parameters.irds_calibration.AZ_Factor);
                            break;
                    case(1):
                            _settextposition(IRDS_AZ_OFFSET + 26);
                            sprintf(char_string, "%-5.2f",
                                    setup_parameters.irds_calibration.AZ_Offset);
                            break;
                    case(2):
                            _settextposition(IRDS_EL_FACTOR + 24);
                            sprintf(char_string, "%4.2f",
                                    setup_parameters.irds_calibration.EL_Factor);
                            break;
                    case(3):
                            _settextposition(IRDS_EL_OFFSET + 28);
                            sprintf(char_string, "%-5.2f",
                                    setup_parameters.irds_calibration.EL_Offset);
                            break;
            }

/* Establish base row and column */
            text = _gettextposition();
    }

/* Display cursor (simulated) */
```

Navy Case No. 77257

```
        _putimage((text.col + char_pointer - 1) * CURSOR_WD
                - console_graphics.X_Center,
                (text.row -1) * CURSOR_HT - console_graphics.Y_Center,
                cursor_ind, _GXOR);
    }
}
/***********************************************************************
Function Name:   update_irds_item()
Number/Version:
History:
      Date              Rev       Author            Description
      5-Apr-1995        1.00      C. Houlberg       Baseline Abstract:   Update line item to activate entry.
***********************************************************************/
void update_irds_item(short item)
{
    switch(item)
    {
        case(0):
            /* Update item */
            setup_parameters.irds_calibration.AZ_Factor
                = atof(char_string);
            /* Recall item */
            sprintf(char_string, "%4.2f",
                setup_parameters.irds_calibration.AZ_Factor);
            /* Display location */
            _settextposition(IRDS_AZ_FACTOR + 22);
            break;
        case(1):
            /* Update item */
            setup_parameters.irds_calibration.AZ_Offset
                = atof(char_string);
            /* Recall item */
            sprintf(char_string, "%-5.2f",
                setup_parameters.irds_calibration.AZ_Offset);
            /* Display location */
            _settextposition(IRDS_AZ_OFFSET + 26);
            break;
        case(2):
            /* Update item */
            setup_parameters.irds_calibration.EL_Factor
                = atof(char_string);
            /* Recall item */
            sprintf(char_string, "%4.2f",
                setup_parameters.irds_calibration.EL_Factor);
            /* Display location */
            _settextposition(IRDS_EL_FACTOR + 24);
            break;
        case(3):
            /* Update item */
            setup_parameters.irds_calibration.EL_Offset
                = atof(char_string);
            /* Recall item */
            sprintf(char_string, "%-5.2f",
                setup_parameters.irds_calibration.EL_Offset);
```

Navy Case No. 77257

```
                /* Display location */
                _settextposition(IRDS_EL_OFFSET + 28);
                break;
        }
        /* Display processed item */
        _outtext(char_string);
}
/*************************************************************************
Function Name:  adjust_tracking_box()
Number/Version:
History:
        Date            Rev     Author          Description
        6-Mar-1995      1.00    C. Houlberg     Baseline
        6-Feb-1996      1.03    C. Houlberg     Added global function key.

Abstract:   Adjust tracking box.
**************************************************************************/
void adjust_tracking_box(unsigned short keyboard_input)
{
        /* Variable declarations */
        char buffer[41];                                        /* 40 character buffer */
        FILE *file_pointer;                                     /* Pointer into file */
        struct File_Location data_location;                     /* File location of data */

/* Process adjust tracking box key input */
        if(mode != ADJUST_TRACKING_BOX)
        {
                /* Establish new mode */
                mode = ADJUST_TRACKING_BOX;

/* Display tracking box adjust screen */
                tracking_box_adjust_screen();
        }
        else
        {
/* Added code 5 Feb 1996 to include global function key execution */
                /* Check for global function key input */
                global_function_key(keyboard_input);            /* Test scan code */
/* End of added code */

/* Code added 7-Feb-1996 for global waypoint selection */
                global_alt_key(keyboard_input);
/* End of added code */

/* Adjust box size and location */
                switch(keyboard_input >> 8)                     /* Test scan code */
                {
                        case(TALLER):
                                display_overlay1_box(BACKGROUND);
                                setup_parameters.Box_Height += 2;
                                display_overlay1_box(overlay1_color);
                                break;
                        case(SHORTER):
                                display_overlay1_box(BACKGROUND);
                                setup_parameters.Box_Height -= 2;
                                display_overlay1_box(overlay1_color);
```

Navy Case No. 77257

```
            break;
case(WIDER):
      display_overlay1_box(BACKGROUND);
      setup_parameters.Box_Width += 2;
      display_overlay1_box(overlay1_color);
      break;
case(NARROWER):
      display_overlay1_box(BACKGROUND);
      setup_parameters.Box_Width -= 2;
      display_overlay1_box(overlay1_color);
      break;
case(LEFT):
      display_overlay1_box(BACKGROUND);
      --(setup_parameters.Box_X_Location);
      display_overlay1_box(overlay1_color);
      break;
case(RIGHT):
      display_overlay1_box(BACKGROUND);
      ++(setup_parameters.Box_X_Location);
      display_overlay1_box(overlay1_color);
      break;
case(UP):
      display_overlay1_box(BACKGROUND);
      --(setup_parameters.Box_Y_Location);
      display_overlay1_box(overlay1_color);
      break;
case(DOWN):
      display_overlay1_box(BACKGROUND);
      ++(setup_parameters.Box_Y_Location);
      display_overlay1_box(overlay1_color);
      break;
case(ESC):
      main_screen(keyboard_input);
      break;
case(X_ENTER):
case(ENTER):
      /* Open setup/calibration file for reading and writing */
      if((file_pointer = fopen("setup.cal", "r+")) == '\0')
      {
            keyboard_error_flags = keyboard_error_flags
                  | CANNOT_OPEN_SETUP;
            add_error(CANNOT_OPEN_SETUP_FILE);
      }
      else if(keyboard_error_flags & CANNOT_OPEN_SETUP)
      {
        /* Clear error flag */
        keyboard_error_flags = keyboard_error_flags
              & !(CANNOT_OPEN_SETUP);
        remove_error(CANNOT_OPEN_SETUP_FILE);
      } if(!(keyboard_error_flags & CANNOT_OPEN_SETUP))
      {
            /* Save the data */
            sprintf(data_location.Group, "TRACKING BOX");
            sprintf(data_location.Item, "X LOCATION");
            data_location.Size = 4;    /* 4 character string */
```

199

Navy Case No. 77257

```
            sprintf(buffer, "%-4d", setup_parameters.Box_X_Location);
            put_calibration(file_pointer, &data_location, buffer);
            sprintf(data_location.Item, "Y LOCATION");
            sprintf(buffer, "%-4d", setup_parameters.Box_Y_Location);
            put_calibration(file_pointer, &data_location, buffer);
            sprintf(data_location.Item, "HEIGHT");
            sprintf(buffer, "%-4d", setup_parameters.Box_Height);
            put_calibration(file_pointer, &data_location, buffer);
            sprintf(data_location.Item, "WIDTH");
            sprintf(buffer, "%-4d", setup_parameters.Box_Width);
            put_calibration(file_pointer, &data_location, buffer);

/* Close the file */
            if(fclose(file_pointer))
            {
                keyboard_error_flags = keyboard_error_flags
                    | CANNOT_CLOSE_SETUP;
                add_error(CANNOT_CLOSE_SETUP_FILE);
            }
            else if(keyboard_error_flags & CANNOT_CLOSE_SETUP)
            {
                /* Clear error flag */
                keyboard_error_flags = keyboard_error_flags
                    & 1(CANNOT_CLOSE_SETUP);
                remove_error(CANNOT_CLOSE_SETUP_FILE);
            }
        }
        break;
    }
  }
}
/**********************************************************************
Function Name:   set_gimbal_limits()
Number/Version:
History:
    Date            Rev     Author          Description
    6-Mar-1995      1.00    C. Houlberg     Baseline
    5-Sep-1995      1.02    C. Houlberg     Added gimbal soft stop capability.
    6-Feb-1996      1.03    C. Houlberg     Added global function key.

Abstract:   Set gimbal limits.
**********************************************************************/
void set_gimbal_limits(unsigned short keyboard_input)
{
    /* Variable declarations */
    short i;                                            /* Index pointer */
    short shift_status;
    short old_item;
    char buffer[2];                                     /* 1 character buffer */
    FILE *file_pointer;                                 /* Pointer into file */
    struct File_Location data_location;     /* File location of data */

/* Put terminator in buffer */
    buffer[1] = '\0';

/* Process set gimbal limit key input */
```

200

Navy Case No. 77257

```c
        if(mode != SET_GIMBAL_LIMITS)
        {
                /* Establish new mode */
                mode = SET_GIMBAL_LIMITS;

/* Display the set gimbal limit screen */
                set_gimbal_limit_screen();

/* Reset line item indicator and text position */
                line_item = 0;                                  /* 1st line item */
                char_pointer = 0;                               /* Beginning of line item */

/* Initially set the cursor position to azimuth scale factor */
                sprintf(char_string, "%-2.0f",
                        setup_parameters.Gimbal_Forward_Limit);
                _settextposition(GIMBAL_FORWARD + 23);

/* Establish the text base row and column */
                text = _gettextposition();
        }
        else
        {
                /* Clear cursor (simulated) */
                _putimage((text.col + char_pointer - 1) * CURSOR_WD
                        - console_graphics.X_Center,
                        (text.row -1) * CURSOR_HT - console_graphics.Y_Center,
                        cursor_ind, _GXOR);

/* Added code 5 Feb 1996 to include global function key execution */
                /* Check for global function key input */
                global_function_key(keyboard_input);             /* Test scan code */
/* End of added code */
/* Code added 7-Feb-1996 for global waypoint selection */
                global_alt_key(keyboard_input);
/* End of added code */

/* Process input */
                numeral_string_input(keyboard_input);

/* Must retain gimbal angle format */
/* Code change 5-Sep-1995 for gimbal soft stop capability from:
                if((line_item == 1) || (line_item == 3))
to: */
                if((line_item == 1) || (line_item == 3)
                        || (line_item == 5) || (line_item == 7))
/* End of code change */
                {
                        /* Negative angle format */
                        if(char_string[0] != '-')                /* Must have '-' sign */
                        {
                                for(i = 2; i > 0; i--)
                                {
                                        char_string[i] = char_string[i - 1];
                                        buffer[0] = char_string[i];
                                        _settextposition(text.row, text.col + i);
                                        _outtext(buffer);
```

201

Navy Case No. 77257

```c
                        }
                        char_string[0] = '-';
                        buffer[0] = char_string[0];
                        _settextposition(text.row, text.col);
                        _outtext(buffer);
                }
                else if(char_string[3] != '\0')         /* Stay within 2 digits */
                {
                        if(char_pointer > 3)
                                char_pointer = 3;
                        char_string[3] = '\0';
                        buffer[0] = ' ';
                        _settextposition(text.row, text.col + 3);
                        _outtext(buffer);
                }
        }
        else if(char_string[2] != '\0')         /* Stay within 2 digits */
        {
                if(char_string[0] == '-')
                {
                        char_pointer = 0;
                        for(i = 0; i < 2; i++)
                        {
                                char_string[i] = char_string[i + 1];
                                buffer[0] = char_string[i];
                                _settextposition(text.row, text.col + i);
                                _outtext(buffer);
                        }
                }
                else if(char_pointer > 2)
                {
                        char_pointer = 2;
                }
                char_string[2] = '\0';
                buffer[0] = ' ';
                _settextposition(text.row, text.col + 2);
                _outtext(buffer);
        }

/* Set cursor location */
_settextposition(text.row, text.col + char_pointer);

/* Test for new line item */
old_item = line_item;
switch(keyboard_input >> 8)             /* Test scan code */
{
        case(ESC):                              /* Test for return to main screen */
                main_screen(keyboard_input);
                /* Toggle cursor off (toggled on below) */
                _putimage((text.col + char_pointer - 1) * CURSOR_WD
                        - console_graphics.X_Center,
                        (text.row -1) * CURSOR_HT - console_graphics.Y_Center,
                        cursor_ind, _GXOR);
                break;
        case(TAB):                              /* Select item */
                /* Update last item edited */
                update_gimbal_item(line_item);
```

202

Navy Case No. 77257

```
                         shift_status = (LEFT_SHIFT_KEY | RIGHT_SHIFT_KEY)
                            & _bios_keybrd( NKEYBRD_SHIFTSTATUS);
                         if((shift_status == LEFT_SHIFT_KEY)
                            || (shift_status == RIGHT_SHIFT_KEY))
                         {
                            if(line_item)
                                --line_item;
                            else
/* Code change 5-Sep-1995 for gimbal soft stop capability from:
                                line_item = 3;
to: */
                                line_item = 7;    /* Roll over to last line item */
/* End of code change */
                         }
                         else
                         {
/* Code change 5-Sep-1995 for gimbal soft stop capability from:
                            if(line_item == 3)
to: */
                            if(line_item == 7)
/* End of code change */
                                line_item = 0;    /* Roll over to 1st line item */
                            else
                                ++line_item;
                         }
                         break;
                   case(UP):                            /* Select previous line */
                         /* Update last item edited */
                         update_gimbal_item(line_item);
                         if(line_item)
                            --line_item;
                         else
/* Code change 5-Sep-1995 for gimbal soft stop capability from:
                            line_item = 3;
to: */
                            line_item = 7;    /* Roll over to last line item */
/* End of code change */
                         break;
                   case(DOWN):                          /* Select next line */
                         /* Update last item edited */
                         update_gimbal_item(line_item);
/* Code change 5-Sep-1995 for gimbal soft stop capability from:
                         if(line_item == 3)
to: */
                         if(line_item == 7)
/* End of code change */
                            line_item = 0;    /* Roll over to 1st line item */
                         else
                            ++line_item;
                         break;
                   case(X_ENTER):
                   case(ENTER):                         /* Save all waypoints */
                         /* Update last item edited */
                         update_gimbal_item(line_item);

/* Point to next line */
/* Code change 5-Sep-1995 for gimbal soft stop capability from:
```

203

Navy Case No. 77257

```
                            if(line_item == 3)
to: */
                            if(line_item == 7)
/* End of code change */
                                    line_item = 0;          /* Roll over to 1st line item */
                            else
                                    ++line_item;

/* Open setup/calibration file for reading and writing */
                            if((file_pointer = fopen("setup.cal", "r+")) == '\0')
                            {
                                    keyboard_error_flags = keyboard_error_flags
                                            | CANNOT_OPEN_SETUP;
                                    add_error(CANNOT_OPEN_SETUP_FILE);
                            }
                            else if(keyboard_error_flags & CANNOT_OPEN_SETUP)
                            {
                                    /* Clear error flag */
                                    keyboard_error_flags = keyboard_error_flags
                                            & !(CANNOT_OPEN_SETUP);
                                    remove_error(CANNOT_OPEN_SETUP_FILE);
                            } if(!(keyboard_error_flags & CANNOT_OPEN_SETUP))
                            {
                                    /* Save the data */
/* Code change 5-Sep-1995 for gimbal soft stop capability from:
                                    sprintf(data_location.Group, "GIMBAL LIMITS");
to: */
                                    sprintf(data_location.Group, "GIMBAL WARNING");
/* End of code change */
                                    sprintf(data_location.Item, "FORWARD");
                                    data_location.Size = 2;       /* 2 character string */
                                    sprintf(char_string, "%-2.0f",
                                            setup_parameters.Gimbal_Forward_Limit);
                                    put_calibration(file_pointer, &data_location, char_string);
                                    sprintf(data_location.Item, "AFT");
                                    data_location.Size = 3;       /* 3 character string */
                                    sprintf(char_string, "%-3.0f",
                                            setup_parameters.Gimbal_Aft_Limit);
                                    put_calibration(file_pointer, &data_location, char_string);
                                    sprintf(data_location.Item, "UP");
                                    data_location.Size = 2;       /* 2 character string */
                                    sprintf(char_string, "%-2.0f",
                                            setup_parameters.Gimbal_Up_Limit);
                                    put_calibration(file_pointer, &data_location, char_string);
                                    sprintf(data_location.Item, "DOWN");
                                    data_location.Size = 3;       /* 3 character string */
                                    sprintf(char_string, "%-3.0f",
                                            setup_parameters.Gimbal_Down_Limit);
                                    put_calibration(file_pointer, &data_location, char_string);

/* Code added 5-Sep-1995 for gimbal soft stop capability */
                                    sprintf(data_location.Group, "GIMBAL STOPS");
                                    sprintf(data_location.Item, "FORWARD");
                                    data_location.Size = 2;       /* 2 character string */
                                    sprintf(char_string, "%-2.0f",
```

Navy Case No. 77257

```
                        setup_parameters.Gimbal_Forward_Stop);
                put_calibration(file_pointer, &data_location, char_string);
                sprintf(data_location.Item, "AFT");
                data_location.Size = 3;          /* 3 character string */
                sprintf(char_string, "%-3.0f",
                        setup_parameters.Gimbal_Aft_Stop);
                put_calibration(file_pointer, &data_location, char_string);
                sprintf(data_location.Item, "UP");
                data_location.Size = 2;          /* 2 character string */
                sprintf(char_string, "%-2.0f",
                        setup_parameters.Gimbal_Up_Stop);
                put_calibration(file_pointer, &data_location, char_string);
                sprintf(data_location.Item, "DOWN");
                data_location.Size = 3;          /* 3 character string */
                sprintf(char_string, "%-3.0f",
                        setup_parameters.Gimbal_Down_Stop);
                put_calibration(file_pointer, &data_location, char_string);
/* End of code addition */

/* Close the file */
                if(fclose(file_pointer))
                {
                        keyboard_error_flags = keyboard_error_flags
                                | CANNOT_CLOSE_SETUP;
                        add_error(CANNOT_CLOSE_SETUP_FILE);
                }
                else if(keyboard_error_flags & CANNOT_CLOSE_SETUP)
                {
                        /* Clear error flag */
                        keyboard_error_flags = keyboard_error_flags
                                & !(CANNOT_CLOSE_SETUP);
                        remove_error(CANNOT_CLOSE_SETUP_FILE);
                }
        }
        break;
}

/* Reposition cursor if line item changed */
if(line_item != old_item)
{
        char_pointer = 0;                       /* Beginning of item */
        switch(line_item)
        {
                case(0):
                        _settextposition(GIMBAL_FORWARD + 23);
                        sprintf(char_string, "%-2.0f",
                                setup_parameters.Gimbal_Forward_Limit);
                        break;
                case(1):
                        _settextposition(GIMBAL_AFT + 19);
                        sprintf(char_string, "%-3.0f",
                                setup_parameters.Gimbal_Aft_Limit);
                        break;
                case(2):
                        _settextposition(GIMBAL_UP + 18);
                        sprintf(char_string, "%-2.0f",
                                setup_parameters.Gimbal_Up_Limit);
```

Navy Case No. 77257

```
                            break;
                    case(3):
                            _settextposition(GIMBAL_DOWN + 20);
                            sprintf(char_string, "%-3.0f",
                                    setup_parameters.Gimbal_Down_Limit);
                            break;
/* Code added 5-Sep-1995 for gimbal soft stop capability */
                    case(4):
                            _settextposition(GIMBAL_FORWARD_STOP + 20);
                            sprintf(char_string, "%-2.0f",
                                    setup_parameters.Gimbal_Forward_Stop);
                            break;
                    case(5):
                            _settextposition(GIMBAL_AFT_STOP + 16);
                            sprintf(char_string, "%-3.0f",
                                    setup_parameters.Gimbal_Aft_Stop);
                            break;
                    case(6):
                            _settextposition(GIMBAL_UP_STOP + 15);
                            sprintf(char_string, "%-2.0f",
                                    setup_parameters.Gimbal_Up_Stop);
                            break;
                    case(7):
                            _settextposition(GIMBAL_DOWN_STOP + 17);
                            sprintf(char_string, "%-3.0f",
                                    setup_parameters.Gimbal_Down_Stop);
                            break;
/* End of code addition */
                    }

/* Establish base row and column */
                    text = _gettextposition();
            }

/* Display cursor (simulated) */
            _putimage((text.col + char_pointer - 1) * CURSOR_WD
                    - console_graphics.X_Center,
                    (text.row -1) * CURSOR_HT - console_graphics.Y_Center,
                    cursor_ind, _GXOR);
        }
}
/******************************************************************************
Function Name:    update_gimbal_item()
Number/Version:
History:
       Date            Rev       Author          Description
       5-Apr-1995      1.00      C. Houlberg     Baseline
       5-Sep-1995      1.02      C. Houlberg     Added gimbal soft stop capability.

Abstract:   Update line item to activate entry.
******************************************************************************/
void update_gimbal_item(short item)
{
        switch(item)
        {
```

Navy Case No. 77257

```
            case(0):
                /* Update item */
                setup_parameters.Gimbal_Forward_Limit = atof(char_string);
                /* Recall item */
                sprintf(char_string, "%-2.0f",
                    setup_parameters.Gimbal_Forward_Limit);
                /* Display location */
                _settextposition(GIMBAL_FORWARD + 23);
                break;
            case(1):
                /* Update item */
                setup_parameters.Gimbal_Aft_Limit = atof(char_string);
                /* Recall item */
                sprintf(char_string, "%-3.0f",
                    setup_parameters.Gimbal_Aft_Limit);
                /* Display location */
                _settextposition(GIMBAL_AFT + 19);
                break;
            case(2):
                /* Update item */
                setup_parameters.Gimbal_Up_Limit = atof(char_string);
                /* Recall item */
                sprintf(char_string, "%-2.0f",
                    setup_parameters.Gimbal_Up_Limit);
                /* Display location */
                _settextposition(GIMBAL_UP + 18);
                break;
            case(3):
                /* Update item */
                setup_parameters.Gimbal_Down_Limit = atof(char_string);
                /* Recall item */
                sprintf(char_string, "%-3.0f",
                    setup_parameters.Gimbal_Down_Limit);
                /* Display location */
                _settextposition(GIMBAL_DOWN + 20);
                break;
/* Code added 5-Sep-1995 for gimbal soft stop capability */
            case(4):
                /* Update item */
                setup_parameters.Gimbal_Forward_Stop = atof(char_string);
                /* Recall item */
                sprintf(char_string, "%-2.0f",
                    setup_parameters.Gimbal_Forward_Stop);
                /* Display location */
                _settextposition(GIMBAL_FORWARD_STOP + 20);
                break;
            case(5):
                /* Update item */
                setup_parameters.Gimbal_Aft_Stop = atof(char_string);
                /* Recall item */
                sprintf(char_string, "%-3.0f",
                    setup_parameters.Gimbal_Aft_Stop);
                /* Display location */
                _settextposition(GIMBAL_AFT_STOP + 16);
                break;
            case(6):
```

207

Navy Case No. 77257

```c
                /* Update item */
                setup_parameters.Gimbal_Up_Stop = atof(char_string);
                /* Recall item */
                sprintf(char_string, "%-2.0f",
                        setup_parameters.Gimbal_Up_Stop);
                /* Display location */
                _settextposition(GIMBAL_UP_STOP + 15);
                break;
            case(7):
                /* Update item */
                setup_parameters.Gimbal_Down_Stop = atof(char_string);
                /* Recall item */
                sprintf(char_string, "%-3.0f",
                        setup_parameters.Gimbal_Down_Stop);
                /* Display location */
                _settextposition(GIMBAL_DOWN_STOP + 17);
                break;
/* End of code addition */
        }
        /* Display processed item */
        _outtext(char_string);
}

/***********************************************************************
Function Name:   edit_waypoints()
Number/Version:
History:
    Date           Rev      Author          Description
    6-Mar-1995     1.00     C. Houlberg     Baseline
    18-Aug-1995    1.01     C. Houlberg     Fix for Latitude truncation.
                                            Size changed to 11 characters.
    6-Feb-1996     1.03     C. Houlberg     Added global function key.

Abstract:   Edit waypoints.
***********************************************************************/
void edit_waypoints(unsigned short keyboard_input)
{
    /* Variable declarations */
    short shift_status;
    short old_item;
    short i;
    char buffer[2];                             /* 1 character buffer */
    FILE *file_pointer;                         /* Pointer into file */
    struct File_Location data_location;         /* File location of data */

/* Put terminator in buffer */
    buffer[1] = '\0';

/* Process edit waypoint key input */
    if(mode != EDIT_WAYPOINTS)
    {
        /* Establish new mode */
        mode = EDIT_WAYPOINTS;

/* Display the edit waypoint screen title */
        edit_waypoints_screen();
```

Navy Case No. 77257

```
        /* Reset line item indicator and text position */
        line_item = 0;                                      /* 1st line item */
        char_pointer = 0;                                   /* Beginning of line item */

/* Initially set the cursor position to waypoint 1 latitude */
        latitude_to_ascii(char_string, setup_parameters.waypoint_1.Latitude);
        _settextposition(WAYPOINT1_LAT);

/* Establish the text base row and column */
        text = _gettextposition();
    }
    else
    {
        /* Clear cursor (simulated) */
        _putimage((text.col + char_pointer - 1) * CURSOR_WD
            - console_graphics.X_Center,
            (text.row -1) * CURSOR_HT - console_graphics.Y_Center,
            cursor_ind, _GXOR);

/* Added code 5 Feb 1996 to include global function key execution */
        /* Check for global function key input */
        global_function_key(keyboard_input);                /* Test scan code */
/* End of added code */

/* Code added 7-Feb-1996 for global waypoint selection */
        global_alt_key(keyboard_input);
/* End of added code */

/* Test to edit latitude field */
        if((line_item == 0) || (line_item == 4) || (line_item == 8)
            || (line_item == 12) || (line_item == 16))
        {
            if(char_pointer == 0)           /* Compass point */
            {
                if(((keyboard_input >> 8) == NORTH)
                    || ((keyboard_input >> 8) == SOUTH))
                {
                    if((keyboard_input >> 8) == NORTH)
                        char_string[char_pointer] = 'N';
                    else
                        char_string[char_pointer] = 'S';

buffer[0] = char_string[char_pointer];
                    _settextposition(text.row, text.col);
                    _outtext(buffer);
                    char_pointer = 3;       /* Now edit numerical string */
                }
                else if((keyboard_input >> 8) == RIGHT)
                    char_pointer = 3;       /* Now edit numerical string */
                else if((keyboard_input >> 8) == END)
                    char_pointer = 11;
            }
            else                                            /* Numerical string */
            {
                numeral_string_input(keyboard_input);
                if(char_string[10] == '\0')    /* Character deleted */
                {
```

Navy Case No. 77257

```c
/* Right justify from pointer to end of string */
for(i = 11; i > char_pointer; i--)
{
        char_string[i] = char_string[i - 1];
        buffer[0] = char_string[i];
        _settextposition(text.row, text.col + i);
        _outtext(buffer);
}

/* Must retain latitude format */
switch(char_pointer)
{
        case(2):
        case(5):
                char_string[char_pointer] = ' ';
                break;
        case(8):
                char_string[char_pointer] = '.';
                break;
        default:
                char_string[char_pointer] = '0';
                break;
}
buffer[0] = char_string[char_pointer];
_settextposition(text.row, text.col + char_pointer);
_outtext(buffer);
}
else
{
        /* Must retain latitude format */
        switch(char_pointer)
        {
                case(5):
                        if((0xff & keyboard_input) == ' ')
                                ++char_pointer;
                        break;
                case(6):
                        char_string[char_pointer - 1] = ' ';
                        buffer[0] = ' ';
                        _settextposition(text.row,
                                text.col + char_pointer - 1);
                        _outtext(buffer);
                        break;
                case(8):
                        if((0xff & keyboard_input) == '.')
                                ++char_pointer;
                        break;
                case(9):
                        char_string[char_pointer - 1] = '.';
                        buffer[0] = '.';
                        _settextposition(text.row,
                                text.col + char_pointer - 1);
                        _outtext(buffer);
                        break;
                case(12):
                        --char_pointer;
                        char_string[char_pointer] = '\0';
```

210

Navy Case No. 77257

```
                                buffer[0] = ' ';
                                _settextposition(text.row,
                                    text.col + char_pointer);
                                _outtext(buffer);
                                break;
                    }
            }

/* Test if moving left to compass point */
            if(char_pointer == 2)
                    char_pointer = 0;
        }
}

/* Test to edit altitude field */
if((line_item == 1) || (line_item == 5) || (line_item == 9)
    || (line_item == 13) || (line_item == 17))
{
    numeral_string_input(keyboard_input);
    if(char_pointer == 8)
    {
            char_pointer = 7;
            char_string[char_pointer] = '\0';
            buffer[0] = ' ';
            _settextposition(text.row, text.col + char_pointer);
            _outtext(buffer);
    }
    else if(char_string[7] !='\0')
    {
            char_string[7] = '\0';
            buffer[0] = ' ';
            _settextposition(text.row, text.col + 7);
            _outtext(buffer);
    }
}

/* Test to edit description field */
if((line_item == 2) || (line_item == 6) || (line_item == 10)
    || (line_item == 14) || (line_item == 18))
{
    ascii_string_input(keyboard_input);
    /* Retain full string length */
    if(char_string[DESCRIPTION_SIZE - 1] == '\0')
            char_string[DESCRIPTION_SIZE - 1] = ' ';
}

/* Test to edit longitude field */
if((line_item == 3) || (line_item == 7) || (line_item == 11)
    || (line_item == 15) || (line_item == 19))
{
    if(char_pointer == 0)                /* Compass point */
    {
            if(((keyboard_input >> 8) == EAST)
                || ((keyboard_input >> 8) == WEST)
                || ((keyboard_input >> 8) == RIGHT))
            {
                    if((keyboard_input >> 8) == EAST)
```

211

Navy Case No. 77257

```
                        char_string[char_pointer] = 'E';
                else
                        char_string[char_pointer] = 'W';
                buffer[0] = char_string[char_pointer];
                _settextposition(text.row, text.col);
                _outtext(buffer);
                char_pointer = 2;
        }
        else if((keyboard_input >> 8) == END)
                char_pointer = 11;
}
else
{
        numeral_string_input(keyboard_input);
        if(char_string[10] == '\0')    /* Character deleted */
        {
                /* Right justify from pointer to end of string */
                for(i = 11; i > char_pointer; i--)
                {
                        char_string[i] = char_string[i - 1];
                        buffer[0] = char_string[i];
                        _settextposition(text.row, text.col + i);
                        _outtext(buffer);
                }

/* Must retain longitude format */
                switch(char_pointer)
                {
                        case(1):
                        case(5):
                                char_string[char_pointer] = ' ';
                                break;
                        case(8):
                                char_string[char_pointer] = '.';
                                break;
                        default:
                                char_string[char_pointer] = '0';
                                break;
                }
                buffer[0] = char_string[char_pointer];
                _settextposition(text.row, text.col + char_pointer);
                _outtext(buffer);
        }
        else
        {
                /* Must retain longitude format */
                switch(char_pointer)
                {
                        case(5):
                                if((0xff & keyboard_input) == ' ')
                                        ++char_pointer;
                                break;
                        case(6):
                                char_string[char_pointer - 1] = ' ';
                                buffer[0] = ' ';
                                _settextposition(text.row,
                                        text.col + char_pointer - 1);
```

212

Navy Case No. 77257

```
                              _outtext(buffer);
                              break;
                      case(8):
                              if((0xff & keyboard_input) == '.')
                                      ++char_pointer;
                              break;
                      case(9):
                              char_string[char_pointer - 1] = '.';
                              buffer[0] = '.';
                              _settextposition(text.row,
                                      text.col + char_pointer - 1);
                              _outtext(buffer);
                              break;
                      case(12):
                              --char_pointer;
                              char_string[char_pointer] = '\0';
                              buffer[0] = ' ';
                              _settextposition(text.row,
                                      text.col + char_pointer);
                              _outtext(buffer);
                              break;
                }
        }

/* Test if moving left to compass point */
        if(char_pointer == 1)
                char_pointer = 0;
     }
}

/* Set cursor location */
_settextposition(text.row, text.col + char_pointer);

/* Test for new line item */
old_item = line_item;
switch(keyboard_input >> 8)        /* Test scan code */
{
      case(ESC):                           /* Test for return to main screen */
              main_screen(keyboard_input);
              /* Toggle cursor off (toggle cursor on below) */
              _putimage((text.col + char_pointer - 1) * CURSOR_WD
                      - console_graphics.X_Center,
                      (text.row -1) * CURSOR_HT - console_graphics.Y_Center,
                      cursor_ind, _GXOR);
              break;
      case(TAB):                           /* Select item */
              update_waypoint_item(line_item);
              shift_status = (LEFT_SHIFT_KEY | RIGHT_SHIFT_KEY)
                      & _bios_keybrd(_NKEYBRD_SHIFTSTATUS);
              if((shift_status == LEFT_SHIFT_KEY)
                      || (shift_status == RIGHT_SHIFT_KEY))
              {
                      if(line_item)
                              --line_item;
                      else
                              line_item = 19;    /* Roll over to last line item */
              }
```

213

Navy Case No. 77257

```
        else
        {
                if(line_item == 19)
                        line_item = 0;      /* Roll over to 1st line item */
                else
                        ++line_item;
        }
        break;
case(UP):                                   /* Select previous line */
        update_waypoint_item(line_item);
        if(line_item < 3)
                line_item = 19;
        else if(line_item == 3)
                line_item = 0;
        else if(line_item < 7)
                line_item = 3;
        else if(line_item == 7)
                line_item = 4;
        else if(line_item < 11)
                line_item = 7;
        else if(line_item == 11)
                line_item = 8;
        else if(line_item < 15)
                line_item = 11;
        else if(line_item == 15)
                line_item = 12;
        else if(line_item < 19)
                line_item = 15;
        else
                line_item = 16;
        break;
case(DOWN):                                 /* Select next line */
        update_waypoint_item(line_item);
        if(line_item < 3)
                line_item = 3;
        else if(line_item == 3)
                line_item = 4;
        else if(line_item < 7)
                line_item = 7;
        else if(line_item == 7)
                line_item = 8;
        else if(line_item < 11)
                line_item = 11;
        else if(line_item == 11)
                line_item = 12;
        else if(line_item < 15)
                line_item = 15;
        else if(line_item == 15)
                line_item = 16;
        else if(line_item < 19)
                line_item = 19;
        else
                line_item = 0;
        break;
case(X_ENTER):
case(ENTER):                                /* Save all waypoints */
        /* Update last item edited */
```

214

Navy Case No. 77257

```
                update_waypoint_item(line_item);

/* Point to next line */
                if(line_item == 19)
                        line_item = 0;           /* Roll over to 1st line item */
                else
                        ++line_item;

/* Open waypoint data file for reading and writing */
                if((file_pointer = fopen("waypoint.dat", "r+")) == '\0')
                {
                        keyboard_error_flags = keyboard_error_flags
                                | CANNOT_OPEN_WAYPOINT;
                        add_error(CANNOT_OPEN_WAYPOINT_FILE);
                }
                else if(keyboard_error_flags & CANNOT_OPEN_WAYPOINT)
                {
                /* Clear error flag */
                keyboard_error_flags = keyboard_error_flags
                        & !(CANNOT_OPEN_WAYPOINT);
                remove_error(CANNOT_OPEN_WAYPOINT_FILE);
                } if(!(keyboard_error_flags & CANNOT_OPEN_WAYPOINT))
                {
                        /* Save the data */
                        sprintf(data_location.Group, "WAYPOINT 1");
                        sprintf(data_location.Item, "LAT");
/* Code change 18-Aug-1995 from:
                        data_location.Size = 10;
to: */
                        data_location.Size = 11;         /* 11 character string
*/
/* End of code change */
                        latitude_to_ascii(char_string,
                                setup_parameters.waypoint_1.Latitude);
                        put_calibration(file_pointer, &data_location, char_string);
                        sprintf(data_location.Item, "LON");
                        data_location.Size = 11;         /* 11 character string
*/
                        longitude_to_ascii(char_string,
                                setup_parameters.waypoint_1.Longitude);
                        put_calibration(file_pointer, &data_location, char_string);
                        sprintf(data_location.Item, "ALT");
                        data_location.Size = 7;          /* 7 character string */
                        sprintf(char_string, "%-7.0f",
                                setup_parameters.waypoint_1.Altitude);
                        put_calibration(file_pointer, &data_location, char_string);
                        sprintf(data_location.Item, "DESCRIPTION");
                        data_location.Size = DESCRIPTION_SIZE;
                        put_calibration(file_pointer, &data_location,
                                setup_parameters.waypoint_1.Description);

sprintf(data_location.Group, "WAYPOINT 2");
                        sprintf(data_location.Item, "LAT");
/* Code change 18-Aug-1995 from:
                        data_location.Size = 10;
```

215

Navy Case No. 77257

```
to: */                        data_location.Size = 11;        /* 11 character string
*/
/* End of code change */      latitude_to_ascii(char_string,
                                  setup_parameters.waypoint_2.Latitude);
                              put_calibration(file_pointer, &data_location, char_string);
                              sprintf(data_location.Item, "LON");
                              data_location.Size = 11;        /* 11 character string
*/
                              longitude_to_ascii(char_string,
                                  setup_parameters.waypoint_2.Longitude);
                              put_calibration(file_pointer, &data_location, char_string);
                              sprintf(data_location.Item, "ALT");
                              data_location.Size = 7;         /* 7 character string */
                              sprintf(char_string, "%-7.0f",
                                  setup_parameters.waypoint_2.Altitude);
                              put_calibration(file_pointer, &data_location, char_string);
                              sprintf(data_location.Item, "DESCRIPTION");
                              data_location.Size = DESCRIPTION_SIZE;
                              put_calibration(file_pointer, &data_location,
                                  setup_parameters.waypoint_2.Description);

sprintf(data_location.Group, "WAYPOINT 3");
                              sprintf(data_location.Item, "LAT");
/* Code change 18-Aug-1995 from:
                              data_location.Size = 10;
to: */                        data_location.Size = 11;        /* 11 character string
*/
/* End of code change */      latitude_to_ascii(char_string,
                                  setup_parameters.waypoint_3.Latitude);
                              put_calibration(file_pointer, &data_location, char_string);
                              sprintf(data_location.Item, "LON");
                              data_location.Size = 11;        /* 11 character string
*/
                              longitude_to_ascii(char_string,
                                  setup_parameters.waypoint_3.Longitude);
                              put_calibration(file_pointer, &data_location, char_string);
                              sprintf(data_location.Item, "ALT");
                              data_location.Size = 7;         /* 7 character string */
                              sprintf(char_string, "%-7.0f",
                                  setup_parameters.waypoint_3.Altitude);
                              put_calibration(file_pointer, &data_location, char_string);
                              sprintf(data_location.Item, "DESCRIPTION");
                              data_location.Size = DESCRIPTION_SIZE;
                              put_calibration(file_pointer, &data_location,
                                  setup_parameters.waypoint_3.Description);

sprintf(data_location.Group, "WAYPOINT 4");
                              sprintf(data_location.Item, "LAT");
/* Code change 18-Aug-1995 from:
                              data_location.Size = 10;
to: */                        data_location.Size = 11;        /* 11 character string
*/
```

Navy Case No. 77257

```c
/* End of code change */
                            latitude_to_ascii(char_string,
                                setup_parameters.waypoint_4.Latitude);
                            put_calibration(file_pointer, &data_location, char_string);
                            sprintf(data_location.Item, "LON");
                            data_location.Size = 11;        /* 11 character string
*/
                            longitude_to_ascii(char_string,
                                setup_parameters.waypoint_4.Longitude);
                            put_calibration(file_pointer, &data_location, char_string);
                            sprintf(data_location.Item, "ALT");
                            data_location.Size = 7;         /* 7 character string */
                            sprintf(char_string, "%-7.0f",
                                setup_parameters.waypoint_4.Altitude);
                            put_calibration(file_pointer, &data_location, char_string);
                            sprintf(data_location.Item, "DESCRIPTION");
                            data_location.Size = DESCRIPTION_SIZE;
                            put_calibration(file_pointer, &data_location,
                                setup_parameters.waypoint_4.Description);

sprintf(data_location.Group, "WAYPOINT 5");
                            sprintf(data_location.Item, "LAT");
/* Code change 18-Aug-1995 from:
                            data_location.Size = 10;
to: */
                            data_location.Size = 11;        /* 11 character string
*/
/* End of code change */
                            latitude_to_ascii(char_string,
                                setup_parameters.waypoint_5.Latitude);
                            put_calibration(file_pointer, &data_location, char_string);
                            sprintf(data_location.Item, "LON");
                            data_location.Size = 11;        /* 11 character string
*/
                            longitude_to_ascii(char_string,
                                setup_parameters.waypoint_5.Longitude);
                            put_calibration(file_pointer, &data_location, char_string);
                            sprintf(data_location.Item, "ALT");
                            data_location.Size = 7;         /* 7 character string */
                            sprintf(char_string, "%-7.0f",
                                setup_parameters.waypoint_5.Altitude);
                            put_calibration(file_pointer, &data_location, char_string);
                            sprintf(data_location.Item, "DESCRIPTION");
                            data_location.Size = DESCRIPTION_SIZE;
                            put_calibration(file_pointer, &data_location,
                                setup_parameters.waypoint_5.Description);

/* Close the file */
                            if(fclose(file_pointer))
                            {
                                keyboard_error_flags = keyboard_error_flags
                                    | CANNOT_CLOSE_WAYPOINT;
                                add_error(CANNOT_CLOSE_WAYPOINT_FILE);
                            }
                            else if(keyboard_error_flags & CANNOT_CLOSE_WAYPOINT)
                            {
                                /* Clear error flag */
```

217

Navy Case No. 77257

```
                keyboard_error_flags = keyboard_error_flags
                        & !(CANNOT_CLOSE_WAYPOINT);
                remove_error(CANNOT_CLOSE_WAYPOINT_FILE);
                }
        }
        break;
}

/* Reposition cursor if line item changed */
if(line_item != old_item)
{
        char_pointer = 0;                       /* Beginning of item */
        switch(line_item)
        {
                case(0):
                        _settextposition(WAYPOINT1_LAT);
                        latitude_to_ascii(char_string,
                                setup_parameters.waypoint_1.Latitude);
                        break;
                case(1):
                        _settextposition(WAYPOINT1_ALT);
                        sprintf(char_string, "%-7.0f",
                                setup_parameters.waypoint_1.Altitude);
                        _outtext(char_string);
                        _settextposition(WAYPOINT1_ALT);
                        for(i = 0;
                                (char_string[i] != ' ') && (char_string[i] != '\0');
                                i++);
                        if(char_string[i] == ' ')
                                char_string[i] = '\0';          /* Terminate string */
                        break;
                case(2):
                        _settextposition(WAYPOINT1_DES);
                        strcpy(char_string,
                                setup_parameters.waypoint_1.Description);
                        break;
                case(3):
                        _settextposition(WAYPOINT1_LON);
                        longitude_to_ascii(char_string,
                                setup_parameters.waypoint_1.Longitude);
                        break;
                case(4):
                        _settextposition(WAYPOINT2_LAT);
                        latitude_to_ascii(char_string,
                                setup_parameters.waypoint_2.Latitude);
                        break;
                case(5):
                        _settextposition(WAYPOINT2_ALT);
                        sprintf(char_string, "%-7.0f",
                                setup_parameters.waypoint_2.Altitude);
                        _outtext(char_string);
                        _settextposition(WAYPOINT2_ALT);
                        for(i = 0;
                                (char_string[i] != ' ') && (char_string[i] != '\0');
                                i++);
                        if(char_string[i] == ' ')
                                char_string[i] = '\0';          /* Terminate string */
```

218

Navy Case No. 77257

```
            break;
    case(6):
            _settextposition(WAYPOINT2_DES);
            strcpy(char_string,
                    setup_parameters.waypoint_2.Description);
            break;
    case(7):
            _settextposition(WAYPOINT2_LON);
            longitude_to_ascii(char_string,
                    setup_parameters.waypoint_2.Longitude);
            break;
    case(8):
            _settextposition(WAYPOINT3_LAT);
            latitude_to_ascii(char_string,
                    setup_parameters.waypoint_3.Latitude);
            break;
    case(9):
            _settextposition(WAYPOINT3_ALT);
            sprintf(char_string, "%-7.0f",
                    setup_parameters.waypoint_3.Altitude);
            _outtext(char_string);
            _settextposition(WAYPOINT3_ALT);
            for(i = 0;
                    (char_string[i] != ' ') && (char_string[i] != '\0');
                    i++);
            if(char_string[i] == ' ')
                    char_string[i] = '\0';          /* Terminate string */
            break;
    case(10):
            _settextposition(WAYPOINT3_DES);
            strcpy(char_string,
                    setup_parameters.waypoint_3.Description);
            break;
    case(11):
            _settextposition(WAYPOINT3_LON);
            longitude_to_ascii(char_string,
                    setup_parameters.waypoint_3.Longitude);
            break;
    case(12):
            _settextposition(WAYPOINT4_LAT);
            latitude_to_ascii(char_string,
                    setup_parameters.waypoint_4.Latitude);
            break;
    case(13):
            _settextposition(WAYPOINT4_ALT);
            sprintf(char_string, "%-7.0f",
                    setup_parameters.waypoint_4.Altitude);
            _outtext(char_string);
            _settextposition(WAYPOINT4_ALT);
            for(i = 0;
                    (char_string[i] != ' ') && (char_string[i] != '\0');
                    i++);
            if(char_string[i] == ' ')
                    char_string[i] = '\0';          /* Terminate string */
            break;
    case(14):
            _settextposition(WAYPOINT4_DES);
```

219

Navy Case No. 77257

```
                strcpy(char_string,
                        setup_parameters.waypoint_4.Description);
                break;
            case(15):
                _settextposition(WAYPOINT4_LON);
                longitude_to_ascii(char_string,
                        setup_parameters.waypoint_4.Longitude);
                break;
            case(16):
                _settextposition(WAYPOINT5_LAT);
                latitude_to_ascii(char_string,
                        setup_parameters.waypoint_5.Latitude);
                break;
            case(17):
                _settextposition(WAYPOINT5_ALT);
                sprintf(char_string, "%-7.0f",
                        setup_parameters.waypoint_5.Altitude);
                _outtext(char_string);
                _settextposition(WAYPOINT5_ALT);
                for(i = 0;
                        (char_string[i] != ' ') && (char_string[i] != '\0');
                        i++);
                if(char_string[i] == ' ')
                        char_string[i] = '\0';      /* Terminate string */
                break;
            case(18):
                _settextposition(WAYPOINT5_DES);
                strcpy(char_string,
                        setup_parameters.waypoint_5.Description);
                break;
            case(19):
                _settextposition(WAYPOINT5_LON);
                longitude_to_ascii(char_string,
                        setup_parameters.waypoint_5.Longitude);
                break;
        }
        /* Establish base row and column */
        text = _gettextposition();
    }

/* Display cursor (simulated) */
    _putimage((text.col + char_pointer - 1) * CURSOR_WD
            - console_graphics.X_Center,
            (text.row -1) * CURSOR_HT - console_graphics.Y_Center,
            cursor_ind, _GXOR);
    }
}

/*************************************************************************
Function Name:    update_waypoint_item()
Number/Version:
History:
    Date            Rev     Author          Description
    3-Apr-1995      1.00    C. Houlberg     Baseline
    6-Feb-1996      1.03    C. Houlberg     Added tracking mode display Abstract:   Update line item to activate entry.
```

Navy Case No. 77257

```
**********************************************************************/
void update_waypoint_item(short item)
{
    switch(item)
    {
        case(0):
            /* Update item */
            setup_parameters.waypoint_1.Latitude
                = ascii_to_latitude(char_string);
            /* Recall item */
            latitude_to_ascii(char_string,
                setup_parameters.waypoint_1.Latitude);
            /* Display location */
            _settextposition(WAYPOINT1_LAT);
            break;
        case(1):
            /* Update item */
            setup_parameters.waypoint_1.Altitude = atof(char_string);
            /* Recall item */
            sprintf(char_string, "% 7.0f",
                setup_parameters.waypoint_1.Altitude);
            /* Display location */
            _settextposition(WAYPOINT1_ALT);
            break;
        case(2):
            /* Update item */
            strcpy(setup_parameters.waypoint_1.Description, char_string);
            /* Display location */
            _settextposition(WAYPOINT1_DES);
            break;
        case(3):
            /* Update item */
            setup_parameters.waypoint_1.Longitude
                = ascii_to_longitude(char_string);
            /* Recall item */
            longitude_to_ascii(char_string,
                setup_parameters.waypoint_1.Longitude);
            /* Display location */
            _settextposition(WAYPOINT1_LON);
            break;
        case(4):
            /* Update item */
            setup_parameters.waypoint_2.Latitude
                = ascii_to_latitude(char_string);
            /* Recall item */
            latitude_to_ascii(char_string,
                setup_parameters.waypoint_2.Latitude);
            /* Display location */
            _settextposition(WAYPOINT2_LAT);
            break;
        case(5):
            /* Update item */
            setup_parameters.waypoint_2.Altitude = atof(char_string);
            /* Recall item */
            sprintf(char_string, "% 7.0f",
                setup_parameters.waypoint_2.Altitude);
            /* Display location */
```

221

Navy Case No. 77257

```
            _settextposition(WAYPOINT2_ALT);
            break;
      case(6):
            /* Update item */
            strcpy(setup_parameters.waypoint_2.Description, char_string);
            /* Display location */
            _settextposition(WAYPOINT2_DES);
            break;
      case(7):
            /* Update item */
            setup_parameters.waypoint_2.Longitude
                  = ascii_to_longitude(char_string);
            /* Recall item */
            longitude_to_ascii(char_string,
                  setup_parameters.waypoint_2.Longitude);
            /* Display location */
            _settextposition(WAYPOINT2_LON);
            break;
      case(8):
            /* Update item */
            setup_parameters.waypoint_3.Latitude
                  = ascii_to_latitude(char_string);
            /* Recall item */
            latitude_to_ascii(char_string,
                  setup_parameters.waypoint_3.Latitude);
            /* Display location */
            _settextposition(WAYPOINT3_LAT);
            break;
      case(9):
            /* Update item */
            setup_parameters.waypoint_3.Altitude = atof(char_string);
            /* Recall item */
            sprintf(char_string, "% 7.0f",
                  setup_parameters.waypoint_3.Altitude);
            /* Display location */
            _settextposition(WAYPOINT3_ALT);
            break;
      case(10):
            /* Update item */
            strcpy(setup_parameters.waypoint_3.Description, char_string);
            /* Display location */
            _settextposition(WAYPOINT3_DES);
            break;
      case(11):
            /* Update item */
            setup_parameters.waypoint_3.Longitude
                  = ascii_to_longitude(char_string);
            /* Recall item */
            longitude_to_ascii(char_string,
                  setup_parameters.waypoint_3.Longitude);
            /* Display location */
            _settextposition(WAYPOINT3_LON);
            break;
      case(12):
            /* Update item */
            setup_parameters.waypoint_4.Latitude
                  = ascii_to_latitude(char_string);
```

Navy Case No. 77257

```
        /* Recall item */
        latitude_to_ascii(char_string,
             setup_parameters.waypoint_4.Latitude);
        /* Display location */
        _settextposition(WAYPOINT4_LAT);
        break;
case(13):
        /* Update item */
        setup_parameters.waypoint_4.Altitude = atof(char_string);
        /* Recall item */
        sprintf(char_string, "% 7.0f",
             setup_parameters.waypoint_4.Altitude);
        /* Display location */
        _settextposition(WAYPOINT4_ALT);
        break;
case(14):
        /* Update item */
        strcpy(setup_parameters.waypoint_4.Description, char_string);
        /* Display location */
        _settextposition(WAYPOINT4_DES);
        break;
case(15):
        /* Update item */
        setup_parameters.waypoint_4.Longitude
             = ascii_to_longitude(char_string);
        /* Recall item */
        longitude_to_ascii(char_string,
             setup_parameters.waypoint_4.Longitude);
        /* Display location */
        _settextposition(WAYPOINT4_LON);
        break;
case(16):
        /* Update item */
        setup_parameters.waypoint_5.Latitude
             = ascii_to_latitude(char_string);
        /* Recall item */
        latitude_to_ascii(char_string,
             setup_parameters.waypoint_5.Latitude);
        /* Display location */
        _settextposition(WAYPOINT5_LAT);
        break;
case(17):
        /* Update item */
        setup_parameters.waypoint_5.Altitude = atof(char_string);
        /* Recall item */
        sprintf(char_string, "% 7.0f",
             setup_parameters.waypoint_5.Altitude);
        /* Display location */
        _settextposition(WAYPOINT5_ALT);
        break;
case(18):
        /* Update item */
        strcpy(setup_parameters.waypoint_5.Description, char_string);
        /* Display location */
        _settextposition(WAYPOINT5_DES);
        break;
case(19):
```

223

Navy Case No. 77257

```c
                /* Update item */
                setup_parameters.waypoint_5.Longitude
                        = ascii_to_longitude(char_string);
                /* Recall item */
                longitude_to_ascii(char_string,
                        setup_parameters.waypoint_5.Longitude);
                /* Display location */
                _settextposition(WAYPOINT5_LON);
                break;
        }
        /* Display processed item */
        _outtext(char_string);

/* Added code 6-Feb-1996 to update globally displayed tracking mode */
        global_tracking_display();
/* End of added code */
}

/**************************************************************************
Function Name:   select_waypoint()
Number/Version:
History:
        Date            Rev     Author          Description
        6-Mar-1995      1.00    C. Houlberg     Baseline
        6-Feb-1996      1.03    C. Houlberg     Added global function key.
        6-Feb-1996      1.03    C. Houlberg     Added tracking mode display Abstract:   Select waypoint to track.
**************************************************************************/
void select_waypoint(unsigned short keyboard_input)
{
        /* Process edit waypoint key input */
        if(mode != SELECT_WAYPOINT)
        {
                /* Establish new mode */
                mode = SELECT_WAYPOINT;

/* Display the edit waypoint screen title */
                select_waypoint_screen();
        }
        else
        {
/* Added code 5 Feb 1996 to include global function key execution */
                /* Check for global function key input */
                global_function_key(keyboard_input);         /* Test scan code */
/* End of added code */

/* Code added 7-Feb-1996 for global waypoint selection */
                global_alt_key(keyboard_input);
/* End of added code */ switch (0xff & keyboard_input)               /* Test ASCII code */
                {
                        case('1'):                                   /* Waypoint #1 */
                                tracking = ACTIVE_WAYPOINT;
                                waypoint = &setup_parameters.waypoint_1;
                                break;
```

Navy Case No. 77257

```
                case('2'):                                      /* Waypoint #2 */
                        tracking = ACTIVE_WAYPOINT;
                        waypoint = &setup_parameters.waypoint_2;
                        break;
                case('3'):                                      /* Waypoint #3 */
                        tracking = ACTIVE_WAYPOINT;
                        waypoint = &setup_parameters.waypoint_3;
                        break;
                case('4'):                                      /* Waypoint #4 */
                        tracking = ACTIVE_WAYPOINT;
                        waypoint = &setup_parameters.waypoint_4;
                        break;
                case('5'):                                      /* Waypoint #5 */
                        tracking = ACTIVE_WAYPOINT;
                        waypoint = &setup_parameters.waypoint_5;
                        break;
        }
/* Added code 6-Feb-1996 to update globally displayed tracking mode */
            global_tracking_display();
/* End of added code */

/* Test for return to main screen */
            if((keyboard_input >> 8) == ESC)        /* Test scan code */
                    main_screen(keyboard_input);
    }
}
/***************************************************************************
Function Name:  ascii_string_input()
Number/Version:
History:
        Date            Rev         Author              Description
        21-Feb-1995     1.00        C. Houlberg         Baseline Abstract:   ASCII string input function (left justified string) .
***************************************************************************/
void ascii_string_input(unsigned short keyboard_input)
{
        /* Variable declarations */
        char buffer[2];                                 /* 1 character buffer */

/* Set terminator */
        buffer[1] = '\0';

/* Must have a valid character */
        if((' ' <= (0xff & keyboard_input))
               && ((0xff & keyboard_input) <= 0x7f))
        {
               if(char_pointer < KEY_BUFFER_SIZE)  /* Can't exceed buffer */
               {
                       /* Keep string terminated */
                       if(char_string[char_pointer] == '\0')
                               char_string[char_pointer + 1] = '\0';
                       /* Accept Input */
                       char_string[char_pointer] = (char) keyboard_input;
                       buffer[0] = char_string[char_pointer];
```

Navy Case No. 77257

```
                _settextposition(text.row, text.col + char_pointer);
                _outtext(buffer);
                ++char_pointer;
            }
        }
        else
        {
            /* String control (cleared string can't revert to '0') */
            buffer[0] = char_string[0];
            string_control(keyboard_input);
            if((char_string[0] == '0') && (buffer[0] != '0'))
            {
                char_string[0] = ' ';
                buffer[0] = char_string[0];
                _settextposition(text.row, text.col);
                _outtext(buffer);
            }
        }

/* Set new text position */
        _settextposition(text.row, text.col + char_pointer);
}
/*******************************************************************
Function Name:   numeral_string_input()
Number/Version:
History:
    Date            Rev         Author          Description
    21-Feb-1995     1.00        C. Houlberg     Baseline Abstract:  String input function for decimal numbers (left justified).
*******************************************************************/
void numeral_string_input(unsigned short keyboard_input)
{
    /* Variable declarations */
    short i;                                    /* Index pointer */
    char buffer[2];                             /* 1 character buffer */

/* Set terminator */
    buffer[1] = '\0';

/* Must have a valid number */
    if(('0' <= (0xff & keyboard_input))
        && ((0xff & keyboard_input) <= '9'))
    {
        if(char_pointer < KEY_BUFFER_SIZE)   /* Can't exceed buffer */
        {
            if(char_string[char_pointer] == '\0')
                char_string[char_pointer + 1] = '\0';
            char_string[char_pointer] = (char) keyboard_input;
            buffer[0] = char_string[char_pointer];
            _settextposition(text.row, text.col + char_pointer);
            _outtext(buffer);
            ++char_pointer;
        }
    }
    else if(!char_pointer)                      /* Might have a sign change */
```

226

Navy Case No. 77257

```
        {
                if(char_string[char_pointer] == '-')
                {
                        switch(0xff & keyboard_input)
                        {
                                case(' '):
                                case('+'):
                                        for(i = 0; char_string[i] != '\0'; i++)
                                        {
                                                char_string[i] = char_string[i + 1];
                                                if(char_string[i] != '\0')
                                                        buffer[0] = char_string[i];
                                                else
                                                        buffer[0] = ' ';
                                                _settextposition(text.row, text.col + i);
                                                _outtext(buffer);
                                        }
                                        break;
                                case('-'):
                                        ++char_pointer;
                                        break;
                        }
                }
                else if((0xff & keyboard_input) == '-')
                {
                        for(i = 0; char_string[i] != '\0'; i++);
                        for(i; i >= 0; i--)
                        {
                                char_string[i + 1] = char_string[i];
                                buffer[0] = char_string[i];
                                _settextposition(text.row, text.col + i + 1);
                                _outtext(buffer);
                        }
                        char_string[0] = '-';
                        buffer[0] = char_string[0];
                        _settextposition(text.row, text.col);
                        _outtext(buffer);
                        ++char_pointer;
                }
        }

/* Check for string control characters */
        string_control(keyboard_input);

/* Set new text position */
        _settextposition(text.row, text.col + char_pointer);
}
/***********************************************************************
Function Name:   string_controls()
Number/Version:
History:
        Date            Rev       Author            Description
        21-Feb-1995     1.00      C. Houlberg       Baseline
        7-Feb-1996      1.03      C. Houlberg       Password characters masked.
Abstract:   Functions implemented for string control (left justified).
***********************************************************************/
```

227

Navy Case No. 77257

```
void string_control(unsigned short keyboard_input)
{
      /* Variable declarations */
      short i;                                      /* Integer */
      char buffer[2];                               /* 1 character buffer */

/* Set terminator */
      buffer[1] = '\0';

switch(keyboard_input >> 8)
      {
            case(HOME):
                  char_pointer = 0;
                  break;
            case(END):
                  for(i = 0; !(char_string[i] == '\0'); i++);
                  char_pointer = i;
                  break;
            case(LEFT):
                  if(char_pointer)
                        --char_pointer;
                  break;
            case(RIGHT):
                  if(char_string[char_pointer] != '\0')
                        ++char_pointer;
                  break;
            case(BKSP):
                  if(char_pointer)
                  {
                        --char_pointer;
                        _settextposition(text.row, text.col + char_pointer);
                        for(i = char_pointer; char_string[i] != '\0'; i++)
                        {
                              char_string[i] = char_string[i + 1];
                              if(char_string[i] == '\0')
                                    if(i)
                                          buffer[0] = ' ';
                                    else
                                    {
                                          char_string[i] = '0';
                                          buffer[0] = '0';
                                    }
                              else
/* Code added 7-Feb-1996 to mask password when in SETUP mode */
                                    if(mode == SETUP)
                                          buffer[0] = '*';
                                    else
/* End of added code */
                                          buffer[0] = char_string[i];
                              _outtext(buffer);
                        }
                  }
                  break;
            case(DEL):
                  _settextposition(text.row, text.col + char_pointer);
                  for(i = char_pointer; char_string[i] != '\0'; i++)
                  {
```

228

Navy Case No. 77257

```
                        char_string[i] = char_string[i + 1];
                        if(char_string[i] == '\0')
                                if(i)
                                        buffer[0] = ' ';
                                else
                                {
                                        buffer[0] = '0';
                                        char_string[0] = '0';
                                }
                        else
/* Code added 7-Feb-1996 to mask password when in SETUP mode */
                                if(mode == SETUP)
                                        buffer[0] = '*';
                                else
/* End of added code */
                                        buffer[0] = char_string[i];
                        _outtext(buffer);
                }
                break;
        }
}

/*************************************************************************
Function Name:   global_function_key()
Number/Version:
History:
        Date            Rev         Author          Description
        5-Feb-1996      1.03        C. Houlberg     Baseline
        7-Feb-1996      1.03        C. Houlberg     Added global waypoint selection.
        21-Mar-1996     1.04        C. Houlberg     Added triangulation feature.

Abstract:   Test for and execution of global function key entrys.
*************************************************************************/
void global_function_key(unsigned short keyboard_input)
{
        switch(keyboard_input >> 8)         /* Test scan code */
        {
                case(F3):                           /* Toggle color */
                        toggle_overlay_color();

/* Select the console display board */
                        current_port = switch_monitors(CONSOLE, current_port);
                        break;
                case(F4):                           /* Record (start both VTRs) */
                        vtr_command = START;
                        vtr1_string_pointer = 0;
                        vtr2_string_pointer = 0;
                        break;
                case(CTRL_F4):                      /* Stop both VTRs? */
                        vtr_command = STOP;
                        vtr1_string_pointer = 0;
                        vtr2_string_pointer = 0;
                        break;
                case(F5):                           /* Not used at this time */
                        break;
                case(F6):                           /* ACQ sight active pointing device */
                        tracking = ACTIVE_ACQSIGHT;  /* Set tracking mode */
```

Navy Case No. 77257

```
                global_tracking_display();
                break;
        case(F7):                           /* IRDS active pointing device */
                tracking = ACTIVE_IRDS;         /* Set tracking mode */
                global_tracking_display();
                break;
        case(F9):                           /* Triangulate object location */
/* Code added 21-Mar-1996 for added triangulation feature */
                pointing_input.Az = gimbal_input.Az;
                pointing_input.El = gimbal_input.El;
                triangulate_location();         /* Triangulate location */
                display_location = YES;

/* Ensure angle warning message is updated */
                _settextposition(ANGLE_WARNING_LOC);
                if(Insufficient_Angle_Warning == YES)
                        _outtext("WARNING Insufficent Triangulation Angle");
                else
                        _outtext("                                         ");
/* End of added code */
                break;
        case(F10):                          /* Display current object location */
                pointing_input.Az = gimbal_input.Az;
                pointing_input.El = gimbal_input.El;
                display_location = YES;
/* Code added 21-Mar-1996 for added triangulation feature */
                estimate_location();            /* Estimate location */

/* Ensure angle warning message is cleared */
                _settextposition(ANGLE_WARNING_LOC);
                _outtext("                                         ");
/* End of added code */
                break;
        default:                            /* Build new estimated altitude */
                break;
        }
}

/*************************************************************************
Function Name:  global_alt_key()
Number/Version:
History:
        Date            Rev     Author          Description
        13-Feb-1996     1.03    C. Houlberg     Baseline Abstract:  Test for and execution of global control key entrys.
*************************************************************************/
void global_alt_key(unsigned short keyboard_input)
{
        if((ALT_1 <= (keyboard_input >> 8)) && ((keyboard_input >> 8) <= ALT_5))
        {
                tracking = ACTIVE_WAYPOINT;
                switch(keyboard_input >> 8)
                {
                        case(ALT_1):                            /* Waypoint #1 */
                                waypoint = &setup_parameters.waypoint_1;
                                break;
```

230

Navy Case No. 77257

```
            case(ALT_2):                                    /* Waypoint #2 */
                    waypoint = &setup_parameters.waypoint_2;
                    break;
            case(ALT_3):                                    /* Waypoint #3 */
                    waypoint = &setup_parameters.waypoint_3;
                    break;
            case(ALT_4):                                    /* Waypoint #4 */
                    waypoint = &setup_parameters.waypoint_4;
                    break;
            case(ALT_5):                                    /* Waypoint #5 */
                    waypoint = &setup_parameters.waypoint_5;
                    break;
            default:
                    break;
        }
        global_tracking_display();
    }
}
/* end */
```

Navy Case No. 77257

```
/************************************************************************
Module Name:    keyboard.h
Number/Version:
History:
     Date            Rev        Author            Description
     12-Jan-1995     1.00       C. Houlberg       Baseline
     25-Jan-1996     1.03       C. Houlberg       Added <Ctrl> F4 to scan table Abstract:
     Keyboard definitions.
************************************************************************/

/*   Constant definitions.
*/
     /* Keyboard scan and ASCII character codes */
     #define ESC                          0x01
     #define F1                           0x3b
     #define F2                           0x3c
     #define F3                           0x3d
     #define F4                           0x3e
     #define F5                           0x3f
     #define F6                           0x40
     #define F7                           0x41
     #define F8                           0x42
     #define F9                           0x43
     #define F10                          0x44
     #define CTRL_F2                      0x59
     #define CTRL_F4                      0x61
     #define CTRL_F5                      0x62
     #define TAB                          0x0f
     #define HOME                         0x47
     #define END                          0x4f
     #define LEFT                         0x4b
     #define RIGHT                        0x4d
     #define UP                           0x48
     #define DOWN                         0x50
     #define DEL                          0x53
     #define BKSP                         0x0e
     #define ENTER                        0x1c
     #define X_ENTER                      0xe0
     #define TALLER                       0x14
     #define SHORTER                      0x1f
     #define WIDER                        0x11
     #define NARROWER                     0x31
     #define NORTH                        0x31
     #define SOUTH                        0x1f
     #define EAST                         0x12
     #define WEST                         0x11
     #define YES_KEY                      0x15
     #define NO_KEY                       0x31
     /* Shift, alt, and control keys */
     #define RIGHT_SHIFT_KEY              0x01
     #define LEFT_SHIFT_KEY               0x02
     #define EITHER_CTRL_KEY              0x04
     #define ALT_1                        0x78
     #define ALT_2                        0x79
     #define ALT_3                        0x7a
```

232

Navy Case No. 77257

```
        #define ALT_4                   0x7b
        #define ALT_5                   0x7c
/*      Global variables.
*/
        extern struct _rccoord text;            /* Text position */
/*      Function definitions.
*/
        void process_keyboard_input(void);

/* end */
```

Navy Case No. 77257

```
/************************************************************************
Module Name:    mem_map.h
Number/Version:
History:
      Date         Rev      Author           Description
      14-Feb-1995  1.00     J. Hauselmann    Baseline Abstract:
    Arinc, A/D and video boards initialization parameters.
************************************************************************/

/*   Constant definitions.
*/
                                                     DP-1 DP-2 DP-3 DP-4 */
/* Videographics Adapters
#define CONSOLE                     0x0200    /* Console  ON   ON   ON   ON  */
#define WFOV                        0x0220    /* WFOV     ON   ON   ON   OFF */
#define NFOV                        0x0240    /* NFOV     ON   ON   OFF  ON  */

/* DT2801 D/A  A/D */
#define IO_BASE_ADDR                0x2BC     /* I/O Base Address Selection */

/* Serial Communications Interface (0x2E0 through 0x2FF) */
/* DOS COM1 => 0x2E8 (board port #2) */
/* DOS COM2 => 0x2F8 (board port #4) */
/* DOS COM3 => 0x2E0 (board port #3) */
/* DOS COM4 => 0x2F0 (board port #1) */

/* Synchro to digital interface (IRDS) */
#define SYNCHRO                     0x300     /* I/O Base Address Selection */
#define SYNCHRO_STATUS_CONTROL      SYNCHRO
#define SYNCHRO_CH1_LSB             (SYNCHRO + 2)
#define SYNCHRO_CH1_MSB             (SYNCHRO + 3)
#define SYNCHRO_CH2_LSB             (SYNCHRO + 4)
#define SYNCHRO_CH2_MSB             (SYNCHRO + 5)

/* Arinc CEI-100 */
#define ARINC_IO                    0x388     /* I/O Base Address Selection */
#define ARINC_SEG                   0xD200
#define ARINC_MEM                   8                   /* Onboard Memory */

/* VGA BIOS disable information */
#define VGA_BIOS                    0xC800    /*          DP-7 DP-8         */
                                              /*          OFF  OFF          */
                                              /* DP-5 ON  Disable on Power Up*/
                                              /*      OFF Enable on Power UP */
                                              /* DP-6 ON  Enable BIOS        */
                                              /*      OFF Disable BIOS       */

/* end */
```

Navy Case No. 77257

```
/*************************************************************************
Module Name:    overlay1.c
Number/Version:
History:
    Date            Rev         Author          Description
    23-Jan-1995     1.00        C. Houlberg     Baseline
    25-Jan-1996     1.03        C. Houlberg     Display leading zeros in heading.
                                                update_overlay1_display()
    7-Feb-1996      1.03        C. Houlberg     Added display of ground speed.

update_overlay1_display()
Abstract:   Overlay #1 display functions.
    1)  Initialize overlay #1 display.
    2)  Display overlay #1 template.
    3)  Display overlay #1 scales.
    4)  Display overlay #1 box.
    5)  Update overlay #1 display.
**************************************************************************/
/*  All parameters and functions used by overlay1.c are defined in
    the following header files.
*/
    #include "stdio.h"                  /* Standard I/O definitions */
    #include "graph.h"                  /* Graphics I/O definitions */
    #include "malloc.h"                 /* Memory allocation definitions */
    #include "mem_map.h"                /* Hardware memory map */
    #include "avtsc.h"                  /* Project definitions */
    #include "init.h"                   /* Initialization definitions */
    #include "gimbal.h"                 /* Gimbal definitions */
    #include "acqsight.h"               /* Acquisition sight definitions */
    #include "irds.h"                   /* IRDS definitions */
    #include "ins.h"                    /* INS definitions */
    #include "pointing.h"               /* Pointing definitions */
    #include "utility.h"                /* Utility definitions */
    #include "video.h"                  /* Video definitions */
    #include "overlay1.h"               /* Overlay #1 display definitions */

/*  Global variable declarations.
*/
    short overlay1_start_mode;          /* Initial overlay #1 screen mode */
    GRAPHICS_TYPE graph1;               /* Overlay #1 screen graphics makeup */
    INDICATOR_TYPE indicator;           /* Indicator locations */
    char __huge *gim_az_ind;            /* Gimbal AZ indicator image pointer */
    char __huge *acq_az_ind;            /* Acquisition AZ indicator image */
    char __huge *gim_el_ind;            /* Gimbal EL indicator image pointer */
    char __huge *acq_el_ind;            /* Acquisition EL indicator image */
    short forward_warning;              /* Warning display flags */
    short aft_warning;
    short up_warning;
    short down_warning;

/*  Functions local to overlay1.c.
*/
    void construct_overlay1_indicators(void);
    void toggle_warning_indicator(enum Warning_Indicator indicator);

/*************************************************************************
Function Name:  init_overlay1_display()
```

235

Navy Case No. 77257

```
Number/Version:
History:
      Date            Rev         Author           Description
      7-Feb-1995      1.00        C. Houlberg      Baseline Abstract:    Initializes overlay #1 display.
***************************************************************************/
void init_overlay1_display(void)
{
      /* Variable declarations */
      struct _videoconfig video;              /* Configuration of video screen */
      long imsize;                            /* Size of indicator image */

/* Select the overlay #1 display board and set the operating mode */
      current_port = switch_monitors(WFOV, current_port);
      set_operation_mode(OVERLAY_MODE);

/* Set the video mode */
      _getvideoconfig(&video); overlay1_start_mode = video.mode;
      _setvideomode(_VRES16COLOR);

/* Get video configuration data and set the screen origin */
      _getvideoconfig(&video);
      graph1.X_Center = (short) (video.numxpixels)/2;
      graph1.Y_Center = (short) (video.numypixels)/2;
      _setvieworg(graph1.X_Center, graph1.Y_Center);
      graph1.X_Max = (short) (video.numxpixels)/2;
      graph1.Y_Max = (short) (video.numypixels)/2;

/* Reserve memory for the indicator images */
      imsize = (size_t)_imagesize(0, 0, GIM_AZ_IND_WD, GIM_AZ_IND_HI);
      gim_az_ind = _halloc(imsize, sizeof(char));
      imsize = (size_t)_imagesize(0, 0, ACQ_AZ_IND_WD, ACQ_AZ_IND_HI);
      acq_az_ind = _halloc(imsize, sizeof(char));
      imsize = (size_t)_imagesize(0, 0, GIM_EL_IND_WD, GIM_EL_IND_HI);
      gim_el_ind = _halloc(imsize, sizeof(char));
      imsize = (size_t)_imagesize(0, 0, ACQ_EL_IND_WD, ACQ_EL_IND_HI);
      acq_el_ind = _halloc(imsize, sizeof(char));

/* Construct and save the indicator images (clears the screen) */
      construct_overlay1_indicators();

/* Initial location of indicators */
      indicator.gim_az_loc = graph1.H_Scale_X_Origin - GIM_AZ_IND_WD/2;
      indicator.acq_az_loc = indicator.gim_az_loc;
      indicator.gim_el_loc = graph1.V_Scale_Y_Origin - GIM_EL_IND_HI/2;
      indicator.acq_el_loc = indicator.gim_el_loc;
}

/****************************************************************************
Function Name:    construct_overlay1_indicators()
Number/Version:
History:
      Date            Rev         Author           Description
      3-Feb-1995      1.00        C. Houlberg      Baseline Abstract:    Constructs and saves overlay #1 indicator images.
```

236

Navy Case No. 77257

```
/****************************************************************************/
void construct_overlay1_indicators(void)
{
    /* Variable declarations */
    struct _xycoord polyside[8];                 /* Sides of polygon */

/* Select the overlay #1 display board */
    current_port = switch_monitors(WFOV, current_port);

/* Clear the screen */
    _clearscreen(_GCLEARSCREEN);

/* Construct gimbal azimuth indicator */
    polyside[0].xcoord = 0;                                              /* Construct polygon */
    polyside[0].ycoord = 0;
    polyside[1].xcoord = GIM_AZ_IND_WD - 1;
    polyside[1].ycoord = 0;
    polyside[2].xcoord = GIM_AZ_IND_WD/2;
    polyside[2].ycoord = GIM_AZ_IND_HI - 1;
    _polygon(_GFILLINTERIOR, polyside, 3);
    _getimage(0, 0, GIM_AZ_IND_WD - 1, GIM_AZ_IND_HI - 1, gim_az_ind);
    _putimage(0, 0, gim_az_ind, _GXOR);                     /* Clear image */

/* Construct acquisition azimuth indicator */
    polyside[0].xcoord = 0;                                              /* Construct polygon */
    polyside[0].ycoord = ACQ_AZ_IND_HI/2 - 1;
    polyside[1].xcoord = 0;
    polyside[1].ycoord = ACQ_AZ_IND_HI - 1;
    polyside[2].xcoord = ACQ_AZ_IND_WD - 1;
    polyside[2].ycoord = ACQ_AZ_IND_HI - 1;
    polyside[3].xcoord = ACQ_AZ_IND_WD - 1;
    polyside[3].ycoord = ACQ_AZ_IND_HI/2 - 1;
    polyside[4].xcoord = ACQ_AZ_IND_WD/2 + 1;
    polyside[4].ycoord = ACQ_AZ_IND_HI/2 - 1;
    polyside[5].xcoord = ACQ_AZ_IND_WD/2 + 1;
    polyside[5].ycoord = 0;
    polyside[6].xcoord = ACQ_AZ_IND_WD/2 - 1;
    polyside[6].ycoord = 0;
    polyside[7].xcoord = ACQ_AZ_IND_WD/2 - 1;
    polyside[7].ycoord = ACQ_AZ_IND_HI/2 - 1;
    _polygon(_GFILLINTERIOR, polyside, 8);
    _getimage(0, 0, ACQ_AZ_IND_WD - 1, ACQ_AZ_IND_HI - 1, acq_az_ind);
    _putimage(0, 0, acq_az_ind, _GXOR);                     /* Clear image */

/* Construct gimbal elevation indicator */
    polyside[0].xcoord = 0;                                              /* Construct polygon */
    polyside[0].ycoord = 0;
    polyside[1].xcoord = 0;
    polyside[1].ycoord = GIM_EL_IND_HI - 1;
    polyside[2].xcoord = GIM_EL_IND_WD - 1;
    polyside[2].ycoord = GIM_EL_IND_HI/2;
    _polygon(_GFILLINTERIOR, polyside, 3);
    _getimage(0, 0, GIM_EL_IND_WD - 1, GIM_EL_IND_HI - 1, gim_el_ind);
    _putimage(0, 0, gim_el_ind, _GXOR);                     /* Clear image */

/* Construct acquisition elevation indicator */
    polyside[0].xcoord = 0;                                              /* Construct polygon */
```

237

Navy Case No. 77257

```
        polyside[0].ycoord = ACQ_EL_IND_HI/2 - 1;
        polyside[1].xcoord = 0;
        polyside[1].ycoord = ACQ_EL_IND_HI/2 + 1;
        polyside[2].xcoord = ACQ_EL_IND_WD/2 - 1;
        polyside[2].ycoord = ACQ_EL_IND_HI/2 + 1;
        polyside[3].xcoord = ACQ_EL_IND_WD/2 - 1;
        polyside[3].ycoord = ACQ_EL_IND_HI - 1;
        polyside[4].xcoord = ACQ_EL_IND_WD - 1;
        polyside[4].ycoord = ACQ_EL_IND_HI - 1;
        polyside[5].xcoord = ACQ_EL_IND_WD - 1;
        polyside[5].ycoord = 0;
        polyside[6].xcoord = ACQ_EL_IND_WD/2 - 1;
        polyside[6].ycoord = 0;
        polyside[7].xcoord = ACQ_EL_IND_WD/2 - 1;
        polyside[7].ycoord = ACQ_EL_IND_HI/2 - 1;
        _polygon(_GFILLINTERIOR, polyside, 8);
        _getimage(0, 0, ACQ_EL_IND_WD - 1, ACQ_EL_IND_HI - 1, acq_el_ind);
        _putimage(0, 0, acq_el_ind, _GXOR);                 /* Clear image */
}
/**************************************************************************
Function Name:  display_overlay1_template()
Number/Version:
History:
        Date            Rev     Author          Description
        31-Jan-1995     1.00    C. Houlberg     Baseline Abstract:   Displays non-changing graphics on overlay #1 display.
**************************************************************************/
void display_overlay1_template(void)
{
        /* Variable declarations */
        short x, y;                                         /* Screen coordinates */

/* Select the overlay #1 display board */
        current_port = switch_monitors(WFOV, current_port);

/* Construct and display the scales */
        display_overlay1_scales();

/* Construct and display the NFOV box */
        display_overlay1_box(overlay1_color);

/* Initial location of azimuth indicators */
        y = graph1.H_Scale_Y_Origin - H_SCALE_HEIGHT1 + H_SCALE_BAR_LOC1
            - GIM_AZ_IND_HI - 1;
        _putimage(indicator.gim_az_loc, y, gim_az_ind, _GXOR);
        y = graph1.H_Scale_Y_Origin - H_SCALE_HEIGHT1 + H_SCALE_BAR_LOC1 + 1;
        _putimage(indicator.acq_az_loc, y, acq_az_ind, _GXOR);

/* Initial location of elevation indicators */
        x = graph1.V_Scale_X_Origin - V_SCALE_WIDTH1 + V_SCALE_BAR_LOC1
            - GIM_EL_IND_WD - 1;
        _putimage(x, indicator.gim_el_loc, gim_el_ind, _GXOR);
        x = graph1.V_Scale_X_Origin - V_SCALE_WIDTH1 + V_SCALE_BAR_LOC1 + 1;
        _putimage(x, indicator.acq_el_loc, acq_el_ind, _GXOR);
```

Navy Case No. 77257

```
        /* Warning indicators initially off */
        forward_warning = NO;
        aft_warning = NO;
        up_warning = NO;
        down_warning = NO;
}
/**************************************************************************
Function Name:    display_overlay1_scales()
Number/Version:
History:
        Date            Rev         Author              Description
        3-Feb-1995      1.00        C. Houlberg         Baseline Abstract:   Constructs and displays the scales used on overlay1.
**************************************************************************/
void display_overlay1_scales(void)
{
        /* Variable declarations */
        short x, y, i;
        char buffer[4];
        double temp;

/* Construct and display the horizontal scale */
        /* Gradient size based upon most compressed side of scale */
        graph1.H_Scale_Gradient = (graph1.X_Max - H_SCALE_X_BORDER1
                - H_SCALE_X_OFFSET1) * H_SCALE_GRAD_SIZE1 / H_SCALE_P_RANGE1;
        i = (graph1.X_Max - H_SCALE_X_BORDER1
                + H_SCALE_X_OFFSET1) * H_SCALE_GRAD_SIZE1 / H_SCALE_N_RANGE1;
        if(graph1.H_Scale_Gradient > i)                  /* Choose the smallest */
                graph1.H_Scale_Gradient = i;
        /* Determine location of scale origin */
        graph1.H_Scale_X_Origin = H_SCALE_X_OFFSET1;
        graph1.H_Scale_Y_Origin = graph1.Y_Max - H_SCALE_Y_BORDER1;
        /* Draw horizontal bar */
        x = graph1.H_Scale_X_Origin
                - ((graph1.H_Scale_Gradient * H_SCALE_N_RANGE1) / H_SCALE_GRAD_SIZE1);
        y = graph1.H_Scale_Y_Origin - H_SCALE_HEIGHT1 + H_SCALE_BAR_LOC1;
        _moveto(x, y);
        x = graph1.H_Scale_X_Origin
                + ((graph1.H_Scale_Gradient * H_SCALE_P_RANGE1) / H_SCALE_GRAD_SIZE1);
        _lineto(x, y);
        /* Draw vertical gradients */
        for(i = - H_SCALE_N_RANGE1/H_SCALE_GRAD_SIZE1;
                i <= H_SCALE_P_RANGE1/H_SCALE_GRAD_SIZE1; i++)
        {
                x = graph1.H_Scale_X_Origin + i * graph1.H_Scale_Gradient;
                if(i)
                {
                        y = graph1.H_Scale_Y_Origin - H_SCALE_HEIGHT1 + H_SCALE_BAR_LOC1
                                - H_SCALE_TICK1;
                        _moveto(x, y);
                        y = graph1.H_Scale_Y_Origin - H_SCALE_HEIGHT1 + H_SCALE_BAR_LOC1
                                + H_SCALE_TICK1;
                }
                else
                {
```

Navy Case No. 77257

```
            y = graph1.H_Scale_Y_Origin - H_SCALE_HEIGHT1;
            _moveto(x, y);
            y = graph1.H_Scale_Y_Origin;
        }
        _lineto(x, y);
    }

/* Construct and display the vertical scale */
/* Gradient size based upon most compressed side of scale */
graph1.V_Scale_Gradient = (graph1.Y_Max - V_SCALE_Y_BORDER1
        - V_SCALE_Y_OFFSET1) * V_SCALE_GRAD_SIZE1 / V_SCALE_P_RANGE1;
i = (graph1.Y_Max - V_SCALE_Y_BORDER1
        + V_SCALE_Y_OFFSET1) * V_SCALE_GRAD_SIZE1 / V_SCALE_N_RANGE1;
if(graph1.V_Scale_Gradient > i)                        /* Choose the smallest */
        graph1.V_Scale_Gradient = i;
/* Determine location of scale origin */
graph1.V_Scale_X_Origin = graph1.X_Max - V_SCALE_X_BORDER1;
graph1.V_Scale_Y_Origin = - V_SCALE_Y_OFFSET1;
/* Draw vertical bar */
x = graph1.V_Scale_X_Origin - V_SCALE_WIDTH1 + V_SCALE_BAR_LOC1;
y = graph1.V_Scale_Y_Origin
        - ((graph1.V_Scale_Gradient * V_SCALE_P_RANGE1) / V_SCALE_GRAD_SIZE1);
_moveto(x, y);
y = graph1.V_Scale_Y_Origin
        + ((graph1.V_Scale_Gradient * V_SCALE_N_RANGE1) / V_SCALE_GRAD_SIZE1);
_lineto(x, y);
/* Draw horizontal gradients */
for(i = - V_SCALE_P_RANGE1/V_SCALE_GRAD_SIZE1;
        i <= V_SCALE_N_RANGE1/V_SCALE_GRAD_SIZE1; i++)
{
        y = graph1.V_Scale_Y_Origin + i * graph1.V_Scale_Gradient;
        if(i)
        {
                x = graph1.V_Scale_X_Origin - V_SCALE_WIDTH1 + V_SCALE_BAR_LOC1
                        - V_SCALE_TICK1;
                _moveto(x, y);
                x = graph1.V_Scale_X_Origin - V_SCALE_WIDTH1 + V_SCALE_BAR_LOC1
                        + V_SCALE_TICK1;
        }
        else
        {
                x = graph1.V_Scale_X_Origin - V_SCALE_WIDTH1;
                _moveto(x, y);
                x = graph1.V_Scale_X_Origin;
        }
        _lineto(x, y);
}

/* Display the text lables */
temp = H_SCALE_N_RANGE1;
sprintf(buffer, "%+2.0f", -temp);
_settextposition(AZMIN_LOC1); _outtext(buffer);
sprintf(buffer, "0"); _settextposition(AZZERO_LOC1); _outtext(buffer);
temp = H_SCALE_P_RANGE1;
sprintf(buffer, "%+2.0f", temp);
_settextposition(AZMAX_LOC1); _outtext(buffer);
temp = V_SCALE_N_RANGE1;
```

240

Navy Case No. 77257

```
    sprintf(buffer, "%+2.0f", -temp);
    _settextposition(ELMIN_LOC1); _outtext(buffer);
    sprintf(buffer, "0"); _settextposition(ELZERO_LOC1); _outtext(buffer);
      temp = V_SCALE_P_RANGE1;
    sprintf(buffer, "%+2.0f", temp);
    _settextposition(ELMAX_LOC1); _outtext(buffer);
}

/************************************************************************
Function Name:   display_overlay1_box()
Number/Version:
History:
       Date              Rev        Author           Description
       9-Feb-1995        1.00       C. Houlberg      Baseline Abstract:   Constructs and displays the NFOV box.
************************************************************************/
void display_overlay1_box(short color)
{
     /* Variable declarations */
     struct _xycoord polyside[4];             /* Sides of polygon */

/* Select the overlay #1 display board */
     current_port = switch_monitors(WFOV, current_port);

/* Set color */
     _setcolor(color);

/* Construct NFOV box */
     polyside[0].xcoord = setup_parameters.Box_X_Location
           - setup_parameters.Box_Width/2;
     polyside[0].ycoord = setup_parameters.Box_Y_Location
           - setup_parameters.Box_Height/2;
     polyside[1].xcoord = setup_parameters.Box_X_Location
           + setup_parameters.Box_Width/2;
     polyside[1].ycoord = setup_parameters.Box_Y_Location
           - setup_parameters.Box_Height/2;
     polyside[2].xcoord = setup_parameters.Box_X_Location
           + setup_parameters.Box_Width/2;
     polyside[2].ycoord = setup_parameters.Box_Y_Location
           + setup_parameters.Box_Height/2;
     polyside[3].xcoord = setup_parameters.Box_X_Location
           - setup_parameters.Box_Width/2;
     polyside[3].ycoord = setup_parameters.Box_Y_Location
           + setup_parameters.Box_Height/2;

/* Display box */
     _polygon(_GBORDER, polyside, 4);
}

/************************************************************************
Function Name:   update_overlay1_display()
Number/Version:
History:
       Date              Rev        Author           Description
       23-Jan-1995       1.00       C. Houlberg      Baseline
       7-Feb-1996        1.03       C. Houlberg      Add display of ground speed.
```

Navy Case No. 77257

```c
Abstract:   Updates overlay #1 display data.
*******************************************************************/
void update_overlay1_display(void)
{
      /* Variable declarations */
      char buffer[15];                        /* 14 character buffer */
      double gaz, gel;                        /* Gimbal AZ and El in degrees */
      double aaz, ael;                        /* Azimuth AZ and El in degrees */
      short x, y;

/* Select the overlay #1 display board */
      current_port = switch_monitors(WFOV, current_port);

/* Display date, time, heading, and altitude */
      _settextposition(ACFT_DATE1); _outtext(platform.Date);
      _settextposition(ACFT_TIME1); _outtext(platform.Time);
/* Code changed 25-Jan-1996 to display leading zeros in heading from:
      sprintf(buffer, "%3.0f", platform.Heading * 180.0/PI);
to: */
      sprintf(buffer, "%03.0f", platform.Heading * 180.0/PI);
/* End of code change */
      _settextposition(ACFT_HEADING1); _outtext(buffer);
      sprintf(buffer, "%6.0f", platform.Alt);
      _settextposition(ACFT_ALT1); _outtext(buffer);
/* Added code 7-Feb-1996 to add update for display of ground speed */
      sprintf(buffer, "%4.0f", platform.Speed);
      _settextposition(ACFT_SPEED1); _outtext(buffer);
/* End of added code */

/* Display latitude and longitude */
      latitude_to_ascii(buffer, platform.Lat);
      _settextposition(ACFT_LAT1); _outtext(buffer);
      longitude_to_ascii(buffer, platform.Lon);
      _settextposition(ACFT_LON1); _outtext(buffer);

/* Convert Gimbal AZ and EL to degrees */
      gaz = gimbal_input.Az * 180.0/PI;
      gel = gimbal_input.El * 180.0/PI;
      /* Display/remove warning indicators if needed */
      if((forward_warning == YES)
            && (gaz < setup_parameters.Gimbal_Forward_Limit))
      {
            toggle_warning_indicator(FORWARD);   /* Turns off indicator */
            forward_warning = NO;
      }
      if((forward_warning == NO)
            && !(gaz < setup_parameters.Gimbal_Forward_Limit))
      {
            toggle_warning_indicator(FORWARD);   /* Turns on indicator */
            forward_warning = YES;
      }
      if((aft_warning == YES)
            && (gaz > setup_parameters.Gimbal_Aft_Limit))
      {
            toggle_warning_indicator(AFT);            /* Turns off indicator */
            aft_warning = NO;
      }
```

Navy Case No. 77257

```
if((aft_warning == NO)
     && !(gaz > setup_parameters.Gimbal_Aft_Limit))
{
     toggle_warning_indicator(AFT);        /* Turns on indicator */
     aft_warning = YES;
}
if((up_warning == YES)
     && (gel < setup_parameters.Gimbal_Up_Limit))
{
     toggle_warning_indicator(UP);         /* Turns off indicator */
     up_warning = NO;
}
if((up_warning == NO)
     && !(gel < setup_parameters.Gimbal_Up_Limit))
{
     toggle_warning_indicator(UP);         /* Turns on indicator */
     up_warning = YES;
}
if((down_warning == YES)
     && (gel > setup_parameters.Gimbal_Down_Limit))
{
     toggle_warning_indicator(DOWN);       /* Turns off indicator */
     down_warning = NO;
}
if((down_warning == NO)
     && !(gel > setup_parameters.Gimbal_Down_Limit))
{
     toggle_warning_indicator(DOWN);       /* Turns on indicator */
     down_warning = YES;
}
/* Limit to range of scale */
if(gaz < -H_SCALE_N_RANGE1)
     gaz = -H_SCALE_N_RANGE1;
else if(gaz > H_SCALE_P_RANGE1)
     gaz = H_SCALE_P_RANGE1;
if(gel < -V_SCALE_N_RANGE1)
     gel = -V_SCALE_N_RANGE1;
else if(gel > V_SCALE_P_RANGE1)
     gel = V_SCALE_P_RANGE1;

/* Convert Acquisition AZ and EL to degrees */
switch(tracking)
{
     case(ACTIVE_ACQSIGHT):
          aaz = acqsight.Az * 180.0/PI;
          ael = acqsight.El * 180.0/PI;
          break;
     case(ACTIVE_IRDS):
          aaz = irds.Az * 180.0/PI;
          ael = irds.El * 180.0/PI;
          break;
     case(ACTIVE_WAYPOINT):
          aaz = pointing_output.Az * 180.0/PI;
          ael = pointing_output.El * 180.0/PI;
          break;
     default:
          break;
```

Navy Case No. 77257

```
}
/* Limit to 5 degrees past end of scale */
if(aaz < -H_SCALE_N_RANGE1)
     aaz = -H_SCALE_N_RANGE1 - 5;
else if(aaz > H_SCALE_P_RANGE1)
     aaz = H_SCALE_P_RANGE1 + 5;
if(ael < -V_SCALE_N_RANGE1)
     ael = -V_SCALE_N_RANGE1 - 5;
else if(ael > V_SCALE_P_RANGE1)
     ael = V_SCALE_P_RANGE1 + 5;

/* Determine Gimbal AZ indicator location */
x = (short) (gaz * graph1.H_Scale_Gradient/H_SCALE_GRAD_SIZE1
     + graph1.H_Scale_X_Origin - GIM_AZ_IND_WD/2);
y = graph1.H_Scale_Y_Origin - H_SCALE_HEIGHT1 + H_SCALE_BAR_LOC1
     - GIM_AZ_IND_HI - 1;
/* Remove old indicator */
_putimage(indicator.gim_az_loc, y, gim_az_ind, _GXOR);
/* Display new indicator */
_putimage(x, y, gim_az_ind, _GXOR);
/* Save indicator location */
indicator.gim_az_loc = x;

/* Determine Acquisition AZ indicator location */
x = (short) (aaz * graph1.H_Scale_Gradient/H_SCALE_GRAD_SIZE1
     + graph1.H_Scale_X_Origin - GIM_AZ_IND_WD/2);
y = graph1.H_Scale_Y_Origin - H_SCALE_HEIGHT1 + H_SCALE_BAR_LOC1 + 1;
/* Remove old indicator */
_putimage(indicator.acq_az_loc, y, acq_az_ind, _GXOR);
/* Display new indicator */
_putimage(x, y, acq_az_ind, _GXOR);
/* Save indicator location */
indicator.acq_az_loc = x;

/* Determine Gimbal EL indicator location */
x = graph1.V_Scale_X_Origin - V_SCALE_WIDTH1 + V_SCALE_BAR_LOC1
     - GIM_EL_IND_WD - 1;
y = (short) (- gel * graph1.V_Scale_Gradient/V_SCALE_GRAD_SIZE1
     + graph1.V_Scale_Y_Origin - GIM_EL_IND_HI/2);
/* Remove old indicator */
_putimage(x, indicator.gim_el_loc, gim_el_ind, _GXOR);
/* Display new indicator */
_putimage(x, y, gim_el_ind, _GXOR);
/* Save indicator location */
indicator.gim_el_loc = y;

/* Determine Acquisition EL indicator location */
x = graph1.V_Scale_X_Origin - V_SCALE_WIDTH1 + V_SCALE_BAR_LOC1 + 1;
y = (short) (- ael * graph1.V_Scale_Gradient/V_SCALE_GRAD_SIZE1
     + graph1.V_Scale_Y_Origin - ACQ_EL_IND_HI/2);
/* Remove old indicator */
_putimage(x, indicator.acq_el_loc, acq_el_ind, _GXOR);
/* Display new indicator */
_putimage(x, y, acq_el_ind, _GXOR);
/* Save indicator location */
indicator.acq_el_loc = y;
```

244

Navy Case No. 77257

```
}
/***************************************************************************
Function Name:   toggle_warning_indicator()
Number/Version:
History:
       Date              Rev         Author              Description
       10-May-1995       1.00        C. Houlberg         Baseline Abstract:    Toggles warning indicator on or off.
****************************************************************************/
void toggle_warning_indicator(enum Warning_Indicator indicator)
{
      /* Variable declarations */
      struct _xycoord polyside[3];            /* Sides of polygon */

/* Determine indicator points */
      switch(indicator)
      {
            case(FORWARD):
                  polyside[0].xcoord = graph1.H_Scale_X_Origin
                        + ((graph1.H_Scale_Gradient
                        * (short)setup_parameters.Gimbal_Forward_Limit)
                        / H_SCALE_GRAD_SIZE1);
                  polyside[0].ycoord = graph1.H_Scale_Y_Origin
                        - H_SCALE_HEIGHT1 + H_SCALE_BAR_LOC1;
                  polyside[1].xcoord = graph1.H_Scale_X_Origin
                        + ((graph1.H_Scale_Gradient * H_SCALE_P_RANGE1)
                        / H_SCALE_GRAD_SIZE1);
                  polyside[1].ycoord = graph1.H_Scale_Y_Origin - H_SCALE_HEIGHT1;
                  polyside[2].xcoord = polyside[1].xcoord;
                  polyside[2].ycoord = graph1.H_Scale_Y_Origin;
                  break;
            case(AFT):
                  polyside[0].xcoord = graph1.H_Scale_X_Origin
                        + ((graph1.H_Scale_Gradient
                        * (short)setup_parameters.Gimbal_Aft_Limit)
                        / H_SCALE_GRAD_SIZE1);
                  polyside[0].ycoord = graph1.H_Scale_Y_Origin
                        - H_SCALE_HEIGHT1 + H_SCALE_BAR_LOC1;
                  polyside[1].xcoord = graph1.H_Scale_X_Origin
                        - ((graph1.H_Scale_Gradient * H_SCALE_N_RANGE1)
                        / H_SCALE_GRAD_SIZE1);
                  polyside[1].ycoord = graph1.H_Scale_Y_Origin - H_SCALE_HEIGHT1;
                  polyside[2].xcoord = polyside[1].xcoord;
                  polyside[2].ycoord = graph1.H_Scale_Y_Origin;
                  break;
            case(UP):
                  polyside[0].ycoord = graph1.V_Scale_Y_Origin
                        - ((graph1.V_Scale_Gradient
                        * (short)setup_parameters.Gimbal_Up_Limit)
                        / V_SCALE_GRAD_SIZE1);
                  polyside[0].xcoord = graph1.V_Scale_X_Origin
                        - V_SCALE_WIDTH1 + V_SCALE_BAR_LOC1;
                  polyside[1].ycoord = graph1.V_Scale_Y_Origin
                        - ((graph1.V_Scale_Gradient * V_SCALE_P_RANGE1)
                        / V_SCALE_GRAD_SIZE1);
```

245

Navy Case No. 77257

```
                polyside[1].xcoord = graph1.V_Scale_X_Origin - V_SCALE_WIDTH1;
                polyside[2].ycoord = polyside[1].ycoord;
                polyside[2].xcoord = graph1.V_Scale_X_Origin;
                break;
            case(DOWN):
                polyside[0].ycoord = graph1.V_Scale_Y_Origin
                        - ((graph1.V_Scale_Gradient
                        * (short)setup_parameters.Gimbal_Down_Limit)
                        / V_SCALE_GRAD_SIZE1);
                polyside[0].xcoord = graph1.V_Scale_X_Origin
                        - V_SCALE_WIDTH1 + V_SCALE_BAR_LOC1;
                polyside[1].ycoord = graph1.V_Scale_Y_Origin
                        + ((graph1.V_Scale_Gradient * V_SCALE_N_RANGE1)
                        / V_SCALE_GRAD_SIZE1);
                polyside[1].xcoord = graph1.V_Scale_X_Origin - V_SCALE_WIDTH1;
                polyside[2].ycoord = polyside[1].ycoord;
                polyside[2].xcoord = graph1.V_Scale_X_Origin;
                break;
        }

/* Toggle indicator */
        _setwritemode(_GXOR);
        _polygon(_GBORDER, polyside, 3);
        _setwritemode(_GPSET);
}
/*****************************************************************************
Function Name:   overlay1_default_mode()
Number/Version:
History:
     Date          Rev       Author           Description
     31-Jan-1995   1.00      C. Houlberg      Baseline Abstract:  Returns overlay1 to its default video mode.
*****************************************************************************/
void overlay1_default_mode(void)
{
        /* Select overlay1 display board */
        current_port = switch_monitors(WFOV, current_port);

/* Return overlay #1 display to its default mode */
        _setvideomode(overlay1_start_mode);
        _clearscreen(_GCLEARSCREEN);
}

/* end */
```

Navy Case No. 77257

```
/***********************************************************************
Module Name:    overlay1.h
Number/Version:
History:
        Date            Rev         Author          Description
        12-Jan-1995     1.00        C. Houlberg     Baseline
        7-Feb-1996      1.03        C. Houlberg     Added ground speed display.
        21-Mar-1996     1.04        C. Houlberg     Display position changes.

Abstract:
    Overlay #1 display definitions.
***********************************************************************/

/*      Constant definitions.
*/
        /* Character display definitions */
        #define ACFT_DATE1          3,6
        #define ACFT_TIME1          4,6
        #define ACFT_HEADING1       5,38        /* Position changed 21-Mar-1996 */
        #define ACFT_ALT1           3,35        /* Position changed 21-Mar-1996 */
        #define ACFT_LAT1           3,60
        #define ACFT_LON1           4,60
/* Added code 7-Feb-1996 to display ground speed */
        #define ACFT_SPEED1         4,37        /* Position changed 21-Mar-1996 */
/* End of added code */

/* Character size */
        #define CH_WD               8               /* Number of pixels wide */
        #define CH_HI               12              /* Number of pixels high */

/* Graphics scale definitions */
        #define H_SCALE_P_RANGE1    45              /* Number of degrees positive */
        #define H_SCALE_N_RANGE1    15              /* Number of degrees negative */
        #define H_SCALE_GRAD_SIZE1  10              /* Size of gradient in degrees */
        #define H_SCALE_X_BORDER1   (10*CH_WD)      /* Horizontal scale border */
        #define H_SCALE_Y_BORDER1   (5*CH_HI)       /* Location from video bottom */
        #define H_SCALE_X_OFFSET1   (-116-4)        /* Horizontal scale X offset */
        #define H_SCALE_HEIGHT1     12              /* Horizontal scale height */
        #define H_SCALE_TICK1       4               /* Horizontal scale tick height */
        #define H_SCALE_BAR_LOC1    7               /* Horizontal scale bar location */
        #define V_SCALE_P_RANGE1    45              /* Number of degrees positive */
        #define V_SCALE_N_RANGE1    45              /* Number of degrees negative */
        #define V_SCALE_GRAD_SIZE1  10              /* Size of gradient in degrees */
        #define V_SCALE_X_BORDER1   (3*CH_WD)       /* Location from video right */
        #define V_SCALE_Y_BORDER1   (5*CH_HI+6)     /* Vertical scale border */
        #define V_SCALE_Y_OFFSET1   (+7)            /* Vertical scale Y offset */
        #define V_SCALE_WIDTH1      12              /* Vertical scale width */
        #define V_SCALE_TICK1       4               /* Vertical scale tick height */
        #define V_SCALE_BAR_LOC1    7               /* Vertical scale bar location */

/* Character screen definitions */
        #define CHARS               80              /* Maximum character number */
        #define LINES               30              /* Maximum line number */

/* Character scale definitions */
        #define AZMIN_LOC1          LINES-3,9       /* Minimum AZ location
*/
```

Navy Case No. 77257

```c
        #define AZZERO_LOC1             LINES-3,CHARS/2 -14    /* Zero AZ location */
        #define AZMAX_LOC1              LINES-3,CHARS-11  /* Maximum AZ location */
        #define ELMAX_LOC1              3,CHARS-3                      /* Maximum EL location
*/
        #define ELZERO_LOC1             LINES/2,CHARS-1        /* Zero EL location */
        #define ELMIN_LOC1              LINES-3,CHARS-3        /* Minimum EL location
*/
        /* Graphics indicator definitions */
        /* AZ width and EL height values */
        #define GIM_AZ_IND_WD    13        /* Gimbal AZ indicator width */
        #define GIM_AZ_IND_HI    16        /* Gimbal AZ indicator height */
        #define ACQ_AZ_IND_WD    13        /* Acquisition AZ indicator width */
        #define ACQ_AZ_IND_HI    16        /* Acquisition AZ indicator height */
        #define GIM_EL_IND_WD    16        /* Gimbal EL indicator width */
        #define GIM_EL_IND_HI    15        /* Gimbal EL indicator height */
        #define ACQ_EL_IND_WD    16        /* Acquisition EL indicator width */
        #define ACQ_EL_IND_HI    15        /* Acquisition EL incidator height */ enum Warning_Indicator
        {
                FORWARD,
                AFT,
                UP,
                DOWN
        };
/*      Structure definitions.
*/
        typedef struct
        {
                short gim_az_loc;
                short acq_az_loc;
                short gim_el_loc;
                short acq_el_loc;

} INDICATOR_TYPE;

/*      External variable definitions.
*/
        extern short overlay1_start_mode;    /* Initial overlay #1 screen mode */

/*      Function definitions.
*/
        void init_overlay1_display(void);
        void construct_overlay1_indicators(void);
        void display_overlay1_template(void);
        void display_overlay1_scales(void);
        void display_overlay1_box(short color);
        void update_overlay1_display(void);
        void overlay1_default_mode(void);

/* end */
```

248

Navy Case No. 77257

```
/************************************************************************
Module Name:    overlay2.c
Number/Version:
History:
    Date            Rev         Author          Description
    23-Jan-1995     1.00        C. Houlberg     Baseline Abstract:   Overlay #2 display functions.
    1)  Initialize overlay #2 display.
    2)  Update overlay #2 display.
    3)  Display overlay #2 object location.
*************************************************************************/
/*  All parameters and functions used by overlay2.c are defined in
    the following header files.
*/
    #include "stdio.h"                  /* Standard I/O definitions */
    #include "graph.h"                  /* Graphics I/O definitions */
    #include "mem_map.h"                /* Hardware memory map */
    #include "avtsc.h"                  /* Project definitions */
    #include "acqsight.h"               /* Acquisition sight definitions */
    #include "irds.h"                   /* IRDS definitions */
    #include "ins.h"                    /* INS definitions */
    #include "earth.h"                  /* Earth definitions */
    #include "utility.h"                /* Utility definitions */
    #include "video.h"                  /* Video definitions */
    #include "overlay2.h"               /* Overlay #2 display definitions */

/*  Global variable declarations.
*/
    short overlay2_start_mode;          /* Initial overlay #2 screen mode */
    GRAPHICS_TYPE graph2;               /* Overlay #2 screen graphics makeup */

/************************************************************************
Function Name:  init_overlay2_display()
Number/Version:
History:
    Date            Rev         Author          Description
    7-Feb-1995      1.00        C. Houlberg     Baseline Abstract:   Initializes overlay #2 display.
*************************************************************************/
void init_overlay2_display(void)
{
    /* Variable declarations */
    struct _videoconfig video;          /* Configuration of video screen */

/* Select overlay2 display board and set the operating mode */
    current_port = switch_monitors(NFOV, current_port);
    set_operation_mode(OVERLAY_MODE);

/* Set the video mode and clear the screen */
    _getvideoconfig(&video); overlay2_start_mode = video.mode;
    _setvideomode(_VRES16COLOR);
    _clearscreen(_GCLEARSCREEN);

/* Get video configuration data and set the screen origin */
    _getvideoconfig(&video);
```

249

Navy Case No. 77257

```
        graph2.X_Center = (short) (video.numxpixels)/2;
        graph2.Y_Center = (short) (video.numypixels)/2;
        _setvieworg(graph2.X_Center, graph2.Y_Center);
        graph2.X_Max = (short) (video.numxpixels)/2;
        graph2.Y_Max = (short) (video.numypixels)/2;
}

/************************************************************************
Function Name:   update_overlay2_display()
Number/Version:
History:
        Date              Rev       Author         Description
        16-Feb-1995       1.00   C. Houlberg       Baseline Abstract:   Updates overlay #2 display data.
************************************************************************/
void update_overlay2_display(void)
{
        /* Select overlay2 display board */
        current_port = switch_monitors(NFOV, current_port);

/* Display date and time */
        _settextposition(ACFT_TIME2);
        _outtext(platform.Day);
        _outtext(":");
        _outtext(platform.Time);
}

/************************************************************************
Function Name:   overlay2_location_display()
Number/Version:
History:
        Date              Rev       Author         Description
        23-Jan-1995       1.00   C. Houlberg       Baseline Abstract:   Displays overlay #2 latitude, longitude, and altitude.
************************************************************************/
void overlay2_location_display(void)
{
        /* Variable declarations */
        char buffer[21];                   /* 20 Character buffer for display */

/* Select overlay2 display board */
        current_port = switch_monitors(NFOV, current_port);

/* To display or not to display, that is the question */
        if((display_location == YES) || (display_location == IS_DISPLAYED))
        {
                /* Display title, time, and lables */
                sprintf(buffer, "Marked Target");
                _settextposition(TGT_TITLE2);  _outtext(buffer);
                _settextposition(TGT_TIME2);   _outtext(designated_point.Time);
                sprintf(buffer, "Altitude =");
                _settextposition(TGT_ALT2);    _outtext(buffer);

if(designated_point.Alt == UNDEFINED)
                {
```

250

Navy Case No. 77257

```
                /* Location is undefined */
                sprintf(buffer, "Undefined   ");
                _settextposition(TGT_LAT2); _outtext(buffer);
                sprintf(buffer, "Undefined   ");
                _settextposition(TGT_LON2); _outtext(buffer);
                sprintf(buffer, "Undefined");
                _settextposition(TGT_ALT2 + 11); _outtext(buffer);
            }
            else
            {
                /* Display the latituce, longitude, and altitude */
                latitude_to_ascii(buffer, designated_point.Lat);
                _settextposition(TGT_LAT2); _outtext(buffer);
                longitude_to_ascii(buffer, designated_point.Lon);
                _settextposition(TGT_LON2); _outtext(buffer);
                sprintf(buffer, "%-6.0f %s", designated_point.Alt, "   ");
                _settextposition(TGT_ALT2 + 11); _outtext(buffer);
            }
        }
        else
        {
        /* Clear displayed text */
            sprintf(buffer, "                ");
            _settextposition(TGT_TITLE2); _outtext(buffer);
            _settextposition(TGT_TIME2);  _outtext(buffer);
            _settextposition(TGT_LAT2);   _outtext(buffer);
            _settextposition(TGT_LON2);   _outtext(buffer);
            _settextposition(TGT_ALT2);   _outtext(buffer);
        }
}

/******************************************************************************
Function Name:   overlay2_default_mode()
Number/Version:
History:
        Date            Rev     Author          Description
        31-Jan-1995     1.00    C. Houlberg     Baseline Abstract:   Returns overlay2 to its default video mode.
******************************************************************************/
void overlay2_default_mode(void)
{
        /* Select overlay2 display board */
        current_port = switch_monitors(NFOV, current_port);

/* Return overlay #2 display to its default mode */
        _setvideomode(overlay2_start_mode);
        _clearscreen(_GCLEARSCREEN);
}
/* end */
```

Navy Case No. 77257

```
/*******************************************************************
Module Name:    overlay2.h
Number/Version:
History:
        Date            Rev     Author          Description
        12-Jan-1995     1.00    C. Houlberg     Baseline Abstract:
    Overlay #2 display definitions.
*******************************************************************/

/*      Constant definitions.
*/
        /* Character display definitions */
        #define ACFT_TIME2              27,35                       /* Run time location */
        #define TGT_LINE2               20
        #define TGT_COL2                50
        #define TGT_TITLE2              TGT_LINE2,     TGT_COL2     /* Title location */
        #define TGT_TIME2               TGT_LINE2 + 1, TGT_COL2 /* Time location */
        #define TGT_LAT2                TGT_LINE2 + 2, TGT_COL2 /* Latitude location */
        #define TGT_LON2                TGT_LINE2 + 3, TGT_COL2 /* Longitude location */
        #define TGT_ALT2                TGT_LINE2 + 4, TGT_COL2 /* Altitude location */

/*      External variable definitions.
*/
        extern short overlay2_start_mode;   /* Initial overlay #2 screen mode */

/*      Function definitions.
*/
        void init_overlay2_display(void);
        void update_overlay2_display(void);
        void overlay2_location_display(void);
        void overlay2_default_mode(void);

/* end */
```

252

Navy Case No. 77257

```c
/* PCLAB function definitions -- C header include file. */

/* configuration functions */
extern short initialize( void );
extern short select_board( short );
extern short reset_dt( short * );
extern short set_timeout( short );
extern short find_dma_length( unsigned short *, short * );
extern short terminate( void );

/* analog input functions */
extern short adc_value( short, short, unsigned short * );
extern short adc_on_trigger( short, short, unsigned short * );
extern short setup_adc( short, short, short, short );
extern short adc_series( short, unsigned short * );
extern short begin_adc_dma( short, unsigned short * );
extern short continuous_adc_dma( short, unsigned short * );
extern short test_adc_dma( short * );
extern short wait_adc_dma( unsigned short * );
extern short stop_adc_dma( void );

/* analog output functions */
extern short dac_value( short, unsigned short * );
extern short dac_on_trigger( short, unsigned short * );
extern short setup_dac( short, short );
extern short dac_series( short, unsigned short * );
extern short begin_dac_dma( short, unsigned short * );
extern short continuous_dac_dma( short, unsigned short * );
extern short test_dac_dma( short * );
extern short wait_dac_dma( unsigned short * );
```

253

Navy Case No. 77257

```c
extern short stop_dac_dma( void );

/* digital input and output functions */ extern short enable_for_output( short );

extern short enable_for_input( short );

extern short output_digital_value( short, unsigned short, unsigned short );

extern short output_digital_on_trigger( short, unsigned short, unsigned short);

extern short input_digital_value( short, unsigned short, unsigned short * );

extern short input_digital_on_trigger(short, unsigned short, unsigned short *);

/* clock functions */ extern short set_clock_divider( long );

extern short set_clock_frequency( float * );

extern short set_clock_period( float * );

/* DT2806 clock functions */ extern short xdelay( short, long );

extern short xstrobe( short, long );

extern short wait_on_delay( void );

extern short generate_clock( long );

extern short count_events( void );

extern short read_events( long * );

extern short get_frequency( short, short *, long * );

extern short stop_clocks( void );

/* system clock functions */ extern short disable_system_clock( void );

extern short enable_system_clock( void );

/* voltage and temperature functions */ extern short measure_volts( short, float * );
```

254

Navy Case No. 77257

```c
extern short measure_thermocouple( short, short, float * );
extern short measure_compensation( float * );
extern short volts_to_degrees( short, float *, float * );
extern short degrees_to_volts( short, float *, float * );
extern short analog_to_volts( unsigned short, short, float * );

/* iSBX functions */
extern short isbx_read( short, short, short, unsigned short * );
extern short isbx_write( short, short, short, unsigned short );

/* error processor functions */
extern short set_error_control_word( unsigned short );
extern short get_error_code( short * );
extern short get_dt_error( unsigned short * );

/* End of PCLAB function definitions. */
```

Navy Case No. 77257

```
/*                          PCLERRS.H

Global error definitions: these error codes are returned from PCLAB
  subroutines.

*/ define E_OUTTMO       7    /* user timeout exceeded on output */
define E_INPTMO       6    /* user timeout exceeded on input */
#define E_DMABSY       5    /* DMA channel currently busy */
#define E_2FAST        4    /* board clocked too fast */
#define E_NORMAL       0    /* success! */
#define E_NOPCL       -1    /* device driver PCL not found */
#define E_MANYFIL     -2    /* too many files open */
#define E_GATING      -4    /* illegal gating source for clock routines */
#define E_NOTFUNC     -5    /* board not capable of requested function */
#define E_DMAFREE     -6    /* DMA not currently in use */
#define E_DMAASN      -7    /* DMA channel not assigned to unit */
#define E_ILLSBX      -8    /* illegal iSBX slot, chip select, or channel
                               number */
#define E_GAIN       -10    /* illegal gain specification */
#define E_DMABND     -13    /* DMA buffer crosses 64K boundary */
#define E_NVALUE     -16    /* non-positive number of values argument */
#define E_MAXVAL     -17    /* series transfer count exceeds 32760 */
#define E_TIMING     -19    /* illegal timing source value */
#define E_SMALLP     -24    /* requested period too small */
#define E_LARGEP     -25    /* requested period too large */
#define E_CLKDIV     -26    /* illegal clock divider */
#define E_PORT       -27    /* illegal digital port */
#define E_CLKTIM     -28    /* illegal clock period or clock freq.
                               period or frequency too small or
                               too large */
#define E_CHANNL     -29    /* illegal channel number */
#define E_DACSEL     -30    /* illegal DAC select */
#define E_BOARD      -31    /* illegal board number */
#define E_STARTC     -32    /* illegal start channel */
#define E_NODIN      -33    /* DIO port enabled for output */
#define E_NODOUT     -34    /* DIO port enabled for input */
#define E_TYPE       -35    /* Illegal thermocouple type. Must be ASCII of
                               B, E, J, K, R, S, T upper or lower case */
#define E_OVTAB      -36    /* specified voltage in routines XVTD, or XMT
                               is not in the thermocouple type's range */
#define E_OTTAB      -37    /* temperature specified in routines XDTV or
                               XMT is not in thermocouple type's range */
#define E_CJC        -38    /* compensated voltage (DT707-T channel zero)
                               is out of linear range. Linear range
                               is 0 degrees C to +40 degrees C */
#define E_INIDAC     -42    /* DAC not initialized */
#define E_INIADC     -43    /* ADC not initialized */
#define E_INPUT      -44    /* board timeout on input */
#define E_OUTPUT     -45    /* board timeout on output */
#define E_READY      -46    /* board timeout on ready */
#define E_ILIV       -49    /* Voltage value in routine XATV is not between
                               current board's negative full scale and
                               positive full scale */
#define E_ILLVAL     -50    /* Illegal ISBX write value */
#define E_ERRCWD     -51    /* Invalid Error Control Word */
```

256

Navy Case No. 77257

```
#define E_UNEXP        -100    /* unexpected error */
/*  end PCLERRS.H  */
```

Navy Case No. 77257

```
/*********************************************************************
Module Name:    pointing.c
Number/Version:
History:
    Date         Rev      Author         Description
    17-Jan-1995  1.00     C. Houlberg    Baseline
    12-Dec-1995  1.03     C. Houlberg    Corrected gimbal pointing error.
                                         gimbal_angles().
    13-Dec-1995  1.03     C. Houlberg    Fix for sequence error and
                                         potential truncation error.
                                         object_direction().
    21-Mar-1996  1.04     C. Houlberg    Changed function name.
                                         estimate_location()
    21-Mar-1996  1.04     C. Houlberg    Changed arguement in function.
                                         estimate_location()
                                         gimbal_orientation()
    21-Mar-1996  1.04     C. Houlberg    Made function more general
                                         geocentric_to_geographic()
    21-Mar-1996  1.04     C. Houlberg    Simplified program.
                                         gimbal_orientation()
    21-Mar-1996  1.04     C. Houlberg    Added triangulation feature.
                                         global items
                                         triangulate_location()
                                         triangulate()
    25-Mar-1996  1.04     C. Houlberg    Fixed new estimated altitude error.

Abstract:  Pointing functions (all angles are in radians).
    estimate_location():
        Determines the geographic location of the point pointed to by the
        display as given by its Line Of Sight (LOS) obtained from the
        gimbal azimuth and elevation, the estimated altitude of the point,
        and the platform location and orientation.
    object_direction():
        Converts pointing angles to angles for a platform with a roll,
        pitch, and heading of zero.
    geographic_to_geocentric():
        Converts geographic location to geocentric coordinates.
    topocentric_to_geocentric():
        Converts topocentric location of object to geocentric coordinates
        given geocentric location and orientation of the platform.
    geocentric_to_geographic():
        Converts the geocentric coordinates to geographic.
    re_estimate_location()
        Uses last platform location and orientation to determine location of
        object.
    translate_coordinates():
        Translates point's coordinates to coordinate system with new origin.
    rotate_about_x():
        Translates point's coordinates to coordinates of system rotated
        about x axis.
    rotate_about_y():
        Translates point's coordinates to coordinates of system rotated
        about y axis.
    rotate_about_z():
        Translates point's coordinates to coordinates of system rotated
        about z axis.
    gimbal_angles():
```

Navy Case No. 77257

```
                Converts Cartesian coordinates to gimbal angle (azimuth and
                elevation) values.
        triangulate_location():
                Triangulates location of object if a previously valid designation
                exists.  If one does not exist the location is designated using
                the estimated altitude.
        triangulate():
                Triangulates line_of_sight vector to object (obtained from
                current line-of-sight angles and geographic location of platform)
                with previous line-of-sight vector to object (obtained from previous
                geographic location of platform and object) to obtain new geographic
                coordinates of object.
*******************************************************************************/
/*      All parameters and global functions used by pointing.c are defined in
        the following header files.
*/
        #include "math.h"                       /* Math function definitions */
        #include "avtsc.h"                      /* Project definitions */
        #include "init.h"                       /* Initialization definitions */
        #include "keyboard.h"                   /* Keyboard variable definitions */
        #include "ins.h"                        /* INS definitions */
        #include "earth.h"                      /* Earth definitions */
        #include "console.h"                    /* Console display definitions */
        #include "pointing.h"                   /* Pointing function definitions */

/*      Global definitions.
*/
        struct Pointing_Angles pointing_input;
        struct Pointing_Angles pointing_output;
/* Code added 21-Mar-1996 for new triangulation feature. */
        struct Inertial last_platform;
        short Insufficient_Angle_Warning;

/* Local definitions.
*/
        #define MIN_TRI_ANGLE   .0001           /* Minimum triangulation angle */
/* End of added code */

/*      Functions local to pointing.c.
*/
        void object_direction(struct Pointing_Angles *direction,
                struct Inertial *geographic, struct Pointing_Angles *pointing);
        void geographic_to_geocentric(CARTESIAN_TYPE *geocentric,
                GEOGRAPHIC_TYPE *geographic);
        void topocentric_to_geocentric(CARTESIAN_TYPE *object,
                CARTESIAN_TYPE *platform, struct Pointing_Angles *direction);
        void geocentric_to_geographic(GEOGRAPHIC_TYPE *geographic,
                CARTESIAN_TYPE *geocentric);
        void translate_coordinates(CARTESIAN_TYPE *point_2,
                CARTESIAN_TYPE *point_1);
        void rotate_about_x(CARTESIAN_TYPE *point, double angle);
        void rotate_about_y(CARTESIAN_TYPE *point, double angle);
        void rotate_about_z(CARTESIAN_TYPE *point, double angle);
        void gimbal_angles(struct Pointing_Angles *angles,
                CARTESIAN_TYPE *object);
/* Code added 21-Mar-1996 for added triangulation feature */
        void triangulate(GEOGRAPHIC_TYPE *object_loc_ptr,
```

259

Navy Case No. 77257

```
             struct Inertial *last_platform_ptr, struct Inertial *platform_ptr,
             struct Pointing_Angles *line_of_sight_ptr);
     void save_platform(struct Inertial *last_platform_ptr,
             struct Inertial *platform_ptr);
/* End of added code */
/****************************************************************
Function Name:    estimate_location()
Number/Version:
History:
     Date           Rev       Author           Description
     14-Mar-1995    1.00      C. Houlberg      Baseline
     21-Mar-1996    1.04      C. Houlberg      Changed function name.
                                               estimate_location().
     21-Mar-1996    1.04      C. Houlberg      Changed arguement in function.
     21-Mar-1996    1.04      C. Houlberg      Added save data feature.

Global inputs:
     Platform geographic location and orientation.
     LOS angles pointed to by the gimbal (pointing_input.az, pointing_input.el).
     Estimated altitude of point (estimated_altitude).

Global Outputs:
     Designated geographic coordinates.

Abstract:  Determines the geographic location of the point pointed to by
     the display as given by its Line Of Sight (LOS) obtained from the
     gimbal azimuth and elevation, the estimated altitude of the point,
     and the platform location and orientation.  The location is based on the
     assumption that the Earth is an ellipsoid.
          Orientation of the geocentric coordinate system used is as follows:
     Origin of coordinate system located at the center of the Earth.
     Platform located in the X-Z plane of the coordinate system.
     X axis oriented to pass through latitude 0.
     Y axis oriented to pass through latitude 0.
     Z axis oriented along the pole with north positive.
****************************************************************/
/* Code changed 21-Mar-1996 to rename function from:
void geographic_location(void)
to: */
void estimate_location(void)
/* End of code change */
{
     /* Variable declarations */
     struct Pointing_Angles direction;
     GEOGRAPHIC_TYPE geographic_location;
     CARTESIAN_TYPE platform_geocentric;
     CARTESIAN_TYPE object_geocentric;

/* Convert pointing angles to angles for a platform with a roll, pitch,
        and heading of zero */
     object_direction(&direction, &platform, &pointing_input);

/* Determine local geocentric coordinates of the platform */
/* Code added 21-Mar-1996 to account for arguement change in function. */
     geographic_location.Lat = platform.Lat;
     geographic_location.Lon = platform.Lon;
     geographic_location.Alt = platform.Alt;
```

Navy Case No. 77257

```
/* End of added code */
    geographic_to_geocentric(&platform_geocentric, &geographic_location);

/* Determine geocentric coordinates of the object */
    /* Temporally assigning estimated platform and object altitudes
         to X and Y locations respectively to implement the
         topocentric_to_geocentric function */
    object_geocentric.X = platform.Alt;
    object_geocentric.Y = estimated_altitude;
    topocentric_to_geocentric(&object_geocentric,
         &platform_geocentric, &direction);

/* Convert local geocentric coordinates to geographic location */
    if(object_geocentric.X || object_geocentric.Y || object_geocentric.Z)
    {
/* Code added 21-Mar-1996 to account for arguement change in function */
        rotate_about_z(&object_geocentric, -platform.Lon);
/* End of added code */
        geocentric_to_geographic(&designated_point,    &object_geocentric);
    }
    else                                                   /* Location
undefined */
    {
        designated_point.Alt = UNDEFINED;
    }

/* Code added 21-Mar-1996 for update or triangulation calculations */
    /* Save platform data for update or triangulation calculations */
    save_platform(&last_platform, &platform);
/* End of added code */
}

/*********************************************************************
Function Name:   object_direction()
Number/Version:
History:
    Date            Rev         Author          Description
    14-Mar-1995     1.00        C. Houlberg     Baseline
    13-Dec-1995     1.03        C. Houlberg     Fix for sequence error and
                                                    potential truncation
error.

Inputs:
    Orientation of platform (inertial->roll,
         inertial->pitch, and inertial->heading).
    Topocentric location of object (pointing->Az and pointing->El).

Outputs:
    Geocentric coordinates (geocentric->X, geocentric->Y, and geocentric->Z).

Abstract:  Converts pointing angles to angles for a platform with a roll,
    pitch, and heading of zero.
         Transformations used:                          Z
    Roll:                                               |
         Using:                                         |
              x = -d cos(az)cos(                        |
              z = d sin(el)                             |
```

Navy Case No. 77257

Rotation about the Y axis yields:

$$\begin{vmatrix} x1 \\ y1 \\ z1 \end{vmatrix} = \begin{vmatrix} \cos(r) & 0 & -\sin(r) \\ 0 & 1 & 0 \\ \sin(r) & 0 & \cos(r) \end{vmatrix} \begin{vmatrix} x0 \\ y0 \\ z0 \end{vmatrix}$$

Hence:

$$\begin{vmatrix} -\cos(az1)\cos(el1) \\ \sin(el1) \end{vmatrix} = \begin{vmatrix} \cos(r) & \sin(r) \\ -\sin(r) & \cos(r) \end{vmatrix} \begin{vmatrix} -\cos(az0)\cos(el0) \\ \sin(el0) \end{vmatrix}$$

Pitch:
  Using:
    y = d sin(az)cos(el)
    z = d sin(el)
  Rotation about the X axis yields:

$$\begin{vmatrix} x1 \\ y1 \\ z1 \end{vmatrix} = \begin{vmatrix} 1 & 0 & 0 \\ 0 & \cos(p) & \sin(p) \\ 0 & -\sin(p) & \cos(p) \end{vmatrix} \begin{vmatrix} x0 \\ y0 \\ z0 \end{vmatrix}$$

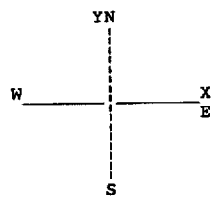

Hence:

$$\begin{vmatrix} \sin(az1)\cos(el1) \\ \sin(el1) \end{vmatrix} = \begin{vmatrix} \cos(p) & -\sin(p) \\ \sin(p) & \cos(p) \end{vmatrix} \begin{vmatrix} \sin(az0)\cos(el0) \\ \sin(el0) \end{vmatrix}$$

Heading:

$$\begin{vmatrix} az1 \\ el1 \end{vmatrix} = \begin{vmatrix} 1 & 0 \\ 0 & 1 \end{vmatrix} \begin{vmatrix} az0 \\ el0 \end{vmatrix} + \begin{vmatrix} h \\ 0 \end{vmatrix}$$

where r, p, and h represent the roll, pitch, and heading of the acft.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/
```
void object_direction(struct Pointing_Angles *direction,
      struct Inertial *geographic, struct Pointing_Angles *pointing)
{
      /* Variable declarations */
      double cace, se;
      double az_b, el_b;
      double az_c, el_c;
      double cazb, sazc;

/* Moved and changed code 13-Dec-1995 to bottom of function, sequence error:
      az_a = pointing->Az + geographic->Heading;
      if(az_a > PI)
            az_a = az_a - 2*PI;
      el_a = pointing->El;
End of moved code */

/* Accounting for roll */
/* Code change 13-Dec-1995 to allow for moved code from:
      el_b = asin(cos(az_a) * cos(el_a) * sin(geographic->Roll)
            + sin(el_a) * cos(geographic->Roll));
to: */
      cace = cos(pointing->Az) * cos(pointing->El);
      se = sin(pointing->El);
      el_b = asin(cace * sin(geographic->Roll) + se * cos(geographic->Roll));
/* End of code change */
```

262

Navy Case No. 77257

```
      /* Azimuth is undefined when elevation = +/-PI/2 (beyond gimbal limits) */
      if(cos(el_b))
      {
/* Code change 13-Dec-1995 to allow for possible truncation error from:
            az_b = acos((cos(az_a) * cos(el_a) * cos(geographic->Roll)
                    - sin(el_a) * sin(geographic->Roll))/cos(el_b));
to: */
            cazb = (cos(pointing->Az) * cos(pointing->El) * cos(geographic->Roll)
                    - sin(pointing->El) * sin(geographic->Roll))/cos(el_b);
            if(cazb < -1)                   /* Account for possible truncation error */
                  az_b = PI;
            else if(cazb > 1)
                  az_b = 0;
            else
                  az_b = acos(cazb);
            if(pointing->Az < 0)            /* Don't loose sign */
/* End of code change */
                  az_b = -az_b;
      }
      else
            az_b = 0;

/* Accounting for pitch */
/* Code change 13-Dec-1995 to account for moved code
 and to allow for possible truncation error from:
      direction->El = asin(sin(az_b) * cos(el_b) * sin(geographic->Pitch)
                    + sin(el_b) * cos(geographic->Pitch));
      if(cos(direction->El))
      {
            direction->Az = asin((sin(az_b) * cos(el_b) * cos(geographic->Pitch)
                    - sin(el_b) * sin(geographic->Pitch))/cos(direction->El));
            if(az_b > PI/2)
                  direction->Az = PI - direction->Az;
            else if(az_b < -PI/2)
                  direction->Az = -PI - direction->Az;
      }
      else
            direction->Az = 0;
to: */
      el_c = asin(sin(az_b) * cos(el_b) * sin(geographic->Pitch)
                    + sin(el_b) * cos(geographic->Pitch));
      /* Azimuth is undefined when elevation = +/-PI/2 */
      if(cos(el_c))
      {
            sazc = (sin(az_b) * cos(el_b) * cos(geographic->Pitch)
                    - sin(el_b) * sin(geographic->Pitch))/cos(el_c);
            if(sazc < -1)                   /* Account for possible truncation error */
                  az_c = -PI/2;
            else if(sazc > 1)
                  az_c = PI/2;
            else
                  az_c = asin(sazc);
            if(az_b > PI/2)                 /* Don't loose sign */
                  az_c = PI - az_c;
            else if(az_b < -PI/2)
                  az_c = -PI - az_c;
      }
```

263

Navy Case No. 77257

```
        else
                az_c = 0;
/* End of code change */

/* Accounting for heading */
/* Code moved 13-Dec-1995 from top of function, heading was out of order: */
        direction->Az = az_c + geographic->Heading;
        if(direction->Az > PI)   /* Keep between +/-PI radians (+/-180 degrees) */
                direction->Az = direction->Az - 2*PI;
        direction->El = el_c;
/* End of moved and changed code */
}

/*********************************************************************
Function Name:    geographic_to_geocentric()
Number/Version:
History:
        Date            Rev         Author              Description
        14-Mar-1995     1.00        C. Houlberg         Baseline Inputs:
        Geographic location (geographic->Lat, geographic->Lon,
                and geographic->alt).

Outputs:
        Geocentric coordinates (geocentric->X, geocentric->Y, and geocentric->Z).

Abstract:   Converts geographic location to geocentric coordinates.
                Equations used:
        X = (Re + alt)/sqrt(1 + ((Re + alt)/(Rp + alt) * (Re + alt)/(Rp + alt)
              * tan(lat) * tan(lat)))
        Y = 0 Point located in the X-Z plane.
        Z = X * tan(lat)
**********************************************************************/
void geographic_to_geocentric(CARTESIAN_TYPE *geocentric,
        GEOGRAPHIC_TYPE *geographic)
{
        /* Variable declarations */
        double a, b, c;

/* Determine declared variables */
        a = EQUATORIAL_RADIUS + geographic->Alt;
        b = POLAR_RADIUS + geographic->Alt;

/* Point located in the X-Z plane */
        geocentric->Y = 0;

/* Watch out for the poles */
        if(geographic->Lat == PI/2)
        {
                geocentric->X = 0;
                geocentric->Z = b;
        }
        else if(geographic->Lat == -PI/2)
        {
                geocentric->X = 0;
                geocentric->Z = -b;
```

Navy Case No. 77257

```
        }
        else
        {
                c = tan(geographic->Lat);
                geocentric->X = a/sqrt(1.0 + (a/b * a/b * c * c));
                geocentric->Z = geocentric->X * c;
        }
}

/****************************************************************************
Function Name:    topocentric_to_geocentric()
Number/Version:
History:
        Date            Rev         Author              Description
        14-Mar-1995     1.00        C. Houlberg         Baseline Inputs:
        Geocentric location of platform (platform->X,
              platform->Y, and platform->Z).
        Topocentric location of object (direction->Az and direction->El).
        Platform altitude temporarily located in object->X
        Estimated object altitude temporarily located in object->Y Outputs:
        Geocentric coordinates (object->X, object->Y, and object->Z).

Abstract:   Converts topocentric location of object to geocentric coordinates
        given geocentric location and orientation of the platform.
            Platform coordinates:
                    y|                              y|
                     |  _r(sin(az)cos(el))          |       el  -
                  \ - - -|                           \  /
                   |/\r  |                            \ /
                   | az \|                             \
                 __||____\|_____x           z__|____\|_____
                   ||
            r(cos(az)cos(el))|                    r(sin(el))|

Z|N                      Where:
              |        *                    a = astronomic latitude
              |       //                    g = geographic latitude
              |      //                     Re = equatorial radius
              |     //                      Rp = polar radius
              |    / /
              |   /  /              With the assumption that the Earth
              |  /\  /\                 is an ellipsiod.
              | /  g/  a
              |/____|_/___|_____X (latitude = 0)

Equations used:
Line passing through platform and object:
        In the X-Z plane: Z = a1*X + b1 or X = (Z - b1)/a1 or b1 = Zp -a1*Xp
        In the Y-Z plane: Z = a2*Y + b2 or Y = (Z - b2)/a2
              At Y = 0, Z = b2 = Zp
```

Navy Case No. 77257

Where:
    $(Xp,0,Zp)$ = location of platform
    a1 = dZ/dX
       = (sin(az)cos(el)cos(a) + sin(el)sin(a))
        /(-sin(az)cos(el)sin(a) + sin(el)cos(a))
    b1 = Zp - a1*Xp
    a2 = dZ/dY = dZ/dx
       = (sin(az)cos(el)cos(a) + sin(el)sin(a))/(-cos(az)cos(el))
    b2 = Zp
    a = atan(k1*k1 * tan(geographic_latitude))
    k1 = (Re + platform_altitude)/(Rp + platform_altitude)
    tan(geographic_latitude) = Zp/Xp Surface object is located on:
    X*X + Y*Y + k2*k2*Z*Z = ro*ro
    Where:
       k2 = (Re + object_altitude)/(Rp + object_altitude)
       ro = Re + object_altitude Point on surface where object is located, by substituting for X and Y
    from the above line equations, is given by:
    Zo = (-b3 + sqrt(b3*b3 - 4*a3*c3))/(2*a3)    Quadratic equation
    Xo = (Zo - b1)/a1
    Yo = (Zo - b2)/a2
    Where:
       a3 = 1/(a1*a1) + 1/(a2*a2) + k2*k2
       b3 = -2(b1/(a1*a1) + b2/(a2*a2))
       c3 = b1*b1/(a1*a1) + b2*b2/(a2*a2) - ro*ro Special conditions:
    dZ = 0
       Zo = Zp
       X = a4*Y + b4
       Yo = (-b5 + sqrt(b5*b5 - 4*a5*c5))/(2*a5) Quadratic equation
       Xo = a4*Yo + b4
    Where:
       a4 = dX/dY
         = (-sin(az)cos(el)sin(a) + sin(el)cos(a))/(-cos(az)cos(el))
       b4 = Xp - a4*Yp
       a5 = 1 + a4*a4
       b5 = 2*a4*b4
       c5 = b4*b4 + k2*k2*Zo*Zo - ro*ro
    dY = 0
       Yo = Yp
       X = (Z - b1)/a1
       Zo = (-b6 + sqrt(b6*b6 - 4*a6*c6))/(2*a6) Quadratic equation
       Xo = (Zo - b1)/a1
    Where:
       a6 = 1/(a1*a1) + k2*k2
       b6 = -2*b1/(a1*a1)
       c6 = b1*b1/(a1*a1) + Yo*Yo - ro*ro
    dX = 0
       Xo = Xp
       Z = a2*Y + b2
       Yo = (-b7 + sqrt(b7*b7 - 4*a7*c7))/(2*a7) Quadratic equation
       Zo = a2*Yo + b2
    Where:
       a7 = 1 + k2*k2*a2*a2
       b7 = 2*(k2*k2*a2*b2)
       c7 = Xo*Xo + k2*k2*b2*b2 - ro*ro Navy Case No. 77257

```
                dZ and dY = 0
                        Zo = Zp
                        Yo = Yp
                        Xo = sqrt(ro*ro - Yo*Yo - k2*k2*Zo*Zo)
                dZ and dX = 0
                        Zo = Zp
                        Xo = Xp
                        Yo = sqrt(ro*ro - Xo*Xo - k2*k2*Zo*Zo)
                dY and dX = 0
                        Yo = Yp
                        Xo = Xp
                        Zo = sqrt(ro*ro - Xo*Xo - Yo*Yo)/k2
                dZ and dY and dX = 0
                        Zo = Zp
                        Yo = Yp
                        Xo = Xp
***************************************************************************/
void topocentric_to_geocentric(CARTESIAN_TYPE *object,
        CARTESIAN_TYPE *platform, struct Pointing_Angles *direction)
{
        /* Variable declarations */
        double platform_alt, object_alt;
        double k1, a;
        double sinaz, cosaz, sinel, cosel;
        double sina, cosa;
        double delta_X, delta_Y, delta_Z;
        double k2, ro;
        double a1, b1, a2, b2;
        double a3, b3, c3;
        double a4, b4;
        double a5, b5, c5;
        double a6, b6, c6;
        double a7, b7, c7;
        double four_ac, b_squared;
        double root, solution1, solution2;

/* object->X temporally contains platform altitude */
        platform_alt = object->X;

/* object->Y temporally contains object altitude */
        object_alt = object->Y;

/* Calculate factor used for surface platform is located on */
        k1 = (EQUATORIAL_RADIUS + platform_alt)/(POLAR_RADIUS + platform_alt);

/* Calculate astronomic latitude of platform */
        if(platform->X)                                          /* Not over pole */
        {
                a = atan(k1 * k1 * platform->Z/platform->X);
        }
        else
        {
                if(platform->Z > 0)                              /* Over north pole */
                        a = PI/2;
                else
                        a = -PI/2;                               /* Over south pole */
        }
```

267

Navy Case No. 77257

```
/* Calculate frequently used variables */
sinaz = sin(direction->Az);
cosaz = cos(direction->Az);
sinel = sin(direction->El);
cosel = cos(direction->El);
sina = sin(a);
cosa = cos(a);

/* Calculate delta values */
delta_X = -sinaz * cosel * sina + sinel * cosa;
delta_Y = -cosaz * cosel;
delta_Z = sinaz * cosel * cosa + sinel * sina;

/* Calculate factor for surface object is located on */
k2 = (EQUATORIAL_RADIUS + object_alt)/(POLAR_RADIUS + object_alt);

/* Radial constant of object surface */
ro = EQUATORIAL_RADIUS + object_alt;

/* Calculate object location allowing for special conditions */
if(delta_X)
{
        /* Pointing vector slope and offset */
        a1 = delta_Z/delta_X;
        b1 = platform->Z - a1*platform->X;
        if(delta_Y)
        {
                /* Pointing vector slope and offset */
                a2 = delta_Z/delta_Y;
                b2 = platform->Z;
                if(delta_Z)
                {
                        /* Quadratic equation factors and constant */
                        a3 = 1/(a1*a1) + 1/(a2*a2) + k2*k2;
                        b3 = - 2*(b1/(a1*a1) + b2/(a2*a2));
                        c3 = b1*b1/(a1*a1) + b2*b2/(a2*a2) - ro*ro;
                        b_squared = b3*b3;
                        four_ac = 4*a3*c3;

/* Location */
                        if(four_ac <= b_squared)            /* A real solution exists */
                        {
                                /* Solution to quadratic */
                                root = sqrt(b_squared - four_ac);
                                solution1 = (-b3 + root)/(2*a3);
                                solution2 = (-b3 - root)/(2*a3);

/* Select the proper solution */
                                if(object_alt <= platform_alt)      /* Assume closest Z */
                                        if(fabs(platform->Z - solution1)
                                                < fabs(platform->Z - solution2))
                                                object->Z = solution1;
                                        else
                                                object->Z = solution2;
                                else
                                        if(direction->El >= 0)                  /* Closest Z */
                                                if(fabs(platform->Z - solution1)
```

268

Navy Case No. 77257

```
                                <= fabs(platform->Z - solution2))
                                object->Z = solution1;
                        else
                                object->Z = solution2;
                else                                    /* Farthest Z */
                        if(fabs(platform->Z - solution1)
                                <= fabs(platform->Z - solution2))
                                object->Z = solution2;
                        else
                                object->Z = solution1;

/* Complete location */
        object->X = (object->Z - b1)/a1;
        object->Y = (object->Z - b2)/a2;

/* Must be on proper side of platform */
        if(((cosaz > 0) && (object->Y > 0))
                || ((cosaz < 0) && (object->Y < 0)))    /* Wrong side */
        {
                        object->X = 0;      /* Signify invalid solution */
                        object->Y = 0;
                        object->Z = 0;
        }
    }
    else                                                /* No real solution */
    {
        /* Locating object at center of Earth to signify
                no real solution */
        object->X = 0;
        object->Y = 0;
        object->Z = 0;
    }
}
else
{
    object->Z = platform->Z;

/* Pointing vector slope and offset */
    a4 = delta_X/delta_Y;
    b4 = platform->X - a4*platform->Y;

/* Quadratic equation factors and constant */
    a5 = 1 + a4*a4;
    b5 = 2*a4*b4;
    c5 = b4*b4 + k2*k2*object->Z*object->Z - ro*ro;
    b_squared = b5*b5;
    four_ac = 4*a5*c5;

/* Location */
    if(four_ac <= b_squared)                    /* A real solution exists */
    {
            /* Solution to quadratic */
            root = sqrt(b_squared - four_ac);
            solution1 = (-b5 + root)/(2*a5);
            solution2 = (-b5 - root)/(2*a5);

/* Select the proper solution */
```

269

Navy Case No. 77257

```
                if(object_alt <= platform_alt)        /* Assume closest Y */
                        if(fabs(solution1) <= fabs(solution2))
                                object->Y = solution1;
                        else
                                object->Y = solution2;
                else
                        if(direction->El > 0)                    /* Closest Y */
                                if(fabs(solution1) <= fabs(solution2))
                                        object->Y = solution1;
                                else
                                        object->Y = solution2;
                        else                                     /* Farthest Y */
                                if(fabs(solution1) <= fabs(solution2))
                                        object->Y = solution2;
                                else
                                        object->Y = solution1;

/* Complete location */
                object->X = a4*object->Y + b4;

/* Must be on proper side of platform */
                if(((cosaz > 0) && (object->Y > 0))
                        || ((cosaz < 0) && (object->Y < 0)))     /* Wrong side */
                {
                                object->X = 0;      /* Signify invalid solution */
                                object->Y = 0;
                                object->Z = 0;
                }
            }
            else
            {
                /* Locating object at center of Earth to signify
                        no real solution */
                object->X = 0;
                object->Y = 0;
                object->Z = 0;
            }
        }
}
else                    /* Object and platform at the same longitude */
{
        object->Y = platform->Y;                     /* Platform Y = 0 */
        if(delta_Z)
        {
                /* Quadratic equation factors and constant */
                a6 = 1/(a1*a1) + k2*k2;
                b6 = -2*b1/(a1*a1);
                c6 = b1*b1/(a1*a1) + object->Y*object->Y - ro*ro;
                b_squared = b6*b6;
                four_ac = 4*a6*c6;

/* Location */
                if(four_ac <= b_squared)             /* A real solution exists */
                {
                        /* Solution to quadratic */
                        root = sqrt(b_squared - four_ac);
                        solution1 = (-b6 + root)/(2*a6);
```

270

Navy Case No. 77257

```
            solution2 = (-b6 - root)/(2*a6);

/* Select the proper solution */
            if(object_alt <= platform_alt)      /* Assume closest Z */
                  if(fabs(platform->Z - solution1)
                        <= fabs(platform->Z - solution2))
                        object->Z = solution1;
                  else
                        object->Z = solution2;
            else
                  if(direction->El > 0)            /* Closest Z */
                        if(fabs(platform->Z - solution1)
                              <= fabs(platform->Z - solution2))
                              object->Z = solution1;
                        else
                              object->Z = solution2;
                  else                             /* Farthest Z */
                        if(fabs(platform->Z - solution1)
                              <= fabs(platform->Z - solution2))
                              object->Z = solution2;
                        else
                              object->Z = solution1;

/* Complete location */
            object->X = (object->Z - b1)/a1;

/* Must be on proper side of platform */
            if(sinaz > 0)                    /* North of platform */
                  if((object->Z/object->X) < (platform->Z/platform->X))
                  {
                        object->X = 0;    /* Signify invalid solution */
                        object->Z = 0;
                  }
            else                             /* South of platform */
                  if((object->Z/object->X) > (platform->Z/platform->X))
                  {
                        object->X = 0;    /* Signify invalid solution */
                        object->Z = 0;
                  }
      }
      else
      {
            /* Locating object at center of Earth to signify
                  no real solution */
            object->X = 0;
            object->Z = 0;
      }
}
else
{
      /* Location */
      object->Z = platform->Z;
      object->X = sqrt(ro*ro - object->Y*object->Y
            - k2*k2*object->Z*object->Z);

/* Select the proper solution */
      if((object_alt > platform_alt) && (direction->El < 0))
```

271

Navy Case No. 77257

```
                    object->X = -object->X;          /* Farthest X */
            /* Must be on proper side of platform */
            if(sinaz > 0)                     /* North of platform */
                if((object->Z/object->X) < (platform->Z/platform->X))
                {
                        object->X = 0;     /* Signify invalid solution */
                        object->Z = 0;
                }
            else                              /* South of platform */
                if((object->Z/object->X) > (platform->Z/platform->X))
                {
                        object->X = 0;     /* Signify invalid solution */
                        object->Z = 0;
                }
        }
    }
}
else
{
    object->X = platform->X;
    if(delta_Y)
    {
        /* Pointing vector slope and offset */
        a2 = delta_Z/delta_Y;
        b2 = platform->Z;
        if(delta_Z)
        {
            /* Quadratic equation factors and constant */
            a7 = 1 + k2*k2*a2*a2;
            b7 = 2*k2*k2*a2*b2;
            c7 = object->X*object->X + k2*k2*b2*b2 - ro*ro;
            b_squared = b7*b7;
            four_ac = 4*a7*c7;

/* Location */
            if(four_ac <= b_squared)           /* A real solution exists */
            {
                /* Solution to quadratic */
                root = sqrt(b_squared - four_ac);
                solution1 = (-b7 + root)/(2*a7);
                solution2 = (-b7 - root)/(2*a7);

/* Select the proper solution */
                if(object_alt <= platform_alt)     /* Assume closest Y */
                    if(fabs(platform->Y - solution1)
                        <= fabs(platform->Y - solution2))
                            object->Y = solution1;
                    else
                            object->Y = solution2;
                else
                    if(direction->El > 0)              /* Closest Y */
                        if(fabs(platform->Y - solution1)
                            <= fabs(platform->Y - solution2))
                                object->Y = solution1;
                        else
                                object->Y = solution2;
```

272

Navy Case No. 77257

```
                        else                              /* Farthest Y */
                                if(fabs(platform->Y - solution1)
                                        <= fabs(platform->Y - solution2))
                                        object->Y = solution2;
                                else
                                        object->Y = solution1;

/* Complete location */
                object->Z = a2*object->Y + b2;

/* Must be on proper side of platform */
                if(((cosaz > 0) && (object->Y > 0))
                        || ((cosaz < 0) && (object->Y < 0)))   /* Wrong side */
                {
                                object->X = 0;    /* Signify invalid solution */
                                object->Y = 0;
                                object->Z = 0;
                }
        }
        else                                              /* No real solution */
        {
                /* Locating object at center of Earth to signify
                        no real solution */
                object->X = 0;
                object->Y = 0;
                object->Z = 0;
        }
    }
    else
    {
        /* Location */
        object->Z = platform->Z;
        object->Y = sqrt(ro*ro - object->X*object->X
                - k2*k2*object->Z*object->Z);

/* Ensure location is on correct side of platform */
        if(cosaz > 0)                     /* West of platform (negative Y) */
                object->Y = -object->Y;
    }
}
else                    /* Object and platform at the same longitude */
{
    object->Y = platform->Y;
    if(delta_Z)
    {
        /* Location */
        object->Z = sqrt(ro*ro - object->X*object->X
                - object->Y*object->Y)/k2;

/* Select the proper solution */
        if(object_alt <= platform_alt)       /* Assume closest Z */
                if(platform->Z < 0)
                        object->Z = -object->Z;
        else
                if(direction->El > 0)                         /* Closest Z */
                        if(platform->Z < 0)
                                object->Z = -object->Z;
```

273

Navy Case No. 77257

```
                                                              /* Farthest Z */
                    else
                         if(platform->Z > 0)
                                object->Z = -object->Z;

/* Must be on proper side of platform */
            if(sinaz > 0)                      /* North of platform */
                    if((object->Z/object->X) < (platform->Z/platform->X))
                    {
                            object->X = 0;      /* Signify invalid solution */
                            object->Z = 0;
                    }
            else                                /* South of platform */
                    if((object->Z/object->X) > (platform->Z/platform->X))
                    {
                            object->X = 0;      /* Signify invalid solution */
                            object->Z = 0;
                    }
         }
         else                    /* Object and platform at the same location */
         {
              object->Z = platform->Z;
         }
      }
   }
}

/*************************************************************************
Function Name:   geocentric_to_geographic()
Number/Version:
History:
        Date         Rev      Author          Description
        16-Mar-1995  1.00     C. Houlberg     Baseline
        21-Mar-1996  1.04     C. Houlberg     Made function more general Inputs:
        Geocentric coordinates (geocentric->X, geocentric->Y, geocentric->Z).

Outputs:
        Geographic coordinates (geographic->Lat, geographic->Lon, and
                geographic->alt).

Abstract:   Converts the geocentric coordinates to geographic.
```

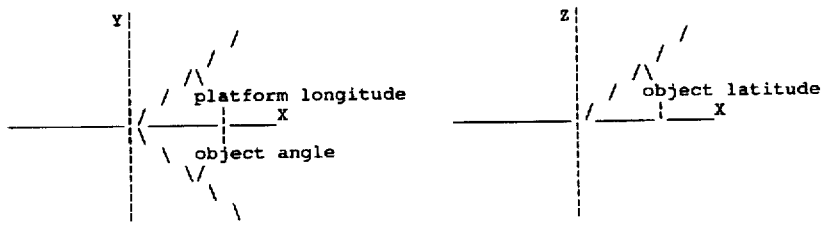

```
        Equations used:
    latitude = arctan(Zo/Xo)
```

Navy Case No. 77257

```
        longitude = arctan(Yo/Xo)
        altitude = sqrt(Xo*Xo + Yo*Yo + Zo*Zo) - local_radius
*****************************************************************************/
void geocentric_to_geographic(GEOGRAPHIC_TYPE *geographic,
            CARTESIAN_TYPE *geocentric)
{
        /* Geographic coordinates (account for the poles) */
        if(geocentric->X)
        {
/* Code changed 21-Mar-1996 to make function more general from:
            geographic->Lat = atan(geocentric->Z/geocentric->X);
            geographic->Lon = longitude + atan(geocentric->Y/geocentric->X);
to: */
            geographic->Lat = atan(geocentric->Z
                    /sqrt(geocentric->X*geocentric->X + geocentric->Y*geocentric->Y));
            geographic->Lon = atan(geocentric->Y/geocentric->X);
            if(geocentric->X < 0)
            {
                    if(geocentric->Y < 0)
                            geographic->Lon -= PI;
                    else
                            geographic->Lon += PI;
            }
/* End of code change */
        }
        else if(geocentric->Z < 0)
        {
                geographic->Lat = -PI/2;         /* At the South Pole */
                geographic->Lon = 0;             /* Actually undefined */
        }
        else
        {
                geographic->Lat = PI/2;          /* At the North Pole */
                geographic->Lon = 0;             /* Actually undefined */
        }

/* Approximate altitude (neglecting astronomicc latitude difference) */
        geographic->Alt = (sqrt(geocentric->X*geocentric->X
                + geocentric->Y*geocentric->Y + geocentric->Z*geocentric->Z)
                - local_radius(geographic->Lat));
}

/*****************************************************************************/
/*****************************************************************************
Function Name:    re_estimate_location()
Number/Version:
History:
        Date            Rev         Author              Description
        25-Mar-1996     1.04        C. Houlberg         Baseline (error fix).

Global inputs:
        Last platform geographic location and orientation.
        LOS angles pointed to by the gimbal (pointing_input.az, pointing_input.el).
        Estimated altitude of point (estimated_altitude).

Global Outputs:
        Designated geographic coordinates.
```

275

Navy Case No. 77257

```
Abstract:  Determines the geographic location of the point pointed to by
     the display as given by its Line Of Sight (LOS) obtained from the
     last gimbal azimuth and elevation, the estimated altitude of the point,
     and the last platform location and orientation.  The location is based
     on the assumption that the Earth is an ellipsoid.
          Orientation of the geocentric coordinate system used is as follows:
     Origin of coordinate system located at the center of the Earth.
     Platform located in the X-Z plane of the coordinate system.
     X axis oriented to pass through latitude 0.
     Y axis oriented to pass through latitude 0.
     Z axis oriented along the pole with north positive.
*****************************************************************************/
void re_estimate_location(void)
{
     /* Variable declarations */
     struct Pointing_Angles direction;
     GEOGRAPHIC_TYPE geographic_location;
     CARTESIAN_TYPE last_platform_geocentric;
     CARTESIAN_TYPE object_geocentric;

/* Convert pointing angles to angles for a platform with a roll, pitch,
          and heading of zero */
     object_direction(&direction, &last_platform, &pointing_input);

/* Determine local geocentric coordinates of the last platform location */
/* Code added 21-Mar-1996 to account for arguement change in function. */
     geographic_location.Lat = last_platform.Lat;
     geographic_location.Lon = last_platform.Lon;
     geographic_location.Alt = last_platform.Alt;
/* End of added code */
     geographic_to_geocentric(&last_platform_geocentric, &geographic_location);

/* Determine geocentric coordinates of the object */
     /* Temporally assigning last platform and estimated object altitudes
          to X and Y locations respectively to implement the
          topocentric_to_geocentric function */
     object_geocentric.X = last_platform.Alt;
     object_geocentric.Y = estimated_altitude;
     topocentric_to_geocentric(&object_geocentric,
          &last_platform_geocentric, &direction);

/* Convert local geocentric coordinates to geographic location */
     if(object_geocentric.X || object_geocentric.Y || object_geocentric.Z)
     {
/* Code added 21-Mar-1996 to account for arguement change in function */
          rotate_about_z(&object_geocentric, -last_platform.Lon);
/* End of added code */
          geocentric_to_geographic(&designated_point,    &object_geocentric);
     }
     else                                                    /* Location
undefined */
     {
          designated_point.Alt = UNDEFINED;
     }
}
/*****************************************************************************/
```

Navy Case No. 77257

```
/************************************************************************
Function Name:   gimbal_orientation()
Number/Version:
History:
        Date            Rev         Author              Description
        13-Mar-1995     1.00        C. Houlberg         Baseline
        21-Mar-1996     1.04        C. Houlberg         Changed arguement in function.
        21-Mar-1996     1.04        C. Houlberg         Simplified program.

Global Inputs:
        Waypoint (waypoint->Latitude, waypoint->Longitude, waypoint->Altitude).

Global Outputs:
        Gimbal orientation (pointing_output.az and pointing_output.el).

Abstract:   Determines orientation of gimbal needed to point to specified
        geographic location given latitude, longitude, and altitude.
************************************************************************/
void gimbal_orientation(void)
{
        /* Variable declarations */
        GEOGRAPHIC_TYPE geographic_location;
        CARTESIAN_TYPE platform_geocentric;
        CARTESIAN_TYPE object;

/* Convert object geographical location to geocentric XYZ */
        geographic_location.Lat = waypoint->Latitude;
        geographic_location.Lon = waypoint->Longitude;
        geographic_location.Alt = waypoint->Altitude;
        geographic_to_geocentric(&object, &geographic_location);
        /* Rotate object coordinates to account for longitudinal distance
                from platform */
        rotate_about_z(&object, platform.Lon - waypoint->Longitude);

/* Convert platform geographical location to geocentric XYZ */
/* Code added 21-Mar-1996 to account for arguement change in function. */
        geographic_location.Lat = platform.Lat;
        geographic_location.Lon = platform.Lon;
        geographic_location.Alt = platform.Alt;
/* End of added code */
        geographic_to_geocentric(&platform_geocentric, &geographic_location);

/* Translate object coordinates to platform location */
        translate_coordinates(&object, &platform_geocentric);

/* Rotate coordinates by astronomic latitude to align with surface */
/* Code changed 21-Mar-1996 to simplify program from:
        k1 = (EQUATORIAL_RADIUS + platform.Alt)/(POLAR_RADIUS + platform.Alt);
        if(platform_geocentric.X)
        {
                astro_lat = atan(k1 * k1
                        * platform_geocentric.Z/platform_geocentric.X);
        }
        else
        {
                if(platform_geocentric.Z > 0)
                        astro_lat = PI/2;
```

277

Navy Case No. 77257

```
            else
                    astro_lat = -PI/2;
        }
        rotate_about_y(&object, -astro_lat);
to: */
        rotate_about_y(&object, -astronomic_latitude(&geographic_location));
/* End of code change */

/* Rotate coordinates to acount for roll, pitch, and heading */
        rotate_about_x(&object, -platform.Heading);
        rotate_about_y(&object, platform.Pitch);
        rotate_about_z(&object, platform.Roll);

/* Calculate gimbal angles */
        gimbal_angles(&pointing_output, &object);
}

/***********************************************************************
Function Name:   translate_coordinates()
Number/Version:
History:
        Date            Rev             Author          Description
        22-Mar-1995     1.00            C. Houlberg     Baseline Inputs:
        Point 1 coordinates (point_1->X, point_1->Y, point_1->Z).
        Point 2 coordinates (point_2->X, point_2->Y, point_2->Z).

Outputs:
        Point 2 coordinates (point_2->X, point_2->Y, point_2->Z).

Abstract:   Translate coordinate origin to point 1.
            x2 = x2 - x1
            y2 = y2 - y1
            z2 = z2 - z1
***********************************************************************/
void translate_coordinates(CARTESIAN_TYPE *point_2, CARTESIAN_TYPE *point_1)
{
        /* Translate coordinates to point 1 */
        point_2->X = point_2->X - point_1->X;
        point_2->Y = point_2->Y - point_1->Y;
        point_2->Z = point_2->Z - point_1->Z;
}

/***********************************************************************
Function Name:   rotate_about_x()
Number/Version:
History:
        Date            Rev             Author          Description
        22-Mar-1995     1.00            C. Houlberg     Baseline Inputs:
        Coordinates (point->X, point->Y, point->Z).
        Angle of rotation.

Outputs:
        Coordinates (point->X, point->Y, point->Z).
```

278

Navy Case No. 77257

```
Abstract:    Rotates coordinates about X axis.
             Transformation used:
              _  _     _                     _  _  _
             | x1 |   | 1     0       0     || x0 |
             | y1 | = | 0   cos(a)  sin(a)  || y0 |
             | z1 |   | 0  -sin(a)  cos(a)  || z0 |
              -  -     -                     -  -  -
**************************************************************************/
void rotate_about_x(CARTESIAN_TYPE *point, double angle)
{
      /* Variable declarations */
      double y, z;

/* Calculate new y and z values */
      y = cos(angle) * point->Y + sin(angle) * point->Z;
      z = -sin(angle) * point->Y + cos(angle) * point->Z;

/* Replace old values */
      point->Y = y;
      point->Z = z;
}

/**************************************************************************
Function Name:    rotate_about_y()
Number/Version:
History:
      Date              Rev       Author            Description
      22-Mar-1995       1.00      C. Houlberg       Baseline Inputs:
      Coordinates (point->X, point->Y, point->Z).
      Angle of rotation.

Outputs:
      Coordinates (point->X, point->Y, point->Z).

Abstract:    Rotates coordinates about Y axis.
             Transformation used:
              _  _     _                     _  _  _
             | x1 |   | cos(a)  0  -sin(a)  || x0 |
             | y1 | = |   0     1     0     || y0 |
             | z1 |   | sin(a)  0   cos(a)  || z0 |
              -  -     -                     -  -  -
**************************************************************************/
void rotate_about_y(CARTESIAN_TYPE *point, double angle)
{
      /* Variable declarations */
      double x, z;

/* Calculate new x and z values */
      x = cos(angle) * point->X - sin(angle) * point->Z;
      z = sin(angle) * point->X + cos(angle) * point->Z;

/* Replace old values */
      point->X = x;
      point->Z = z;
}
```

Navy Case No. 77257

```
/************************************************************************
Function Name:    rotate_about_z()
Number/Version:
History:
      Date            Rev         Author           Description
      22-Mar-1995     1.00        C. Houlberg      Baseline Inputs:
      Coordinates (point->X, point->Y, point->Z).
      Angle of rotation.

Outputs:
      Coordinates (point->X, point->Y, point->Z).

Abstract:   Rotates coordinates about Z axis.
            Transformation used:
            _   _       _                        _   _    _
            | x1 |     |  cos(a)   sin(a)   0 |  | x0 |
            | y1 |  =  | -sin(a)   cos(a)   0 |  | y0 |
            | z1 |     |    0        0      1 |  | z0 |
            -   -       -                        -   -    -
************************************************************************/
void rotate_about_z(CARTESIAN_TYPE *point, double angle)
{
      /* Variable declarations */
      double x, y;

/* Calculate new x and y values */
      x =  cos(angle) * point->X + sin(angle) * point->Y;
      y = -sin(angle) * point->X + cos(angle) * point->Y;

/* Replace old values */
      point->X = x;
      point->Y = y;
}

/************************************************************************
Function Name:    gimbal_angles()
Number/Version:
History:
      Date            Rev         Author           Description
      22-Mar-1995     1.00        C. Houlberg      Baseline
      12-Dec-1995     1.03        C. Houlberg      Corrected gimbal pointing error.
Inputs:
      Object coordinates (object->X, object->Y, and object->Z).

Outputs:
      Pointing angles (angle->Az and angle->El).

Abstract:   Determines azimuth and elevation angles needed to point the
      gimbal to the object.  The platform points along the z axis with the
      x axis point up (y axis points along the right side of the platform).
      az = -atan(z/y)             x|
      el = -atan(x*cos(a)/y)       |
                                   |____z
                                  /
                                 /y
```

280

Navy Case No. 77257

```
*********************************************************************/
void gimbal_angles(struct Pointing_Angles *angles, CARTESIAN_TYPE *object)
{
      /* Calculate az and el */
      if(object->Y == 0)
      {
            if(object->Z > 0)
                  angles->Az = PI/2;              /* In front of platform */
            else
                  angles->Az = -PI/2;             /* At or behind platform */ if(object->X > 0)
                  angles->El = PI/2;              /* Above platform */
            else
                  angles->El = -PI/2;             /* At or below platform altitude */
      }
      else if(object->Y < 0)                      /* To the left of the platform */
      {
            angles->Az = -atan(object->Z/object->Y);

angles->El = -atan(object->X * cos(angles->Az)/object->Y);
      }
      else                                        /* To the right of the platform */
      {
            if(object->Z < 0)
/* Code change 12-Dec-1995 to correct pointing error from:
                  angles->Az = - PI/2 - atan(object->Z/object->Y);
to: */
                  angles->Az = - PI - atan(object->Z/object->Y);
/* End of code change */
            else
/* Code change 12-Dec-1995 to correct pointing error from:
                  angles->Az = PI/2 - atan(object->Z/object->Y);
to: */
                  angles->Az = PI - atan(object->Z/object->Y);
/* End of code change */

/* Code change 12-Dec-1995 to correct pointing error from:
            angles->El = atan(object->X * cos(angles->Az)/object->Y);
to: */
            angles->El = -atan(object->X * cos(angles->Az)/object->Y);
/* End of code change */
      }
}
/*********************************************************************/
/*********************************************************************
Function Name:    triangulate_location()
Number/Version:
History:
      Date            Rev       Author           Description
      21-Mar-1996     1.04      C. Houlberg      Baseline Global inputs:
      Previous geographic location of designated point (object).
      Previous geographic location of platform.
      Platform geographic location and orientation.
```

281

Navy Case No. 77257

LOS angles pointed to by the gimbal (pointing_input.az, pointing_input.el).
    Estimated altitude of point (estimated_altitude).

Global Outputs:
    Designated geographic coordinates.

Abstract:  Triangulates location of object if a previously valid
    designation exists.  If one does not exist the location is designated
    using the estimated altitude.
*********************************************************************/
void triangulate_location(void)
{
    /* Clear insufficient triangulation angle warning message flag */
    Insufficient_Angle_Warning = NO;

/* Determine if previously designated or if designation was valid */
    if(designated_point.Alt == UNDEFINED)
        /* Determine location using estimated altitude */
        estimate_location();
    else                                    /* Previously valid designation */
        /* Determine location through triangulation */
        triangulate(&designated_point, &last_platform,
            &platform, &pointing_input);
}

/*********************************************************************
Function Name:   triangulate()
Number/Version:
History:
    Date            Rev       Author           Description
    21-Mar-1996     1.04      C. Houlberg      Baseline Inputs:
    Last geographic location of object (object_loc_ptr->Lat,
        object_loc_ptr->Lon, and object_loc_ptr->Alt).
    Last geographic location of platform (last_platform_ptr->Lat,
        last_platform_ptr->Lon, and last_platform_ptr->Alt).
    Current geographic location of platform (platform_ptr->Lat,
        platform_ptr->Lon, and platform_ptr->Alt).
    Line-of-sight to the object (line_of_sight_ptr->Az
        and line_of_sight_ptr->El).

Outputs:
    New geographic location of object (object_loc_ptr->Lat,
        object_loc_ptr->Lon, and object_loc_ptr->Alt).

Abstract:  Triangulates line_of_sight vector to object (obtained from
    current line-of-sight angles and geographic location of platform) with
    previous line-of-sight vector to object (obtained from previous
    geographic location of platform and object) to obtain new geographic
    coordinates of object.
        Platform coordinates:

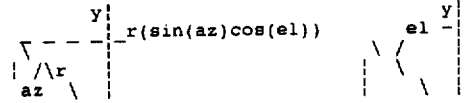

282

Navy Case No. 77257

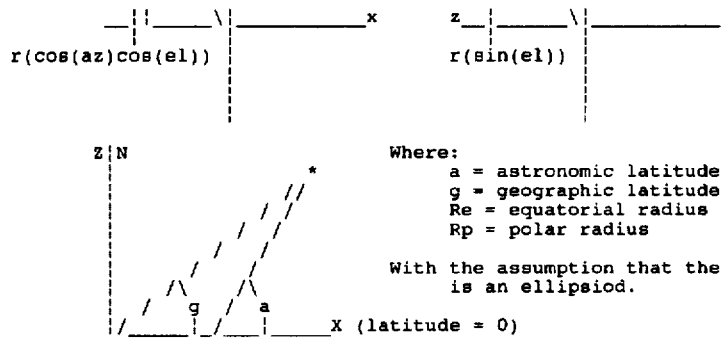

```
Z|N                      Where:
 |         *                a = astronomic latitude
 |       //                 g = geographic latitude
 |     //                   Re = equatorial radius
 |    / /                   Rp = polar radius
 |   / /
 |  /\  /                 With the assumption that the Earth
 | / g\/ a                is an ellipsiod.
 |/___|/__|_____X (latitude = 0)
```

Equations used:
1st line of sight from platform to object:
    In the X-Y plane: Y1 = a1*X1 + b1
    In the X-Z plane: Z1 = c1*X1 + d1
    Where:
        (Xp1,Yp1,Zp1) = previous location of platform
        (Xo1,Yo1,Zo1) = previous location of object
        a1 = dY1/dX1 = (Yo1 - Yp1)/(Xo1 - Xp1)
        b1 = Yp1 - a1*Xp1
        c1 = dZ1/dX1 = (Zo1 - Zp1)/(Xo1 - Xp1)
        d1 = Zp1 - c1*Xp1
2nd line of sight from platform to object:
    In the X-Y plane: Y2 = a2*X2 + b2
    In the X-Z plane: Z2 = c2*X2 + d2
    Where:
        (Xp2,Yp2,Zp2) = location of platform at point P2
        a2 = dY2/dX2 = dY2_factor/dX2_factor
        b2 = Yp2 - a2*Xp2
        c2 = dZ2/dX2 = dZ2_factor/dX2_factor
        d2 = Zp2 - c2*Xp2
        where:
            dX2_factor, dY2_factor and dZ2_factor are obtained by
            rotating dx, dy, and dz about the Z-axis by the -(longitude)
            and then about the Y-axis by the -(astronomic latitude).
            dx = sin(el)       => dX2_factor
            dy = cos(az)cos(el) => dY2_factor
            dz = sin(az)cos(el) => dZ2_factor
        astronomic_latitude2 = atan(k2*k2 * tan(geographic_latitude2))
        k2 = (Re + platform_altitude2)/(Rp + platform_altitude2)
Object is located at midpoint of shortest line connecting both
    line-of-sight vectors.  Problem is solved most simply in 3 steps:
        1) Rotate coordinate system so X-Axis is parallel to
           line-of-sight vector.
        2) Solve simple equation with b2 = Yp2 and d2 = Zp2.
        3) Rotate coordinate system back to original orientation.
    Length of interconnecting line (l) is given by:
    L = l*l = (X1-X2)*(X1-X2) + (Y1-Y2)*(Y1-Y2) + (Z1-Z2)*(Z1-Z2)
    Closest location on old line-of-sight vector (Xo1',Yo1',Zo1'):
    X1 = Xo1' = (a1*(b2-b1) + c1*(d2-d1))/(a1*a1 + c1*c1)
```

Navy Case No. 77257

```
            Y1 = Yo1' = c1*Xo1' + d1
            Z1 = Zo1' = a1*Xo1' + b1
            Closest location on new line-of-sight vector (Xo2,Yo2,Zo2):
            X2 = Xo2 = Xo1'
            Y2 = Yo2 = b2
            Z2 = Zo2 = d2
      Point on interconnecting line P(X,Y,Z) where object is located:
            X = (Xo1' + Xo2)/2
            Y = (Yo1' + Yo2)/2
            Z = (Zo1' + Zo2)/2
      Special condition (parallel line-of-sights):
            a1 = c1 = 0
            Solve for minimum distance from last determined point
            P(Xo1, Yo1, Zo1) to line-of-sight vector as given above for
            2nd line-of-sight.
                  Xo1 = last determined x location
                  Yo1 = last determined y location
                  Zo1 = last determined z location
                  Xo2 = Xo1
                  Yo2 = Yp2
                  Zo2 = Zp2
****************************************************************************/
void triangulate(GEOGRAPHIC_TYPE *object_loc_ptr,
      struct Inertial *last_platform_ptr,
      struct Inertial *platform_ptr,
      struct Pointing_Angles *line_of_sight_ptr)
{
      /* Variable declarations */
      CARTESIAN_TYPE last_platform_geocentric;
      CARTESIAN_TYPE last_object_geocentric;
      GEOGRAPHIC_TYPE geographic_location;
      CARTESIAN_TYPE platform_geocentric;
      struct Pointing_Angles direction;
      CARTESIAN_TYPE factors;
      double z_angle, y_angle;
      double a1, b1, c1, d1;
      CARTESIAN_TYPE object_geocentric;

/* Determine geocentric coordinates of last platform location */
      geographic_location.Lat = last_platform_ptr->Lat;
      geographic_location.Lon = last_platform_ptr->Lon;
      geographic_location.Alt = last_platform_ptr->Alt;
      geographic_to_geocentric(&last_platform_geocentric, &geographic_location);
      rotate_about_z(&last_platform_geocentric, -last_platform_ptr->Lon);

/* Determine geocentric coordinates of last object location */
      geographic_to_geocentric(&last_object_geocentric, object_loc_ptr);
      rotate_about_z(&last_object_geocentric, -object_loc_ptr->Lon);

/* Determine geocentric coordinates of the platform */
      geographic_location.Lat = platform_ptr->Lat;
      geographic_location.Lon = platform_ptr->Lon;
      geographic_location.Alt = platform_ptr->Alt;
      geographic_to_geocentric(&platform_geocentric, &geographic_location);
      rotate_about_z(&platform_geocentric, -platform_ptr->Lon);

/* Convert pointing angles to angles for a platform with a roll, pitch,
```

Navy Case No. 77257

```
            and heading of zero */
    object_direction(&direction, platform_ptr, line_of_sight_ptr);

/* Determine line-of-sight factors */
    factors.X = sin(direction.El);                          /* Local X factor
*/
    factors.Y = -cos(direction.Az)*cos(direction.El);       /* Local Y factor */
    factors.Z = sin(direction.Az)*cos(direction.El);        /* Local Z factor */
    rotate_about_y(&factors, astronomic_latitude(&geographic_location));
    rotate_about_z(&factors, -platform_ptr->Lon);

/* Rotate coordinate system to make line_of_sight parallel to X-axis */
    if(factors.X)                           /* Determine Z-axis rotation angle */
        z_angle = atan(factors.Y/factors.X);
    else
        z_angle = PI/2;
    /* Rotate about Z-axis */
    rotate_about_z(&last_platform_geocentric, z_angle);
    rotate_about_z(&last_object_geocentric, z_angle);
    rotate_about_z(&platform_geocentric, z_angle);
    rotate_about_z(&factors, z_angle);
    /* Determine Y-axis rotation angle */
    if(factors.X)
        y_angle = atan(factors.Z/factors.X);
    else
        y_angle = PI/2;
    /* Rotate about Y-axis */
    rotate_about_y(&last_platform_geocentric, -y_angle);
    rotate_about_y(&last_object_geocentric, -y_angle);
    rotate_about_y(&platform_geocentric, -y_angle);

/* Determine closest locations on line-of-sight vectors */
    if(last_object_geocentric.X - last_platform_geocentric.X)
    {
        /* Determine factors and offsets for linear equations */
        a1 = (last_object_geocentric.Y - last_platform_geocentric.Y)
             /(last_object_geocentric.X - last_platform_geocentric.X);
        b1 = last_platform_geocentric.Y - a1 * last_platform_geocentric.X;
        c1 = (last_object_geocentric.Z - last_platform_geocentric.Z)
             /(last_object_geocentric.X - last_platform_geocentric.X);
        d1 = last_platform_geocentric.Z - c1 * last_platform_geocentric.X;

/* Locations */
        /* Line-of-sight vectors are not parallel */
        if((a1 > MIN_TRI_ANGLE) || (c1 > MIN_TRI_ANGLE)
            || (a1 < -MIN_TRI_ANGLE) || (c1 < -MIN_TRI_ANGLE))
        {
            /* Redefine last_object_geocentric location */
            last_object_geocentric.X = (a1*(platform_geocentric.Y - b1)
                + c1*(platform_geocentric.Z - d1))/(a1*a1 + c1*c1);
            last_object_geocentric.Y = a1*last_object_geocentric.X + b1;
            last_object_geocentric.Z = c1*last_object_geocentric.X + d1;

/* Save platform data for update or triangulation calculations */
            save_platform(last_platform_ptr, platform_ptr);

/* Determine object_geocentric location */
```

285

Navy Case No. 77257

```
            object_geocentric.X = last_object_geocentric.X;
            object_geocentric.Y = platform_geocentric.Y;
            object_geocentric.Z = platform_geocentric.Z;
        }
        else
        {
            /* Can not accurately determine new location */
            object_geocentric.X = last_object_geocentric.X;
            object_geocentric.Y = last_object_geocentric.Y;
            object_geocentric.Z = last_object_geocentric.Z;

/* Set flag to display warning message */
            Insufficient_Angle_Warning = YES;
        }
    }
    else
    {
        /* Determine object_geocentric location from last location */
        object_geocentric.X = last_object_geocentric.X;
        object_geocentric.Y = platform_geocentric.Y;
        object_geocentric.Z = platform_geocentric.Z;
    }

/* Choose location between both line-of-sight vectors */
    object_geocentric.Y = (object_geocentric.Y + last_object_geocentric.Y)/2;
    object_geocentric.Z = (object_geocentric.Z + last_object_geocentric.Z)/2;

/* Rotate coordinates back to original position */
    rotate_about_y(&object_geocentric, y_angle);
    rotate_about_z(&object_geocentric, -z_angle);

/* Convert geocentric to geographic coordinates of object */
    geocentric_to_geographic(object_loc_ptr, &object_geocentric);
}

/****************************************************************************
Function Name:   save_platform()
Number/Version:
History:
      Date              Rev       Author            Description
      21-Mar-1996       1.04      C. Houlberg       Baseline Inputs:
      Platform geographic location and orientation.

Outputs:
      Last platform geographic location and orientation.

Abstract:   Save platform location and attitude data to
      last_platform data location.
****************************************************************************/
void save_platform(struct Inertial *last_platform_ptr,
      struct Inertial *platform_ptr)
{
      last_platform_ptr->Roll = platform_ptr->Roll;
      last_platform_ptr->Pitch = platform_ptr->Pitch;
      last_platform_ptr->Heading = platform_ptr->Heading;
```

286

Navy Case No. 77257

```
        last_platform_ptr->Lat = platform_ptr->Lat;
        last_platform_ptr->Lon = platform_ptr->Lon;
        last_platform_ptr->Alt = platform_ptr->Alt;
}

/* end */
```

Navy Case No. 77257

```
/************************************************************************
Module Name:      pointing.h
Number/Version:
History:
      Date              Rev       Author          Description
      17-Jan-1995       1.00      C. Houlberg     Baseline
      21-Mar-1996       1.04      C. Houlberg     Deleted unused typedef.
                                                  Moved type for global access.
                                                  Renamed function.
                                                  Added triangulation feature.
Abstract:
    Pointing parameter and function definitions.
*************************************************************************/

/*      Structure definitions.
*/
      struct Pointing_Angles
      {
            double Az;
            double El;
      };

/* Code deleted 21-Mar-1996 since type no longer used:
      typedef struct
      {
            double R;
            double A;
            double E;

} SPHERICAL_TYPE;
End of deleted code */

/* Code moved 21-Mar-1996 to avtsc.h to allow global access:
      typedef struct
      {
            double X;
            double Y;
            double Z;

} CARTESIAN_TYPE;
End of moved code */

/*      Global variables.
*/
      extern struct Pointing_Angles pointing_input;
      extern struct Pointing_Angles pointing_output;
/* Code added 21-Mar-1996 for added triangulation feature. */
      extern short Insufficient_Angle_Warning;
/* End of added code */

/*      Function definitions.
*/
/* Code changed 21-Mar-1996 to rename function from:
    void geographic_location(void);
to: */
    void estimate_location(void);
/* End of code change */
```

Navy Case No. 77257

```
/* Code added 25-Mar-1996 to fix error when estimating from new altitude */
    void re_estimate_location(void);
/* End of added code */
    void gimbal_orientation(void);
/* Code added 21-Mar-1996 for added triangulation feature. */
    void triangulate_location(void);
/* End of added code */
```

Navy Case No. 77257

```
************************************************************************
Module Name:   setup.cal
Number/Version:
History:
      Date                  Rev    Author         Description
      13-Feb-1995           1.00   C. Houlberg    Baseline
      11-Sep-1995           1.02   C. Houlberg    Gimbal stops added
Abstract:      Setup and calibration parameters.
************************************************************************
      Password protected calibration functions:
INS HEADING
      CORRECTION 0.00                 Degrees.
ACQ SIGHT
      AZ FACTOR 1.15                  Factor.
      AZ OFFSET 1.36                  Volts.
      EL FACTOR 1.10                  Factor.
      EL OFFSET 0.11                  Volts.
GIMBAL DRIVE
      AZ FACTOR 1.71                  Factor.
      AZ OFFSET 2.72                  Volts.
      EL FACTOR 0.87                  Factor.
      EL OFFSET 0.13                  Volts.
GIMBAL INPUT
      AZ FACTOR 1.04                  Factor.
      AZ OFFSET -0.54                 Volts.
      EL FACTOR 1.27                  Factor.
      EL OFFSET 0.23                  Volts.
IRDS
      AZ FACTOR 1.00                  Factor.
      AZ OFFSET 2.50                  Degrees.
      EL FACTOR 1.00                  Factor.
      EL OFFSET 0.50                  Degrees.
TRACKING BOX
      X LOCATION -9                   Pixels.
      Y LOCATION -14                  Pixels.
      HEIGHT 106                      Pixels.
      WIDTH 164                       Pixels.
GIMBAL WARNING
      FORWARD 35                      Degrees.
      AFT -5                          Degrees.
      UP 35                           Degrees.
      DOWN -35                        Degrees.
GIMBAL STOPS
      FORWARD 45                      Degrees.
      AFT -15                         Degrees.
      UP 45                           Degrees.
      DOWN -45                        Degrees.
```

Navy Case No. 77257

```
/*============================================================================*
 * FILE:                U T I L D E F S . H
 *============================================================================*
 *
 * FUNCTION: Equates used by ARINC utilities and those that call them.
 *
 *============================================================================*/

/*----------------------------------------------------------------------------*
 * ARINC configuration equates.
 *----------------------------------------------------------------------------*/ define AR_ODD              0
define AR_EVEN             1
define AR_HIGH             0
define AR_LOW              1
define AR_WRAP_ON          0
define AR_WRAP_OFF         1
define AR_ON               7
define AR_OFF              8
define AR_SHORT            9
define AR_LONG             10

/*----------------------------------------------------------------------------*
 * Utility function codes for ARINC chip configuration.
 *----------------------------------------------------------------------------*/ define ARU_XMIT_RATE       1
define ARU_RECV_RATE       2
define ARU_PARITY          3
define ARU_INTERNAL_WRAP   4
define ARU_WORD_LENGTH     5
define ARU_R1_SDI_FILTER   6
define ARU_R2_SDI_FILTER   7
define ARU_R3_SDI_FILTER   8
define ARU_R4_SDI_FILTER   9
define ARU_R5_SDI_FILTER   10
define ARU_R6_SDI_FILTER   11
define ARU_R7_SDI_FILTER   12
define ARU_R8_SDI_FILTER   13
define ARU_R1_SDI_VALUE    14
define ARU_R2_SDI_VALUE    15
define ARU_R3_SDI_VALUE    16
define ARU_R4_SDI_VALUE    17
define ARU_R5_SDI_VALUE    18
define ARU_R6_SDI_VALUE    19
define ARU_R7_SDI_VALUE    20
define ARU_R8_SDI_VALUE    21 define ARU_X1_RATE         22
define ARU_X2_RATE         23
define ARU_X3_RATE         24
define ARU_X4_RATE         25 define ARU_R12_RATE        26
define ARU_R34_RATE        27
define ARU_R56_RATE        28
```

291

Navy Case No. 77257

```
define ARU_R78_RATE           29 define ARU_R12X1_PARITY       30
define ARU_R34X2_PARITY       31
define ARU_R56X3_PARITY       32
define ARU_R78X4_PARITY       33 define ARU_XMIT               34
define ARU_RECV               35

/*---------------------------------------------------------------------*
 * Utility function codes
 *---------------------------------------------------------------------*/ define ARU_ENABLE_INT         1
define ARU_DISABLE_INT        2
define ARU_ENABLE_TIMETAG     1
define ARU_DISABLE_TIMETAG    0 define ARU_ALL_LABELS         0x1FF
define ARU_FILTER_OFF         0
define ARU_FILTER_ON          1
define ARU_BUFFERED           0
define ARU_DEDICATED          1
define ARU_MERGED             2

/*---------------------------------------------------------------------*
 * Utility return status codes
 *---------------------------------------------------------------------*/ define ARS_NODATA             0
define ARS_NORMAL             1
define ARS_GOTDATA            4
define ARS_INVHARCMD          1002
define ARS_INVHARVAL          1003
define ARS_XMITOVRFLO         1004
define ARS_INVBOARD           1005
define ARS_NOSYNC             1006
define ARS_BADLOAD            1007
define ARS_BRDNOTLOAD         1008
define ARS_SYNCTIMEOUT        1009
define ARS_SYNCOVERRUN        1010
define ARS_BADINIT            1011
define ARS_MEMADERR           1012
define ARS_MEMWRERR           1013
define ARS_INVSTRING          1014
define ARS_INVEQID                    1015
define ARS_CHECKSUM           1016
define ARS_NORESPONSE         1017
define ARS_UNSUPTYPE          1018
define ARS_INVARG             1019
define ARS_INVLABEL           1020

/*---------------------------------------------------------------------*
 * Utility function prototypes.
 *---------------------------------------------------------------------*/
```

292

Navy Case No. 77257

```
int ar_loadslv (int board, unsigned base_seg, int base_port, unsigned ram_size);
void ar_reset (int board);
void ar_go (int board);
void ar_int_slave (int board);
void ar_reset_int (int board);
int ar_init_slave (int board);
int ar_getnext (int board, int channel, void *destination);
int ar_getword (int board, int channel, void *destination);
int ar_xmit_sync (int board, int channel);
int ar_set_config (int board, int item, unsigned value);
int ar_get_config (int board, int item);
int ar_get_timercnt (int board);
unsigned long ar_get_timercntl (int board);
void ar_reset_timercnt (int board);
void ar_set_timerrate (int board, int rate);
char *ar_get_error (unsigned error);
int ar_int_control (int board, int channel, int flag);
int ar_timetag_control (int board, int flag);
int ar_getnextt (int board, int channel, void *data, void *timetag);
int ar_getwordt (int board, int channel, void *data, void *timetag);
int ar_label_filter (int board, int channel, unsigned label, int action);
int ar_set_storage_mode (int board, int flag);
void ar_get_latest (int board, int channel, int label, void *data, char *seq_num);
int ar_set_raw_mode (int board, int direction, int channel, int control);
int ar_modify_msg (int board, int channel, int msg_num, int rate, long data);
int ar_define_msg (int board, int channel, int rate, int start, long data);
int ar_msg_control (int board, int control);

void ar_reformat (void *lsw, void *msw);
/* int ar_putword (int board, int channel, int lsw, int msw); */
int ar_putword (int board, int channel, long arinc_word);
```

Navy Case No. 77257

```
/************************************************************************
Module Name:    utility.c
Number/Version:
History:
     Date              Rev        Author           Description
     23-Feb-1995       1.00       C. Houlberg      Baseline
     8-Feb-1996        1.03       C. Houlberg      Added display of file errors.
                                                   get_calibration()
                                                   put_calibration()

Abstract:   Utility program.
     latitude_to_ascii():    Converts latitude in radians to an ASCII string.
     longitude_to_ascii():   Converts longitude in radians to an ASCII string.
     ascii_to_latitude():    Converts ascii latitude string to radians.
     ascii_to_longitude():   Converts ascii longitude string to radians.
     ascii_to_angle():       Converts ascii angle to radians.
     get_calibration():      Retreives data from file.
     put_calibration():      Stores data into file.
     analog_to_radians();    Converts analog data to radians.
     radians_to_analog();    Converts radians to analog data.
*************************************************************************/
/*   All parameters and functions used by utility() are defined in
     the following header files.
*/
     #include "stdio.h"                    /* Standard I/O definitions */
     #include "math.h"                     /* Math definitions */
     #include "string.h"                   /* String definitions */
     #include "avtsc.h"                    /* Project definitions */
     #include "utility.h"                  /* Utility definitions */
     #include "error.h"                    /* Error definitions */

/************************************************************************
Function Name:  latitude_to_ascii()
Number/Version:
History:
     Date              Rev        Author           Description
     23-Feb-1995       1.00       C. Houlberg      Baseline Abstract:   Converts latitude in radians to ascii string.
*************************************************************************/
void latitude_to_ascii(char *buffer, double latitude)
{
     /* Variable declarations */
     char ns;                                      /* Compass point */
     double latd, latm;                            /* Degrees and minutes */

/* Replace sign with compass point */
     if(latitude < 0)
     {
          latitude = -latitude;
          ns = 'S';
     }
     else
     {
          ns = 'N';
     }
```

294

Navy Case No. 77257

```
        /* Convert degrees to degrees and minutes */
        latm = 60 * modf(latitude * 180/PI, &latd);

/* Put the latitude in the buffer */
        sprintf(buffer, "%c %3.0f %05.2f", ns, latd, latm);
}
/**************************************************************************
Function Name:   longitude_to_ascii()
Number/Version:
History:
        Date            Rev             Author          Description
        23-Feb-1995     1.00            C. Houlberg     Baseline Abstract:   Converts longitude in radians to ascii string.
***************************************************************************/
void longitude_to_ascii(char *buffer, double longitude)
{
        /* Variable declarations */
        char ew;                                        /* Compass point */
        double lond, lonm;                              /* Degrees and minutes */

/* Replace sign with compass point */
        if(longitude < 0)
        {
                longitude = -longitude;
                ew = 'W';
        }
        else
        {
                ew = 'E';
        }

/* Convert degrees to degrees and minutes */
        lonm = 60 * modf(longitude * 180/PI, &lond);

/* Put the latitude in the buffer */
        sprintf(buffer, "%c %3.0f %05.2f", ew, lond, lonm);
}
/**************************************************************************
Function Name:   ascii_to_latitude()
Number/Version:
History:
        Date            Rev             Author          Description
        23-Feb-1995     1.00            C. Houlberg     Baseline Abstract:   Converts ascii string to latitude in radians.
***************************************************************************/
double ascii_to_latitude(char *buffer)
{
        /* Variable declarations */
        char compass_point[2];
        char degrees[3];
        char minutes[6];
        double latitude;                                /* Radians */
```

295

Navy Case No. 77257

```
      /* Convert degrees and minutes to radians */
      sscanf(buffer, "%s %s %s", compass_point, degrees, minutes);
      latitude = atof(degrees) + atof(minutes)/60;    /* Angle in degrees */
      if(latitude > 90)
            latitude = 90;                                      /* Limit angle to 90 */
      latitude = latitude * PI/180;                       /* Angle in radians */

/* Acount for sign */
      if((compass_point[0] == 'S') || (compass_point[0] == 's'))
            latitude = -latitude;

return latitude;
}
/****************************************************************************
Function Name:    ascii_to_longitude()
Number/Version:
History:
      Date              Rev         Author          Description
      23-Feb-1995       1.00        C. Houlberg     Baseline Abstract:   Converts ascii string to longitude in radians.
****************************************************************************/
double ascii_to_longitude(char *buffer)
{
      /* Variable declarations */
      char compass_point[2];
      char degrees[3];
      char minutes[6];
      double longitude;                                   /* Radians */

/* Convert degrees and minutes to radians */
      sscanf(buffer, "%s %s %s", compass_point, degrees, minutes);
      longitude = atof(degrees) + atof(minutes)/60;   /* Angle in degrees */
      if(longitude > 180)                                 /* Limit angle to 180 */
            longitude = 180;
      longitude = longitude * PI/180;                     /* Angle in radians */

/* Acount for sign */
      if((compass_point[0] == 'W') || (compass_point[0] == 'w'))
            longitude = -longitude;

return longitude;
}
/****************************************************************************
Function Name:    ascii_to_angle()
Number/Version:
History:
      Date              Rev         Author          Description
      1-Mar-1995        1.00        C. Houlberg     Baseline Abstract:   Converts ascii string to an angle in radians.
****************************************************************************/
double ascii_to_angle(char *buffer)
{
      /* Variable declarations */
```

Navy Case No. 77257

```c
       char degrees[4], minutes[6];
       double angle;                                    /* Angle in radians */

/* Convert degrees and minutes to radians */
       sscanf(buffer, "%s %s", degrees, minutes);
       angle = atof(degrees) + atof(minutes)/60;        /* Angle in degrees */
       angle = angle * PI/180;                          /* Angle in radians */ return angle;
}
/******************************************************************************
Function Name:   get_calibration()
Number/Version:
History:
        Date            Rev         Author          Description
        1-Mar-1995      1.00        C. Houlberg     Baseline
        8-Feb-1996      1.03        C. Houlberg     Added display of file errors.

Abstract:    Retreives calibration data from the file setup.cal.
******************************************************************************/
void get_calibration(FILE *file_pointer,
     struct File_Location *data_location, char *data)
{
       /* Variable declarations */
       char buffer[82];           /* Allow for LF and an 80 character line */
       char *string_pointer;                  /* Pointer into string */
       short error;                           /* Error flag */

/* Search file from the beginning */
       error = fseek(file_pointer, 0, SEEK_SET);
       if(error)
               add_error(FILE_SEEK_FAILED);
       else
               /* Locate the data group */
               do
               {
                       /* Search each line in the file */
                       error = fscanf(file_pointer, "%[\n]");   /* Move pointer past \n */
                       if(error == EOF)
                               add_error(FILE_SCAN_FAILED);
                       else                                     /* Read up to \n */
                       {
                               error = fscanf(file_pointer, "%[^\n]", buffer);
                               if(error == EOF)
                                       add_error(FILE_SCAN_FAILED);
                               else
                                       error = 0;
                       }
               /* Test for Group */
               } while(!error && !strstr(buffer, data_location->Group));

if(!error)
               /* Locate the data item */
               do
               {
                       error = fscanf(file_pointer, "%[\n]");   /* Move pointer past \n */
```

Navy Case No. 77257

```
                if(error == EOF)
                        add_error(FILE_SCAN_FAILED);
                else                                            /* Read up to \n */
                {
                        error = fscanf(file_pointer, "%[^\n]", buffer);
                        if(error == EOF)
                                add_error(FILE_SCAN_FAILED);
                        else
                                error = 0;
                }
        /* Test for data item */
        } while(!error
                && !(string_pointer = strstr(buffer, data_location->Item)));

if(!error)
        {
                /* Move the pointer to the data */
                string_pointer += strlen(data_location->Item) + 1;

/* Copy out the desired data */
                strncpy(data, string_pointer, data_location->Size);
                data[data_location->Size] = '\0';               /* Terminate string */
        }
}

/**************************************************************************
Function Name:  put_calibration()
Number/Version:
History:
        Date            Rev     Author          Description
        1-Mar-1995      1.00    C. Houlberg     Baseline
        8-Feb-1996      1.03    C. Houlberg     Added display of file errors.

Abstract:   Stores calibration data into the file setup.cal.
**************************************************************************/
void put_calibration(FILE *file_pointer,
        struct File_Location *data_location, char *data)
{
        /* Variable declarations */
        char buffer[85];                        /* Allow for an 80 character line */
        char *string_pointer;                   /* Pointer into string */
        long static temp;
        short error;                            /* Error flag */

/* Search file from the beginning */
        error = fseek(file_pointer, 0, SEEK_SET);
        if(error)
                add_error(FILE_SEEK_FAILED);
        else
                /* Locate the data group */
                do
                {
                        /* Search each line in the file (skip the first) */
                        error = fscanf(file_pointer, "%[\n]");  /* Move pointer past \n */
                        if(error == EOF)
                                add_error(FILE_SCAN_FAILED);
                        else                                    /* Read up to \n */
```

Navy Case No. 77257

```
                {
                        error = fscanf(file_pointer, "%[^\n]", buffer);
                        if(error == EOF)
                                add_error(FILE_SCAN_FAILED);
                        else
                                error = 0;
                }
                /* Test for Group */
                } while(!error && !strstr(buffer, data_location->Group));

if(!error)
                /* Locate the data item */
                do
                {
                        error = fscanf(file_pointer, "%[\n]");      /* Move pointer past \n */
                        if(error == EOF)
                                add_error(FILE_SCAN_FAILED);
                        else                                         /* Read up to \n */
                        {
                                error = fscanf(file_pointer, "%[^\n]", buffer);
                                if(error == EOF)
                                        add_error(FILE_SCAN_FAILED);
                                else
                                        error = 0;
                        }
                /* Test for data item */
                } while(!error
                        && !(string_pointer = strstr(buffer, data_location->Item)));

if(!error)
        {
                /* Move the pointer to the data storage location */
                string_pointer += strlen(data_location->Item) + 1;
                temp = string_pointer - buffer;
                temp -= strlen(buffer);
                error = fseek(file_pointer, temp, SEEK_CUR);
                if(error)
                        add_error(FILE_SEEK_FAILED);
        } if(!error)
                /* Write the data to the file (without the string terminator) */
                fwrite(data, sizeof(char), data_location->Size, file_pointer);
}
/************************************************************************
Function Name:   analog_to_radians()
Number/Version:
History:
        Date            Rev         Author          Description
        13-Mar-1995     1.00        J. Hauselmann   Baseline Abstract: Convert analog i/o data into radians with calabrations included.
************************************************************************/
double voltage_to_radians(double analog,
        struct Adjustment *adjustments)
```

Navy Case No. 77257

```
{
    double angle;

/* Convert analog voltage to radians */
    angle = ( adjustments->gain * adjustments->cal_gain *
            ( analog + adjustments->v_offset + adjustments->cal_offset ) ) *
            ( PI/180.0 );

return ( angle );
}

/************************************************************************
Function Name:    radians_to_analog()
Number/Version:
History:
      Date              Rev       Author            Description
      13-Mar-1995       1.00      J. Hauselmann     Baseline Output:
      analog_data - converted radian data Abstract: Convert radians into analog data with calabrations included.
************************************************************************/
unsigned short radians_to_dac(double angle, struct Adjustment *adjustments)
{
      unsigned short analog;
    double volts;

volts = ((angle * adjustments->cal_gain * (180/PI))/adjustments->gain)
      - (adjustments->v_offset + adjustments->cal_offset);

/*   Verify that volts is between positive full scale - 1LS and
           negitive full scale. Adjust accordingly */
      if( volts >= POS_FULL_SCALE/GAIN_1 )
            volts = (POS_FULL_SCALE/GAIN_1)
                  - (((POS_FULL_SCALE - NEG_FULL_SCALE)/GAIN_1)/4096.0);
      else if( volts < NEG_FULL_SCALE/GAIN_1 )
            volts = NEG_FULL_SCALE/GAIN_1;

/* Convert volts to a 12 bit analog value */
      analog = (unsigned short) ((volts - (NEG_FULL_SCALE/GAIN_1))
            * (4096.0/((POS_FULL_SCALE - NEG_FULL_SCALE)/GAIN_1)));

return ( analog );
}

/* end */
```

Navy Case No. 77257

```
/*******************************************************************
Module Name:    utility.h
Number/Version:
History:
        Date            Rev         Author          Description
        20-Jan-1995     1.00        C. Houlberg     Baseline
        5-Sep-1995      1.02        C. Houlberg     Added gimbal soft stop capability.

Abstract:   Utility definitions.
*******************************************************************/

/*      Physical constants.
*/
        #define GAIN_1                  1           /* 1 +/- 10 Volts */
        #define GAIN_2                  2           /* 2 +/- 5 Volts */
        #define GAIN_4                  4           /* 4 +/- 2.5 Volts */
        #define GAIN_8                  8           /* 8 +/- 1.25 Volts */ define POS_FULL_SCALE          10.0
        #define NEG_FULL_SCALE          -10.0

/*      Structure definitions.
*/
        struct File_Location
        {
/* Code change 5-Sep-1995 for gimbal soft stop capability from:
            char Group[14];
to: */
            char Group[15];
/* End of code change */
            char Item[14];
            short Size;
        };

struct Adjustment
        {
            double gain;
            double v_offset;
            double cal_gain;
            double cal_offset;
            double max_volts;
            double min_volts;
        };

/*      Function definitions.
*/
        void latitude_to_ascii(char *buffer, double latitude);
        void longitude_to_ascii(char *buffer, double latitude);
        double ascii_to_latitude(char *buffer);
        double ascii_to_longitude(char *buffer);
        double ascii_to_angle(char *buffer);
        void get_calibration(FILE *file_pointer,
            struct File_Location *data_location,
            char *data);
        void put_calibration(FILE *file_pointer,
            struct File_Location *data_location,
            char *data);
```

Navy Case No. 77257

```
double voltage_to_radians(double analog,
        struct Adjustment *adjustments);
unsigned short radians_to_dac(double angle,
        struct Adjustment *adjustments);

/* end */
```

Navy Case No. 77257

```
/*******************************************************************
Module Name:     video.c
Number/Version:
History:
     Date             Rev        Author           Description
     31-Mar-1995      1.00       J. Hauselmann    Baseline Abstract:
    set_anti_flicker()    : Enables or disables anti flicker.
    set_operation_mode(): Sets current board to specified mode.
    switch_monitors()     : Switches control from one video board to another.
********************************************************************/
/*   All parameters and functions used by video.c are defined in
     the following header files.
*/ include "dos.h"              /* Dos funtion definitions */
     #include "graph.h"            /* Graphics I/O definitions */
     #include "displays.h"         /* Display function definitions */
     #include "mem_map.h"          /* Memory Map definitions */
     #include "video.h"            /* Video display definitions */

/* Global variables
*/
     unsigned short current_port = CONSOLE;
     short console_color;                      /* Console pixel color */
     short overlay1_color;                     /* Overlay #1 pixel color */
     short overlay2_color;                     /* Overlay #2 pixel color */

/*******************************************************************
Function Name:   set_anti_flicker()
Number/Version:
History:
     Date             Rev        Author           Description
     03-Apr-1995      1.00       J. Hauselmann    Baseline Abstract: Sets anti flicker on or off.
********************************************************************/
void set_anti_flicker(unsigned char enable_disable)
{
     union REGS regs;

regs.x.ax = VGA_BIOS + 0x21;   // Set/Clear Anti-flicker
     regs.h.bl = enable_disable;
     int86(0x10,®s, ®s);
}

/*******************************************************************
Function Name:   set_operation_mode()
Number/Version:
History:
     Date             Rev        Author           Description
     03-Apr-1995      1.00       J. Hauselmann    Baseline
```

Navy Case No. 77257

```c
Abstract: Sets video output operation mode.
**************************************************************************/
void set_operation_mode(unsigned char video_mode)
{
      union REGS regs;

regs.x.ax = VGA_BIOS + 0x22;  // Setup video mode
      regs.h.bl = video_mode;
      int86(0x10,®s, ®s);
}

/**************************************************************************
Function Name:   switch_monitors()
Number/Version:
History:
      Date              Rev       Author          Description
      03-Apr-1995       1.00      J. Hauselmann   Baseline Global Input:
      console_color  : Present color to be displayed for colsole.
      overlay1_color : Present color to be displayed for overlay1.
      overlay2_color : Present color to be displayed for overlay2.

Abstract: Enable & Disable VIGA Boards.
**************************************************************************/
unsigned short switch_monitors(unsigned short new_addr,
      unsigned short old_addr)
{
      union REGS regs;
      short color;

if( new_addr != old_addr )
      {
            regs.x.ax = VGA_BIOS + 0x24;   // Enable & Disable VIGA Boards
            regs.x.bx = new_addr;
            regs.x.dx = old_addr;
            int86(0x10,®s, ®s);
      }

/* Determine color for newly selected video board */
      switch(new_addr)
      {
            case(CONSOLE):
                  color = console_color;
                  break;
            case(WFOV):
                  color = overlay1_color;
                  break;
            case(NFOV):
                  color = overlay2_color;
                  break;
      }

/* Set color for newly selected video board */
     _setcolor(color);
     _settextcolor(color);
```

Navy Case No. 77257

```
    return( new_addr );
}
```

Navy Case No. 77257

```
/*****************************************************************
Module Name:    video.h
Number/Version:
History:
      Date             Rev         Author            Description
      10-Apr-1995      1.00        J. Hauselmann     Baseline Abstract:
    Video boards definitions
******************************************************************/

/*    Constant definitions.
*/
      #define DISABLE              0
      #define ENABLE               1
      #define GRAPHIC_MODE         0x01
      #define LIVE_MODE            0x02
      #define GENLOCK_MODE         0x03
      #define OVERLAY_MODE         0x04

/*    Global definitions
*/
      extern unsigned short current_port;
      extern short console_color;        /* Console pixel color */
      extern short overlay1_color;       /* Overlay #1 pixel color */
      extern short overlay2_color;       /* Overlay #2 pixel color */

/*    Function definitions.
*/
      void set_anti_flicker(unsigned char enable_disable);
      void set_operation_mode(unsigned char video_mode);
      unsigned short switch_monitors(unsigned short new_addr,
            unsigned short old_addr);

/* end */
```

Navy Case No. 77257

```
/*********************************************************************
Module Name:    vtr.c
Number/Version:
History:
        Date            Rev         Author          Description
        23-Jan-1995     1.00        C. Houlberg     Baseline Abstract:   Video Tape Recorder (VTR) functions.
        output_vtr_command():
                Outputs commands to the VTRs.
        vtr_send():
                Sends ASCII characters to the VTRs.
*********************************************************************/
/*      All parameters and functions used by vtr.c are defined in
        the following header files.
*/
        #include "time.h"                   /* Computer timer definitions */
        #include "bios.h"                   /* BIOS definitions */
        #include "avtsc.h"                  /* Project definitions */
        #include "error.h"                  /* Error display definitions */
        #include "vtr.h"                    /* VTR function definitions */

/*      Constant definitions local to vtr.c.
*/
        enum VTR_Control vtr_command;
        char vtr_start_command[] = {STX, 'O', 'R', 'C', ETX, 0};
        char vtr_stop_command[]  = {STX, 'O', 'S', 'P', ETX, 0};
        short vtr1_string_pointer = 0;
        short vtr2_string_pointer = 0;
        short vtr_error_flags = 0;          /* Error flags */

/*      Variables local to init.c.
*/
        /* COM port address locations */
        #define COM3_VEC   0x00400004       /* COM3 vector memory location */
        #define COM4_VEC   0x00400006       /* COM4 vector memory location */
        #ifdef TARGET_SYSTEM
            #define COM3_LOC   0x2e0        /* Port #1 => COM3 (VTR #1) */
            #define COM4_LOC   0x2f0        /* Port #3 => COM4 (VTR #2) */
        #else
            #define COM3_LOC   0x3f8        /* Actually COM1 */
            #define COM4_LOC   0x2f8        /* Actually COM2 */
        #endif
        /* VTR errors */
        #define VTR_1_NOT_READY    0x01     /* VTR 1 not ready */
        #define VTR_2_NOT_READY    0x02     /* VTR 2 not ready */
        #define VTR_1_ERROR        0x04     /* VTR 1 receive error */
        #define VTR_2_ERROR        0x08     /* VTR 2 receive error */

/*      Functions local to vtr.c
*/
        void vtr_send(char ascii, enum Serial_Port vtr);

/*********************************************************************
Function Name:  initialize_vtr_ports()
Number/Version:
History:
```

Navy Case No. 77257

```
        Date            Rev         Author          Description
        23-Jan-1995     1.00        C. Houlberg     Baseline Abstract:   Outputs commands to the VTRs.
***********************************************************************/
void initialize_vtr_ports(void)
{
      /* Variable declarations */
      short far *com_port_vector;
      unsigned short status;

/* Establish address locations for COM3 and COM4 */
      com_port_vector = (short far *) COM3_VEC;
      *com_port_vector = COM3_LOC;
      com_port_vector = (short far *) COM4_VEC;
      *com_port_vector = COM4_LOC;

/* Initialize COM3 (port for VTR #1) */
      status = _bios_serialcom(_COM_INIT, COM3,
            _COM_CHR7 | _COM_STOP1 | _COM_ODDPARITY | _COM_9600);
      if(!(status & DSR))
      {
            vtr_error_flags = vtr_error_flags | VTR_1_NOT_READY;
            add_error(VTR1_NOT_READY);
      }

/* Initialize COM4 (port for VTR #2) */
      status = _bios_serialcom(_COM_INIT, COM4,
            _COM_CHR7 | _COM_STOP1 | _COM_ODDPARITY | _COM_9600);
      if(!(status & DSR))
      {
            vtr_error_flags = vtr_error_flags | VTR_2_NOT_READY;
            add_error(VTR2_NOT_READY);
      }
}

/************************************************************************
Function Name:   output_vtr_command()
Number/Version:
History:
        Date            Rev         Author          Description
        23-Jan-1995     1.00        C. Houlberg     Baseline Abstract:   Outputs commands to the VTRs.
***********************************************************************/
void output_vtr_command(enum VTR_Control vtr_command)
{
      /* Variable declarations */
      short vtr1_done = NO;
      short vtr2_done = NO;
      char command_character_1 = 0;
      char command_character_2 = 0;

/* Point to command for VTRs */
      switch(vtr_command)
      {
            case(START):                            /* [STX]ORC[ETX] */
```

Navy Case No. 77257

```
                /* Start recording */
                command_character_1 = vtr_start_command[vtr1_string_pointer];
                command_character_2 = vtr_start_command[vtr2_string_pointer];
                break;
            case(STOP):                                  /* [STX]OSP[ETX] */
                /* Stop recording */
                command_character_1 = vtr_stop_command[vtr1_string_pointer];
                command_character_2 = vtr_stop_command[vtr2_string_pointer];
                break;
    }

/* Send command character to VTR #1 */
    if(command_character_1)
        vtr_send(command_character_1, COM3);
    else
        vtr1_done = YES;

/* Send command character to VTR #2 */
    if(command_character_2)
        vtr_send(command_character_2, COM4);
    else
        vtr2_done = YES;

/* Test for commands sent */
    if((vtr1_done == YES) && (vtr2_done == YES))
        vtr_command = NONE;
}
/*****************************************************************************
Function Name:   vtr_send()
Number/Version:
History:
    Date            Rev         Author          Description
    23-Jan-1995     1.00        C. Houlberg     Baseline Abstract:   Sends ASCII characters to the VTR.
*****************************************************************************/
void vtr_send(char ascii, enum Serial_Port vtr)
{
    /* Variable declarations */
    unsigned short status, test;

/* Test VTR port status */
    status = _bios_serialcom(_COM_STATUS, vtr, ascii);
    /* Continue with command if data set is ready */
    if(status & DSR)
    {
        if(vtr == COM3)
        {
            /* If set remove previous data set not ready error */
            if(vtr_error_flags & VTR_1_NOT_READY)     /* Clear error indication */
            {
                vtr_error_flags = vtr_error_flags & !(VTR_1_NOT_READY);
                remove_error(VTR1_NOT_READY);
            }
        }
        else
```

Navy Case No. 77257

```
    {
        if(vtr_error_flags & VTR_2_NOT_READY)       /* Clear error indication */
        {
            vtr_error_flags = vtr_error_flags & !(VTR_2_NOT_READY);
            remove_error(VTR2_NOT_READY);
        }
    }

/* Clear any previously received data */
if(status & DREADY)                                 /* Data is ready, clear it */
    test = _bios_serialcom(_COM_RECEIVE, vtr, ascii);

/* Display error condition */
if(status & ERROR)                                  /* VTR error */
{
    if(vtr == COM3)
    {
        /* Reset character pointer */
        vtr1_string_pointer = 0;

vtr_error_flags = vtr_error_flags | VTR_1_ERROR;
        add_error(VTR1_ERROR);
    }
    else
    {
        /* Reset character pointer */
        vtr2_string_pointer = 0;

vtr_error_flags = vtr_error_flags | VTR_2_ERROR;
        add_error(VTR2_ERROR);
    }
}
else if((status & CTS)                              /* Send the command character */
    && (status & TX_HOLD_EMPTY))    /* Ready for next character */
{
    if(vtr == COM3)
    {
        /* Increment character pointer */
        ++vtr1_string_pointer;

/* If set remove previous error indication */
        if(vtr_error_flags & VTR_1_NOT_READY)       /* Clear error */
        {
            vtr_error_flags = vtr_error_flags & !(VTR_1_NOT_READY);
            remove_error(VTR1_NOT_READY);
        }
    }
    else
    {
        /* Increment character pointer */
        ++vtr2_string_pointer;

if(vtr_error_flags & VTR_2_NOT_READY)       /* Clear error */
        {
            vtr_error_flags = vtr_error_flags & !(VTR_2_NOT_READY);
            remove_error(VTR2_NOT_READY);
        }
```

310

Navy Case No. 77257

```
            }
            /* Output VTR command character */
            _bios_serialcom(_COM_SEND, vtr, ascii);
        }
    }
    else                                           /* Display VTR not ready */
    {
        if(vtr == COM3)
        {
            vtr_error_flags = vtr_error_flags | VTR_1_NOT_READY;
            add_error(VTR1_NOT_READY);
        }
        else
        {
            vtr_error_flags = vtr_error_flags | VTR_2_NOT_READY;
            add_error(VTR2_NOT_READY);
        }
    }
}
/* end */
```

Navy Case No. 77257

```
/****************************************************************
Module Name:     vtr.h
Number/Version:
History:
        Date            Rev         Author          Description
        12-Jan-1995     1.00        C. Houlberg     Baseline Abstract:
    Video Tape Recorder (VTR) definitions.
****************************************************************/

/*      Constant definitions.
*/
        #define STX                 0x02            /* Start of transmission */
        #define ETX                 0x03            /* End of transmission */
        #define TX_HOLD_EMPTY       0x2000          /* Hold register is empty */
        #define DREADY              0x0100          /* Data ready mask */
        #define ERROR               0x0c00          /* Error mask (overrun OK) */
        #define DSR                 0x0020          /* Data set ready */
        #define CTS                 0x0010          /* Clear to send mask */ enum Serial_Port
        {
                COM1,
                COM2,
                COM3,
                COM4
        };

enum VTR_Control
        {
                NONE,
                START,
                STOP
        };

/*      Global variables.
*/
        extern enum VTR_Control vtr_command;
        extern short vtr1_string_pointer;
        extern short vtr2_string_pointer;

/*      Function definitions.
*/
        void initialize_vtr_ports(void);
        void output_vtr_command(enum VTR_Control command);

/* end */
```

Navy Case No. 77257

```
/****************************************************************
Module Name:      vtr.h
Number/Version:
History:
        Date            Rev         Author          Description
        12-Jan-1995     1.00        C. Houlberg     Baseline Abstract:
    Video Tape Recorder (VTR) definitions.
****************************************************************/
/*      Constant definitions.
*/
        #define STX                 0x02            /* Start of transmission */
        #define ETX                 0x03            /* End of transmission */
        #define TX_HOLD_EMPTY       0x2000          /* Hold register is empty */
        #define DREADY              0x0100          /* Data ready mask */
        #define ERROR               0x0c00          /* Error mask (overrun OK) */
        #define DSR                 0x0020          /* Data set ready */
        #define CTS                 0x0010          /* Clear to send mask */ enum Serial_Port
        {
            COM1,
            COM2,
            COM3,
            COM4
        };

enum VTR_Control
        {
            NONE,
            START,
            STOP
        };

/*      Global variables.
*/
        extern enum VTR_Control vtr_command;
        extern short vtr1_string_pointer;
        extern short vtr2_string_pointer;

/*      Function definitions.
*/
        void initialize_vtr_ports(void);
        void output_vtr_command(enum VTR_Control command);

/* end */
```

Navy Case No. 77257

```
***********************************************************************
Module Name:    waypoint.dat
Number/Version:
History:
      Date          Rev        Author           Description
      13-Feb-1995   1.00       C. Houlberg      Baseline Abstract:   Waypoint data file.
***********************************************************************

WAYPOINT 1
      LAT N   34 06.43                 Compass point, degrees, and minutes.
      LON W  119 04.00                 Compass point, degrees, and minutes.
      ALT 1413                         Feet.
      DESCRIPTION Dome
WAYPOINT 2
      LAT N   34 07.37                 Compass point, degrees, and minutes.
      LON W  119 04.13                 Compass point, degrees, and minutes.
      ALT 550                          Feet.
      DESCRIPTION Lone Tree
WAYPOINT 3
      LAT N   34 06.67                 Compass point, degrees, and minutes.
      LON W  119 05.00                 Compass point, degrees, and minutes.
      ALT 250                          Feet.
      DESCRIPTION Water Tower
WAYPOINT 4
      LAT N   34 06.50                 Compass point, degrees, and minutes.
      LON W  119 03.88                 Compass point, degrees, and minutes.
      ALT 1476                         Feet.
      DESCRIPTION Laguna Peak
WAYPOINT 5
      LAT N   34 06.08                 Compass point, degrees, and minutes.
      LON W  119 04.00                 Compass point, degrees, and minutes.
      ALT 1080                         Feet.
      DESCRIPTION ET Sign
```

314

Navy Case No. 77257

CASOS.BAT

```
cd \avtsc
avtsc
cd\
```

Navy Case No. 77257

DIRS.BAT dir/ad/on

What is claimed is:

1. An airborne video tracking system for establishing and maintaining a line of sight to a target, said airborne video tracking system being mounted within an aircraft, said airborne video tracking system comprising:

an acquisition sight positioned within said aircraft, said acquisition sight allowing a pilot of said aircraft to acquire and begin tracking said target, said acquisition sight having a newton ring, said target being acquired when said pilot observes said target within the newton ring of said acquisition sight, said acquisition sight providing first analog position signals indicative of azimuth and elevation sight angles for said acquisition sight when said acquisition sight is tracking said target;

a track handle positioned within said aircraft, said track handle having a trigger switch, said track handle allowing an observer within said aircraft to take control of tracking said target from said pilot when said observer activates said trigger switch, said track handle providing second analog position signals indicative of azimuth and elevation sight angles for said track handle when said track handle is tracking said target;

a computer connected to said acquisition sight to receive said first analog position signals from said acquisition sight and said track handle to receive said second analog position signals from said track handle, said computer processing said first analog position signals and said second analog position signals to generate gimbal orientation signals;

a gimballed mirror having a gimbal interface, said gimbal interface being connected to said computer to receive said gimbal orientation signals from said computer, said gimbal interface responsive to said gimbal orientation signals steering said gimballed mirror to said target to establish and then maintain said line of sight to said target;

said gimballed mirror receiving image forming light from said target and then redirecting said image forming light along a first light path;

a first turning mirror positioned on said first light path to receive a portion of said image forming light from said gimballed mirror and then direct the portion of said image forming light received thereby along a second light path;

a first video camera positioned on said second light path to receive said image forming light directed along said second light path by said first turning mirror, said first video camera responsive to said image forming light received from said first turning mirror generating a first video signal;

a first video monitor connected to said first video camera to receive said first video signal, said first video monitor responsive to said first video signal displaying a wide field of view scene including said target, said first video monitor being positioned within said aircraft to allow said observer to monitor said target when said observer is using said track handle to track said target;

a second turning mirror positioned on said first light path downstream from said first turning mirror, said second turning mirror receiving a remainder of said image forming light from said gimballed mirror and then directing the remainder of said image forming light received thereby along a third light path;

a zoom telescope positioned on said third light path to receive said image forming light directed along said third light path by said second turning mirror, said zoom telescope modifying said image forming light to define a narrow field of view scene;

a second video camera positioned downstream from said zoom telescope on said third light path to receive said image forming light from zoom telescope, said second video camera responsive to said image forming light received from said zoom telescope generating a second video signal; and a second video monitor connected to said second video camera to receive said second video signal, said second video monitor responsive to said second video signal displaying said narrow field of view scene, said narrow field of view scene having said target displayed therein whenever said gimballed mirror is aligned with said line of sight to said target, said second video monitor being positioned within said aircraft to allow said observer to monitor said target when said observer is using said track handle to track said target.

2. The airborne video tracking system of claim 1 wherein said gimballed mirror comprises an approximately four inch mirror fabricated from beryllium, said gimballed mirror having a flatness of about lambda over ten.

3. The airborne video tracking system of claim 1 wherein said first turning mirror comprises a one inch turning mirror having a flatness of about lambda over ten.

4. The airborne video tracking system of claim 1 wherein said second turning mirror comprises a four inch turning mirror having a flatness of about lambda over ten.

5. The airborne video tracking system of claim 1 wherein said zoom telescope modifies said image forming light to provide a range from about 0.1 degree to about one degree for said narrow field of view scene.

6. The airborne video tracking system of claim 1 further comprising:

a first video recorder connected to said first video camera to receive said first video signal and record said first video signal; and a second video recorder connected to said second video camera to receive said second video signal and record said second video signal.

7. An airborne video tracking system for establishing and maintaining a line of sight to a target, said airborne video tracking system being mounted within an aircraft, said airborne video tracking system comprising:

an acquisition sight positioned within said aircraft, said acquisition sight allowing a pilot of said aircraft to acquire and begin tracking said target, said acquisition sight having a newton ring, said target being acquired when said pilot observes said target within the newton ring of said acquisition sight, said acquisition sight providing first analog position signals indicative of azimuth and elevation sight angles for said acquisition sight when said acquisition sight is tracking said target;

a track handle positioned within said aircraft, said track handle having a trigger switch, said track handle allowing an observer within said aircraft to take control of tracking said target from said pilot when said observer activates said trigger switch, said track handle providing second analog position signals indicative of azimuth and elevation sight angles for said track handle when said track handle is tracking said target;

a computer connected to said acquisition sight to receive said first analog position signals from said acquisition sight and said track handle to receive said second analog position signals from said track handle, said computer processing said first analog position signals and said second analog position signals to generate gimbal angular pointing signals;

a gimballed mirror having a gimbal interface, said gimbal interface being connected to said computer to receive said gimbal angular pointing signals from said computer, said gimbal interface responsive to said gimbal angular pointing signals steering said gimballed mirror to said target establish and then maintain said line of sight to said target;

said gimballed mirror receiving image forming light from said target and then directing a first beam of said image forming light along a first light path;

a first turning mirror positioned on said first light path to receive the first beam of said image forming light from said gimballed mirror, said first turning mirror directing a second beam of said image forming light along a second light path;

a first video camera positioned on said second light path to receive the second beam of said image forming light, said first video camera responsive to the second beam of said image forming light received from said first turning mirror generating a first video signal;

a first video monitor connected to said first video camera to receive said first video signal, said first video monitor responsive to said first video signal displaying a wide field of view scene including said target, said first video monitor being positioned within said aircraft to allow said observer to monitor said target when said observer is using said track handle to track said target;

a second turning mirror positioned on said first light path downstream from said first turning mirror, said second turning mirror receiving the first beam of said image forming light from said gimballed mirror, said second turning mirror directing a third beam of said image forming light along a third light path;

a zoom telescope positioned on said third light path to receive the third beam of said image forming light, said zoom telescope modifying the third beam of said image forming light to define a narrow field of view scene;

a second video camera positioned downstream from said zoom telescope on said third light path to receive the third beam said image forming light from zoom telescope, said second video camera responsive to the third beam of said image forming light received from said zoom telescope generating a second video signal;

an aircraft inertial navigation system connected to said computer, said aircraft inertial navigation system generating digital aircraft positional signals indicative of latitude, longitude and altitude for said aircraft and roll, pitch and heading for said aircraft, said aircraft inertial navigation system providing said digital aircraft positional signals to said computer;

said gimbal interface generating gimbal angular position signals indicative of azimuth and elevation line of sight angles for said gimballed mirror when said gimballed mirror is tracking said target, said gimbal interface providing said gimbal angular position signals to said computer;

said computer, responsive to said digital aircraft positional signals and said gimbal angular position signals, calculating a latitude, a longitude and an altitude for said target;

said computer being connected to said second video camera to receive said second video signal, said computer processing said second video signal to overlaying the latitude, the longitude and the altitude of said target on said second video signal; and a second video monitor connected to said computer to receive said second video signal, said second video monitor responsive to said second video signal displaying said narrow field of view scene, said narrow field of view scene having said target displayed therein whenever said gimballed mirror is aligned with said line of sight to said target, said narrow field of view scene including the latitude, the longitude and the altitude of said target, said second video monitor being positioned within said aircraft to allow said observer to monitor said target when said observer is using said track handle to track said target.

8. The airborne video tracking system of claim 7 wherein said gimballed mirror comprises an approximately four inch mirror fabricated from beryllium, said gimballed mirror having a flatness of about lambda over ten.

9. The airborne video tracking system of claim 7 wherein said first turning mirror comprises a one inch turning mirror having a flatness of about lambda over ten and said second turning mirror comprises a four inch turning mirror having a flatness of about lambda over ten.

10. The airborne video tracking system of claim 7 wherein said zoom telescope modifies said image forming light to provide a range from about 0.1 degree to about one degree for said narrow field of view scene.

11. The airborne video tracking system of claim 7 further comprising:

a first video recorder connected to said first video camera to receive said first video signal and record said first video signal; and a second video recorder connected to said computer to receive said second video signal and record said second video signal.

12. The airborne video tracking system of claim 7 further comprising:

a flip mirror positioned on said third light path between said zoom telescope and said second video camera, said flip mirror directing the third beam said image forming light from zoom telescope to said second video camera; and a third video camera positioned downstream from said flip mirror on a fourth light path;

said flip mirror being rotated ninety degrees, said flip mirror then directing the third beam of said image forming light to said third video camera;

said third video camera responsive to the third beam of said image forming light received from said zoom telescope generating a third video signal;

said third video camera being connected to said computer to provide said third video signal to said computer.

13. The airborne video tracking system of claim 7 further comprising a third video monitor connected to said computer, said third video monitor displaying the latitude, the longitude and the altitude of said target.

14. An airborne video tracking system for establishing and maintaining a line of sight to a target, said airborne video tracking system being mounted within an aircraft, said airborne video tracking system comprising:

an acquisition sight positioned within said aircraft, said acquisition sight allowing a pilot of said aircraft to acquire and begin tracking said target, said acquisition sight having a newton ring, said target being acquired when said pilot observes said target within the newton ring of said acquisition sight, said acquisition sight providing first analog position signals indicative of azimuth and elevation sight angles for said acquisition sight when said acquisition sight is tracking said target;

a track handle positioned within said aircraft, said track handle having a trigger switch, said track handle allowing an observer within said aircraft to take control of tracking said target from said pilot when said observer activates said trigger switch, said track handle providing second analog position signals indicative of azimuth and elevation sight angles for said track handle when said track handle is tracking said target;

a computer connected to said acquisition sight to receive said first analog position signals from said acquisition sight and said track handle to receive said second analog position signals from said track handle, said computer processing said first analog position signals and said second analog position signals to generate gimbal angular pointing signals;

a gimballed mirror having a gimbal interface, said gimbal interface being connected to said computer to receive said gimbal angular pointing signals from said computer, said gimbal interface responsive to said gimbal angular pointing signals steering said gimballed mirror to said target establish and then maintain said line of sight to said target;

said gimballed mirror receiving image forming light from said target and then directing a first beam of said image forming light along a first light path;

a first turning mirror positioned on said first light path to receive the first beam of said image forming light from said gimballed mirror, said first turning mirror directing a second beam of said image forming light along a second light path;

a first video camera positioned on said second light path to receive the second beam of said image forming light, said first video camera responsive to the second beam of said image forming light received from said first turning mirror generating a first video signal;

said computer being connected to said first video camera to receive said first video signal, said computer overlaying time and data information on said first video signal;

a first video monitor connected to said computer to receive said first video signal, said first video monitor responsive to said first video signal displaying a wide field of view scene including said target and said time and data information;

a second turning mirror positioned on said first light path downstream from said first turning mirror, said second turning mirror receiving the first beam of said image forming light from said gimballed mirror, said second turning mirror directing a third beam of said image forming light along a third light path;

a zoom telescope positioned on said third light path to receive the third beam of said image forming light, said zoom telescope modifying the third beam of said image forming light to define a narrow field of view scene;

a second video camera positioned downstream from said zoom telescope on said third light path to receive the third beam said image forming light from zoom telescope, said second video camera responsive to the third beam of said image forming light received from said zoom telescope generating a second video signal;

an aircraft inertial navigation system connected to said computer, said aircraft inertial navigation system generating digital aircraft positional signals indicative of latitude, longitude and altitude for said aircraft and roll, pitch and heading for said aircraft, said aircraft inertial navigation system providing said digital aircraft positional signals to said computer;

said gimbal interface generating gimbal angular position signals indicative of azimuth and elevation line of sight angles for said gimballed mirror when said gimballed mirror is tracking said target, said gimbal interface providing said gimbal angular position signals to said computer;

said computer, responsive to said digital aircraft positional signals and said gimbal angular position signals, calculating a latitude, a longitude and an altitude for said target;

said computer being connected to said second video camera to receive said second video signal, said computer processing said second video signal to overlaying the latitude, the longitude and the altitude of said target on said second video signal; and a second video monitor connected to said computer to receive said second video signal, said second video monitor responsive to said second video signal displaying said narrow field of view scene, said narrow field of view scene having said target displayed therein whenever said gimballed mirror is aligned with said line of sight to said target, said narrow field of view scene including the latitude, the longitude and the altitude of said target; and an automatic video tracker positioned within said aircraft, said automatic video tracker beginning to track said target when said target is within said narrow field of view scene and said observer switches control of tracking said target from said track handle to said automatic video tracker, said automatic video tracker providing third analog position signals indicative of azimuth and elevation sight angles for said automatic video tracker when said automatic video tracker is tracking said target;

said computer being connected to said automatic video tracker to receive said third analog position signals, said computer processing said third analog position signals to generate said gimbal angular pointing signals.

15. The airborne video tracking system of claim 14 wherein said gimballed mirror comprises an approximately four inch mirror fabricated from beryllium, said gimballed mirror having a flatness of about lambda over ten.

16. The airborne video tracking system of claim 14 wherein said first turning mirror comprises a one inch turning mirror having a flatness of about lambda over ten and said second turning mirror comprises a four inch turning mirror having a flatness of about lambda over ten.

17. The airborne video tracking system of claim 14 wherein said zoom telescope modifies said image forming light to provide a range from about 0.1 degree to about one degree for said narrow field of view scene.

18. The airborne video tracking system of claim 14 further comprising:

a first video recorder connected to said computer to receive said first video signal and record said first video signal; and a second video recorder connected to said computer to receive said second video signal and record said second video signal.

19. The airborne video tracking system of claim 14 further comprising:

a flip mirror positioned on said third light path between said zoom telescope and said second video camera, said flip mirror directing the third beam of said image forming light from zoom telescope to said second video camera; and a third video camera positioned downstream from said flip mirror on a fourth light path;

said flip mirror being rotated ninety degrees, said flip mirror then directing the third beam of said image forming light to said third video camera;

said third video camera responsive to the third beam of said image forming light received from said zoom telescope generating a third video signal;

said third video camera being connected to said computer to provide said third video signal to said computer.

20. The airborne video tracking system of claim 14 further comprising a third video monitor connected to said computer, said third video monitor displaying the latitude, the longitude and the altitude of said target.

* * * * *